United States Patent [19]
Watts et al.

[11] Patent Number: 5,862,394
[45] Date of Patent: Jan. 19, 1999

[54] ELECTRONIC APPARATUS HAVING A SOFTWARE CONTROLLED POWER SWITCH

[75] Inventors: LaVaughn F. Watts, Temple; William F. Jergens, Belton, both of Tex.

[73] Assignee: Texas Instruments Incorporated, Dallas, Tex.

[21] Appl. No.: 621,741

[22] Filed: Mar. 21, 1996

[51] Int. Cl.$^6$ ............................. G06F 1/24; G06F 1/26
[52] U.S. Cl. ............................. 395/750.07; 395/750.01
[58] Field of Search ............................. 395/750, 750.07, 395/750.01; 364/707; 365/226; 323/271

[56] References Cited

U.S. PATENT DOCUMENTS

| | | | |
|---|---|---|---|
| 4,365,290 | 12/1982 | Nelms et al. | 364/707 |
| 4,598,383 | 7/1986 | Leach | 395/750 |
| 4,847,616 | 7/1989 | Gotou et al. | 340/825 |
| 5,167,024 | 11/1992 | Smith et al. | 395/375 |
| 5,287,525 | 2/1994 | Lum et al. | 395/750 |
| 5,450,003 | 9/1995 | Cheon | 323/272 |
| 5,504,910 | 4/1996 | Wisor et al. | 395/750 |
| 5,542,035 | 7/1996 | Kikimis et al. | 395/750 |
| 5,598,567 | 1/1997 | Ninomiya | 395/750 |

FOREIGN PATENT DOCUMENTS

| | | | |
|---|---|---|---|
| 0730217A1 | 9/1996 | European Pat. Off. | G06F 1/32 |
| 2295040 | 2/1995 | United Kingdom | G06F 1/30 |

OTHER PUBLICATIONS

"Method for Determining a Low Battery Condition," IBM Technical Bulletin, vol. 38, No. 6, Jun. 1, 1995 pp. 295–296.

*Primary Examiner*—Gopal C. Ray
*Attorney, Agent, or Firm*—Ronald O. Neerings; James C. Kesterson; Richard L. Donaldson

[57] ABSTRACT

This is a system and method of intelligently terminating power to a computing device. The system may comprise: a processing device; a power source connected to the processing device; a switch connected to the power source; and a control system run by the processing device and connected to the power source and the switch. In addition, the system may include a deadman timer which provides a fail-safe operation. Further, the system may include a method and apparatus for executing an orderly shut down procedure for software and hardware. Moreover, the system could be tied to a thermal and/or power management system. Additionally, the system could initiate an orderly shut down of peripheral devices connected to the system serially or by parallel connections. Other devices, systems and methods are also described.

59 Claims, 119 Drawing Sheets

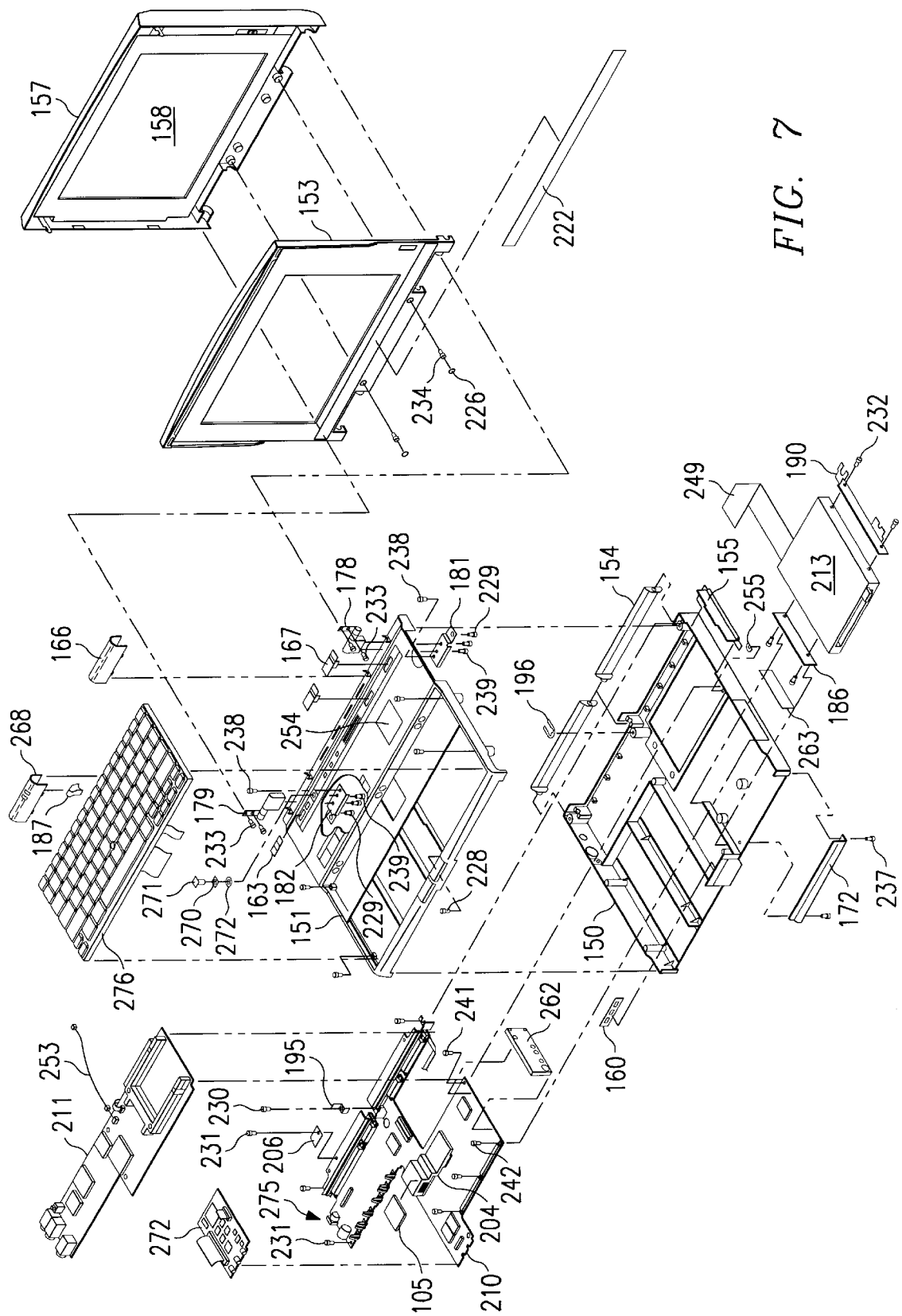

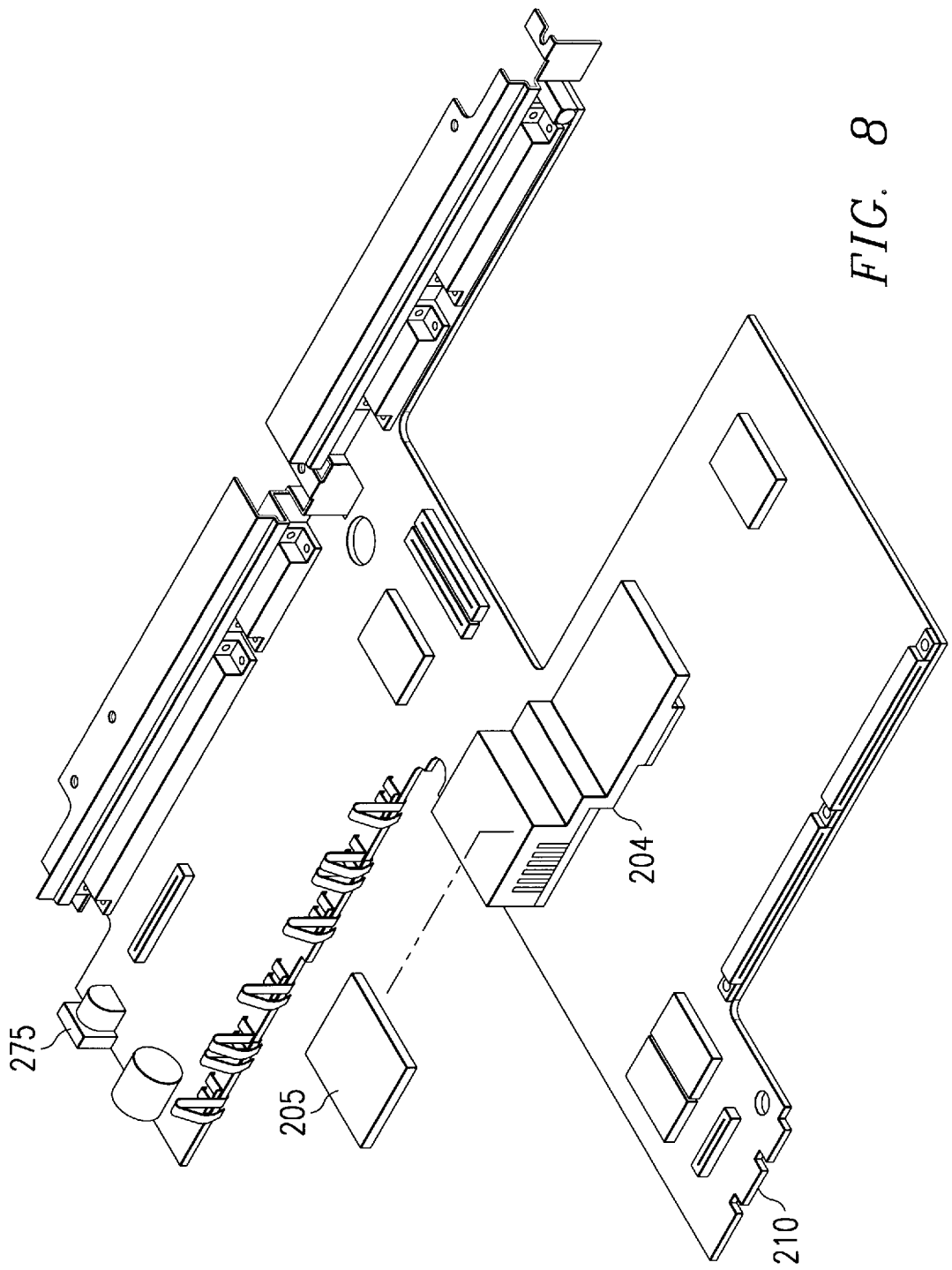

FIG. 9

NOTES : UNLESS OTHERWISE SPECIFIED :
1. ALL IC DEVICE TYPES ARE PREFIXED WITH SN74.
2. THE FOLLOWING PREFIX'S ARE ALWAY'S USED:
   T IS EQUAL TO "LS"
   AT IS EQUAL TO "ALS"
3. THE FOLLOWING PREFIX'S ARE USED ONLY WHEN INSUFFICIENT CHARACTERS ARE AVAILABLE:
   A IS EQUAL TO "ACT"
   B IS EQUAL TO "BCT"
   V IS EQUAL TO "AS"
   W IS EQUAL TO "AT" OR "ALS"
4. IC PACKAGE TYPE IS INDICATED BY THE FOLLOWING SUFFIX'S:
   DUAL-IN-LINE, PLASTIC = "N" OR BLANK
   DUAL-IN-LINE, PLASTIC [WIDE]     = NW
   DUAL-IN-LINE, CERAMIC            = J
   DUAL-IN-LINE, CERAMIC [WIDE]     = JD
   CHIP CARRIER, PLASTIC            = F
   CHIP CARRIER IN A S.M. SCKT      = FF
   CHIP CARRIER IN A PGA SCKT       = FX
   CHIP CARRIER, CERAMIC [RECT]     = FE
   CHIP CARRIER, CERAMIC [SQUARE]   = FH
   FLAT PACKAGE, CERAMIC            = U
   FLAT PACKAGE, CERAMIC [WIDE]     = W
   GRID ARRAY, PLASTIC              = X
   GRID ARRAY, PLASTIC [LIF SCKT]   = XL
   GRID ARRAY, PLASTIC [ZIF SCKT]   = XZ
   GRID ARRAY, CERAMIC              = Y
   GRID ARRAY, CERAMIC [LIF SCKT]   = YL
   GRID ARRAY, CERAMIC [ZIF SCKT]   = YZ
   SINGLE-IN-LINE                   = E,L,M,G
   "SOIC", PLASTIC                  = D
   "SOIC", PLASTIC [WIDE]           = DW
   "SOJ", PLASTIC, J LEADS          = R

5. VCC IS APPLIED TO PIN 8 OF ALL 8-PIN IC's, PIN 14 OF ALL 14-PIN IC's, PIN 16 OF ALL 16-PIN IC's, PIN 20 OF ALL 20-PIN IC's, ETC.
6. GROUND IS APPLIED TO PIN 4 OF ALL 8-PIN IC's, PIN 7 OF ALL 14-PIN IC's, PIN 8 OF ALL 16-PIN IC's, PIN 10 OF ALL 20-PIN IC's, ETC.
7. DEVICE TYPE, PIN NUMBERS, AND REFERENCE DESIGNATOR [LOCATION] OF GATES ARE SHOWN AS FOLLOWS:

00 AND 04 = DEVICE TYPES
   1, 2, AND 3 = PIN NUMBERS
   U01 AND U02 = REF. DESIGNATOR [LOCATION]

8. RESISTANCE VALUES ARE IN OHMS.
9. RESISTORS ARE 1/8 WATT, 5%.
10. CAPACITANCE VALUES ARE IN MICROFARADS.
11. CAPACITORS ARE 50V, 10%.
12. THIS COUPON WILL BE USED ON ALL COMMERICAL MULTILAYER BOARDS.

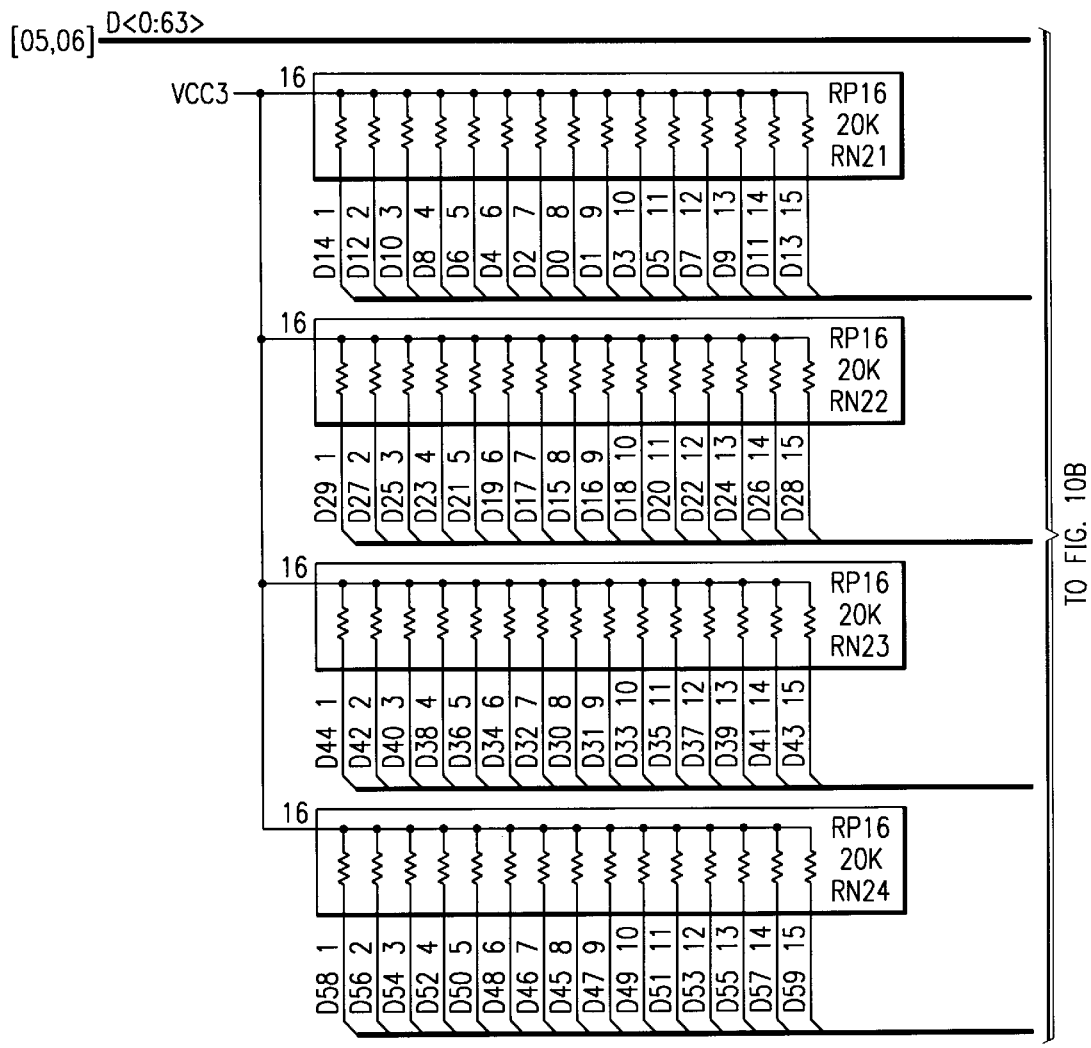
FIG. 10A
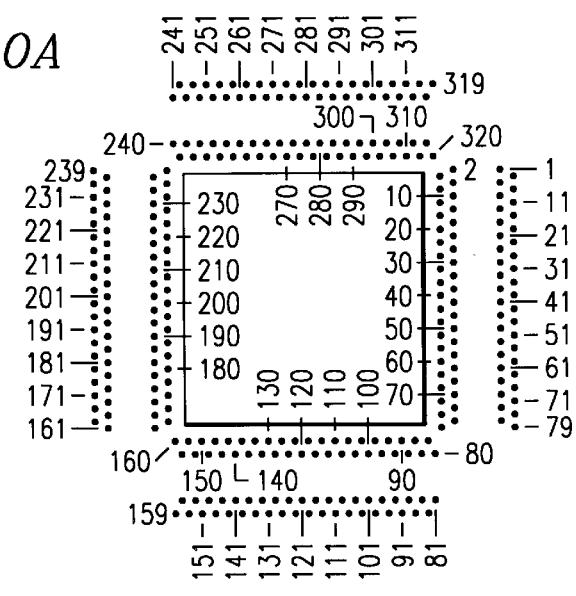
PENTIUM PINOUT TCP 320
BACKSIDE VIEW (TOP OF PWB)

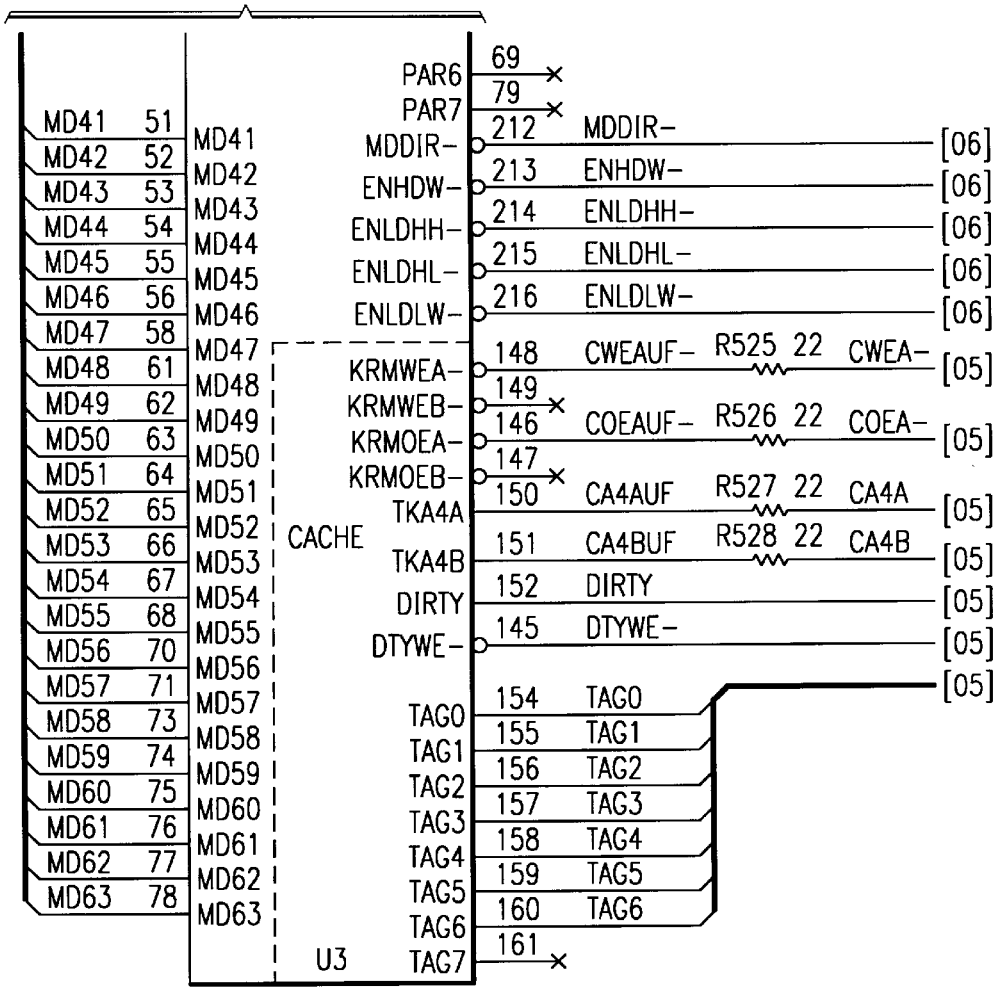
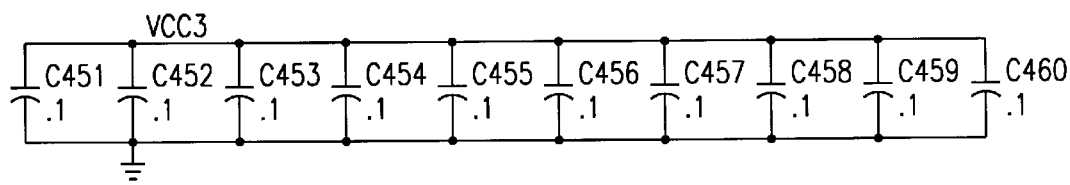
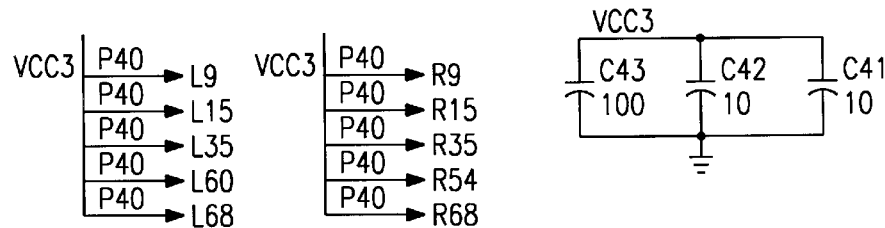
FIG. 12D

FIG. 13D
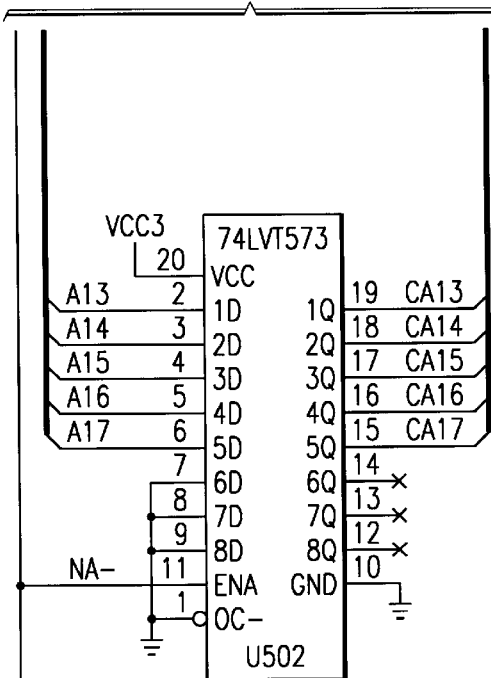
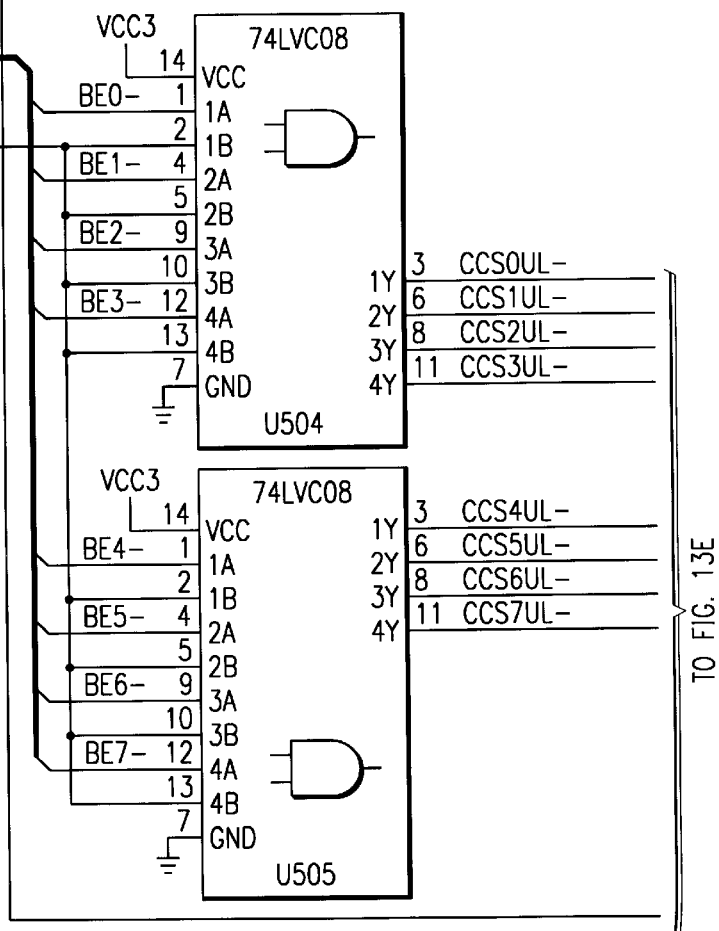

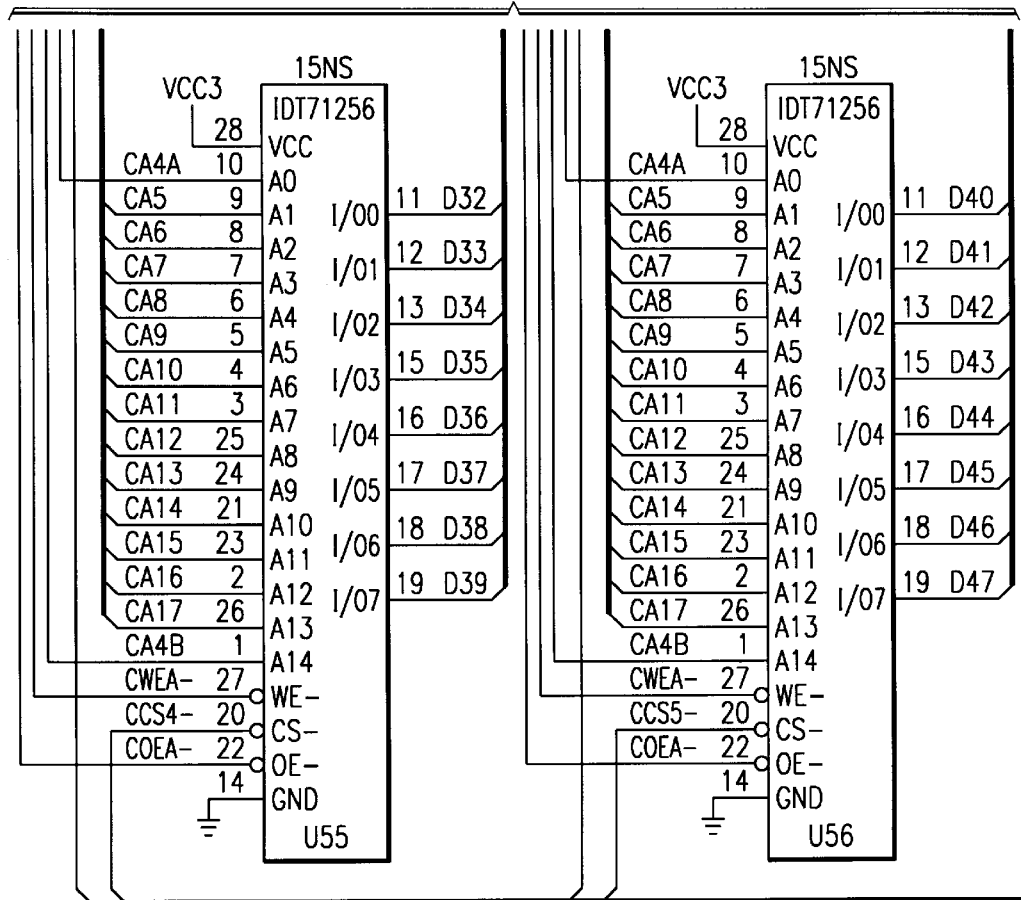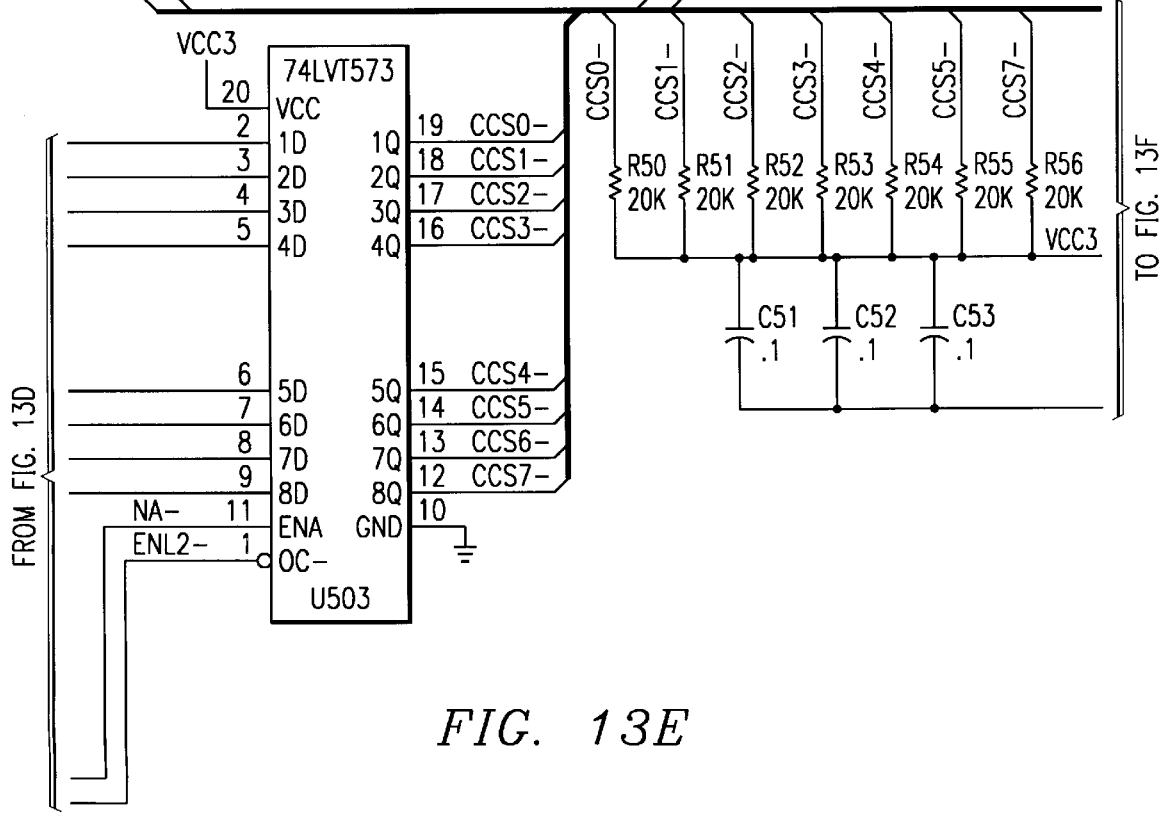
FIG. 13E

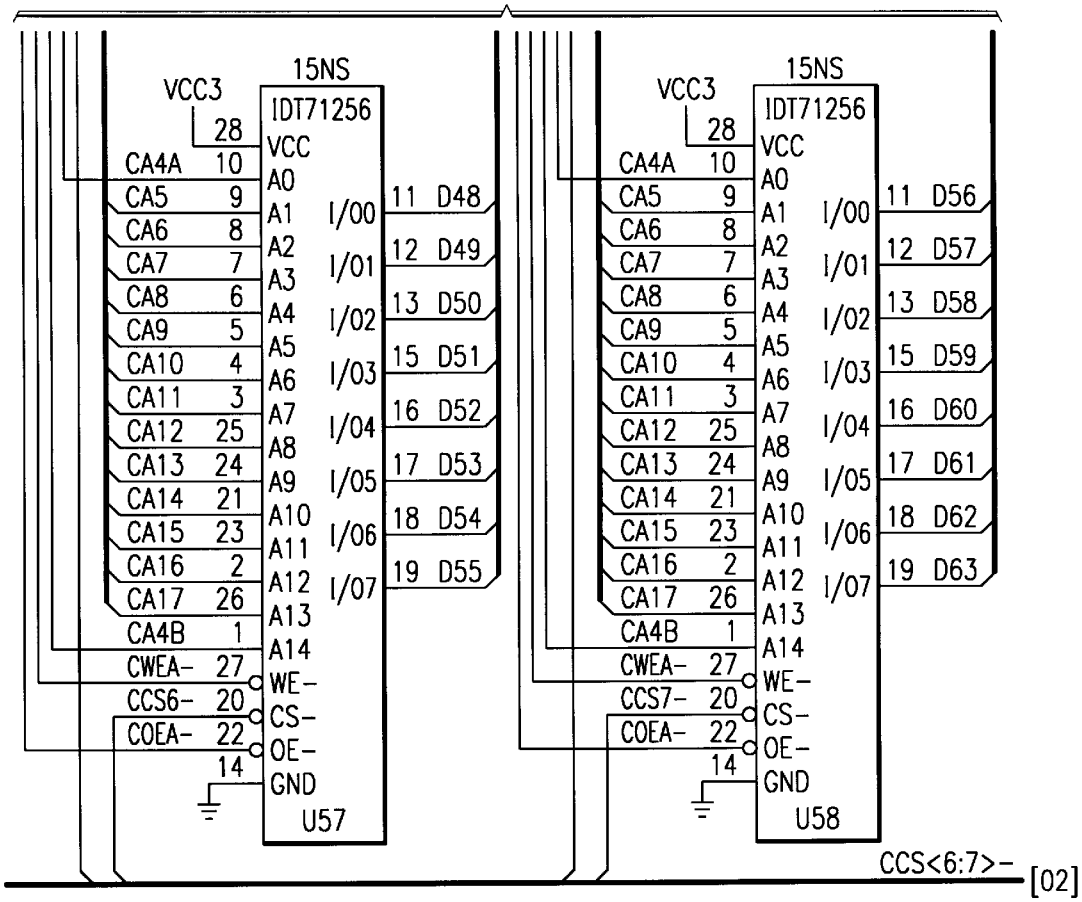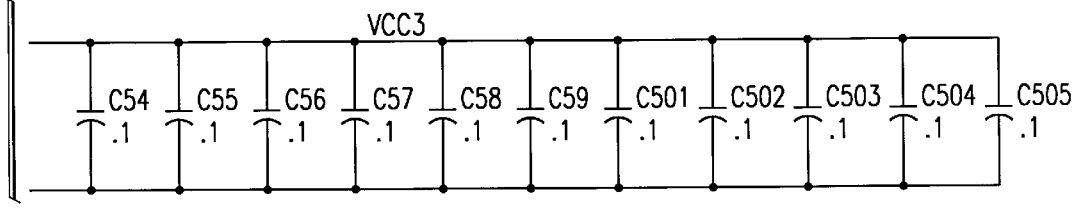
FIG. 13F

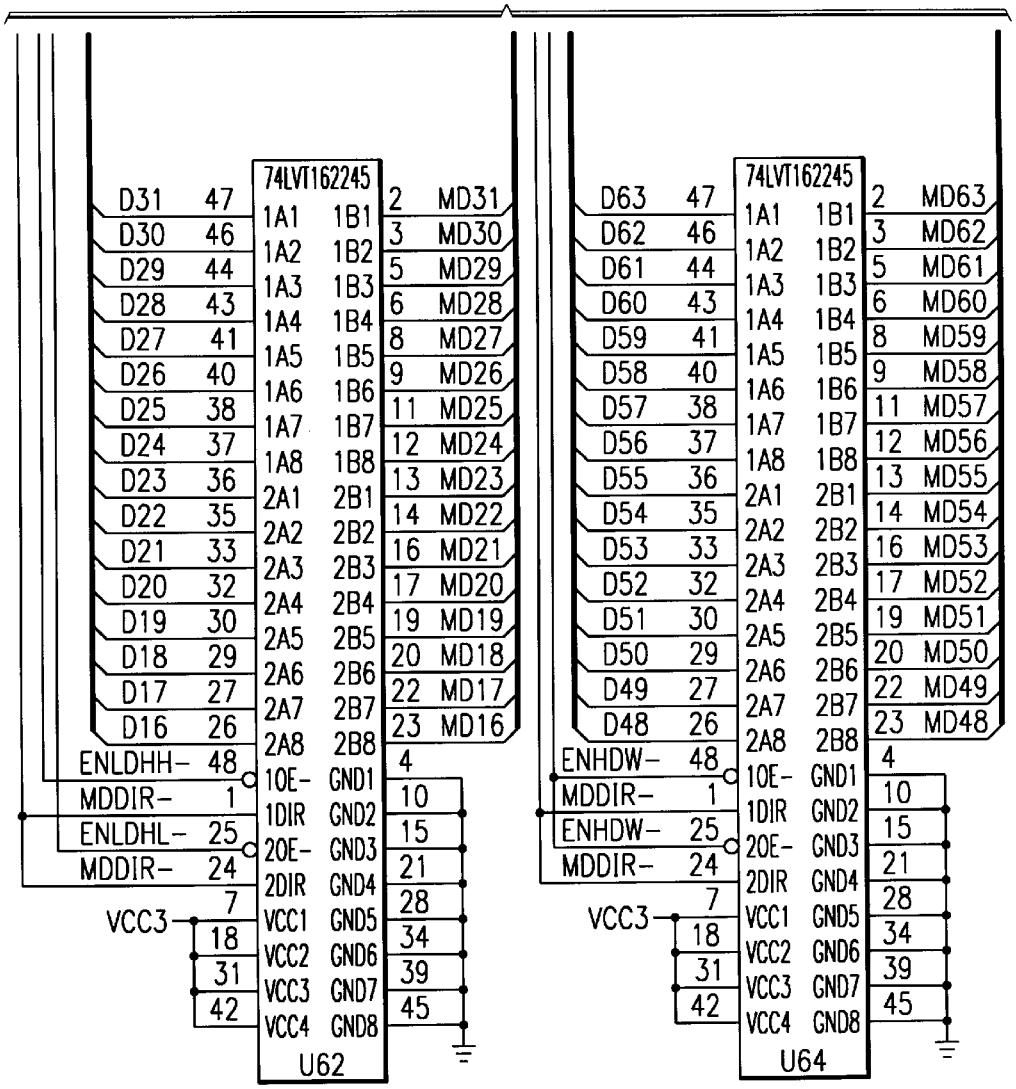
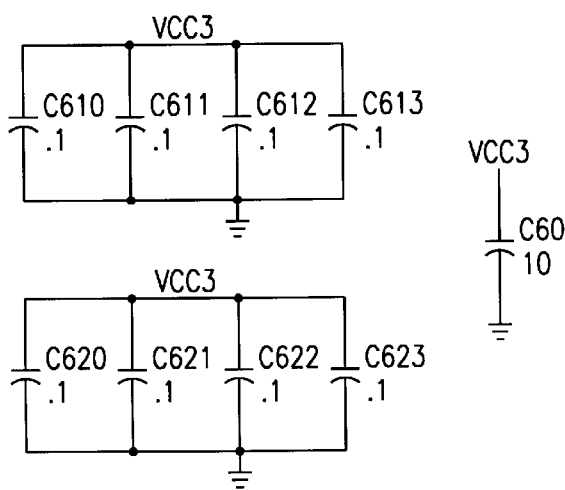
FIG. 14B

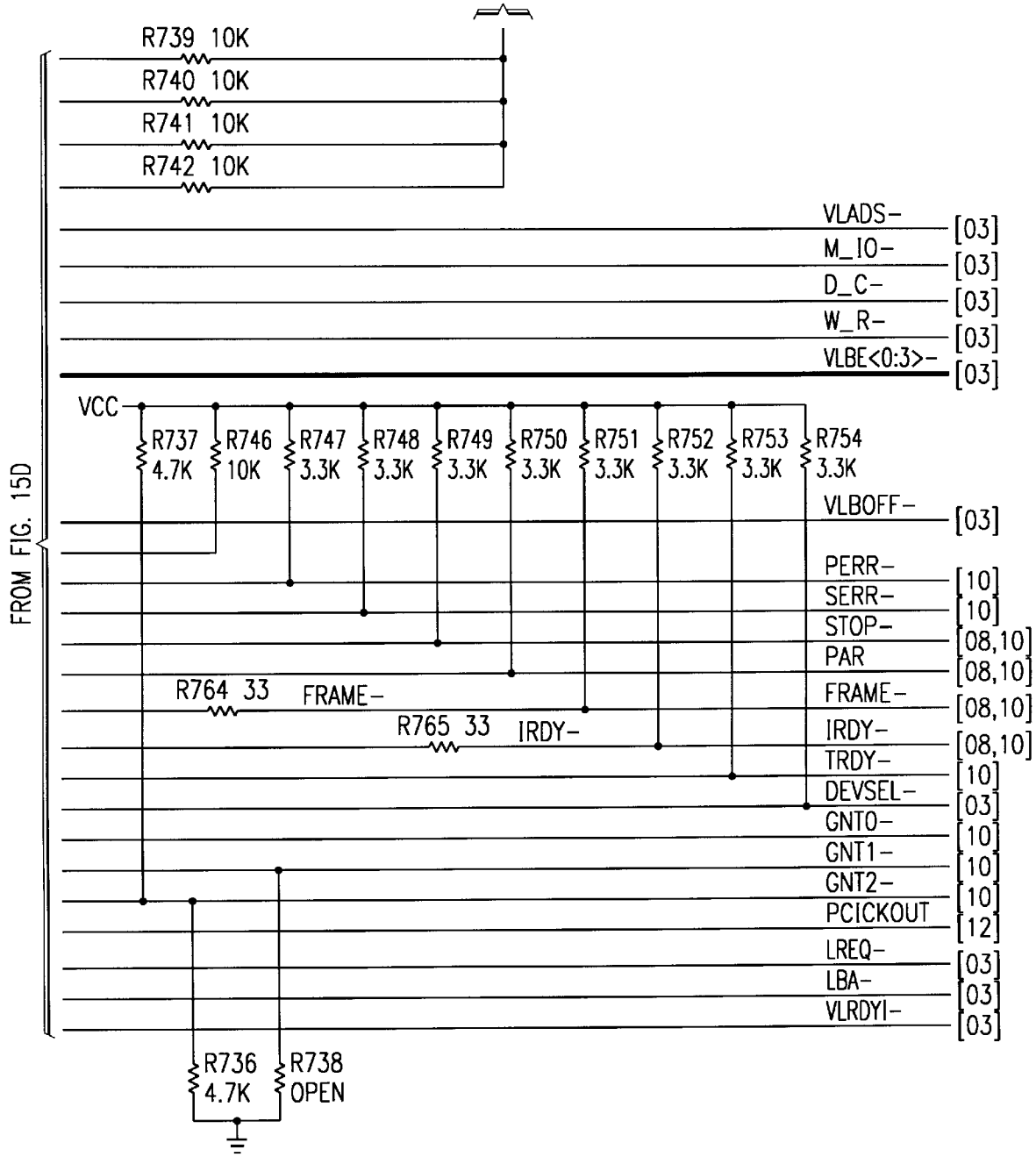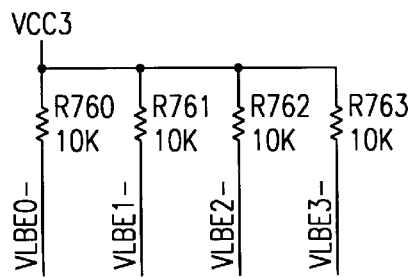
FIG. 15E

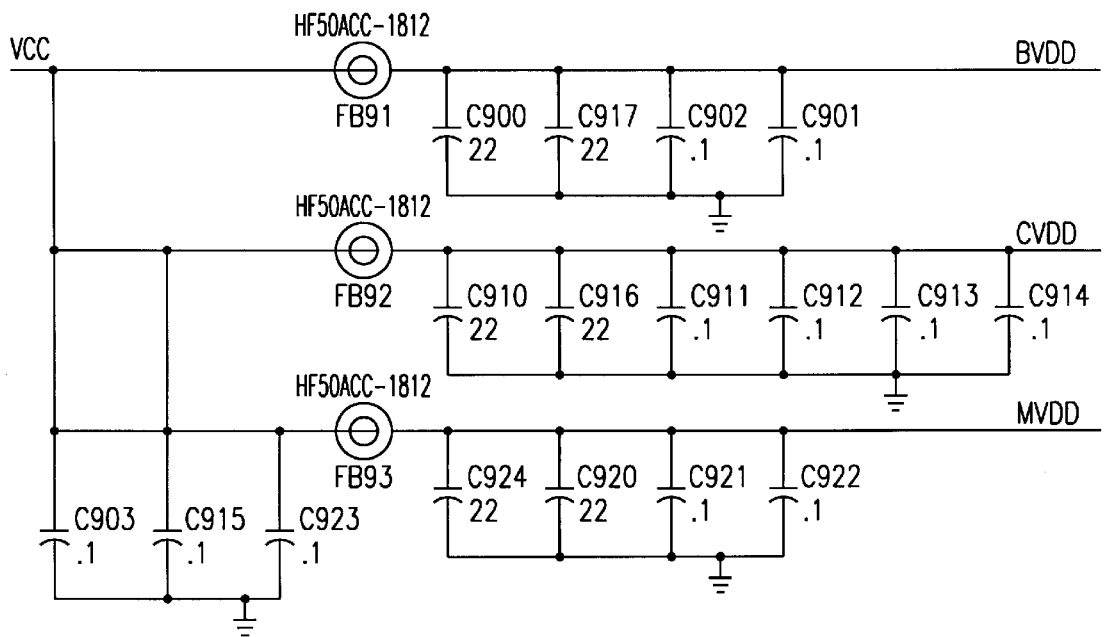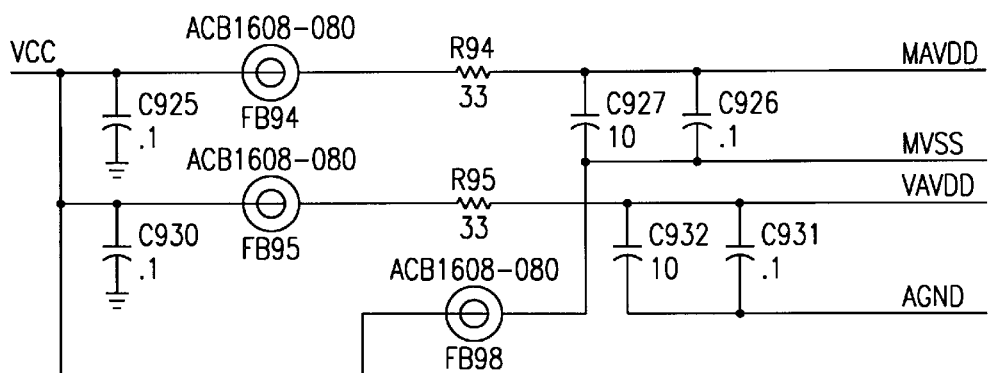
FIG. 17A

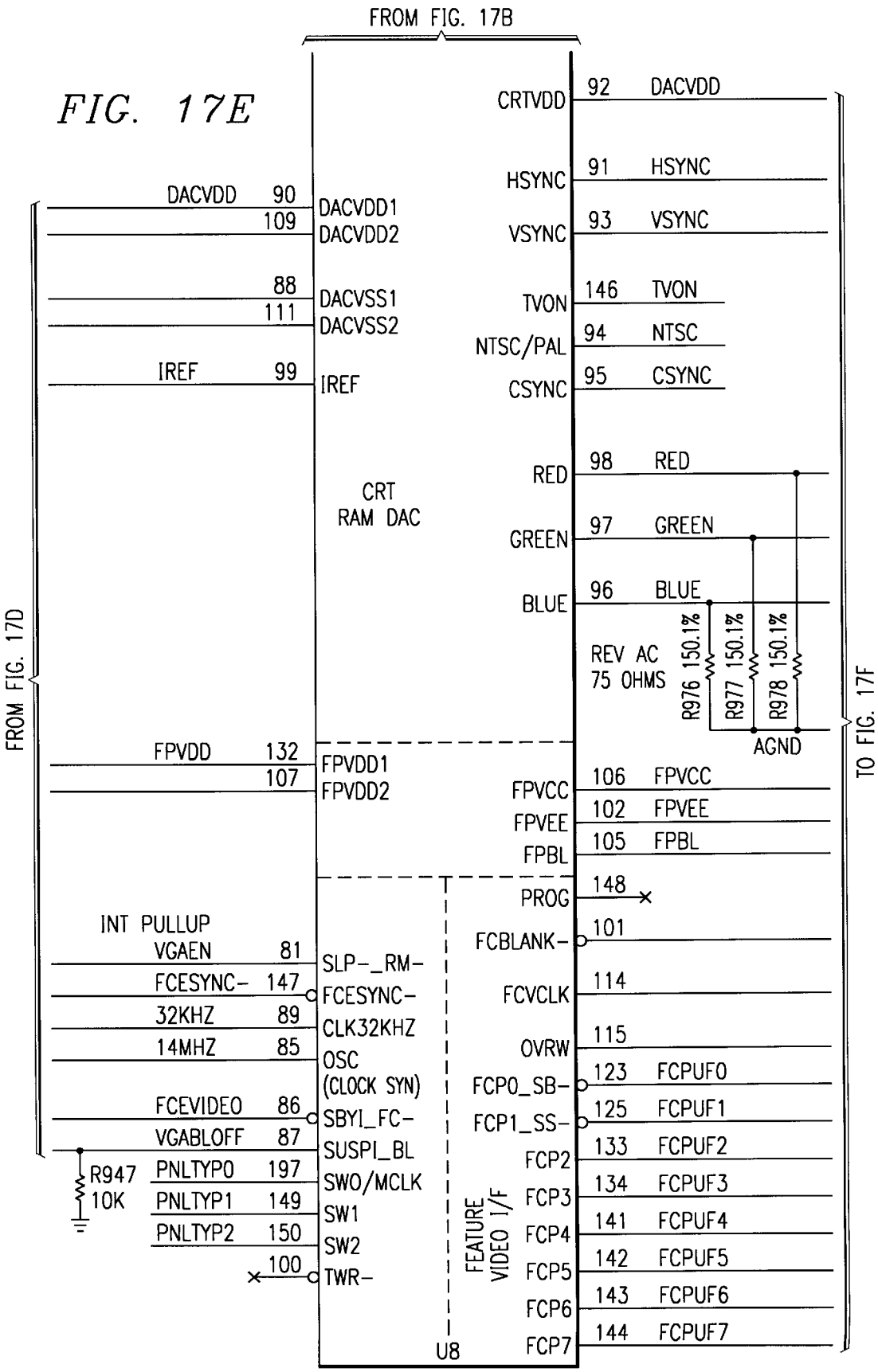

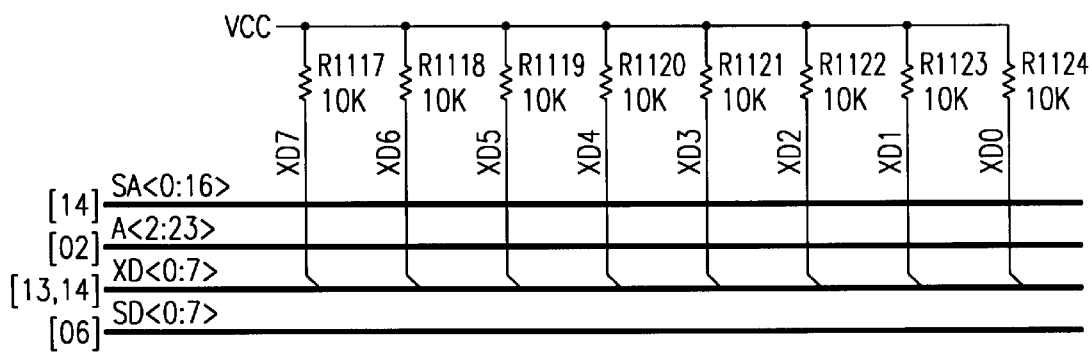
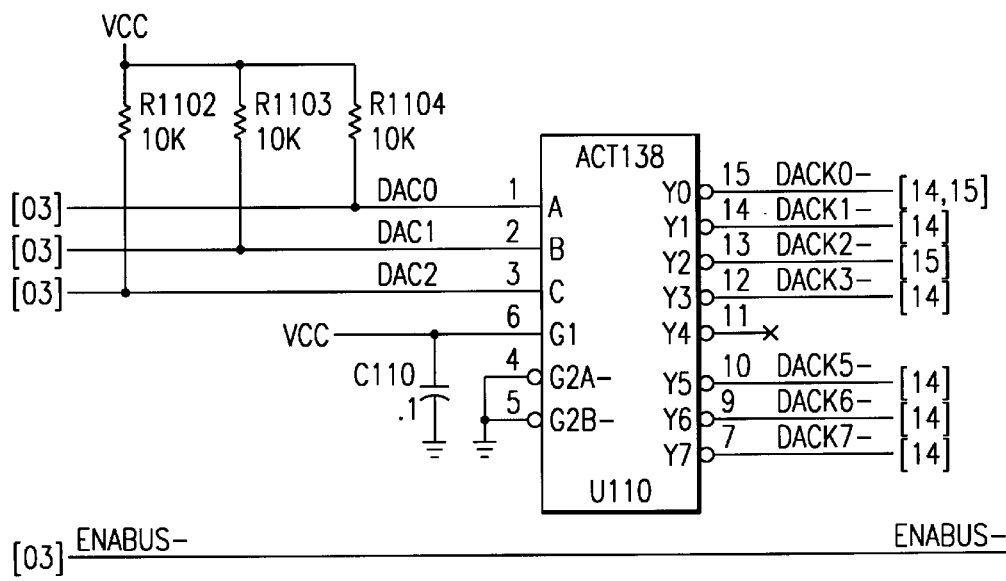
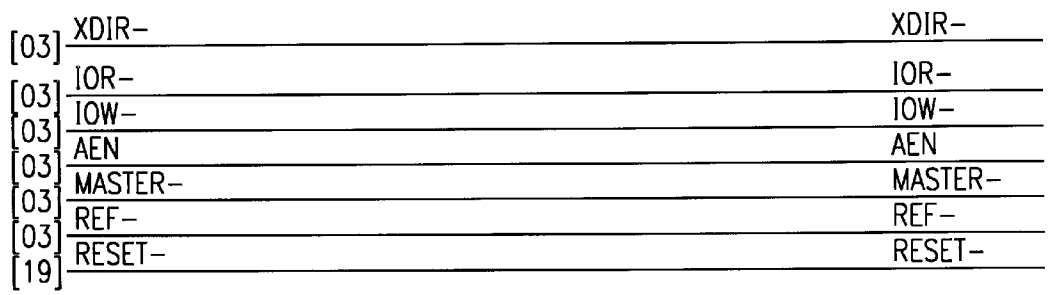
FIG. 19A

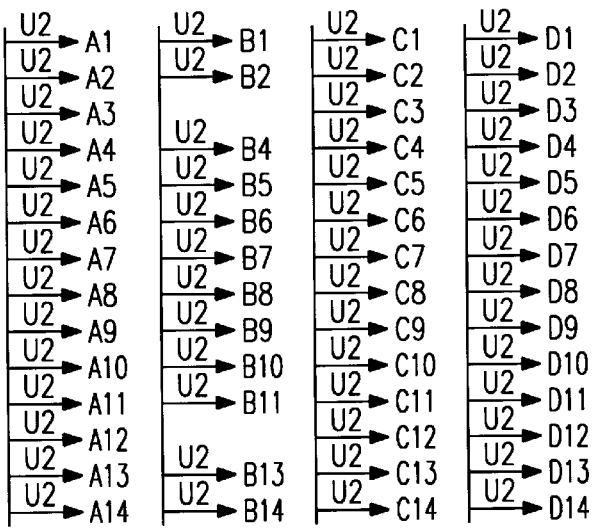
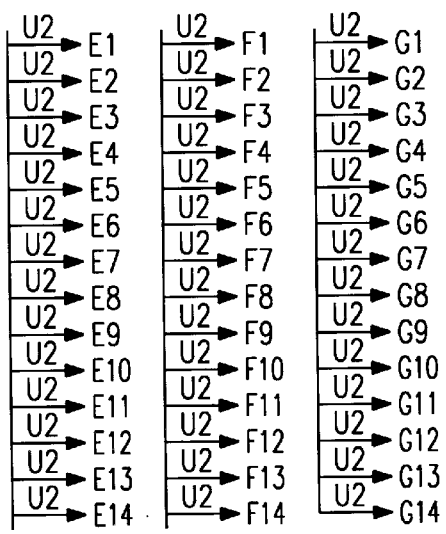
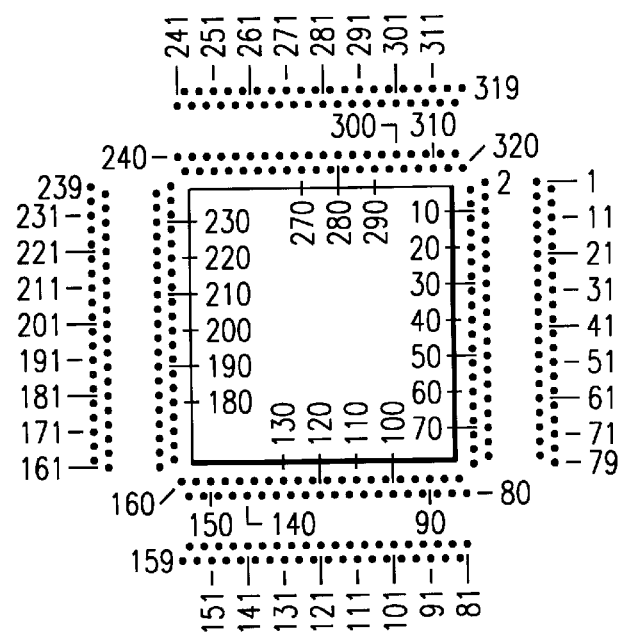
FIG. 25C
PENTIUM PINOUT TCP 320
BACKSIDE VIEW (TOP OF PWB)

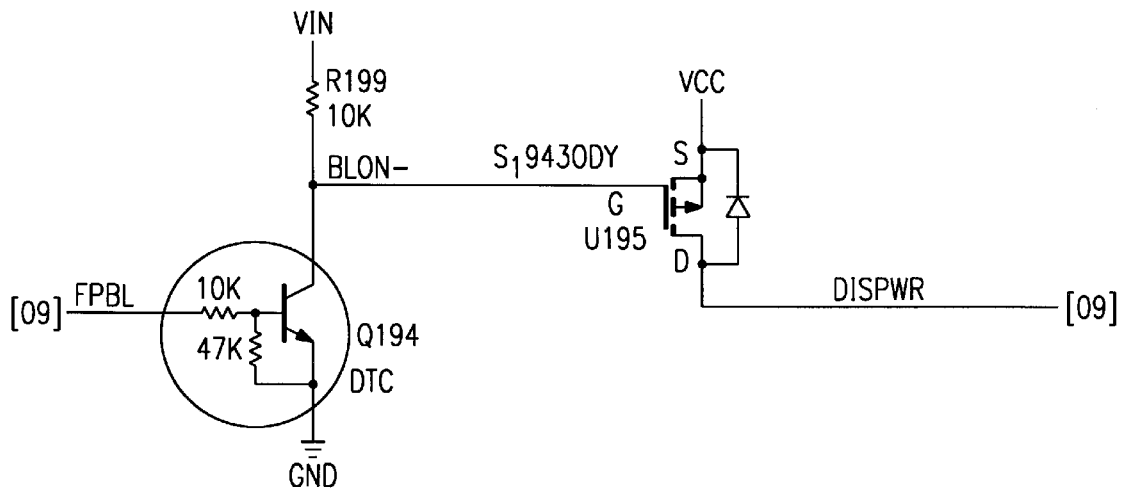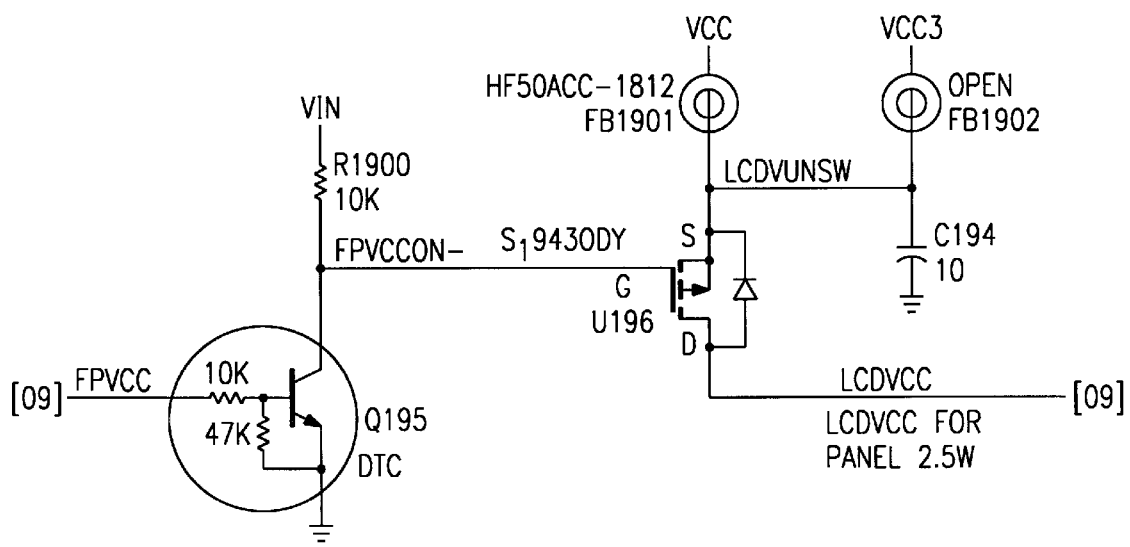
FIG. 27B

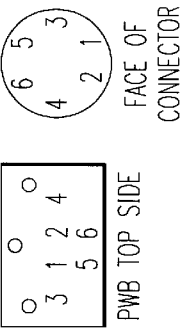

P90

| PIN# | SIGNAL | SH# | PIN# | SIGNAL | SH# |
|---|---|---|---|---|---|
| 1 | CBLUE | 09 | 9 | N.C. | 09 |
| 2 | CGREEN | 09 | 10 | GND | 09 |
| 3 | CRED | 09 | 11 | N.C. | 09 |
| 4 | N.C. | 09 | 12 | N.C. | 09 |
| 5 | GND | 09 | 13 | CHSYNC | 09 |
| 6 | AGND | 09 | 14 | CVSYNC | 09 |
| 7 | AGND | 09 | 15 | N.C. | 09 |
| 8 | AGND | 09 | | | |

PWB TOP SODE
INTO FACE OF CONN

15 PIN D SUB RECEPTACLE

P142 MOUSE

| PIN# | SIGNAL | SH# |
|---|---|---|
| 1 | PSDATA | 14 |
| 2 | N.C. | 14 |
| 3 | PSGND | 14 |
| 4 | PSVCC | 14 |
| 5 | PSCLK | 14 |
| 6 | N.C. | 14 |

FACE OF CONNECTOR

PWB TOP SIDE

P92 LCD

| PIN# | SIGNAL | SH# | PIN# | SIGNAL | SH# |
|---|---|---|---|---|---|
| 1 | FP23 | 09 | 11 | FP20 | 09 |
| 2 | DISPWR | 09 | 12 | PNLTYP0 | 09 |
| 3 | GND | 09 | 13 | FP19 | 09 |
| 4 | DISPWR | 09 | 14 | PNLTYP1 | 09 |
| 5 | FP22 | 09 | 15 | FP18 | 09 |
| 6 | LCDVCC | 09 | 16 | PNLTYP2 | 09 |
| 7 | GND | 09 | 17 | FP15 | 09 |
| 8 | LCDVCC | 09 | 18 | GND | 09 |
| 9 | FP21 | 09 | 19 | FP14 | 09 |
| 10 | GND | 09 | 20 | FP13 | 09 |

20 PIN DOUBLE ROW HEADER

| SIGNAL | 9BIT TFT | 12BIT TFT | 18BIT TFT | 16BIT STN |
|---|---|---|---|---|
| FP13 | G0 | G3 | G3 | LD5 |
| FP14 | G1 | G4 | G4 | LD6 |
| FP15 | G2 | G5 | G5 | LD7 |
| FP18 | N.C. | N.C. | R0 | UD6 |
| FP19 | N.C. | N.C. | R1 | UD7 |
| FP20 | N.C. | N.C. | R2 | UD0 |
| FP21 | R0 | R0 | R3 | UD1 |
| FP22 | R1 | R1 | R4 | UD2 |
| FP23 | R2 | R2 | R5 | UD3 |

P91 LCD

| PIN# | SIGNAL | SH# | PIN# | SIGNAL | SH# |
|---|---|---|---|---|---|
| 1 | GND | 09 | 11 | FP7 | 09 |
| 2 | FPVDCLK (SCLK) | 09 | 12 | VCC | 09 |
| 3 | GND | 09 | 13 | FP6 | 09 |
| 4 | EXTPWR- | 09 | 14 | GND | 09 |
| 5 | FP12 | 09 | 15 | FP5 | 09 |
| 6 | FP2 | 09 | 16 | FP4 | 09 |
| 7 | FP11 | 09 | 17 | FPDE | 09 |
| 8 | GND | 09 | 18 | FP3 | 09 |
| 9 | FP10 | 09 | 19 | LFS (FLM) | 09 |
| 10 | FPVEE | 09 | 20 | LLCLK (LP) | 09 |

20 PIN DOUBLE ROW HEADER

| SIGNAL | 9BIT TFT | 12BIT TFT | 18BIT TFT | 16BIT STN |
|---|---|---|---|---|
| FP2 | N.C. | N.C. | B0 | N.C. |
| FP3 | N.C. | N.C. | B1 | MOD |
| FP4 | N.C. | B0 | B2 | LD0 |
| FP5 | B0 | B1 | B3 | LD1 |
| FP6 | B1 | B2 | B4 | LD2 |
| FP7 | B2 | B3 | B5 | LD3 |
| FP10 | N.C. | N.C. | G0 | UD4 |
| FP11 | N.C. | N.C. | G1 | UD5 |
| FP12 | N.C. | G0 | G2 | LD4 |

*FIG. 30A*

P40 MEMORY EXPANSION

| PIN# | SIGNAL | SH# | PIN# | SIGNAL | SH# | PIN# | SIGNAL | SH# | PIN# | SIGNAL | SH# | PIN# | SIGNAL | SH# | PIN# | SIGNAL | SH# |
|---|---|---|---|---|---|---|---|---|---|---|---|---|---|---|---|---|---|
| L1 | GND | 04 | L18 | MD21 | 04 | L35 | VCC3 | 06 | L52 | GND | 06 | R1 | GND | 06 | R18 | MD63 | 06 | R35 | VCC3 | 06 | R52 | GND | 06 |
| L2 | MD1 | 04 | L19 | MD23 | 04 | L36 | MD0 | 06 | L53 | MD22 | 06 | R2 | MD43 | 06 | R19 | N.C. | 06 | R36 | MD42 | 06 | R53 | N.C. | 06 |
| L3 | GND | 04 | L20 | MD24 | 04 | L37 | MD2 | 06 | L54 | GND | 06 | R3 | GND | 06 | R20 | GND | 06 | R37 | MD44 | 06 | R54 | VCC3 | 06 |
| L4 | MD4 | 04 | L21 | MD26 | 04 | L38 | MD3 | 06 | L55 | MD25 | 06 | R4 | MD46 | 06 | R21 | RAS2- | 06 | R38 | MD45 | 06 | R55 | RAS3- | 06 |
| L5 | GND | 04 | L22 | MD27 | 04 | L39 | MD5 | 06 | L56 | GND | 06 | R5 | GND | 06 | R22 | RAS1- | 06 | R39 | MD47 | 06 | R56 | GND | 06 |
| L6 | CAS0- | 04 | L23 | MD29 | 04 | L40 | CAS1- | 06 | L57 | MD28 | 06 | R6 | CAS4- | 06 | R23 | GND | 06 | R40 | MD57 | 06 | R57 | RAS0- | 06 |
| L7 | GND | 04 | L24 | CAS3- | 04 | L41 | WEN- | 06 | L58 | GND | 06 | R7 | MD48 | 06 | R24 | CAS6- | 06 | R41 | GND | 06 | R58 | CAS7- | 06 |
| L8 | MD7 | 04 | L25 | GND | 04 | L42 | MD6 | 06 | L59 | CAS2- | 06 | R8 | MD50 | 06 | R25 | MA4 | 06 | R42 | MD49 | 06 | R59 | GND | 06 |
| L9 | VCC3 | 04 | L26 | MD30 | 04 | L43 | MD8 | 06 | L60 | VCC3 | 06 | R9 | VCC3 | 06 | R26 | GND | 06 | R43 | GND | 06 | R60 | MA5 | 06 |
| L10 | MD10 | 04 | L27 | MD32 | 04 | L44 | MD9 | 06 | L61 | MD31 | 06 | R10 | MD52 | 06 | R27 | MA7 | 06 | R44 | MD51 | 06 | R61 | MA6 | 06 |
| L11 | GND | 04 | L28 | MD33 | 04 | L45 | MD11 | 06 | L62 | GND | 06 | R11 | GND | 06 | R28 | MA8 | 06 | R45 | MD53 | 06 | R62 | GND | 06 |
| L12 | MD13 | 04 | L29 | MD35 | 04 | L46 | MD12 | 06 | L63 | MD34 | 06 | R12 | MD55 | 06 | R29 | MA11 | 06 | R46 | MD54 | 06 | R63 | MA9 | 06 |
| L13 | GND | 04 | L30 | MD36 | 04 | L47 | MD14 | 06 | L64 | GND | 06 | R13 | GND | 06 | R30 | MA3 | 06 | R47 | MD56 | 06 | R64 | MA10 | 06 |
| L14 | MD16 | 04 | L31 | MD38 | 04 | L48 | MD15 | 06 | L65 | MD37 | 06 | R14 | MD58 | 06 | R31 | GND | 06 | R48 | MD57 | 06 | R65 | GND | 06 |
| L15 | VCC3 | 04 | L32 | MD39 | 04 | L49 | MD17 | 06 | L66 | VCC3 | 06 | R15 | VCC3 | 06 | R32 | GND | 06 | R49 | MD59 | 06 | R66 | AM2 | 06 |
| L16 | MD18 | 04 | L33 | MD41 | 04 | L50 | GND | 06 | L67 | MD40 | 06 | R16 | MD60 | 06 | R33 | MA0 | 06 | R50 | GND | 06 | R67 | MA1 | 06 |
| L17 | MD20 | 04 | L34 | GND | 04 | L51 | MD19 | 06 | L68 | VCC3 | 06 | R17 | MD62 | 06 | R34 | GND | 06 | R51 | MD61 | 06 | R68 | VCC3 | 06 |

P171 PRINTER

| PIN# | SIGNAL | SH# | PIN# | SIGNAL | SH# |
|---|---|---|---|---|---|
| 1 | PRTSTB- | 16 | 10 | PRTACK- | 16 |
| 2 | PRTD0 | 16 | 11 | PRTBSY | 16 |
| 3 | PRTD1 | 16 | 12 | PRTPE | 16 |
| 4 | PRTD2 | 16 | 13 | PRTONLN | 16 |
| 5 | PRTD3 | 16 | 14 | PRTAF- | 16 |
| 6 | PRTD4 | 16 | 15 | PRTFLT- | 16 |
| 7 | PRTD5 | 16 | 16 | PRTINI- | 16 |
| 8 | PRTD6 | 16 | 17 | PRTSLCT- | 16 |
| 9 | PRTD7 | 16 | 18 | GND | 16 |
|   |   |   | 19 | GND | 16 |
|   |   |   | 20 | GND | 16 |
|   |   |   | 21 | GND | 16 |
|   |   |   | 22 | GND | 16 |
|   |   |   | 23 | GND | 16 |
|   |   |   | 24 | GND | 16 |
|   |   |   | 25 | GND | 16 |

P170 RS232

| PIN# | SIGNAL | SH# |
|---|---|---|
| 1 | DCD | 16 |
| 2 | RXD | 16 |
| 3 | TXD | 16 |
| 4 | DTR | 16 |
| 5 | GND | 16 |
| 6 | DSR | 16 |
| 7 | RTS | 16 |
| 8 | CTS | 16 |
| 9 | RI | 16 |

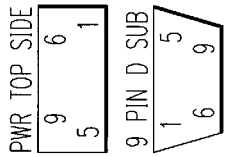

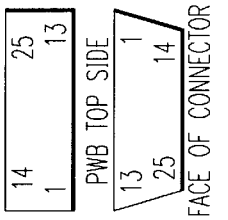

FIG. 30B

P140 PCMCIA/SOUND CARD

| PIN# | SIGNAL | SH# | PIN# | SIGNAL | SH# | PIN# | SIGNAL | SH# | PIN# | SIGNAL | SH# | PIN# | SIGNAL | SH# | PIN# | SIGNAL | SH# |
|---|---|---|---|---|---|---|---|---|---|---|---|---|---|---|---|---|---|
| 1 | GND | 20 | 21 | RESET | 20 | 41 | PWROFF- | 19 | 61 | IOR- | 03 | 81 | SD5 | 06 | 101 | SA5 | 11 | 121 | DREQ6 | 11 |
| 2 | VCC | 20 | 22 | LMICIN | 20 | 42 | PWRON- | 19 | 62 | MEMW- | 03 | 82 | SD6 | 06 | 102 | SA6 | 11 | 122 | DREQ7 | 11 |
| 3 | IRRST- | 15 | 23 | IRD_C- | 15 | 43 | SUSRES | 14 | 63 | IRQ3 | 11 | 83 | SD7 | 06 | 103 | SA7 | 11 | 123 | DACK0- | 11 |
| 4 | VIN | 18 | 24 | RTLNIN | 10 | 44 | AEN | 03 | 64 | IRQ4 | 11 | 84 | SD8 | 06 | 104 | SA8 | 11 | 124 | DACK7- | 11 |
| 5 | GND | 20 | 25 | MIDITXD | 20 | 45 | SHUT- | 14 | 65 | IRQ5 | 11 | 85 | SD9 | 06 | 105 | SA9 | 11 | 125 | IRBSY | 15 |
| 6 | TVDN | 09 | 26 | LINGND | 09 | 46 | ZEROWS- | 03 | 66 | IRQ6 | 11 | 86 | SD10 | 06 | 106 | SA10 | 11 | 126 | DACK6- | 11 |
| 7 | NTSCR | 09 | 27 | MIDIRXD | 09 | 47 | TC | 03 | 67 | IRQ7 | 11 | 87 | SD11 | 06 | 107 | SA11 | 11 | 127 | DACK5- | 11 |
| 8 | NTSCB | 09 | 28 | LFLNIN | 10 | 48 | IOCS16- | 03 | 68 | IRQ9 | 11 | 88 | SD12 | 06 | 108 | SA12 | 11 | 128 | DACK1- | 11 |
| 9 | CSYNC | 09 | 29 | GND | 20 | 49 | GND | 20 | 69 | IRQ10 | 11 | 89 | VCC | 20 | 109 | VCC | 20 | 129 | VCC3 | 20 |
| 10 | LFLNOUT | 10 | 30 | VCC | 20 | 50 | VCC | 20 | 70 | IRQ11 | 11 | 90 | GND | 20 | 110 | GND | 20 | 130 | GND | 20 |
| 11 | AENSND | 13 | 31 | 12V | 20 | 51 | SPKR | 19 | 71 | IRQ14 | 11 | 91 | SD13 | 06 | 111 | SA13 | 11 | 131 | LA23 | 11 |
| 12 | LNOUTGND | 10 | 32 | PWRGOOD | 10 | 52 | REF- | 03 | 72 | IRQ15 | 11 | 92 | SD14 | 06 | 112 | SA14 | 11 | 132 | DACK3- | 11 |
| 13 | IRRXD | 15 | 33 | AENCIA | 13 | 53 | IOCHRDY | 03 | 73 | IRQ12 | 11 | 93 | SD15 | 06 | 113 | SA15 | 11 | 133 | LA21 | 11 |
| 14 | RTLNOUT | 10 | 34 | NUM_LED- | 14 | 54 | BALE | 03 | 74 | SD0 | 06 | 94 | SA0 | 11 | 114 | SA16 | 11 | 134 | LA22 | 11 |
| 15 | NTSCG | 09 | 35 | PWR_LED- | 14 | 55 | MEMCS16- | 14 | 75 | SD1 | 06 | 95 | SA1 | 11 | 115 | DREQ5 | 11 | 135 | LA19 | 11 |
| 16 | IRTXD | 15 | 36 | SCR_LED- | 14 | 56 | IOW- | 03 | 76 | SD2 | 06 | 96 | SA2 | 11 | 116 | DREQ3 | 11 | 136 | LA20 | 11 |
| 17 | NTSC | 09 | 37 | CAP_LED- | 14 | 57 | SBHE- | 03 | 77 | SD3 | 06 | 97 | SA3 | 11 | 117 | DREQ0 | 11 | 137 | LA17 | 11 |
| 18 | MICGND | 10 | 38 | PBLB | 18 | 58 | MEMR- | 03 | 78 | SD4 | 06 | 98 | SA4 | 11 | 118 | DREQ1 | 11 | 138 | LA18 | 11 |
| 19 | VCC | 20 | 39 | VCC3 | 20 | 59 | GND | 20 | 79 | GND | 20 | 99 | GND | 20 | 119 | GND | 20 | 139 | GND | 20 |
| 20 | GND | 05 | 40 | GND | 20 | 60 | VCC | 20 | 80 | VCC3 | 20 | 100 | VCC | 20 | 120 | VCC | 20 | 140 | VCC | 20 |

P150 IR MODULE

| PIN# | SIGNAL | SH# |
|---|---|---|
| 1 | VCC | 15 |
| 2 | GND | 15 |
| 3 | IRTXD | 15 |
| 4 | IRRXD | 15 |
| 5 | IRBSY | 15 |
| 6 | IRD_C- | 15 |
| 7 | N.C. | |
| 8 | IRRST- | 15 |

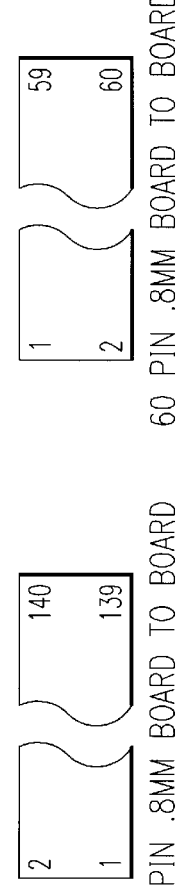

PWB TOP SIDE

140 PIN .8MM BOARD TO BOARD

60 PIN .8MM BOARD TO BOARD

| SOT23 | MARKINGS |
|---|---|
| 2222 | 1PT |
| 2907 | 2FE |
| DIA114 | 54E |
| DTC114 | 64 |
| 914BF | 5D |
| BAT54 | L4P |
| BAT54A | L42 |
| BAT54S | L44 |
| BAV70 | A4W |
| 5.6VZENER | 8GH |
| BST82 | 02P |

26 PIN 1MM FFC

```
 2  4        24  26
 1  3        23  25
```

P141 KEYSCAN BOARD

| PIN# | SIGNAL | SH# | PIN# | SIGNAL | SH# | PIN# | SIGNAL | SH# |
|---|---|---|---|---|---|---|---|---|
| 1 | GND | 22 | 21 | EXTSLOW- | 03 | 41 | GND | 05 |
| 2 | GND | 03 | 22 | N.C. | 04 | 42 | GND | 05 |
| 3 | XD1 | 03 | 23 | KGA20 | 04 | 43 | N.C. | 05 |
| 4 | XD0 | 03 | 24 | STANDBY- | 04 | 44 | N.C. | 05 |
| 5 | XD3 | 03 | 25 | SELKBD | 13 | 45 | GND | 22 |
| 6 | XD2 | 03 | 26 | EXUNIT- | 04 | 46 | GND | 05 |
| 7 | XD5 | 03 | 27 | N.C. | 04 | 47 | BATA_DAT | 05 |
| 8 | XD4 | 03 | 28 | IRQ11 | 22 | 48 | BATB_DAT | 05 |
| 9 | XD7 | 03 | 29 | CPUTMP | 04 | 49 | VCC | 22 |
| 10 | XD6 | 03 | 30 | N.C. | 18 | 50 | VCC | 22 |
| 11 | VCC | 04 | 31 | GND | 03 | 51 | NUM_LED- | 04 |
| 12 | VCC | 05 | 32 | GND | 03 | 52 | FDD_LED- | 04 |
| 13 | KBCS2- | 05 | 33 | EXTPWR | 03 | 53 | PWR_LED- | 04 |
| 14 | 8042CS- | 05 | 34 | VIN | 03 | 54 | HDD_LED- | 03 |
| 15 | IORB- | 05 | 35 | DIN_DAT | 22 | 55 | CAP_LED- | 20 |
| 16 | IOW- | 05 | 36 | DIN_CLK | 03 | 56 | TUR_LED- | 04 |
| 17 | SA2 | 05 | 37 | GND | 03 | 57 | SCR_LED- | 04 |
| 18 | KEYHIT- | 05 | 38 | GND | 03 | 58 | PWRGOOD | 04 |
| 19 | IRQ1 | 04 | 39 | KBDDAT | 03 | 59 | GND | 04 |
| 20 | IRQ12 | 04 | 40 | KBDCLK | 05 | 60 | GND | 22 |

P21 IDE

| PIN# | SIGNAL | SH# | PIN# | SIGNAL | SH# |
|---|---|---|---|---|---|
| 1 | HDRESET | 16 | 23 | HDIOW- | 16 |
| 2 | GND | 16 | 24 | GND | 16 |
| 3 | IDED7 | 16 | 25 | HDIOR- | 16 |
| 4 | HDD8 | 16 | 26 | GND | 16 |
| 5 | HDD6 | 16 | 27 | N.C. | 16 |
| 6 | HDD9 | 16 | 28 | N.C. | 16 |
| 7 | HDD5 | 16 | 29 | N.C. | 16 |
| 8 | HDD10 | 16 | 30 | GND | 16 |
| 9 | HDD4 | 16 | 31 | IRQ14 | 16 |
| 10 | HDD11 | 16 | 32 | IOCS16- | 16 |
| 11 | HDD3 | 16 | 33 | HDA1 | 16 |
| 12 | HDD12 | 16 | 34 | N.C. | 16 |
| 13 | HDD2 | 16 | 35 | HDA0 | 16 |
| 14 | HDD13 | 16 | 36 | HDA2 | 16 |
| 15 | HDD1 | 16 | 37 | HDCS0- | 16 |
| 16 | HDD14 | 16 | 38 | HDCS1- | 16 |
| 17 | HDD0 | 16 | 39 | HDLED- | 16 |
| 18 | HDD15 | 16 | 40 | GND | 16 |
| 19 | GND | 16 | 41 | VCC | 16 |
| 20 | N.C. | 16 | 42 | VCC | 16 |
| 21 | N.C. | 16 | 43 | GND | 16 |
| 22 | GND | 16 | 44 | VCC | 16 |

44 PIN 2MM HEADER

```
 2  4        42  44
 1  3        41  43
```

P22 FLOPPY

| PIN# | SIGNAL | SH# | PIN# | SIGNAL | SH# | PIN# | SIGNAL | SH# |
|---|---|---|---|---|---|---|---|---|
| 1 | VCC | 16 | 10 | MIRO- | 16 | 19 | GND | 16 |
| 2 | INDEX- | 16 | 11 | N.C. | 16 | 20 | TRKO- | 16 |
| 3 | VCC | 16 | 12 | DIR | 16 | 21 | GND | 16 |
| 4 | DRV0- | 16 | 13 | N.C. | 16 | 22 | WRPRT- | 16 |
| 5 | VCC | 16 | 14 | STEP- | 16 | 23 | GND | 16 |
| 6 | DSKCHG | 16 | 15 | GND | 16 | 24 | RDATA- | 16 |
| 7 | N.C. | 16 | 16 | WDATA- | 16 | 25 | GND | 16 |
| 8 | N.C. | 16 | 17 | GND | 16 | 26 | HDSEL | 16 |
| 9 | N.C. | 16 | 18 | WGATE- | 16 | | | |

NOTES : UNLESS OTHERWISE SPECIFIED :
1. ALL IC DEVICE TYPES ARE PREFIXED WITH SN74.
2. THE FOLLOWING PREFIX'S ARE ALWAY'S USED:
   T IS EQUAL TO "LS"
   AT IS EQUAL TO "ALS"
3. THE FOLLOWING PREFIX'S ARE USED ONLY WHEN INSUFFICIENT CHARACTERS ARE AVAILABLE:
   A IS EQUAL TO "ACT"
   B IS EQUAL TO "BCT"
   V IS EQUAL TO "AS"
   W IS EQUAL TO "AT" OR "ALS"
4. IC PACKAGE TYPE IS INDICATED BY THE FOLLOWING SUFFIX'S:
   DUAL-IN-LINE, PLASTIC = "N" OR BLANK
   DUAL-IN-LINE, PLASTIC [WIDE] = NW
   DUAL-IN-LINE, CERAMIC = J
   DUAL-IN-LINE, CERAMIC [WIDE] = JD
   CHIP CARRIER, PLASTIC = F
   CHIP CARRIER IN A S.M. SCKT = FF
   CHIP CARRIER IN A PGA SCKT = FX
   CHIP CARRIER, CERAMIC [RECT] = FE
   CHIP CARRIER, CERAMIC [SQUARE] = FH
   FLAT PACKAGE, CERAMIC = U
   FLAT PACKAGE, CERAMIC [WIDE] = W
   GRID ARRAY, PLASTIC = X
   GRID ARRAY, PLASTIC [LIF SCKT] = XL
   GRID ARRAY, PLASTIC [ZIF SCKT] = XZ
   GRID ARRAY, CERAMIC = Y
   GRID ARRAY, CERAMIC [LIF SCKT] = YL
   GRID ARRAY, CERAMIC [ZIF SCKT] = YZ
   SINGLE-IN-LINE = E,L,M,G
   "SOIC", PLASTIC = D
   "SOIC", PLASTIC [WIDE] = DW
   "SOJ", PLASTIC, J LEADS = R

5. VCC IS APPLIED TO PIN 8 OF ALL 8-PIN IC's, PIN 14 OF ALL 14-PIN IC's, PIN 16 OF ALL 16-PIN IC's, PIN 20 OF ALL 20-PIN IC's, ETC.
6. GROUND IS APPLIED TO PIN 4 OF ALL 8-PIN IC's, PIN 7 OF ALL 14-PIN IC's, PIN 8 OF ALL 16-PIN IC's, PIN 10 OF ALL 20-PIN IC's, ETC.
7. DEVICE TYPE, PIN NUMBERS, AND REFERENCE DESIGNATOR [LOCATION] OF GATES ARE SHOWN AS FOLLOWS:

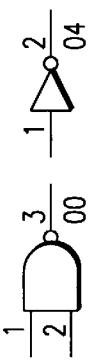

00 AND 04 = DEVICE TYPES
1, 2, AND 3 = PIN NUMBERS
U01 AND U02 = REF. DESIGNATOR [LOCATION]

8. RESISTANCE VALUES ARE IN OHMS.
9. RESISTORS ARE 1/8 WATT, 5%.
10. CAPACITANCE VALUES ARE IN MICROFARADS.
11. CAPACITORS ARE 50V, 10%.
12. THIS COUPON WILL BE USED ON ALL COMMERICAL MULTILAYER BOARDS.

*FIG. 31*

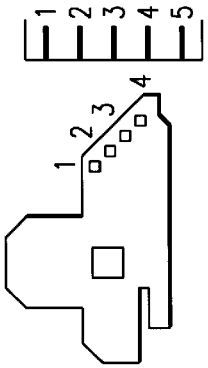

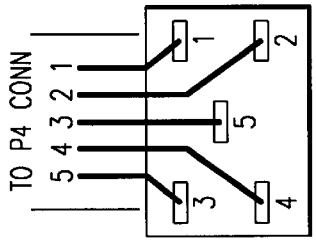

| P3 STICK CONN | |
|---|---|
| PIN# | SIGNAL NAME |
| 1 | Y |
| 2 | GND |
| 3 | X |
| 4 | VCC |
| 5 | SHIELD |

SCH PG 04

| 1 | 5 |
|---|---|

| P4 QUICK PORT CONN | |
|---|---|
| PIN# | SIGNAL NAME |
| 1 | VCC |
| 2 | CLK |
| 3 | SHIELD |
| 4 | DATA |
| 5 | GND |

SCH PG 03

| 1 | 5 |
|---|---|

FIG. 35

| P2 BROTHER KEYBOARD CONN | | | | |
|---|---|---|---|---|
| PIN# | SIGNAL | PIN# | SIGNAL |
| 1 | SENS4 | 15 | SENS5 |
| 2 | SHIELD | 16 | GND |
| 3 | SENS2 | 17 | DRV3 |
| 4 | GND | 18 | DRV2 |
| 5 | SENS6 | 19 | DRV1 |
| 6 | GND | 20 | DRV0 |
| 7 | SENS1 | 21 | DRV11 |
| 8 | GND | 22 | DRV10 |
| 9 | SENS0 | 23 | DRV9 |
| 10 | GND | 24 | DRV8 |
| 11 | SENS7 | 25 | DRV7 |
| 12 | GND | 26 | DRV6 |
| 13 | SENS3 | 27 | DRV5 |
| 14 | GND | 28 | DRV4 |

SCH PG 02

| 1 | 28 |
|---|---|

SCH PG 02, 03, 04

| 1 | 59 |
|---|---|
| 2 | 60 |

| P1 8D2BD CONNECTOR – RECEPTACLE | | | | |
|---|---|---|---|---|
| PIN# | SIGNAL | PIN# | SIGNAL |
| 1 | GND | 2 | GND |
| 3 | XD1 | 4 | XD0 |
| 5 | XD3 | 6 | XD2 |
| 7 | XD5 | 8 | XD4 |
| 9 | XD7 | 10 | XD6 |
| 11 | VCC | 12 | VCC |
| 13 | CS2– | 14 | 8042CS– |
| 15 | IOR– | 16 | IOW– |
| 17 | SAO2 | 18 | KEYHIT– |
| 19 | IRQ1 | 20 | IRQ12 |
| 21 | CPU_RES– | 22 | EXTSMI– |
| 23 | GATEA20 (NU) | 24 | STANDBY– |
| 25 | SELKBD | 26 | EXUNIT– |
| 27 | CPU_TEMP_RET | 28 | IRQ11 |
| 29 | CPU_TEMP | 30 | WAKE_H8– |
| 31 | GND | 32 | GND |
| 33 | EXTPWR | 34 | VIN |
| 35 | DIN_DATA (KBD/MSE) | 36 | DIN_CLK (KBD/MSE) |
| 37 | GND | 38 | GND |
| 39 | EXT_KBD_DATA | 40 | EXT_KBD_CLK |
| 41 | GND | 42 | GND |
| 43 | NC (KCLK OSC) | 44 | NC |
| 45 | GND | 46 | GND |
| 47 | BATA_DAT | 48 | BATB_DAT |
| 49 | VCC | 50 | VCC |
| 51 | NUM_LED– | 52 | FDD_LED– |
| 53 | POWER_LED– | 54 | HDD_LED– |
| 55 | CAP_LED– | 56 | TURBO_LED– |
| 57 | SCR_LED– | 58 | RESET– |
| 59 | GND | 60 | GND |

NOTES : UNLESS OTHERWISE SPECIFIED :
1. ALL IC DEVICE TYPES ARE PREFIXED WITH SN74.
2. THE FOLLOWING PREFIX'S ARE ALWAY'S USED:
   T IS EQUAL TO "LS"
   AT IS EQUAL TO "ALS"
3. THE FOLLOWING PREFIX'S ARE USED ONLY WHEN
   INSUFFICIENT CHARACTERS ARE AVAILABLE:
   A IS EQUAL TO "ACT"
   B IS EQUAL TO "BCT"
   V IS EQUAL TO "AS"
   W IS EQUAL TO "AT" OR "ALS"
4. IC PACKAGE TYPE IS INDICATED BY THE FOLLOWING SUFFIX'S:
   DUAL-IN-LINE, PLASTIC = "N" OR BLANK
   DUAL-IN-LINE, PLASTIC [WIDE]         = NW
   DUAL-IN-LINE, CERAMIC                = J
   DUAL-IN-LINE, CERAMIC [WIDE]         = JD
   CHIP CARRIER, PLASTIC                = F
   CHIP CARRIER IN A S.M. SCKT          = FF
   CHIP CARRIER IN A PGA SCKT           = FX
   CHIP CARRIER, CERAMIC [RECT]         = FE
   CHIP CARRIER, CERAMIC [SQUARE]       = FH
   FLAT PACKAGE, CERAMIC                = U
   FLAT PACKAGE, CERAMIC [WIDE]         = W
   GRID ARRAY, PLASTIC                  = X
   GRID ARRAY, PLASTIC [LIF SCKT]       = XL
   GRID ARRAY, PLASTIC [ZIF SCKT]       = XZ
   GRID ARRAY, CERAMIC                  = Y
   GRID ARRAY, CERAMIC [LIF SCKT]       = YL
   GRID ARRAY, CERAMIC [ZIF SCKT]       = YZ
   SINGLE-IN-LINE                       = E,L,M,G
   "SOIC", PLASTIC                      = D
   "SOIC", PLASTIC [WIDE]               = DW
   "SOJ", PLASTIC, J LEADS              = R

VCC'S NOT MARKED ON THE SCHEMATIC. ARE APPLIED AS FOLLOW:

| power name | ref. designator | pin number |
|---|---|---|
| +5VSYS | U6 | 14 |
| " | U33 | 14 |
| " | U27 | 20 |
| " | U37 | 20 |
| " | U36 | 20 |
| " | U22 | 14 |
| VCC | U8 | 14 |
| " | U11 | 14 |
| SW_VCC | U10 | 14 |
| +5VID | U28 | 16 |

6. GROUND IS APPLIED TO PIN 4 OF ALL 8-PIN IC's,
   PIN 7 OF ALL 14-PIN IC's, PIN 8 OF ALL
   16-PIN IC's, PIN 10 OF ALL 20-PIN IC's, ETC.
7. DEVICE TYPE, PIN NUMBERS, AND REFERENCE DESIGNATOR
   [LOCATION] OF GATES ARE SHOWN AS FOLLOWS:

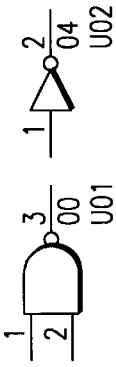

00 AND 04 = DEVICE TYPES
   1, 2, AND 3 = PIN NUMBERS
   U01 AND U02 = REF. DESIGNATOR [LOCATION]
8. RESISTANCE VALUES ARE IN OHMS.
9. RESISTORS ARE 1/8 WATT, 5%.
10. CAPACITANCE VALUES ARE IN MICROFARADS.
11. CAPACITORS ARE 50V, 10%.
12. THIS COUPON WILL BE USED ON ALL
    COMMERCIAL MULTILAYER BOARDS.

LAST REF.
DESIGNATORS USED:
R176 C183
L27 U40
CR9 SW3
TP5 Q26
QSC2 SP1

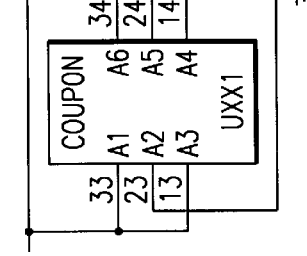

FIG. 36

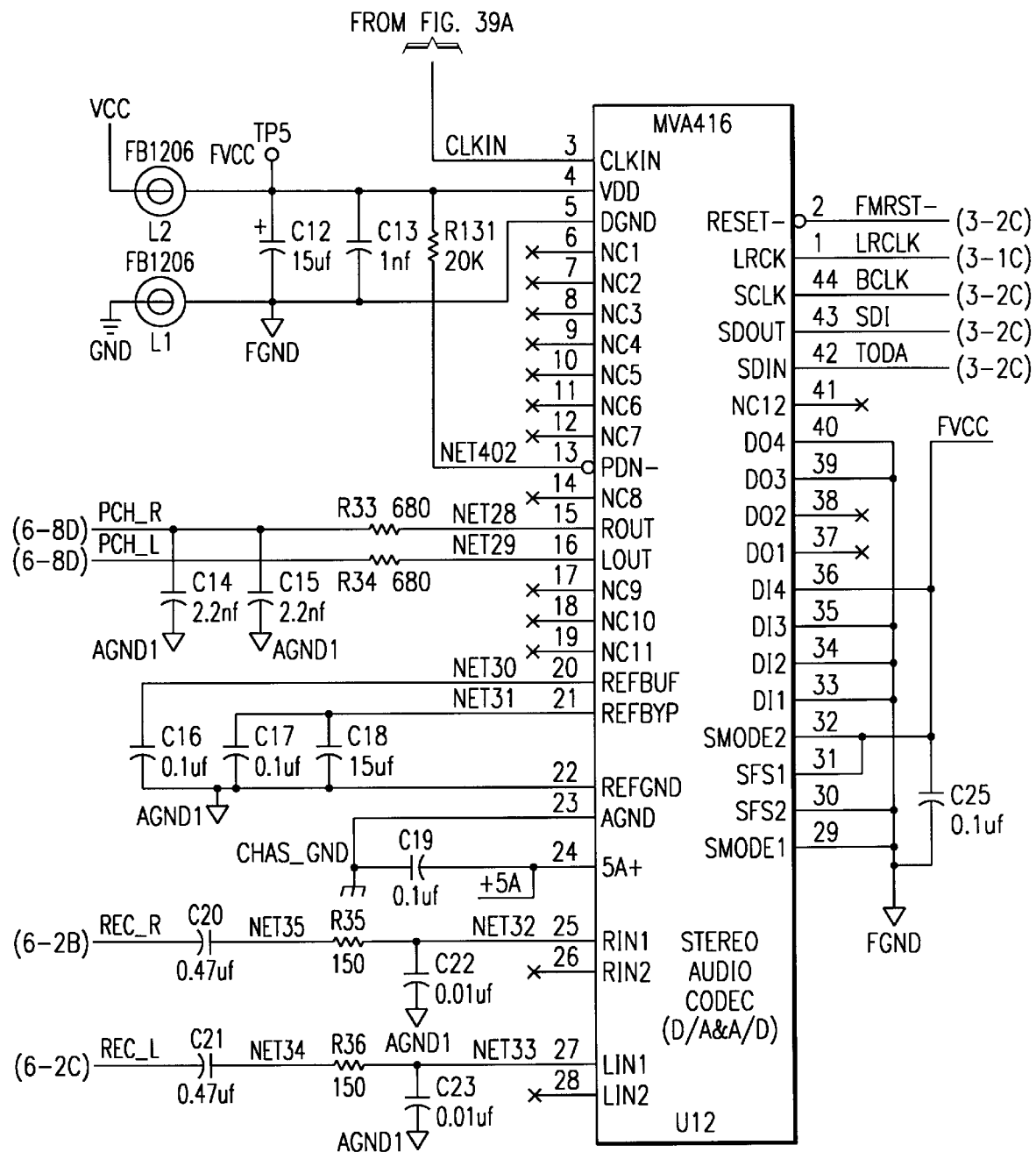
FIG. 39B
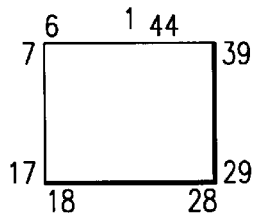

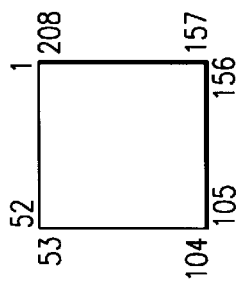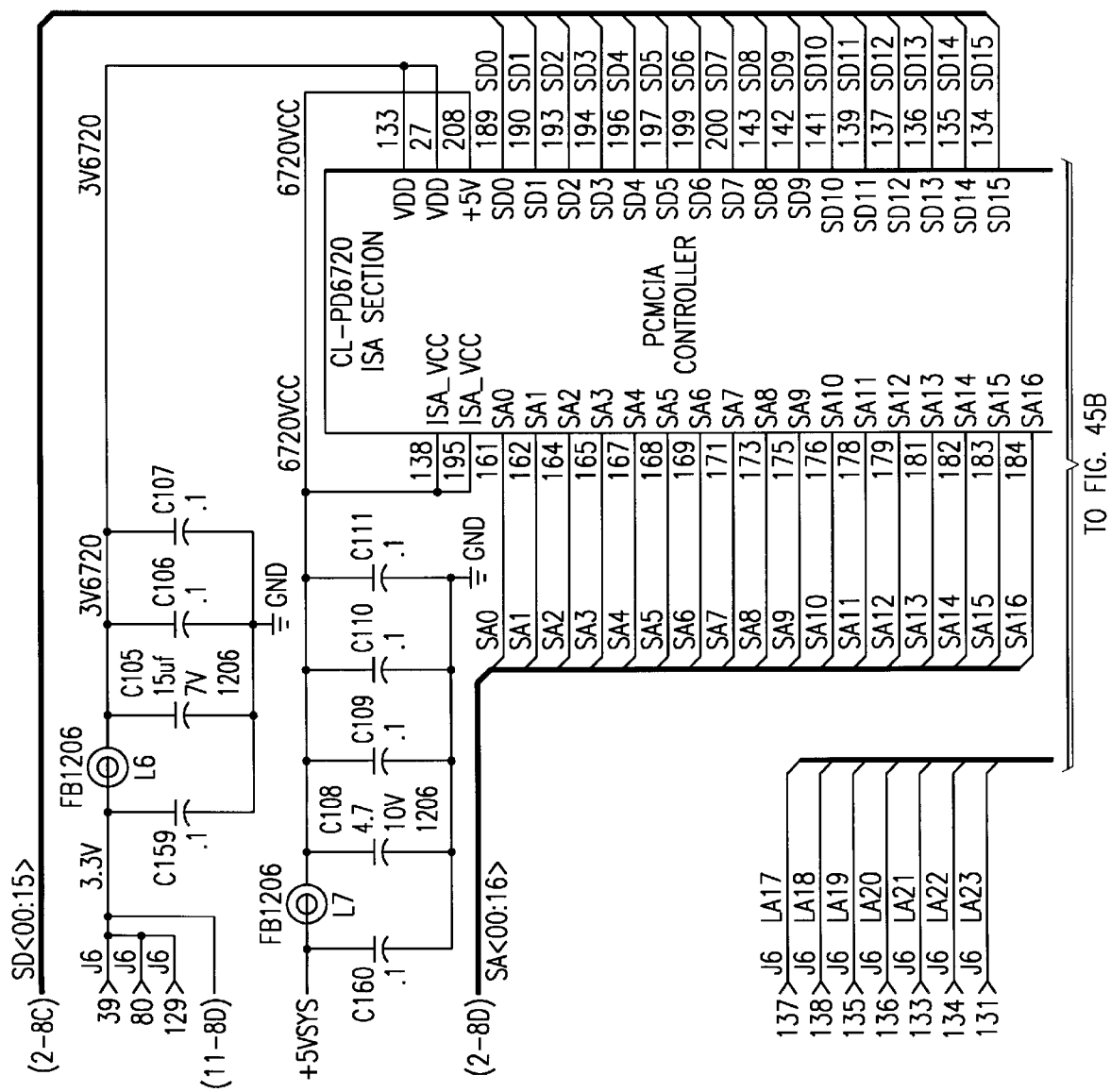
FIG. 45A

NOTES : UNLESS OTHERWISE SPECIFIED :
1. ALL IC DEVICE TYPES ARE PREFIXED WITH SN74.
2. THE FOLLOWING PREFIX'S ARE ALWAY'S USED:
   T IS EQUAL TO "LS"
   AT IS EQUAL TO "ALS"
3. THE FOLLOWING PREFIX'S ARE USED ONLY WHEN INSUFFICIENT CHARACTERS ARE AVAILABLE:
   A IS EQUAL TO "ACT"
   B IS EQUAL TO "BCT"
   V IS EQUAL TO "AS"
   W IS EQUAL TO "AT" OR "ALS"
4. IC PACKAGE TYPE IS INDICATED BY THE FOLLOWING SUFFIX'S:
   DUAL-IN-LINE, PLASTIC = "N" OR BLANK
   DUAL-IN-LINE, PLASTIC [WIDE]           = NW
   DUAL-IN-LINE, CERAMIC                  = J
   DUAL-IN-LINE, CERAMIC [WIDE]           = JD
   CHIP CARRIER, PLASTIC                  = F
   CHIP CARRIER IN A S.M. SCKT            = FF
   CHIP CARRIER IN A PGA SCKT             = FX
   CHIP CARRIER, CERAMIC [RECT]           = FE
   CHIP CARRIER, CERAMIC [SQUARE]         = FH
   FLAT PACKAGE, CERAMIC                  = U
   FLAT PACKAGE, CERAMIC [WIDE]           = W
   GRID ARRAY, PLASTIC                    = X
   GRID ARRAY, PLASTIC [LIF SCKT]         = XL
   GRID ARRAY, PLASTIC [ZIF SCKT]         = XZ
   GRID ARRAY, CERAMIC                    = Y
   GRID ARRAY, CERAMIC [LIF SCKT]         = YL
   GRID ARRAY, CERAMIC [ZIF SCKT]         = YZ
   SINGLE-IN-LINE                         = E,L,M,G
   "SOIC", PLASTIC                        = D
   "SOIC", PLASTIC [WIDE]                 = DW
   "SOJ", PLASTIC, J LEADS                = R

5. VCC IS APPLIED TO PIN 8 OF ALL 8-PIN IC's, PIN 14 OF ALL 14-PIN IC's, PIN 16 OF ALL 16-PIN IC's, PIN 20 OF ALL 20-PIN IC's, ETC.
6. GROUND IS APPLIED TO PIN 4 OF ALL 8-PIN IC's, PIN 7 OF ALL 14-PIN IC's, PIN 8 OF ALL 16-PIN IC's, PIN 10 OF ALL 20-PIN IC's, ETC.
7. DEVICE TYPE, PIN NUMBERS, AND REFERENCE DESIGNATOR [LOCATION] OF GATES ARE SHOWN AS FOLLOWS:

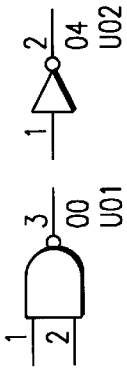

00 AND 04 = DEVICE TYPES
1, 2, AND 3 = PIN NUMBERS
U01 AND U02 = REF. DESIGNATOR [LOCATION]

8. RESISTANCE VALUES ARE IN OHMS.
9. RESISTORS ARE 1/8 WATT, 5%.
10. CAPACITANCE VALUES ARE IN MICROFARADS.
11. CAPACITORS ARE 50V, 10%.
12. THIS COUPON WILL BE USED ON ALL COMMERICAL MULTILAYER BOARDS.

*FIG. 48*

ELECTRONIC APPARATUS HAVING A SOFTWARE CONTROLLED POWER SWITCH

CROSS-REFERENCE TO RELATED APPLICATIONS

The following coassigned patent applications are hereby incorporated herein by reference:

| Ser. No. | Filing Date | TI Case No. | Title |
| --- | --- | --- | --- |
| 08/395,335 | 02/28/95 | TI-20391 | Real Time Power Conservation and Thermal Management for Computers |
| 08/598,904 | 12/07/95 | TI-20567 | Power Management - Thermal |

NOTICE (C) Copyright, Texas Instruments Incorporated 1996. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to power switches for electronic devices.

BACKGROUND OF THE INVENTION

Without limiting the scope of the invention, its background is described in connection with desktop and portable computers.

From the advent of electricity, there have been millions of devices built that are powered by electricity. However, every electronic device has to have a method of turning that device on and off. Therefore, virtually every electronic device has a power switch that enables the user to turn that device on and off.

In addition, from the evolution of the computer, there has always been a method and device for turning off a computer's power. In the normal environment, the switch would be turned on to apply power to the computer and turned off to terminate the power. However, the normal power switch simply turns off the power without regard to what the computer is doing at the time. The user simply flips a switch, and thus terminates the power to the computer. Yet, if the computer is in the middle of a software application, or updating a database, or writing to a hard disk, valuable information can be lost or corrupted.

SUMMARY OF THE INVENTION

A need has been discovered for an intelligent power switch; a switch that considers what the computer is doing at the time the user flips the power switch; a switch that will not lose whatever is in the memory at the time; a switch that lets the hard drive position and park its heads before powering down; an intelligent power switch could do this and more.

The present invention solves such a problem. The intelligent power switch can be a mechanical power switch that is controlled by software. However, the intelligent power switch could also be all electronic and run by software entirely. Or, the intelligent power switch could be a combination of electronics, software and mechanical devices.

The intelligent power switch may be programmed to be intelligent based on what the computer is doing. If the computer is doing something that requires intelligence, (i.e. the system is in a mode that could cause damage to the file system, the communication system, computer network, applications, or even physical hardware damage), then the system knows precisely what to shut down in what order. The software would take control of the power switch away from the hardware and treat that as an event and then process the event at a later time. That would allow preparation for an orderly shut down. The orderly shut down would allow software applications to close files and exit in an orderly manner. In addition, peripheral devices could also shut down orderly. For example, heads on hard drives could be positioned and parked before terminating power. Moreover, peripheral devices connected to the computer serially or by parallel connections could also be shut down in an orderly manner. Further, even display devices could be shut down in an orderly manner.

There are three methods of operating the intelligent power switch One method is to simply terminate the power of the computer whenever the power switch was turned off. Another method is to treat the power switch being turned off as an event and then let the control software proceed with an orderly shut down of the computer's programs and hardware before terminating power to the computer. The last method is similar to the second method, but allows a hardware override after a certain time limit. This would allow the computer to automatically terminate the power in case the software malfunctioned. This hardware override could be implemented as a deadman timer with either a default time limit and/or a time limit that may be adjusted by the control software. In addition, the timer circuit could be setup to allow normal operation if the user quickly turns the power switch to the on position before the system is complete with its orderly shut down. However, the full operation of the system would depend upon how much the system has been shut down already before the user turns on the power again. If, however, the system has not started the shut down procedure, but only registered the event, full operation would begin immediately. Many other variations could also be implemented.

This is a system and method of intelligently terminating power to a computing device. The system may comprise: a processing device; a power source connected to the processing device; a switch connected to the power source; and a control system run by the processing device and connected to the power source and the switch. In addition, the system may include a deadman timer which provides a fail-safe operation. Further, the system may include a means for executing an orderly shut down procedure for software and hardware. Moreover, the system could be tied to a thermal and/or power management system. Additionally, the system could initiate an orderly shut down of peripheral devices connected to the system by serial, parallel or other connections. Other devices, systems and methods are also disclosed.

BRIEF DESCRIPTION OF THE DRAWINGS

In the drawings:

FIG. 7 is an exploded view of a portable computer;

FIG. 8 is a closeup of the main printed circuit board from FIG. 7;

FIGS. 9–30D show logic diagrams of an implementation of the main printed circuit board of FIG. 7;

FIGS. 31–35 show logic diagrams of an implementation of the keyscan printed circuit board of FIG. 7;

FIGS. 36–47B show logic diagrams of an implementation of the PCMCIA/Sound printed circuit board of FIG. 7; and FIGS. 48–49 show logic diagrams of an implementation of the IR module printed circuit board of FIG. 7.

Corresponding numerals and symbols in the different figures refer to corresponding parts unless otherwise indicated.

DETAILED DESCRIPTION OF PREFERRED EMBODIMENTS

The intelligent power switch can be executed in any combination of three methods. The first is to have the intelligent power switch execute in simple mode; when the user turns off the power, the power switch simply terminates the power to the computer. The second method makes the power switch intelligent by controlling it with software; this method will not turn the power off until the software program releases control and triggers the termination of power. The third method is to have a deadman timer run concurrently to the software program and time out after a specified time limit and then proceed to terminate the power to the computer.

A software program that controls the power switch can be executed on a central processing unit (CPU), or a separate processor like an application processor. For example, you can either have a CPU run the control program with its other programs, or dedicate a small microprocessor to monitor the power switch.

The software control program can have three modes of operation: no intelligent power switch, intelligent power switch with real time event, or intelligent power switch with delayed event (for the sake of clarity, real time events and delayed events will be described with real time events getting attention by the CPU and other hardware in real time, similar to interrupts, and delayed events getting attention from the CPU at a later time like any other software program getting scheduled time slices). The software control program allows the applications time to shut down in an orderly manner. However, if any of the application programs lose control or have some type of unrecoverable error, and are not able to get back to the timer before it runs out, the deadman timer will time out and allow the computer to shut down as in the simple mode, just like an ordinary power switch. Therefore, the setting of the deadman timer is crucial; the time limit should be long enough to let the applications shut down in orderly process, and get back to the timer and reset it if necessary. In addition, the time limit should not be too long, in case the applications get into some type of unrecoverable error; the user should not have to wait too long for the computer to shut off.

Figure 1:
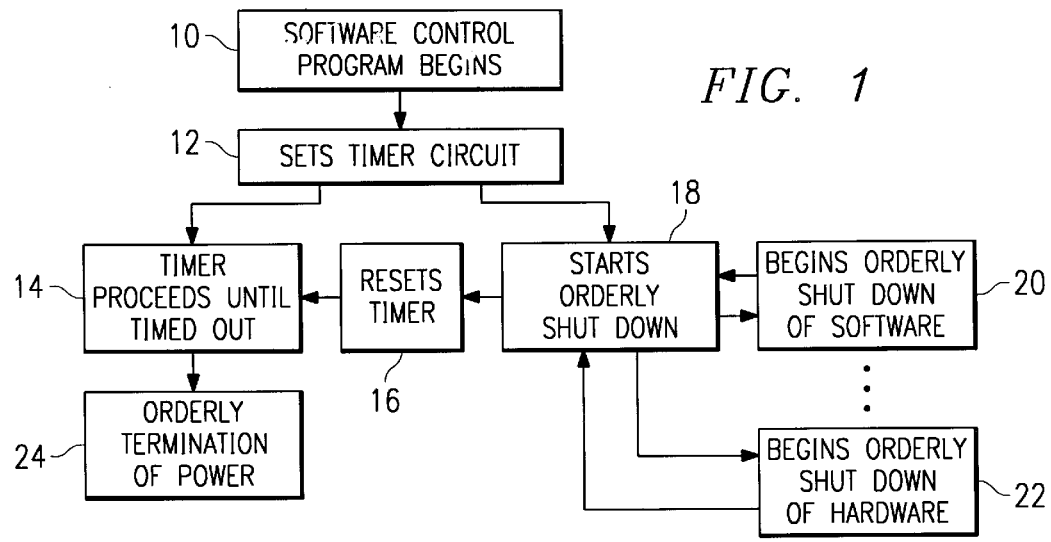
FIG. 1 is a chart of the preferred embodiment.

FIG. 1 describes a general flow of the intelligent power switch. The system begins by starting the software control program 10. The software control program may be started at the bootup process or on user demand. However, after the software control program starts, the timer circuit gets set 12. The timer circuit may get set to a value by the software, or have a default value. However, the timer must be able to get reset by the software control program. Once the timer circuit gets set, the timer proceeds until timed out 14. In addition, the software program initiates an orderly shut down procedure 18 concurrently. The software program could first start the software shut down process 20 and the hardware shut down process 22. However, these two procedures could be implemented in any order or intermixed. Yet, the software program has to be able to reset the timer circuit 16 before it times out if additional time is needed to complete the shut down process. Finally, after the timer circuit has timed out, the orderly termination of power to the system begins 24. In addition, the software program could be implemented to set the timer value to time out instantly if the shut down process is complete.

FIG. 1 details a flowchart of the software control program. However, as stated before, the software control program can be implemented at different times in the operation of the control program. It may be implemented in the bootup process of the computer and have the user turn it off or on. It may also be implemented only when the user hits the power switch to turn the computer off. It could be implemented with a battery source to supply just enough power to ensure an orderly shut down process of the peripherals and the application programs. This implementation would be beneficial in case of a power failure. In addition, the user could turn on the software control program at any time by just executing the program.

Figure 2:
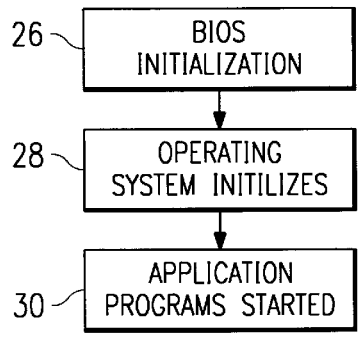
FIGS. 2 is a flow chart of the bootup process of a computer.

FIG. 2 details the implementation of the software control program in the preferred embodiment. First, the basic input/output system (BIOS) is initialize 26. Then, the operating system gets initialized 28. Within the operating system initialization, some of the steps executed are: initialize core operating system, initialize advanced power management system, start scheduler, and start user interface. Once the operating system is initialized, the other software applications may be implemented 30. Even though the software control program may be implemented in other stages of the system's operation, the software control program is implemented at this point in the preferred embodiment.

An example implementation of the software control program is included in this specification. However, the invention could be implemented in a multitude of ways and is not restricted to this embodiment.

DEADMAN TIMER CIRCUIT OPTION

Deadman Timer

An optional feature of the present invention can ensure a shut down of the device even though the computer software has malfunctioned. This optional feature is a fail-safe or a deadman timer circuit built into the intelligent power switch. The deadman timer would function after the intelligent power switch loses software control After a specified period of time elapses that would indicate the software has lost control, then the switch will revert back to turning power off in an unconditioned state just as if it had not been an intelligent power switch. This deadman timer is a fail-safe condition.

However, with the creation of a software controlled power switch, sometimes the software monitors the intelligence malfunctions. In addition, the software may malfunction because of the processor that it's running on.

Once the software has control of the power switch, the hardware circuit sets a maximum time that the circuit will wait for a response from the software control. If the circuit does not get a response from the software control, it will shut down the rest of the system. However, the software control can come back to the circuit and reset the clock, or even set a new maximum time for the circuit to wait for another response. This would enable the software control program to be more dynamic in case it needs to wait for unexpected events before powering the system down. This mode would place a burden on the software to come back to reset the timer every so often before the expiration of the maximum time. However, the user may also adjust the maximum time. This versatility would allow the user to determine what is acceptable as the maximum time for circuit to wait.

When the power switch is turned on, the system boots; the software boots; the Basic Input/Output System (BIOS) initializes and then the dead man timer gets set to zero and the power switch gets turned to simple, the default condition. Then, through the process of initializing the rest of the computer system (the software, and the different sets of hardware), the software control program will determine whether to turn on the intelligence power switch. However, the software control program may also determine to wait until the operating system is running or to wait until the user selects a particular application to turn this switch on or off.

The software control program is a real time event. It may be turned on or off based on the boot up condition. Then the software control program can decide whether to continue to keep it on or keep it off or whether to come back later and turn it to intelligent or simple mode.

For example, in the preferred embodiment, the computer can go through the boot process, then load DOS or Windows and then turn the intelligent power switch on. The software control program has to get back at least every 15 seconds or the system is going to turn itself off because the deadman timer switch is on.

In addition, the power switch can be programmed to watch a System Management Interrupt (SMI). The SMI can either be acted on real time, or can be acted upon later.

If the power switch is set to be acted upon a real time event, then as soon as the event is triggered, the heads of the hard drive are positioned and parked. Then the power from the hard drive is turned off, along with the power to the displays and other devices within the system. Then the CMOS parameters that need to be saved are saved. This process would enable protection against lost clusters or allocations on hard disks, which is a major problem on other products.

If the power switch is set to be acted upon a delayed event, then the software control program allows the operating system and other programs to prepare for shut down. This will allow the system to go through and start closing files. In addition, it will start updating any pertinent parameters and then trigger the event to start the shut down process. The shut down process is the same as the previous scenario.

In both scenarios, the power switch may be tied directly to the actions required by the operating system to do an orderly shut down. However, the intelligent power switch can also be integrated into an existing shut down software program (e.g. Super Shutdown by Texas Instruments Incorporated). This would allow the shut down program to automatically go through all the software programs and ensure an orderly shut down. A shut down program could ensure that all files are closed, and parameters updated before it gives control back to the software control program.

DEADMAN TIMER CIRCUIT IMPLEMENTATION

The intelligent power switch circuit with the deadman timer consists of the five functional parts identified in FIG. 3 and as described below:

Supervisory Transistor 38—Low power transistor switch that runs unregulated input power on and off to the computer power supervisory circuitry.

Manual Switch 56—Manual power on/off switch that is set by the computer operator and that informs the Intelligent power switch and computer processor to turn system power on and off.

Power Off Timer 74—provides power control to processor when Intelligent power switch is in the intelligent mode and Manual Switch 56 is in the "off" position.

Power Off Latch 36—system power off latch holds computer power "off" when processor has turned off power and Manual Switch 56 is still "on".

Power Off Latch Trigger 32—provides power control by processor when Intelligent power switch is in the intelligent mode and the Manual Switch 56 is in the "on" position.

Figure 3:
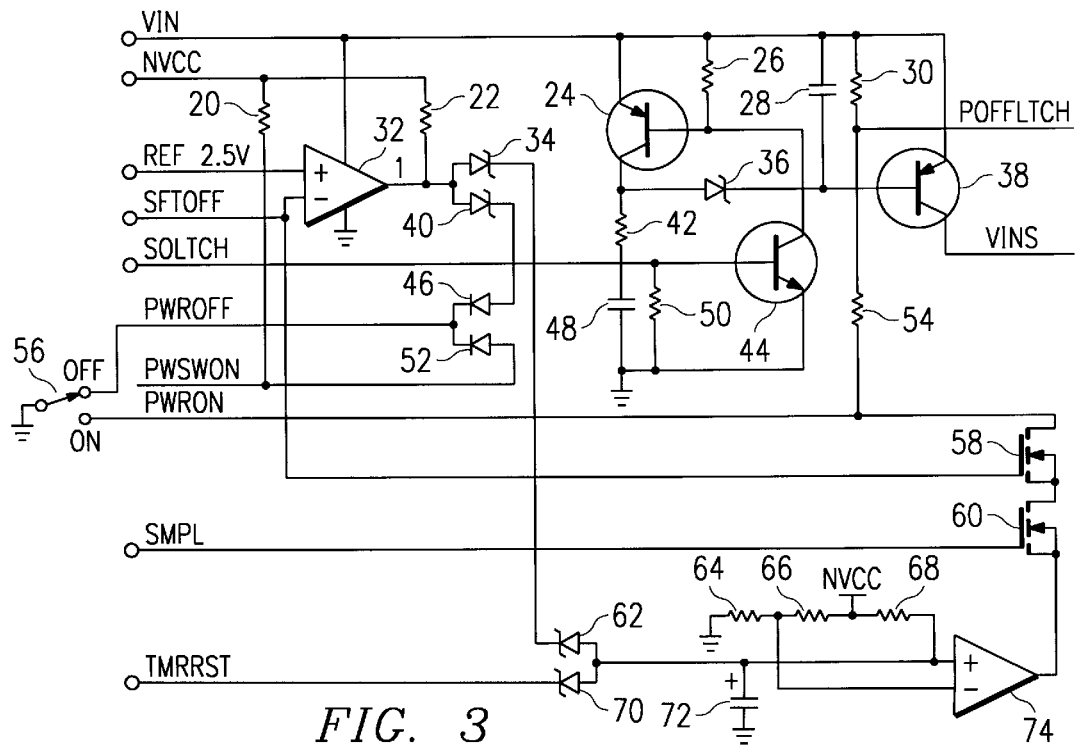
FIG. 3 is a circuit diagram of an embodiment of hardware used for the Intelligent power switch.
Figure 4:
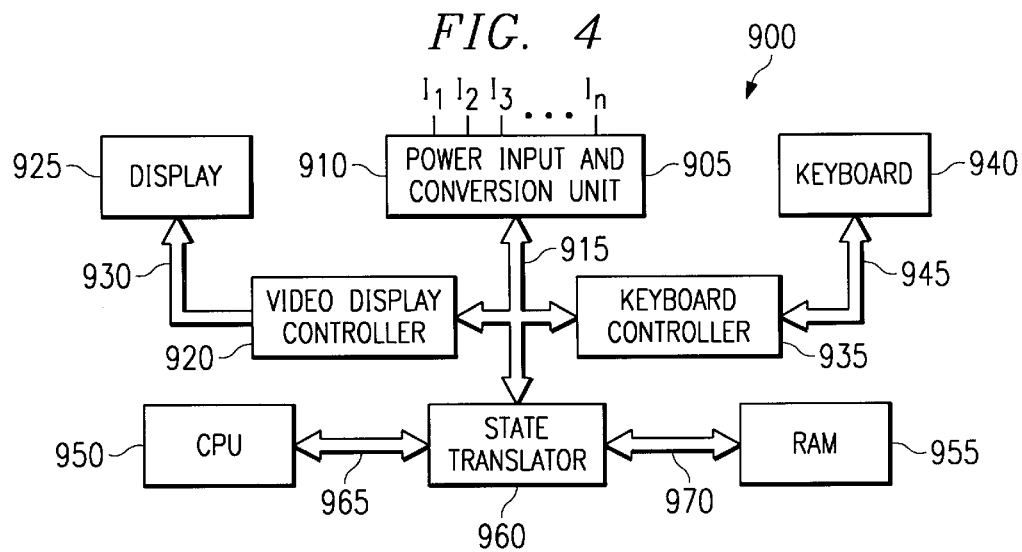
FIG. 4 is a block diagram of the electronic architecture of a basic computer.

The Intelligent power switch control signals shown in FIG. 3 are described below:

"VIN"—unregulated DC input power to computer sourced by external power and/or internal batteries.

"VINS"—unregulated DC input power to computer power Supervisory Circuit 38.

"NVCC"—regulated DC power to computer logic.

"REF 2.5"—compalitor reference voltage.

"SFTOFF"—low active logic signal from processor indicating software status of the manual on/off switch.

"PWROFF"—low active logic signal from manual on/off switch indicating "off" position.

"PWRON"—low active logic signal from manual on/off switch indicating "on" position.

"PWRSWON"—logic signal to processor indicating status of the manual on/off switch.

"SMPL"—logic signal from processor indicating mode of Intelligent power switch.

"TRMRRST"—low active logic signal from processor that resets the Power Off Timer 74.

The Intelligent power switch Circuit shown in FIG. 3 couples the computer operator and the computer processor to the computer system power switch. The computer processor can be programmed to turn off the system power intelligently. The computer power is turned on by the operator changing the manual switch status from "off to "on". In addition, the computer power may be turned off by the computer processor under software controlled conditions in an orderly and intelligent manner, through the intelligent power switch circuit. The manual power on/off switch 56 may be a single pole, double throw as shown in FIG. 3, or may be any switching device that provides compatible logic levels when connected to the circuit. The Intelligent power switch defaults to the simple mode when system power is "off" or when the system power "on" routine is being executed by the computer logic (the computer boot-up process). The intelligent switch can be changed to the intelligent mode by the computer at any time after the power "on" routine is complete or as part of the system initialization during the power "on" routine. The Intelligent power switch is in the simple mode whenever the logic signal "SMPL" is low. In this mode, the system power can only be turned "on" and "off" by the operator using the manual switch 56. The power "off" timer 74 and power "off" latch trigger 32 are disabled through diode 62 and transistor 60 through diode 34 respectively, when signal "SMPL" is held low by the computer or by loss of system power. Manual power "on" and "off" in this mode is as follows:

1) The closed contacts of the manual switch 56 in the "off" position grounds signal "PWROFF" and disables the power off latch trigger 32 through diodes 46 and 40, and clear the power off latch 36 through diode 46. In addition, the open contact of the manual switch 56 in the "off" position allows the signal "PWRON" to float up through resistors R7 and R6, shutting off the supervisory transistor 20. The system is turned off in this mode.

2) The closed contacts of the manual switch 56 in the "on" position grounds signal "PWRON" and turns on the supervisory transistor 38 through resistor 64. The system power is turned on in this mode. In addition, the open contact of the manual switch 56 in the "on" position turns off diodes 46 and 52 enabling the power off latch 36 and signaling to the processor that the manual switch 56 is "on" by pulling up signal "PWRSWON" through resistor 20.

The intelligent mode of the Intelligent power switch can only be set by the computer processor when the system power is on. The processor enables the intelligent mode by setting the signal "SMPL-" high. This enables the power off latch trigger 32 circuit by turning off diode 34 and enables the power off timer 74 by turning off diode 62 and turning on transistor 60. Transistor 58 is turned on by signal "SFTOFF" being high, and the power off timer 74 is held reset by the low signal "TMRRST-". The output of the power off latch trigger 32 is held low by the high level on the inverting input of 32 from the signal "SFTOFF". Thus the power off latch 36 is not triggered and system power remains on.

System power can now be turned off with the Intelligent power switch in the intelligent mode and the manual power switch 56 in the "on" position in the following way only:

The computer processor sets the signal "SFTOFF" low, turning off the latch trigger comparitor output 32. This sets the power off latch 36 by turning on transistor 44 through diode 40 and resistor 22 to the +5 VDC on signal "NVCC". Transistor 44 turns on transistor 24 which holds transistor 44 on. Transistor 24 also turns on diode 36 which turns off transistor 38, thus turning off system power. The power off latch 36 remains set as long as the manual power switch 56 remains in the "on" position and power lasts on signal "VIN" from the external and/or internal unregulated power sources.

The computer processor can control the system power with the intelligent switch in the "Intelligent" mode and the manual switch in the "off" position. The supervisor transistor 20 is held on through resistor 54 so long as transistors 58 and 60 and the time-out comparator 74 are all turned on. The system power is turned off if any one of the three are turned off.

The computer processor can now turn off system power by setting signal "SFTOFF" low, turning off transistor 60, or by allowing the power off timer 74 to turn off when capacitor 72 charges through resistor 68 to a level above the voltage at the junction of the divider at resistors 64 and 66, or by allowing the power off timer 74 to turn off after a software controlled time that holds signal "TMRRST" low.

Giving power off control to the computer processor insures that the shut down is done in an orderly and predictable manner protecting function integrity for the user.

Listed below in Table 1 are examples of types of devices and values that can be implemented in the Intelligent power switch circuit illustrated in FIG. 3. It is to be understood that the present invention is not limited to only this embodiment.

TABLE 1

| Element | Name | Description |
| --- | --- | --- |
| 20 | Resistor | 10k resistor |
| 22 | Resistor | 47k resistor |
| 24 | Transistor | DTA transistor |
| 26 | Resistor | 47k resistor |
| 28 | Capacitor | .0047 f capacitor |
| 30 | Resistor | 4.7k resistor |
| 32 | Invertor | TLC393C/2 invertor |
| 34 | Diode | BAT54A diode |
| 36 | Diode | BAT64 diode |
| 38 | Transistor | 2907 transistor |
| 40 | Diode | BAT54A diode |
| 42 | Resistor | 10k resistor |
| 44 | Transistor | DTC transistor |
| 46 | Diode | BAV70 diode |
| 48 | Capacitor | 0.1 f capacitor |
| 50 | Resistor | 47k resistor |
| 52 | Diode | BAV70 diode |
| 54 | Resistor | 4.7k resistor |
| 56 | Switch | single pole, double throw |
| 58 | Transistor | BST82 transistor |
| 60 | Transistor | BST82 transistor |
| 62 | Diode | BAT54A diode |
| 64 | Resistor | 10k resistor |
| 66 | Resistor | 3.3k resistor |
| 68 | Resistor | 1 M resistor |
| 70 | Diode | BAT54A diode |
| 72 | Capacitor | 10/16 v capacitor |
| 74 | Invertor | TLC393C/2 invertor |

OTHER OPTIONS

The control software program can also be interactive. It can prompt the user with questions like "do you really want to turn the power off—yes or no?" and if the user says yes, then the program could go ahead and execute an orderly shut down. However, the program could also just tell the user how to manually execute an orderly shut down, and let the user manually shut down the software programs and/or hardware. For example, the program could have the user close all files, close all software programs in a specific order, and then turn off all hardware devices that are hooked up to the computer. Yet, the control program could also be set to execute an orderly shut down automatically. In addition, the interactive part could more or less interactive, depending on options set in installation, in execution or at production.

Another option that could be implemented, is to automatically shut down the computer when it goes into an uncontrollable state. This could be done if the deadman timer was set to a time that the software control program knew it could get back to the timer if the computer was in a controllable state. However, if a software program took control of the computer and then went into an infinite loop or some other uncontrollable state, the deadman timer would time out and then execute the shut down procedure. Again, the intelligent power switch could be set to just simply terminate the power to the computer or go through an orderly shut down first. Moreover, the deadman timer could also run in the background while the control program is executing an orderly shut down, and then time out if the software control program gets in an uncontrollable state.

The software control program may also interface with a thermal management system (i.e. the thermal management systems described in U.S. patent application Ser. No.

08/395,335 and U.S. patent application Ser. No. 08/568,904) and/or a power management system (i.e. the power management system described in U.S. patent application Ser. No. 08/395,335). This would allow an intelligent power switch to have an orderly shut down when the user turns the computer off, and would also allow the features of the thermal and power management systems to be integrated into the intelligent power switch. The thermal and/or power management systems could control the deadman timer and reset to zero when the system wanted to terminate power. This would be helpful if the computer was in imminent danger of overheating, or in some other state of impending danger.

If the intelligent power switch incorporates the power management system, the software control program can be tied off of Advanced Power Management™ (APM) events under Windows 3.11™ and Windows95™ (Advanced Power Management, Windows 3.11 and Windows95 are trademarks of Microsoft). This would allow the software control program to be posted to the 530B interrupt. This would ensure that the operating system will check once every one to five seconds to make sure the software control program is still alive. Other operating systems might implement other interrupts that the software control program could be linked to also. In addition, the 530B interrupt may also change in implementation in other versions of the Windows™ operating system. However, the software control program would still function as long as it was checked periodically. For further details on the implementation of the preferred embodiment, refer to the APMfuncb procedure, as well as the SMI interrupt procedure in the example software implementation included at the end of the specification.

In sum, the present invention can be a mechanical power switch that is controlled by software. However, the intelligent power switch could also be all electronic and run by software entirely. Or, the intelligent power switch could be a combination of electronics, software and mechanical devices.

In addition, the intelligent power switch may be programmed to be intelligent based on what the user is doing. If the user is doing something that requires more intelligence, (i.e. the system is in a mode that could case damage to the file system, the communication system, computer network, applications, or even physical hardware damage), then the system knows precisely what to shut down in what order. The software would take control of the power switch away from the hardware and treat that as an event and then process the event at a later time. That would allow preparation for an orderly shut down. The orderly shut down would allow software applications to close files and exit in an orderly manner. In addition, peripheral devices could also shut down orderly. For example, heads on hard drives could be positioned and parked before terminating power. Moreover, peripheral devices connected to the computer serially or by parallel connections could also be shut down in an orderly manner. Further, even display devices could be shut down in an orderly manner.

There are three methods of operating the intelligent power switch. One method is to simply terminate the power of the computer whenever the power switch was turned off. Another method is to treat the power switch being turned off as an event and then let the control software proceed with an orderly shut down of the computer's programs and hardware before terminating power to the computer. The last method is similar to the second method, but allows a hardware override after a certain time limit. This would allow the computer to automatically terminate the power in case the software malfunctioned. This hardware override could be implemented as a deadman timer with either a default time limit and/or an time limit that may be adjusted by the control software. In addition, the timer circuit could be setup to allow normal operation if the user quickly turns the power switch to the on position before the system is complete with its orderly shut down. However, the full operation of the system would depend upon how much the system has been shut down already before the user turns on the power again. If, however, the system has not started the shut down procedure, but only registered the event, full operation would begin immediately. Many other variations could also be implemented.

FIGS. 4–8 depict example devices that the present invention can be implemented on. However, these embodiments are not intended to be limiting. The present invention may also be implemented on other devices as well.

Figure 6:
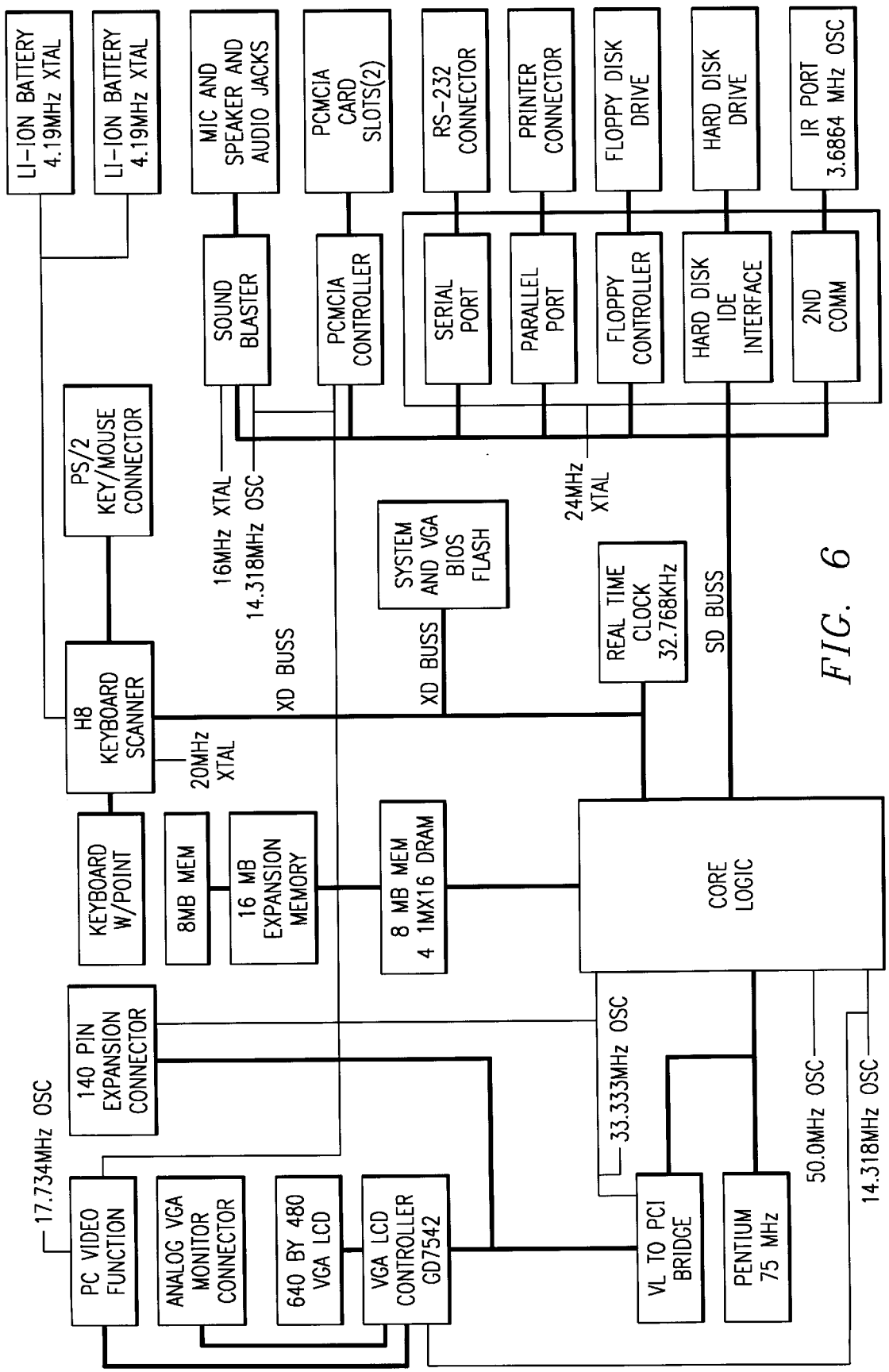
FIG. 6 is a block diagram of the portable computer of FIG. 4.
Figure 10B:
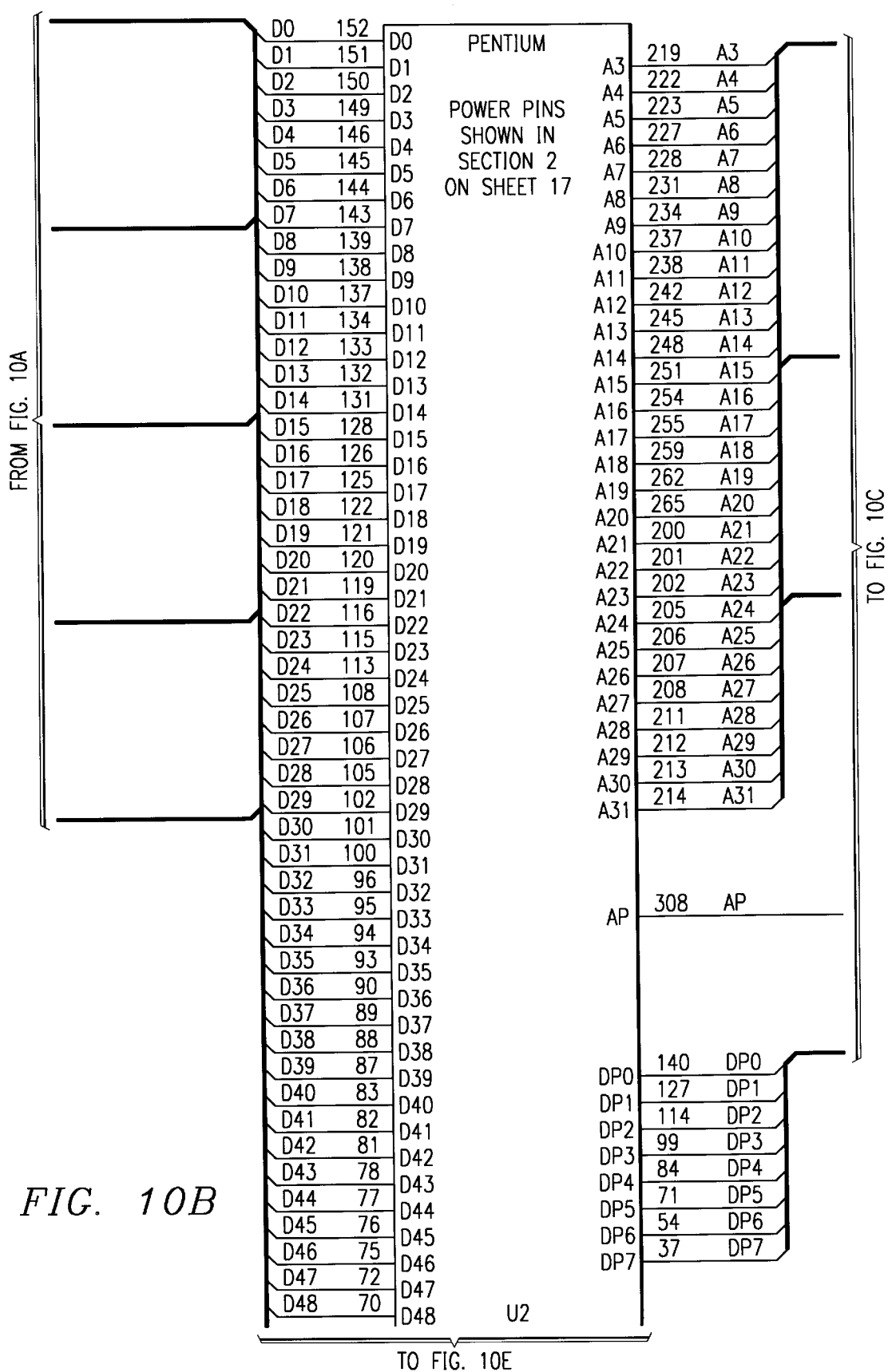
Figure 10C:
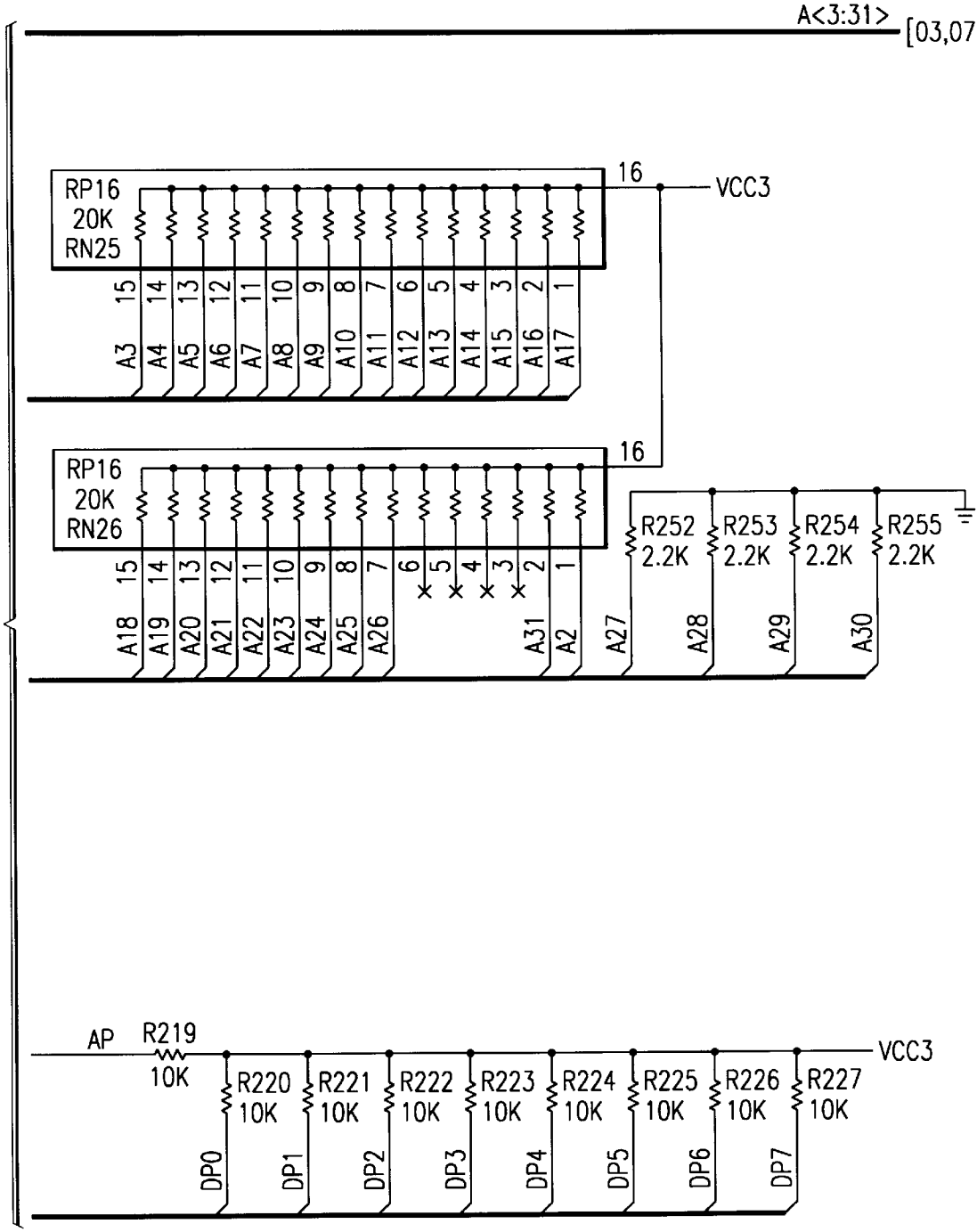
Figure 10D:
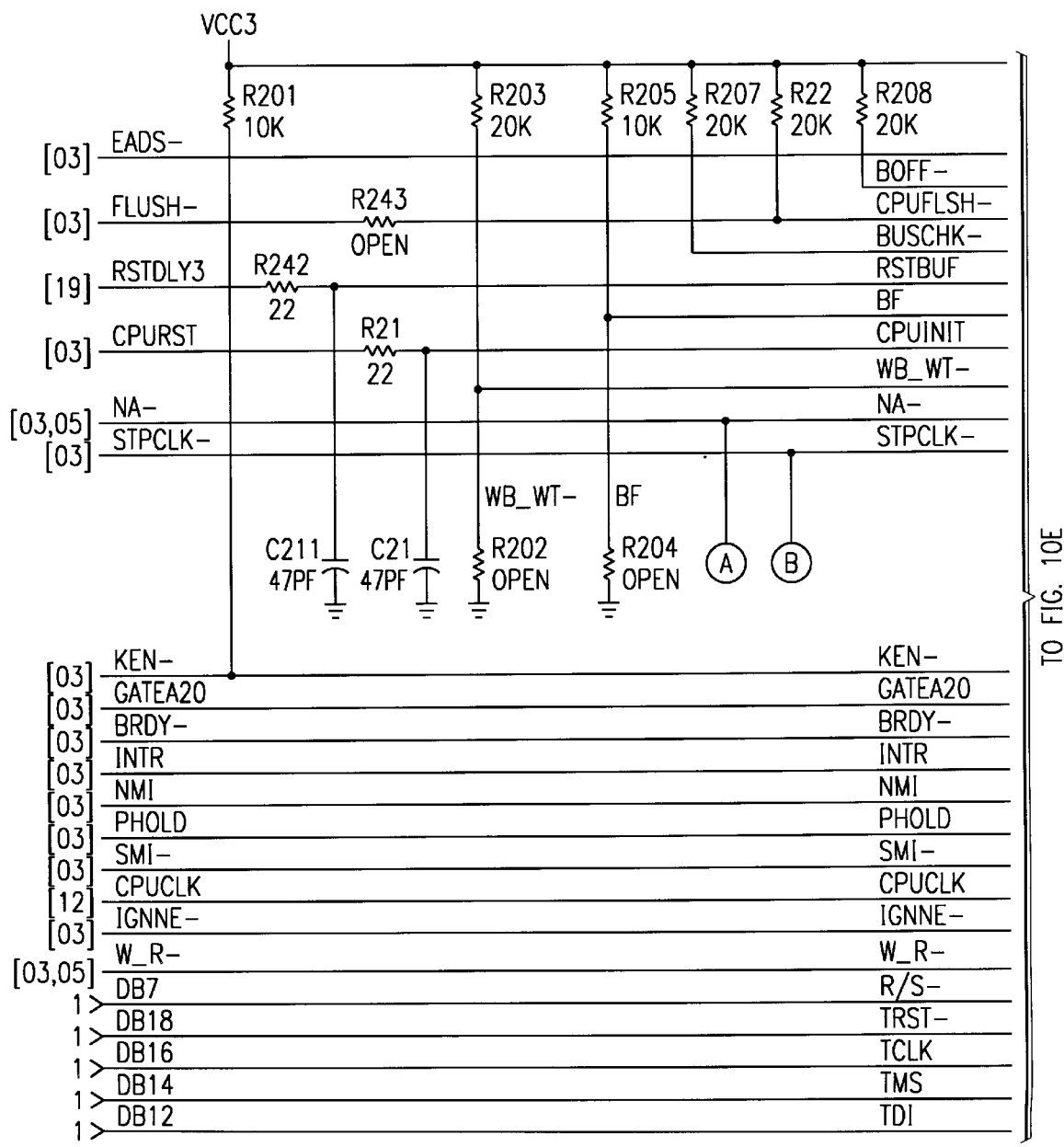
Figure 10E:
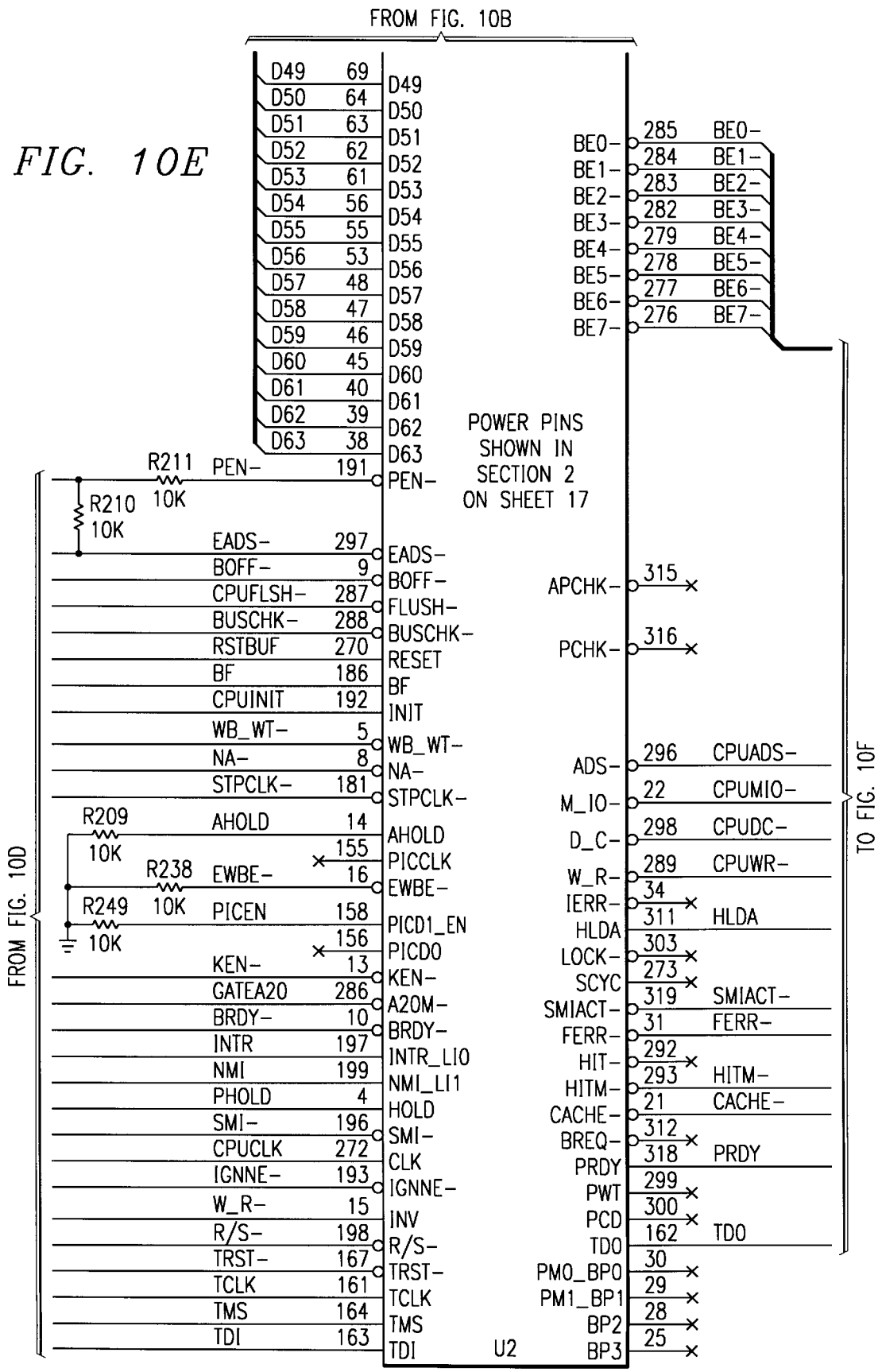
Figure 10F:
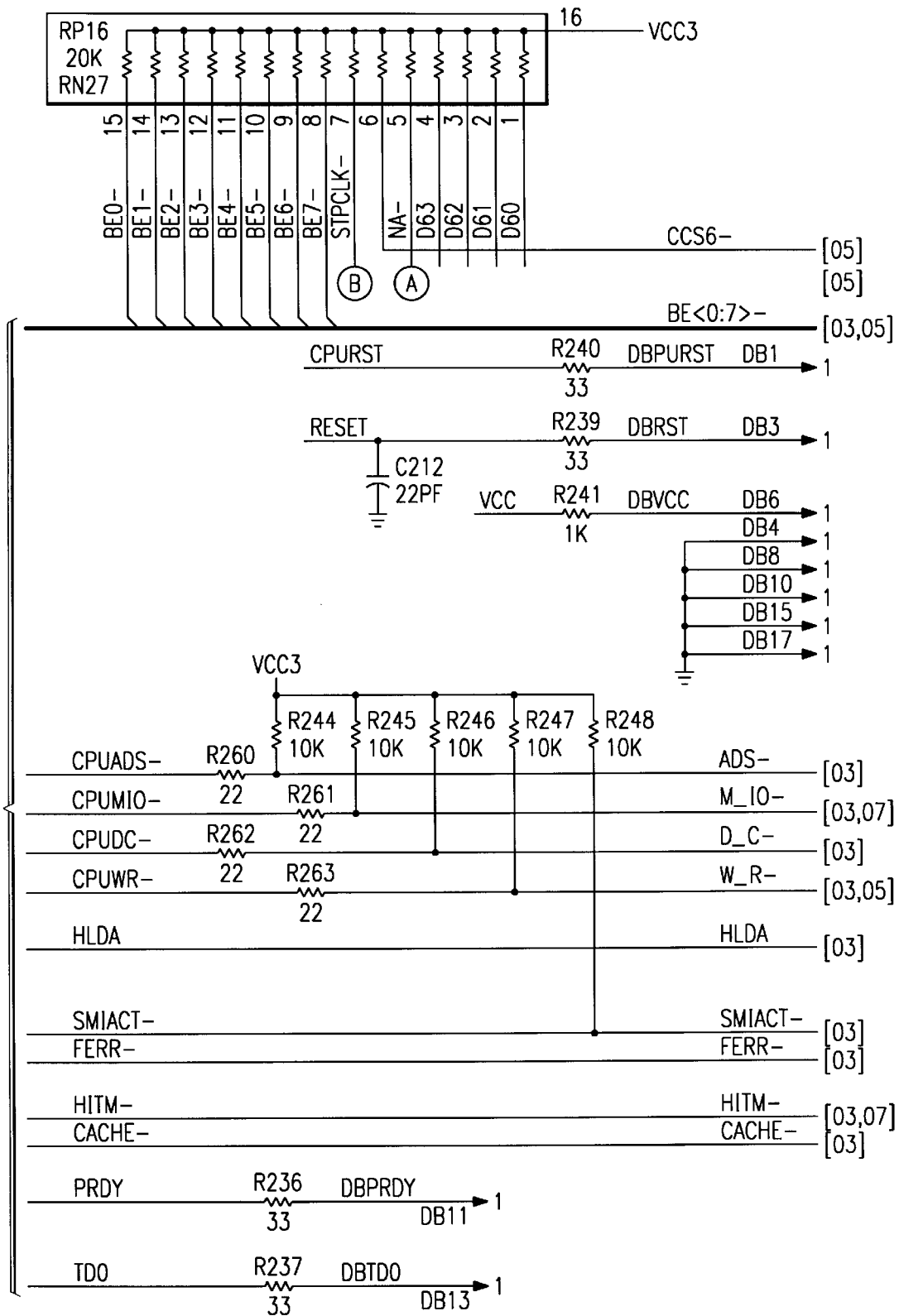
Figure 11A:
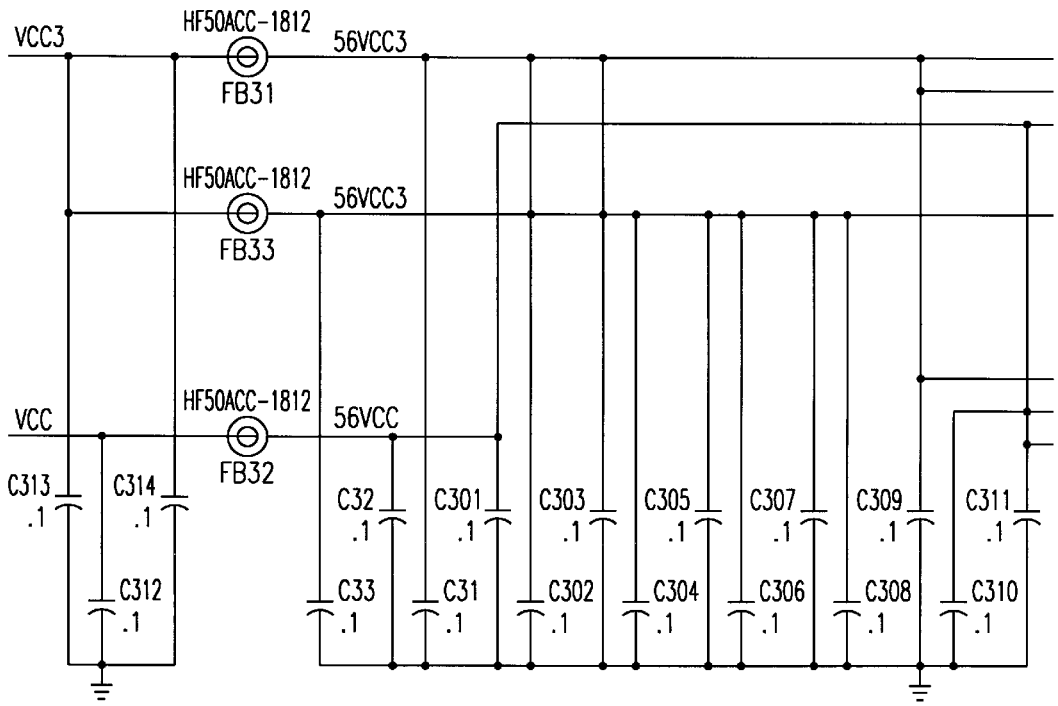
Figure 11B:
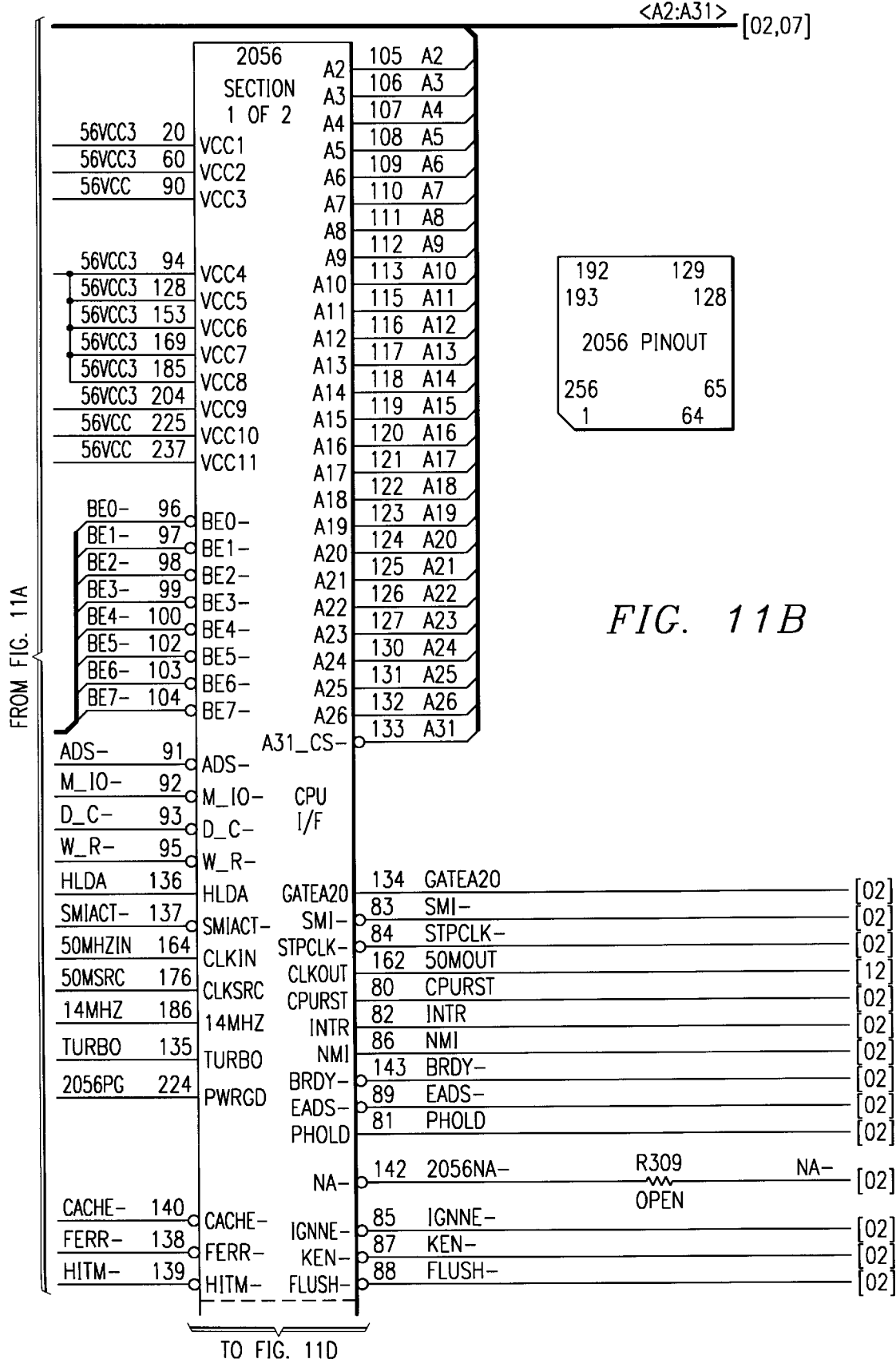
Figure 11C:
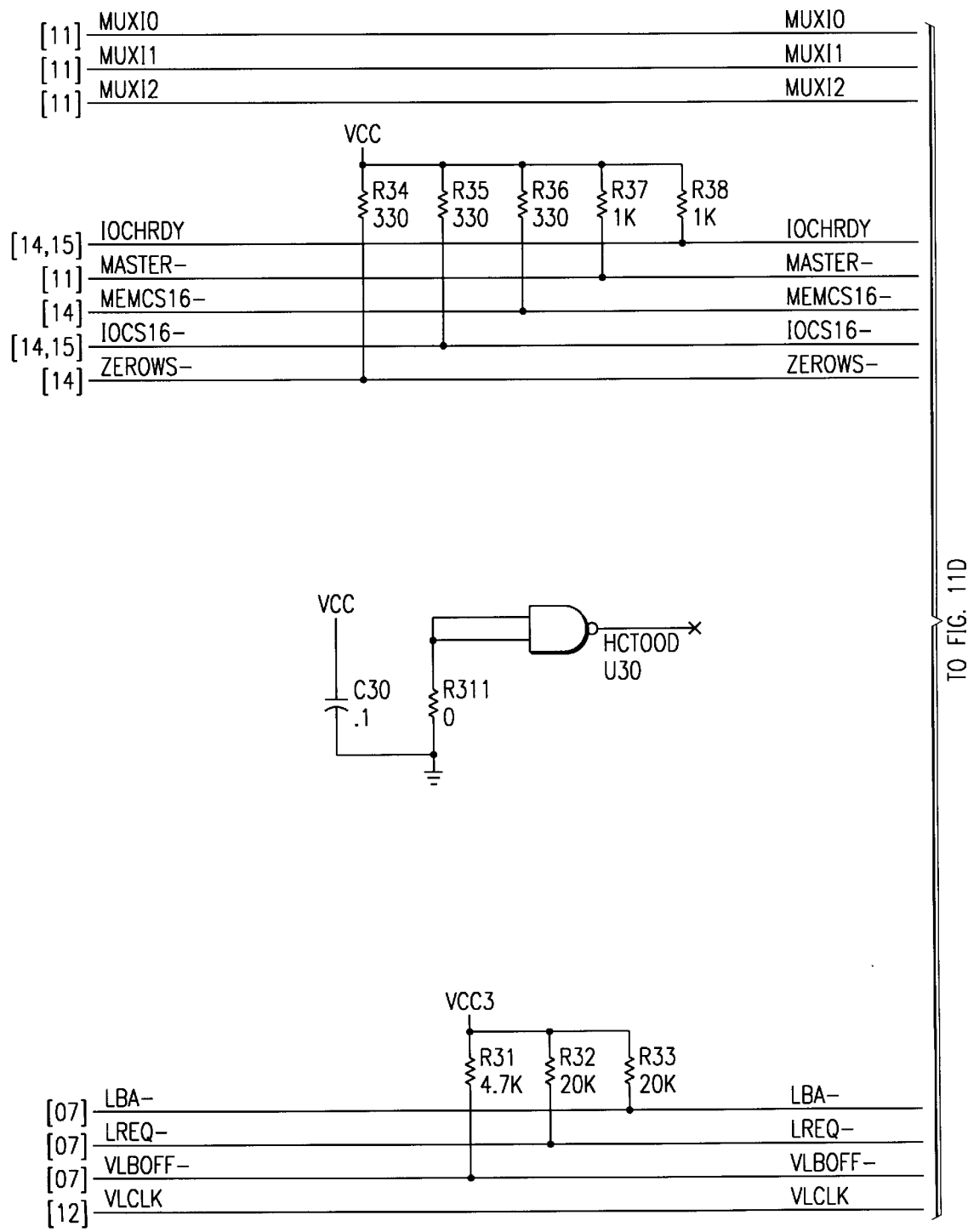
Figure 11D:
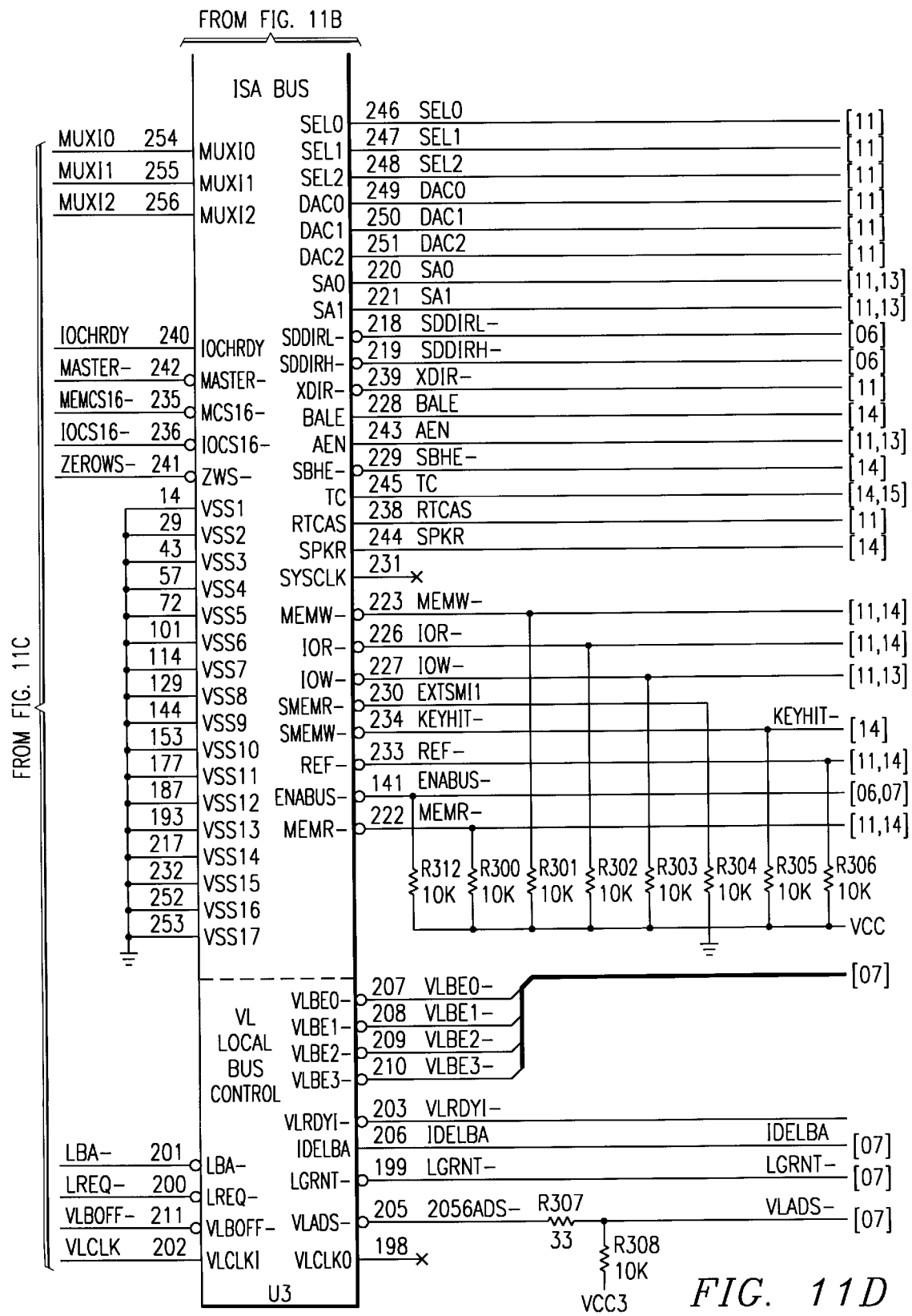
Figure 12A:
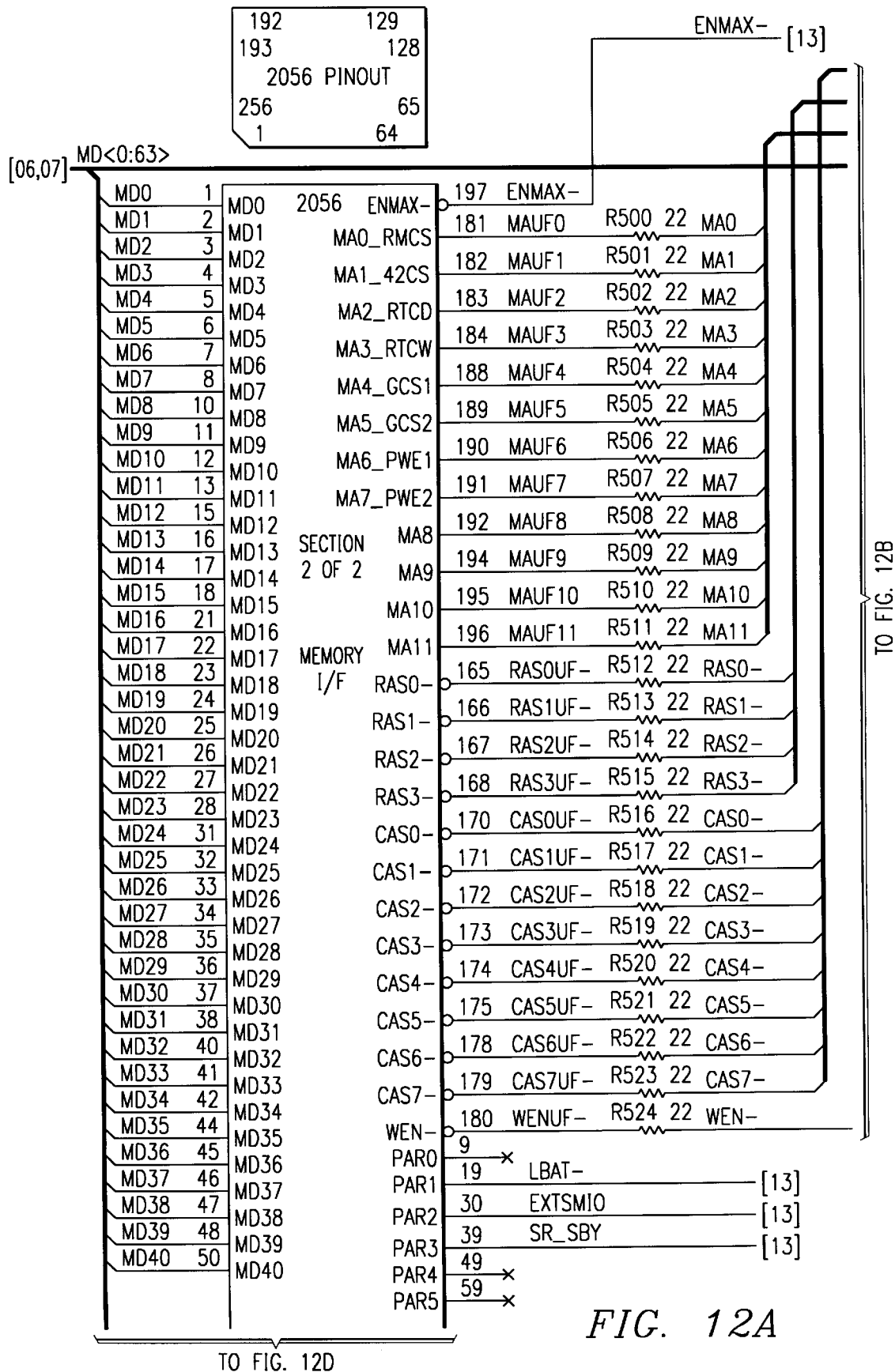
Figure 12B:
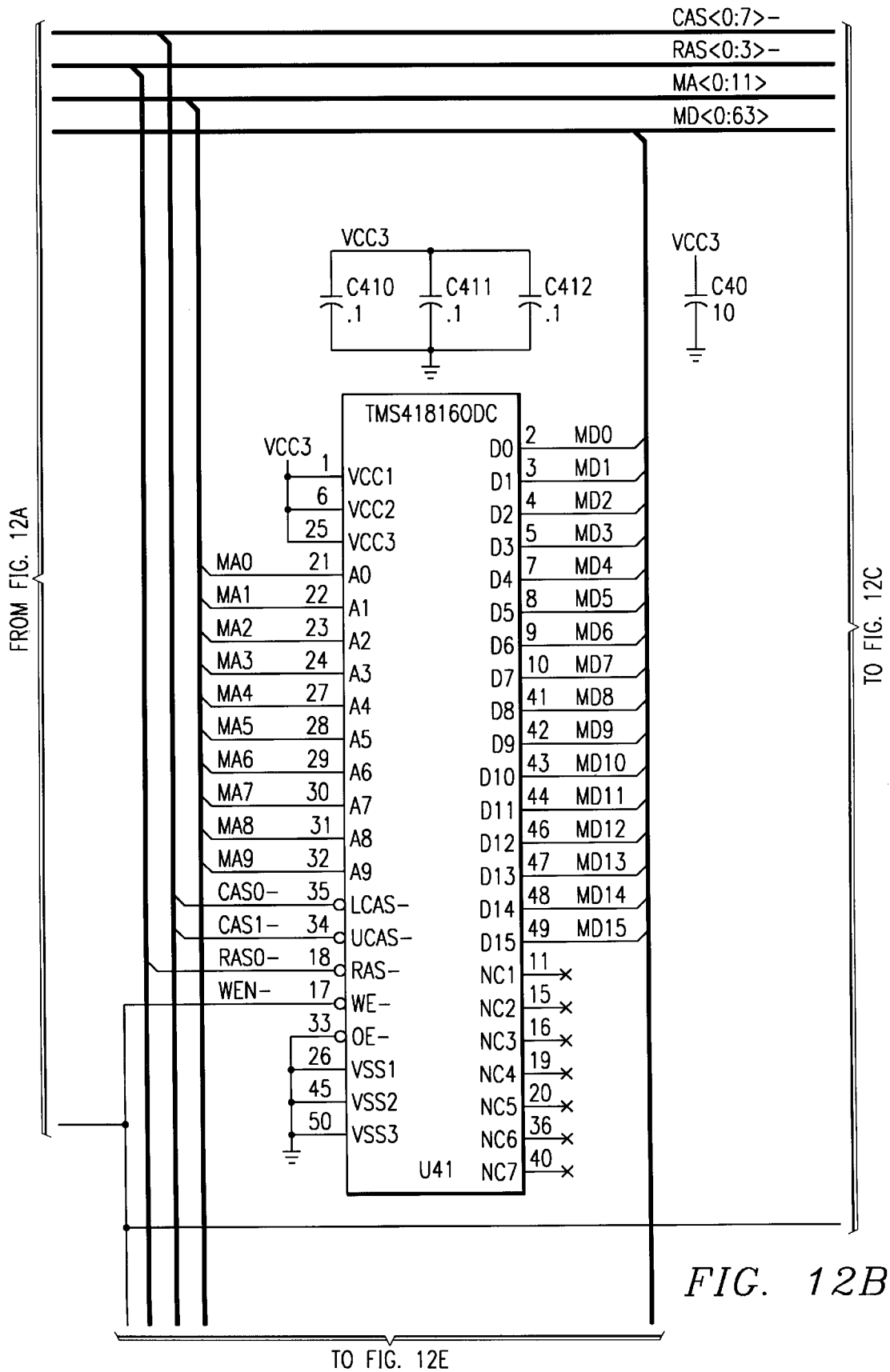
Figure 12C:
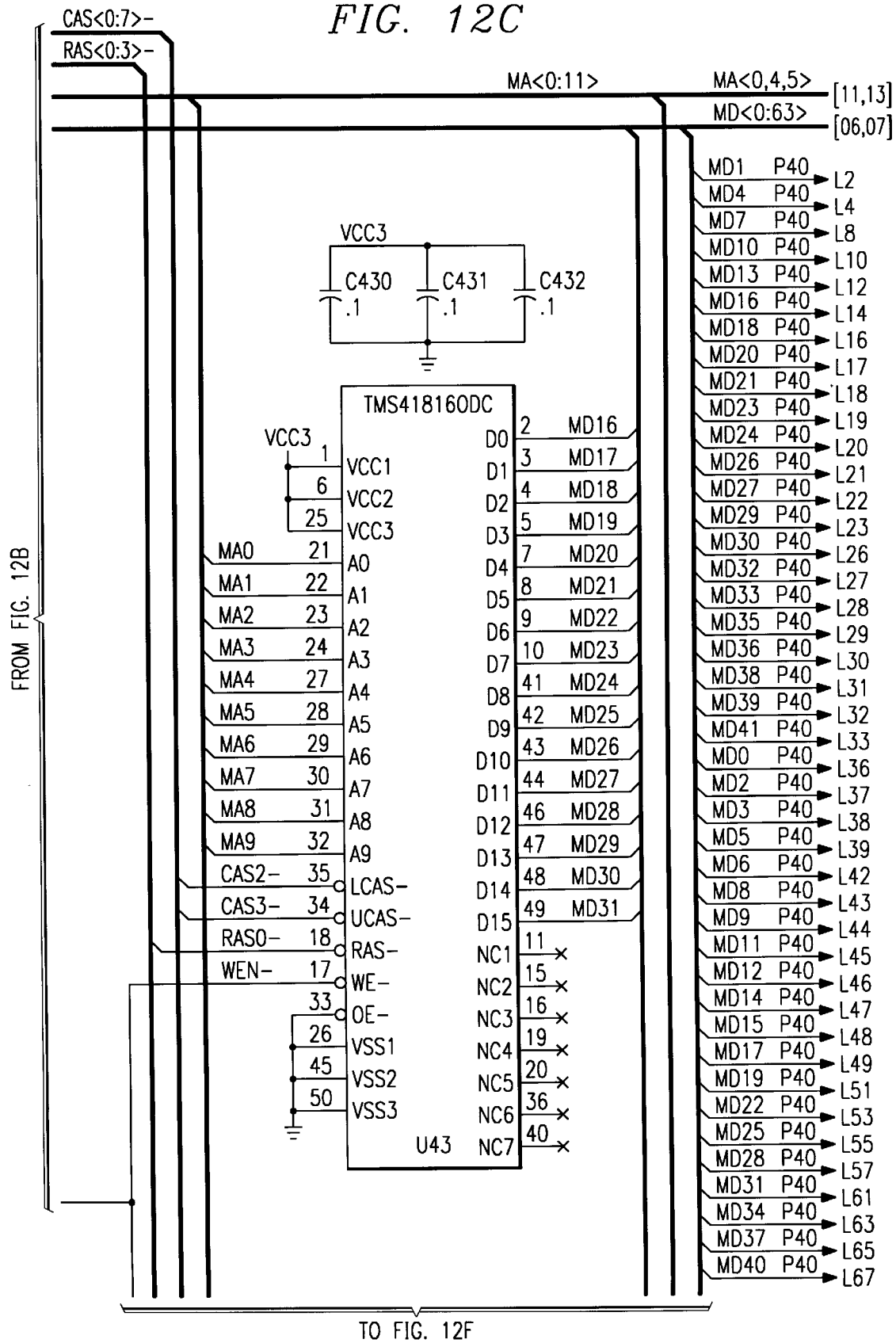
Figure 12E:
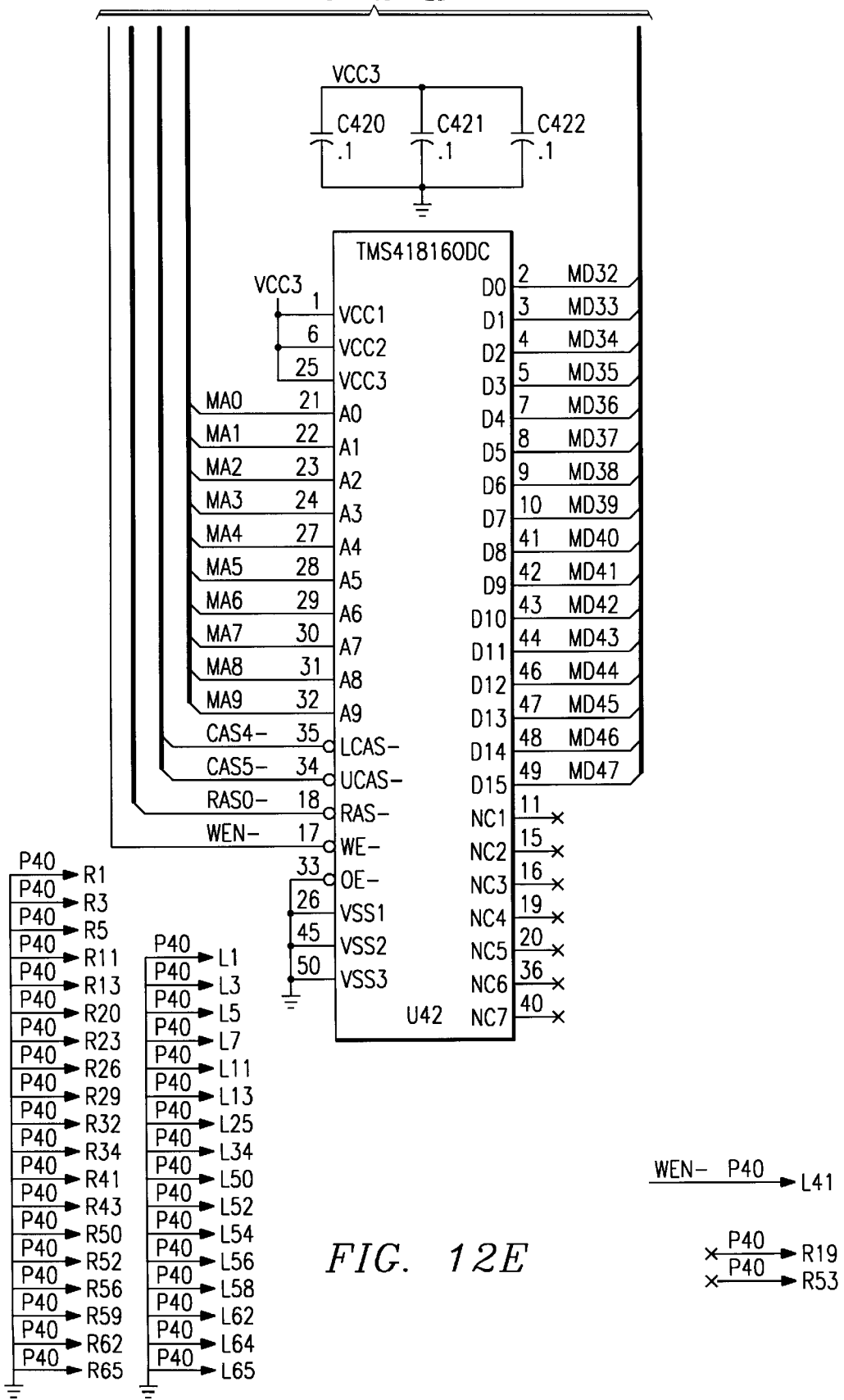
Figure 12F:
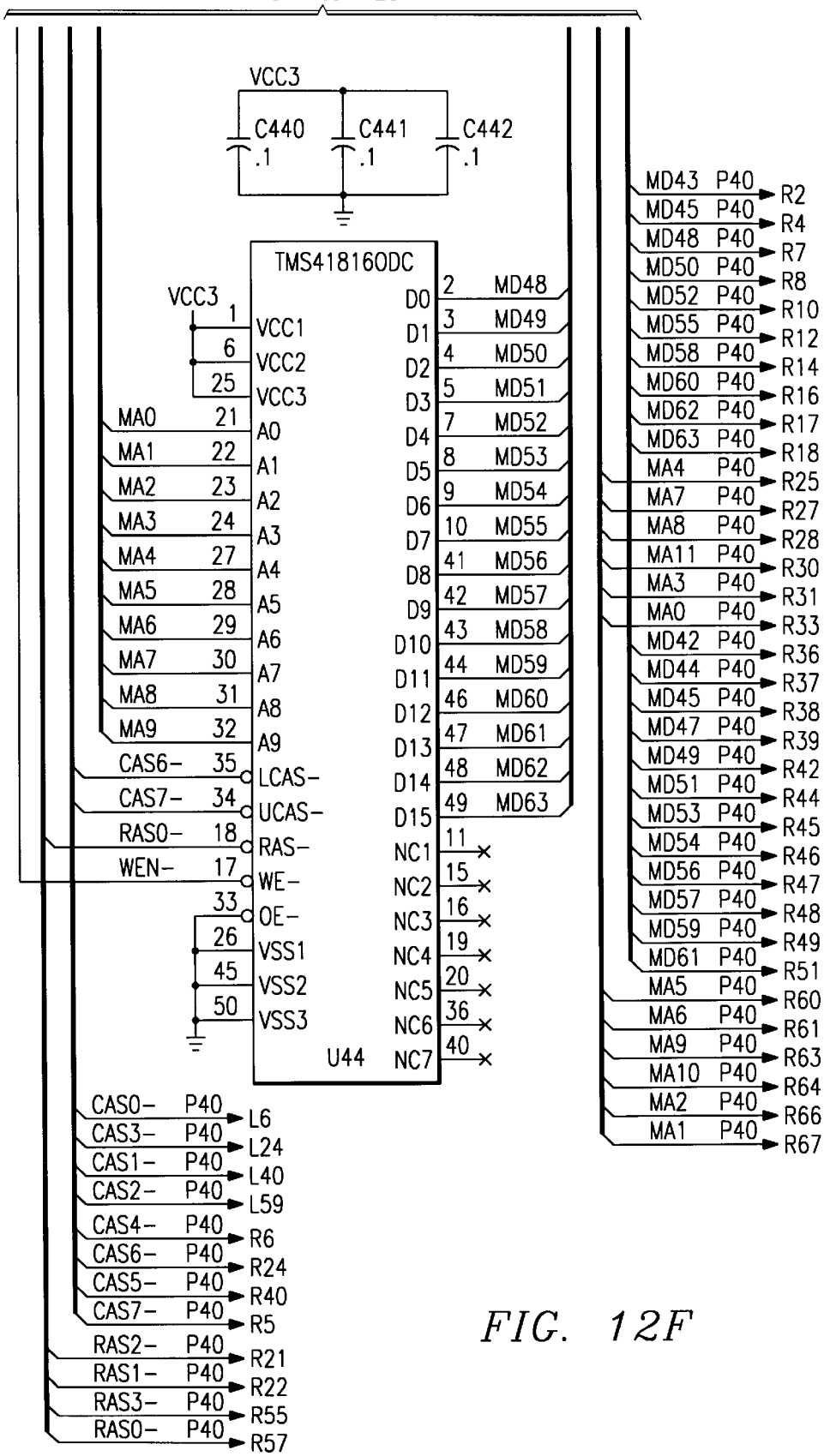
Figure 13A:
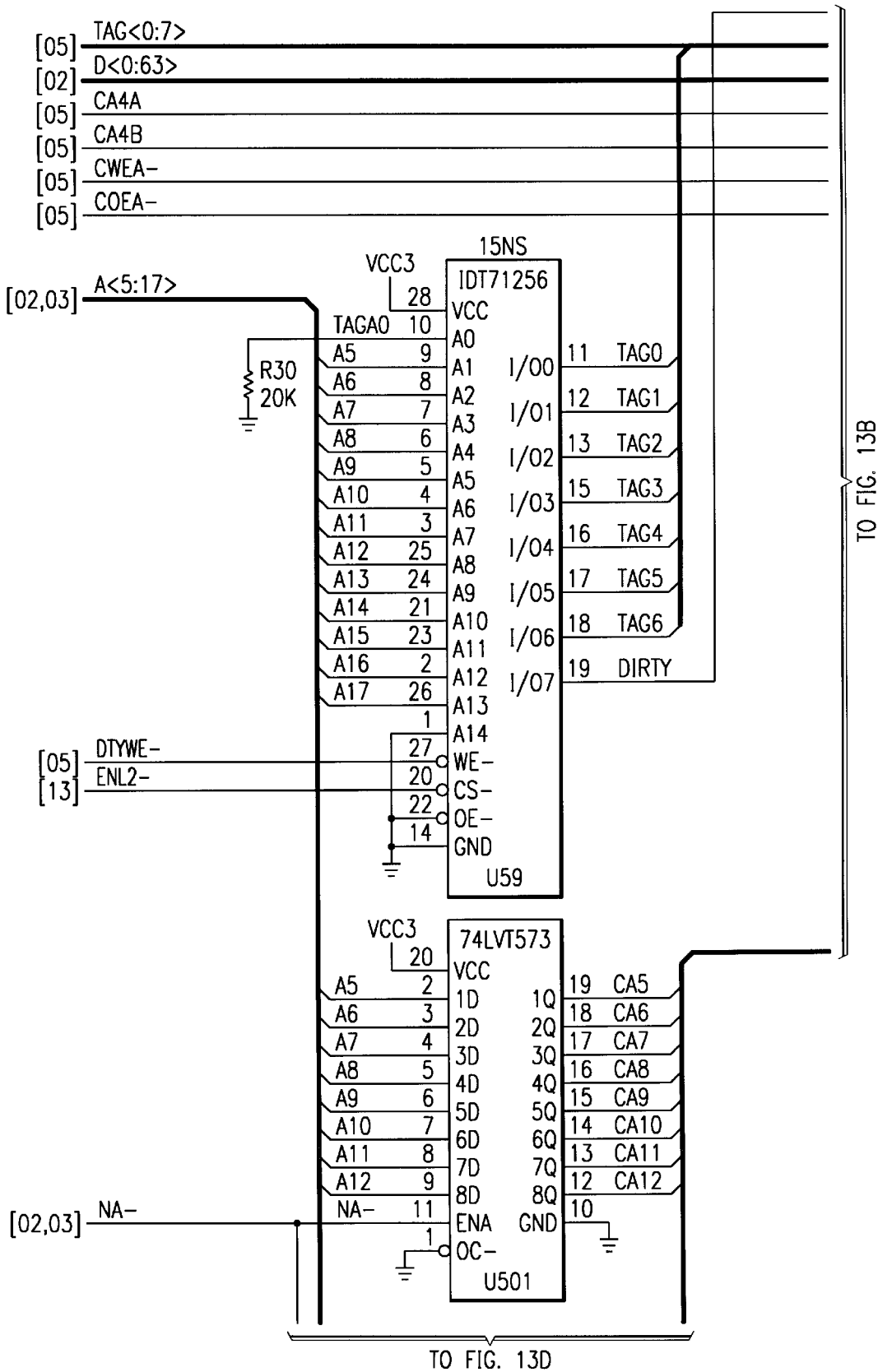
Figure 13B:
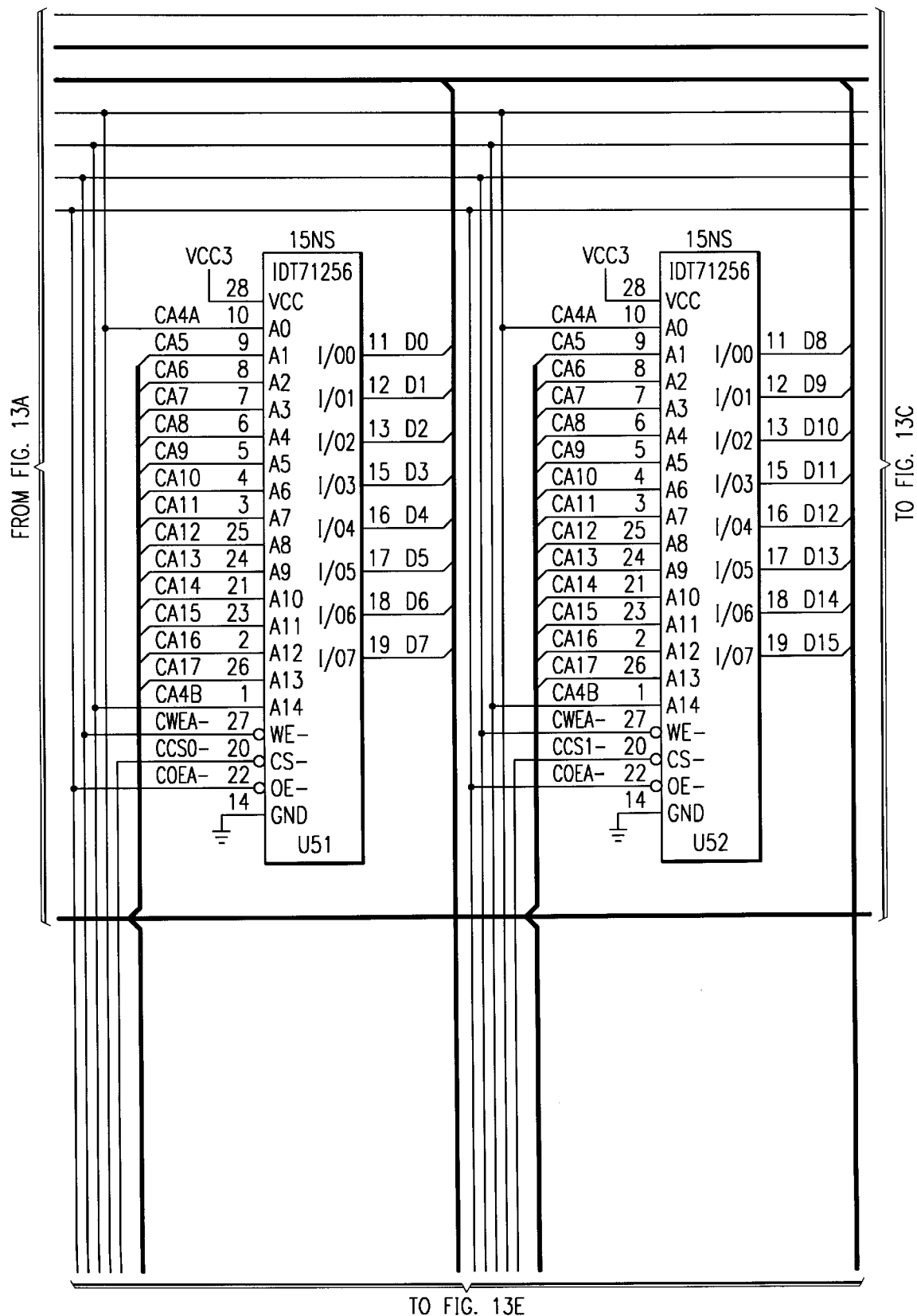
Figure 13C:
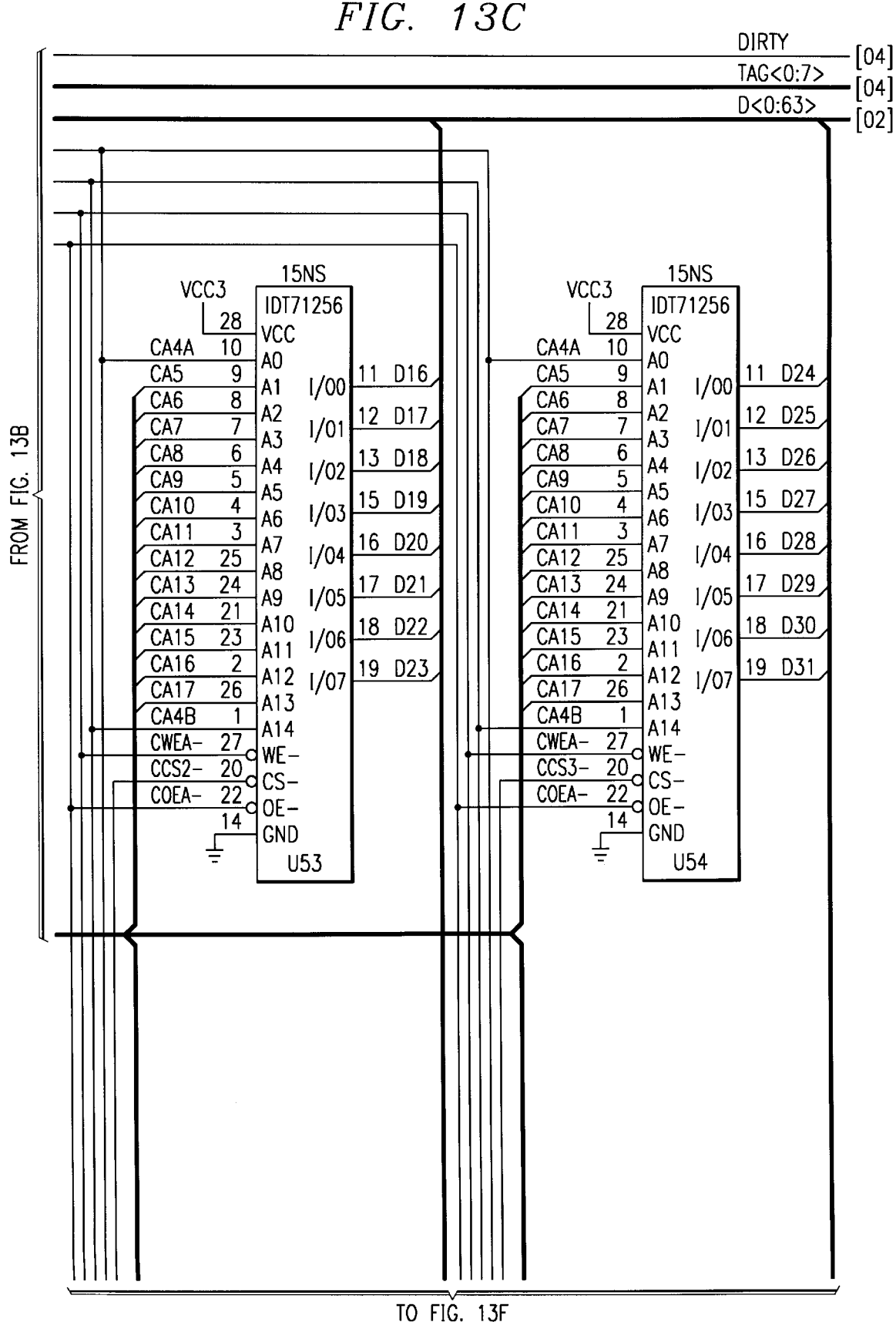
Figure 14A:
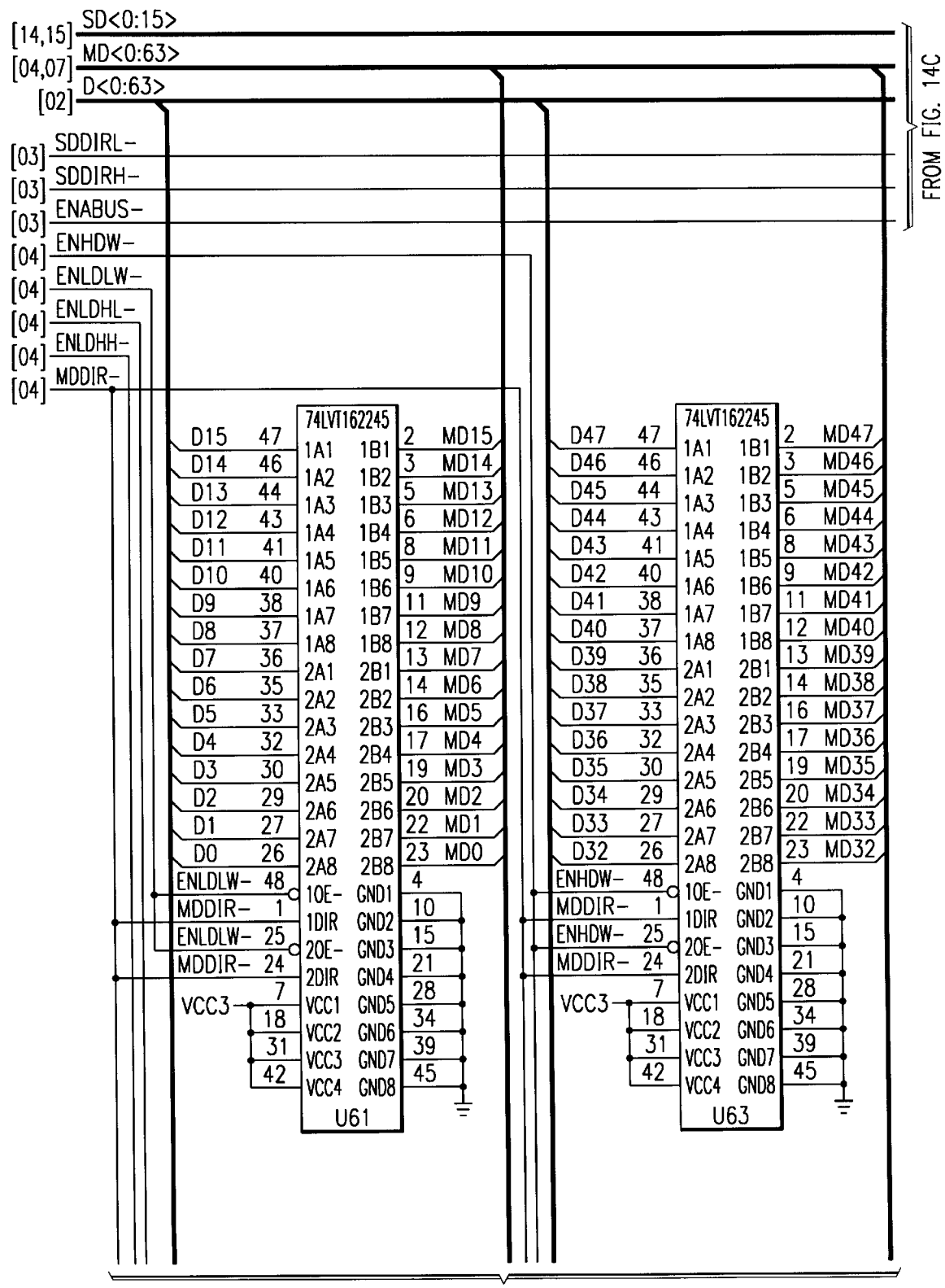
Figure 14C:
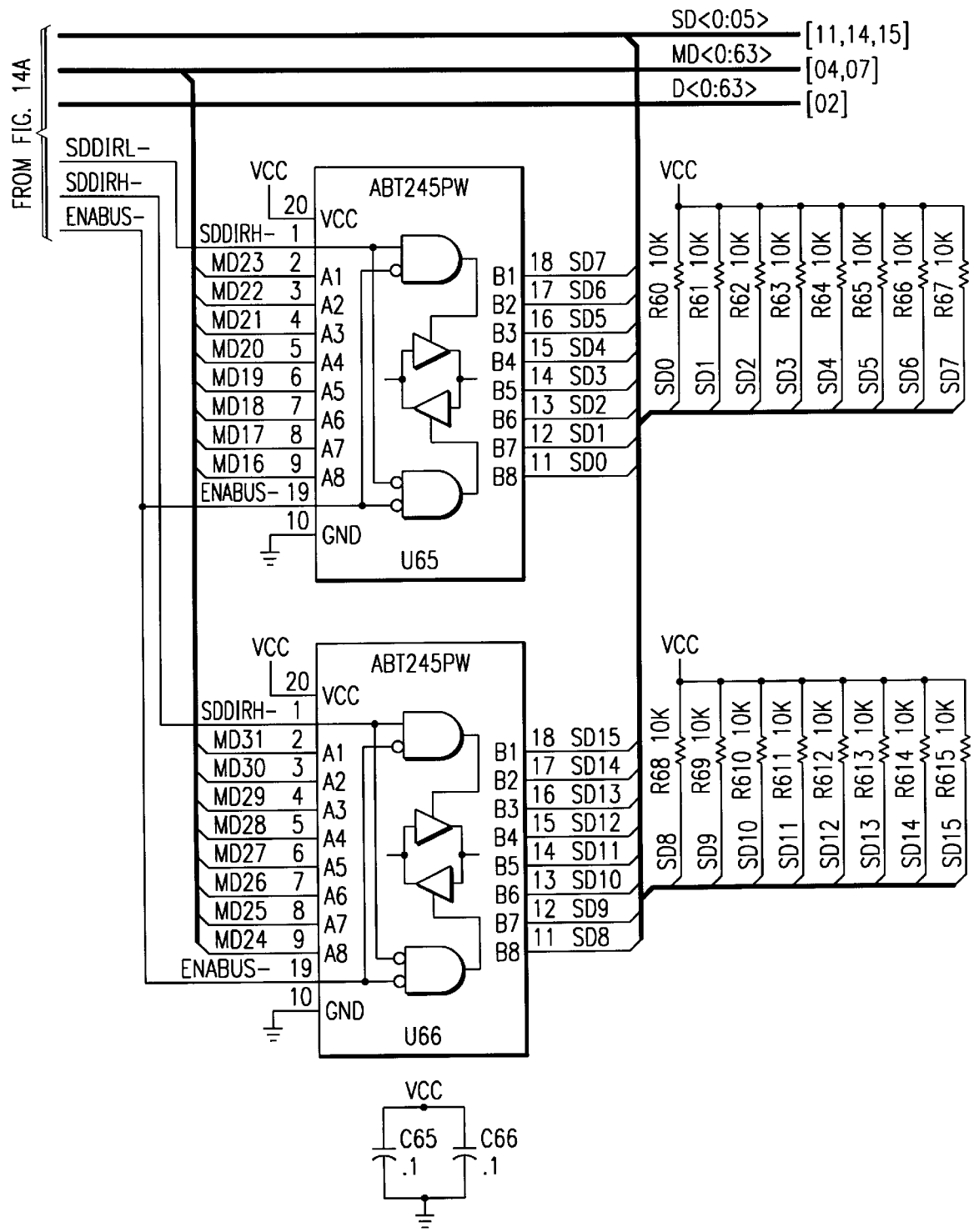
Figure 15A:
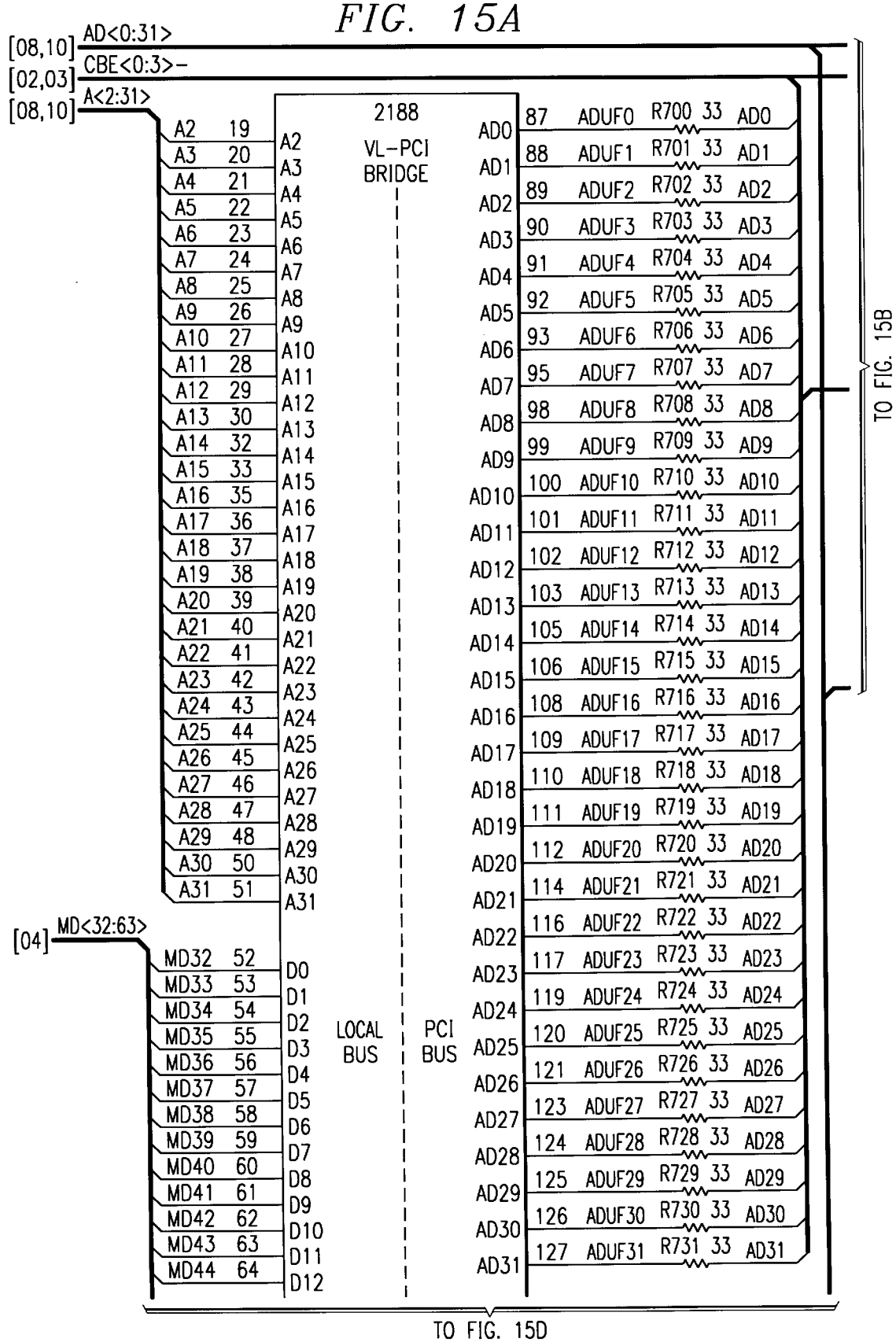
Figure 15B:
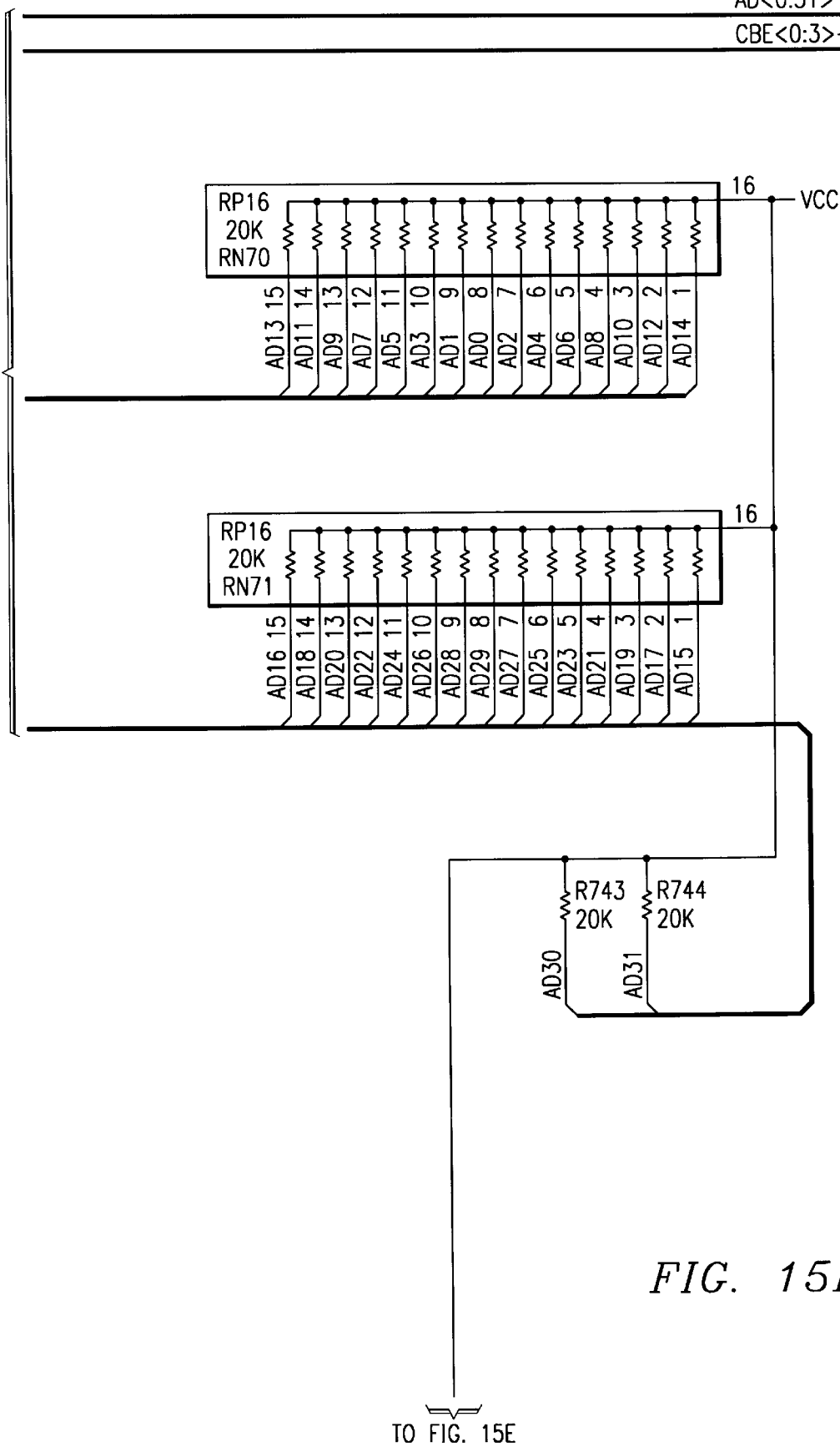
Figure 15C:
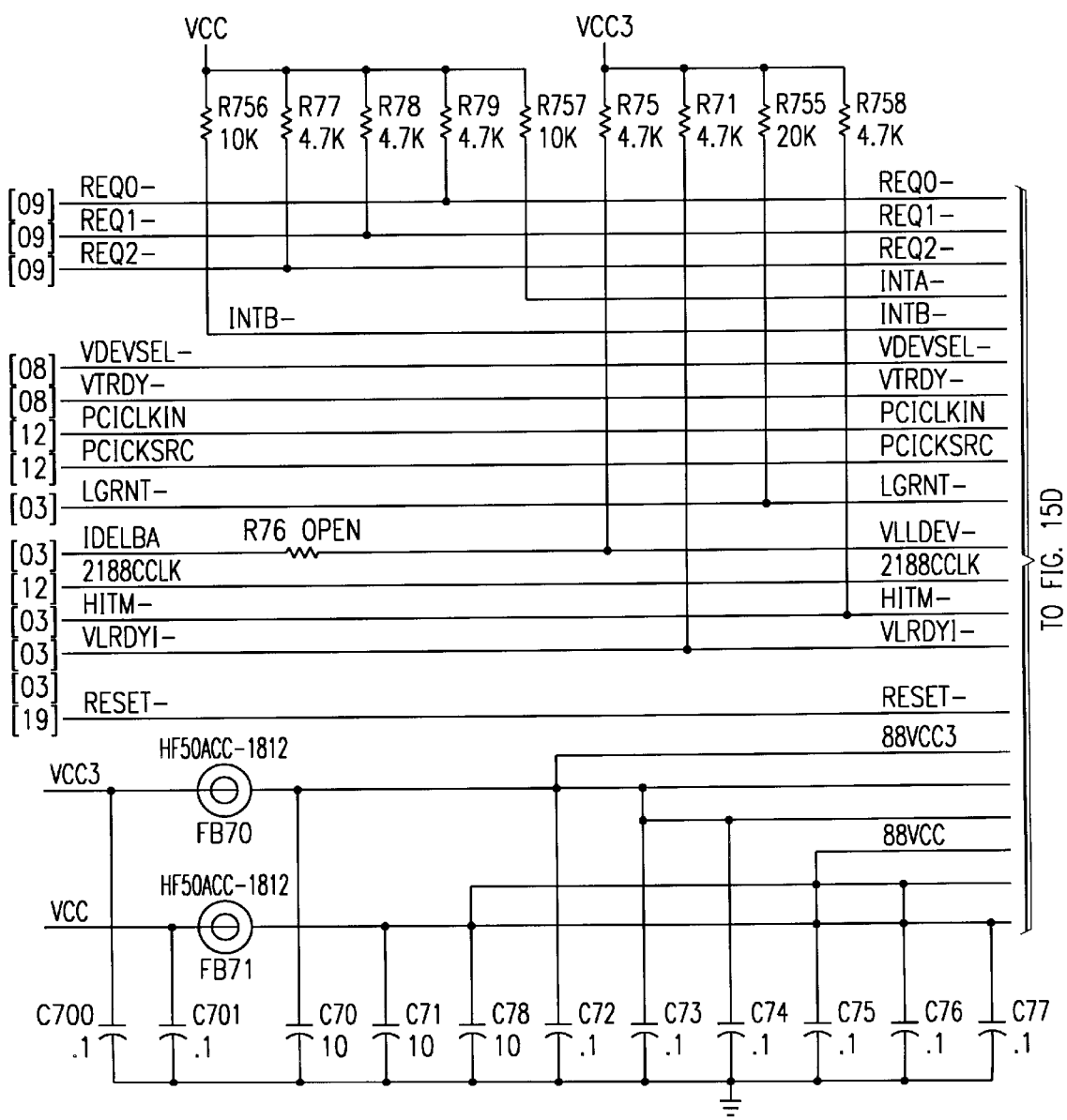
Figure 15D:
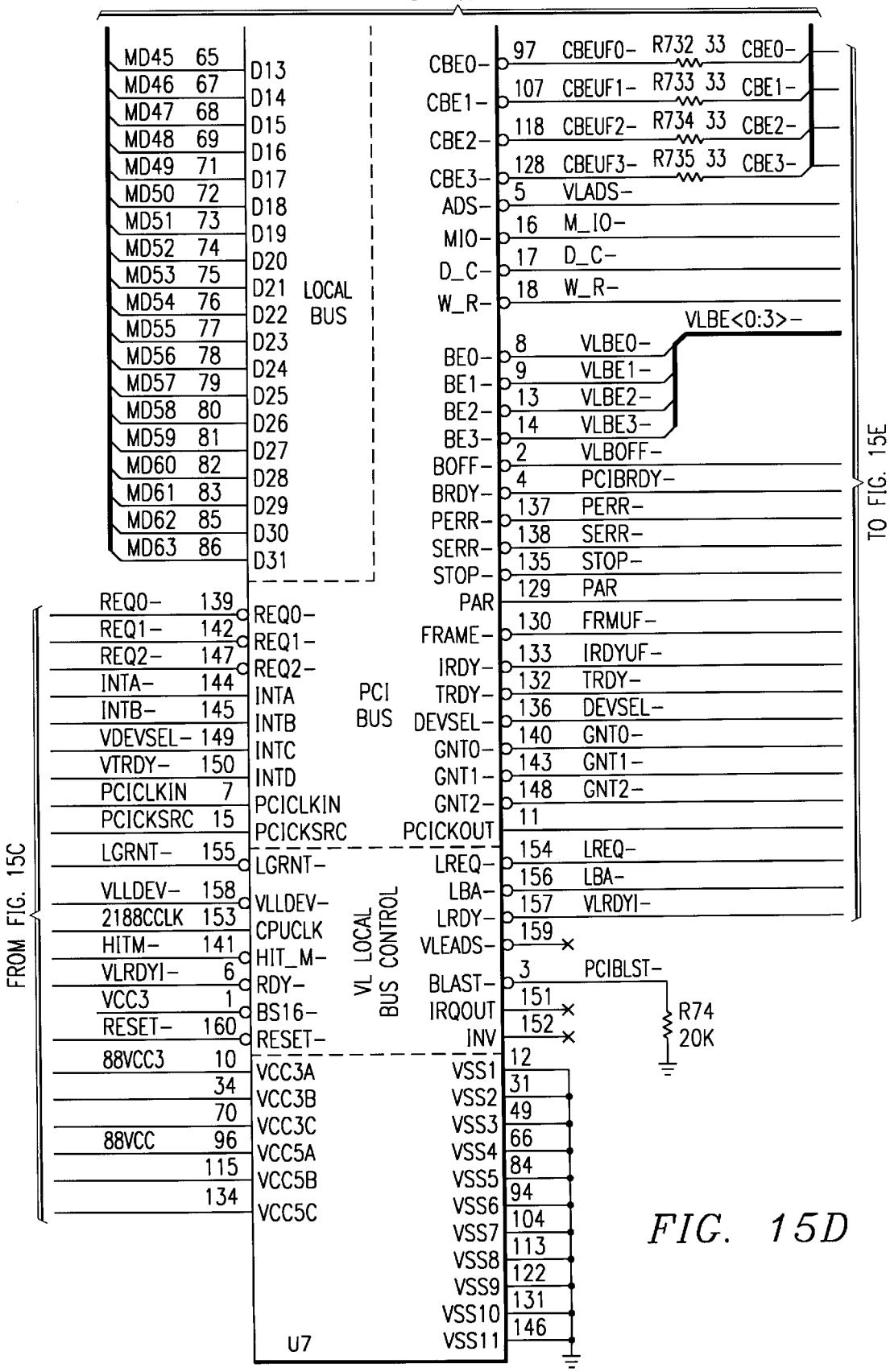
Figure 16A:
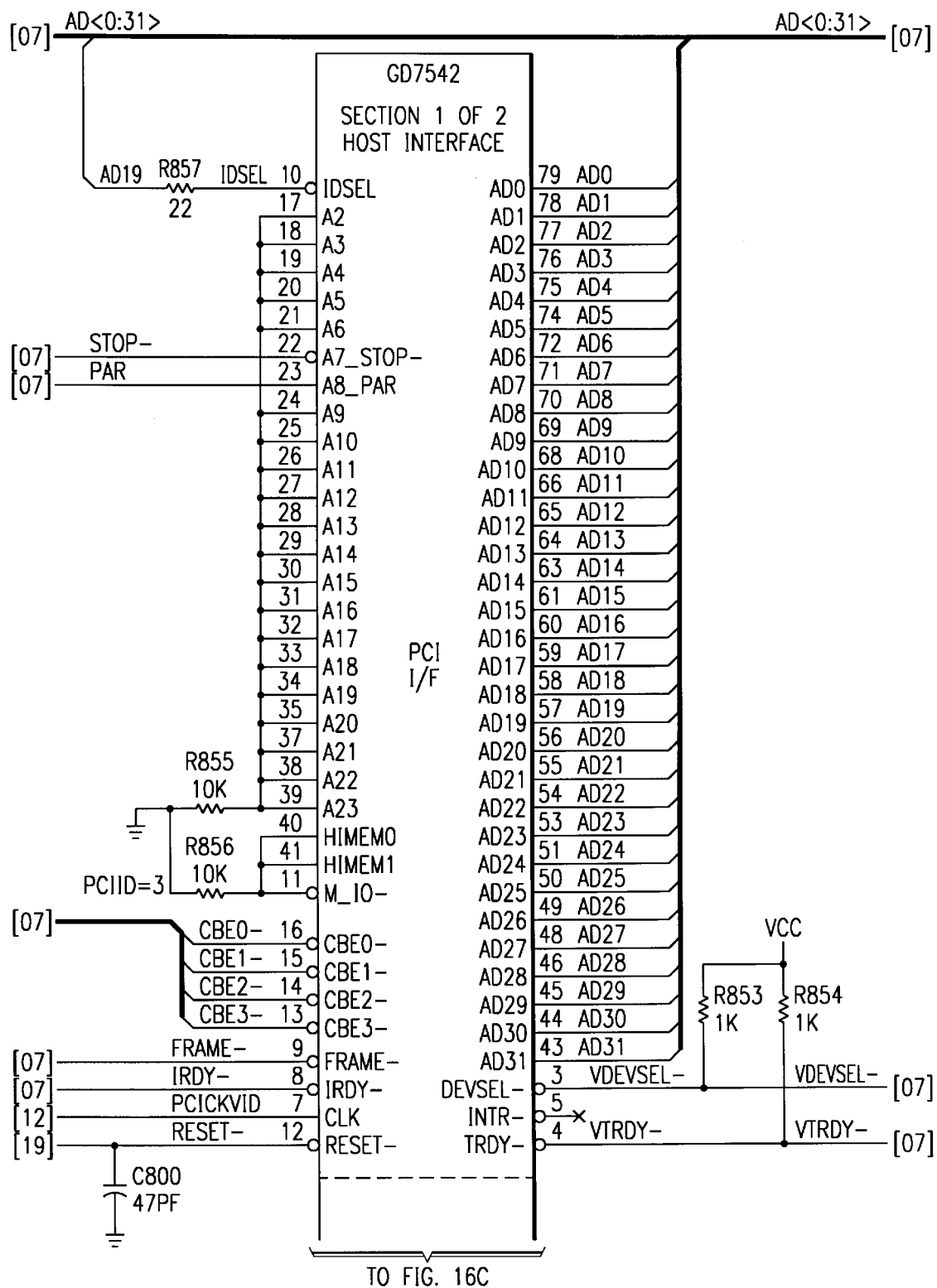
Figure 16B:
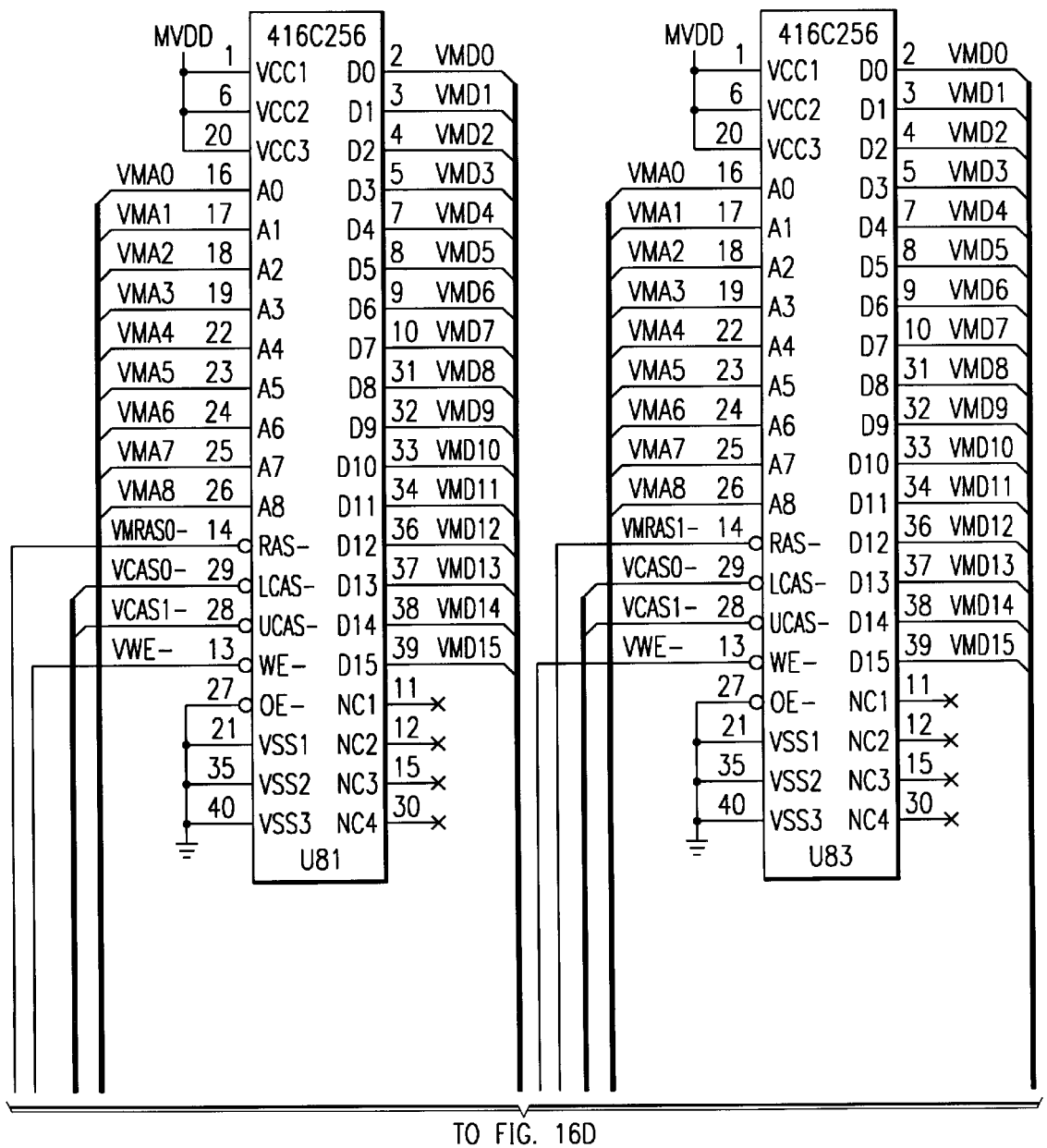
Figure 16C:
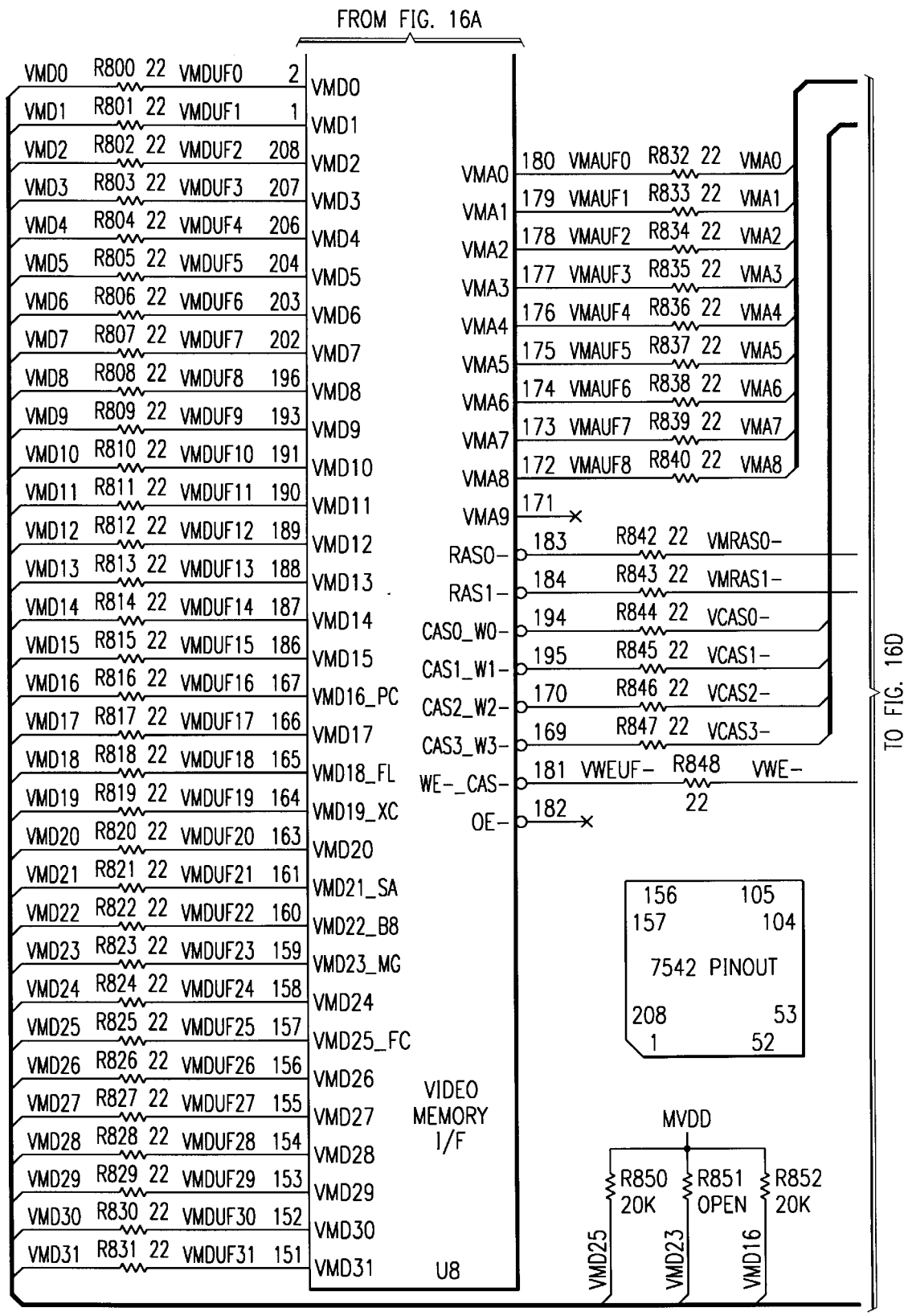
Figure 16D:
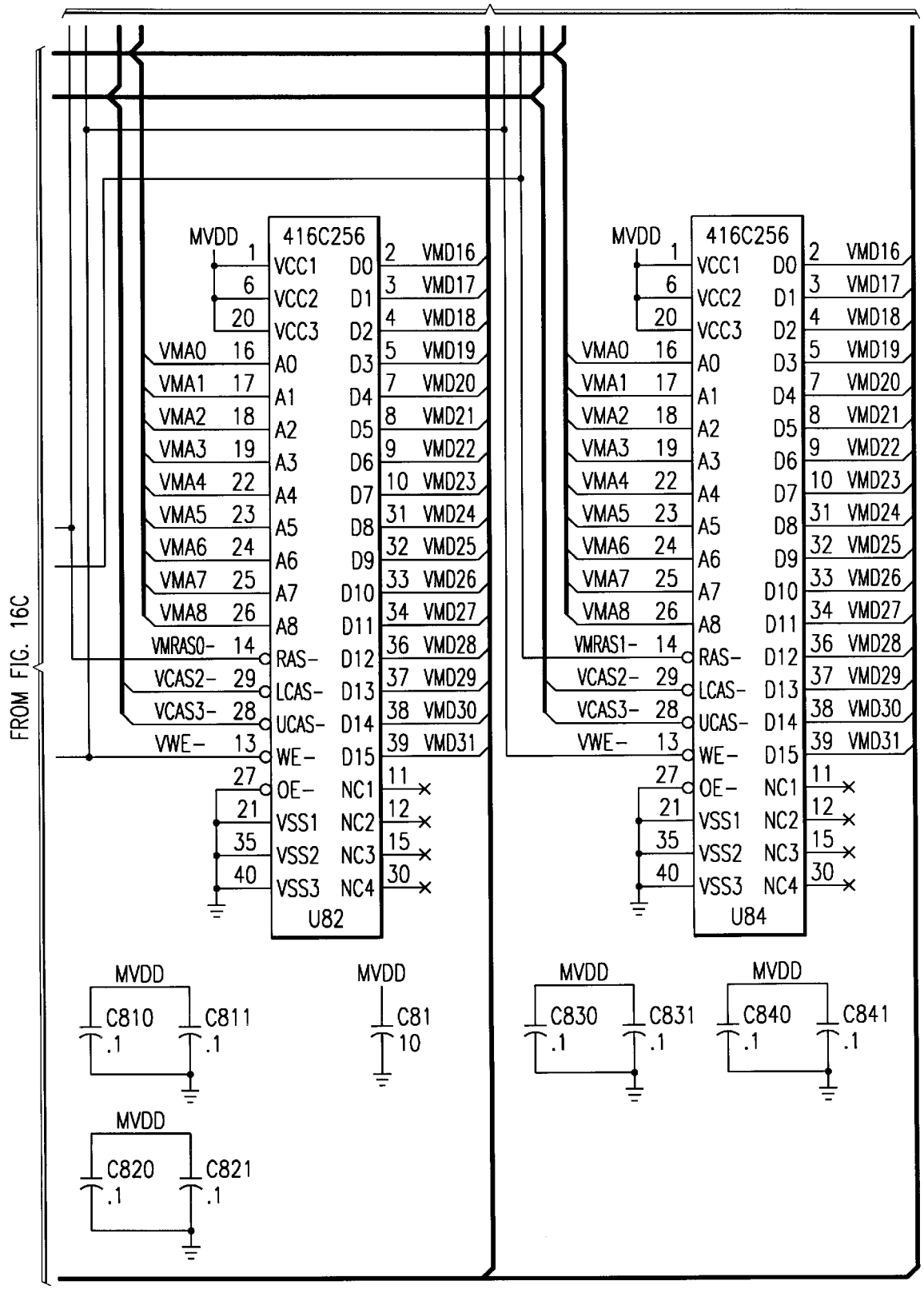
Figure 17B:
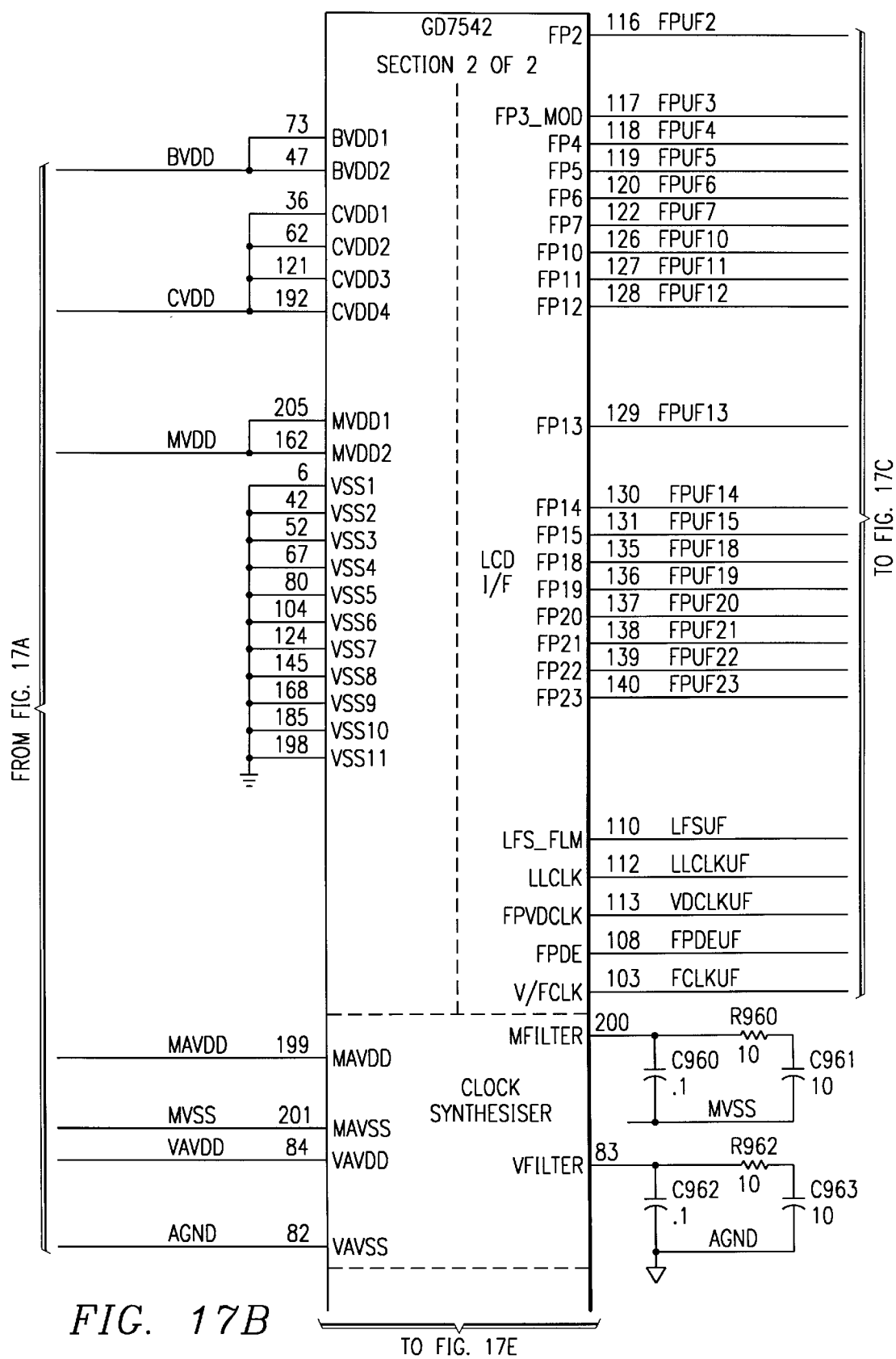
Figure 17C:
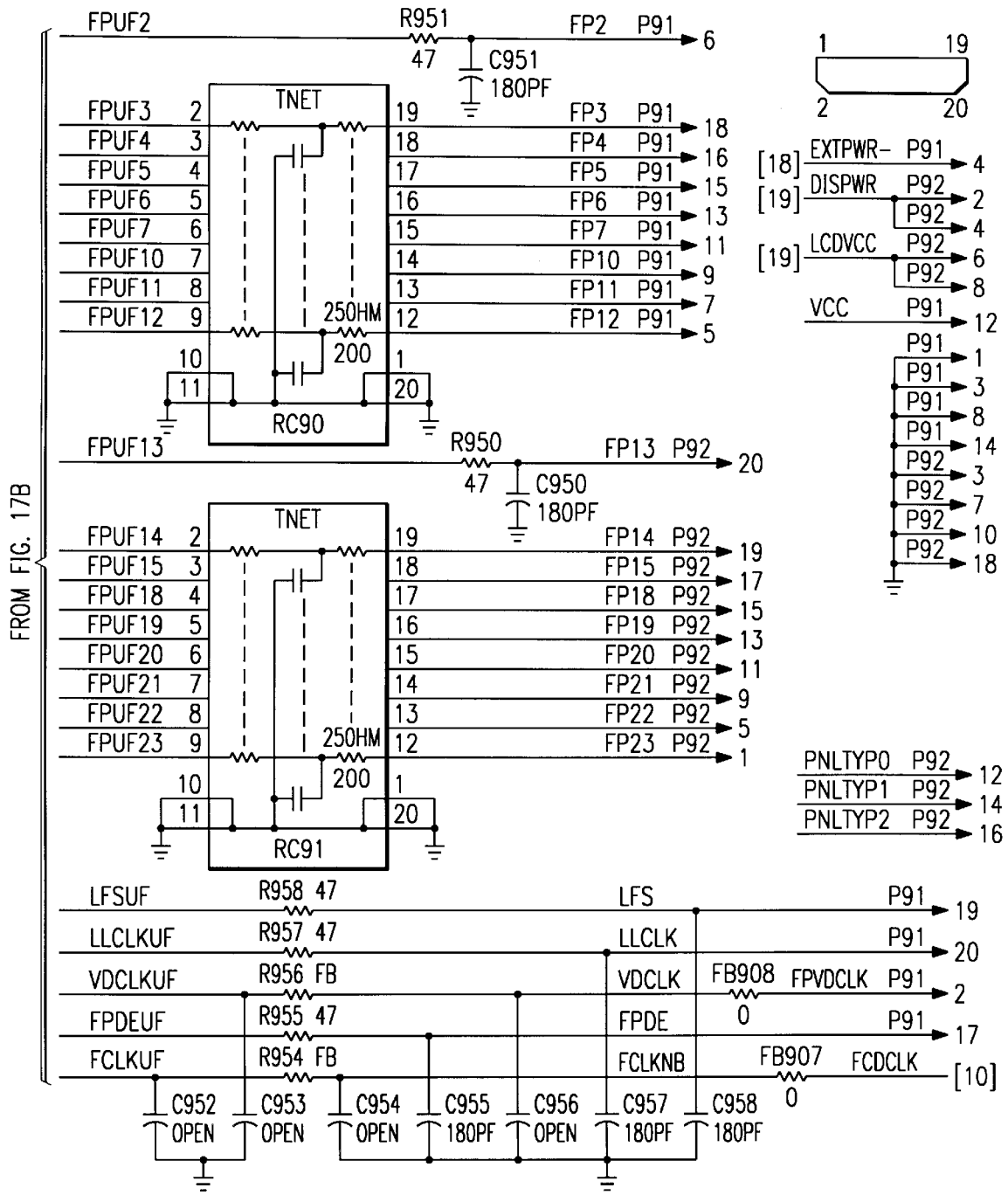
Figure 17D:
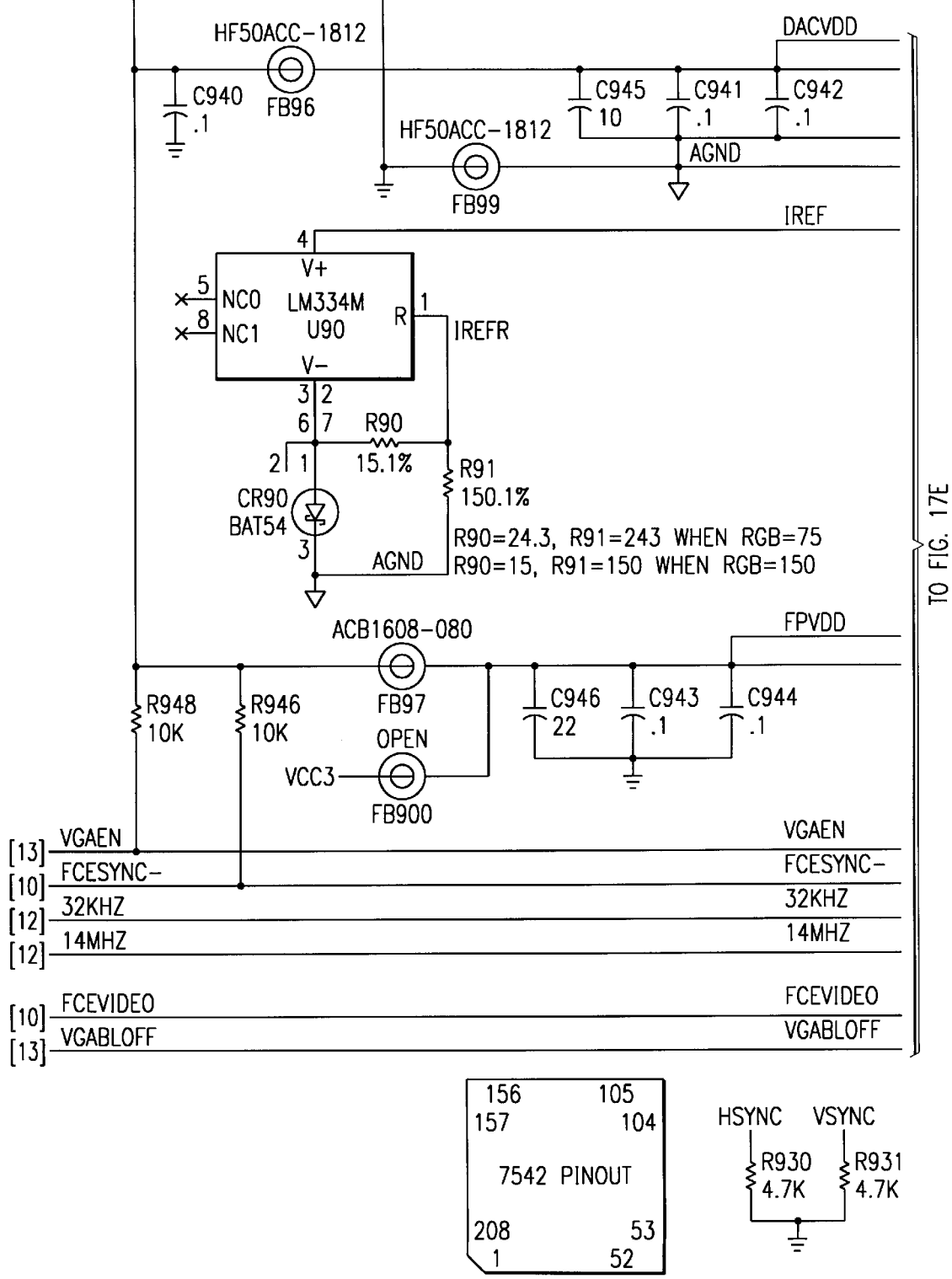
Figure 17F:
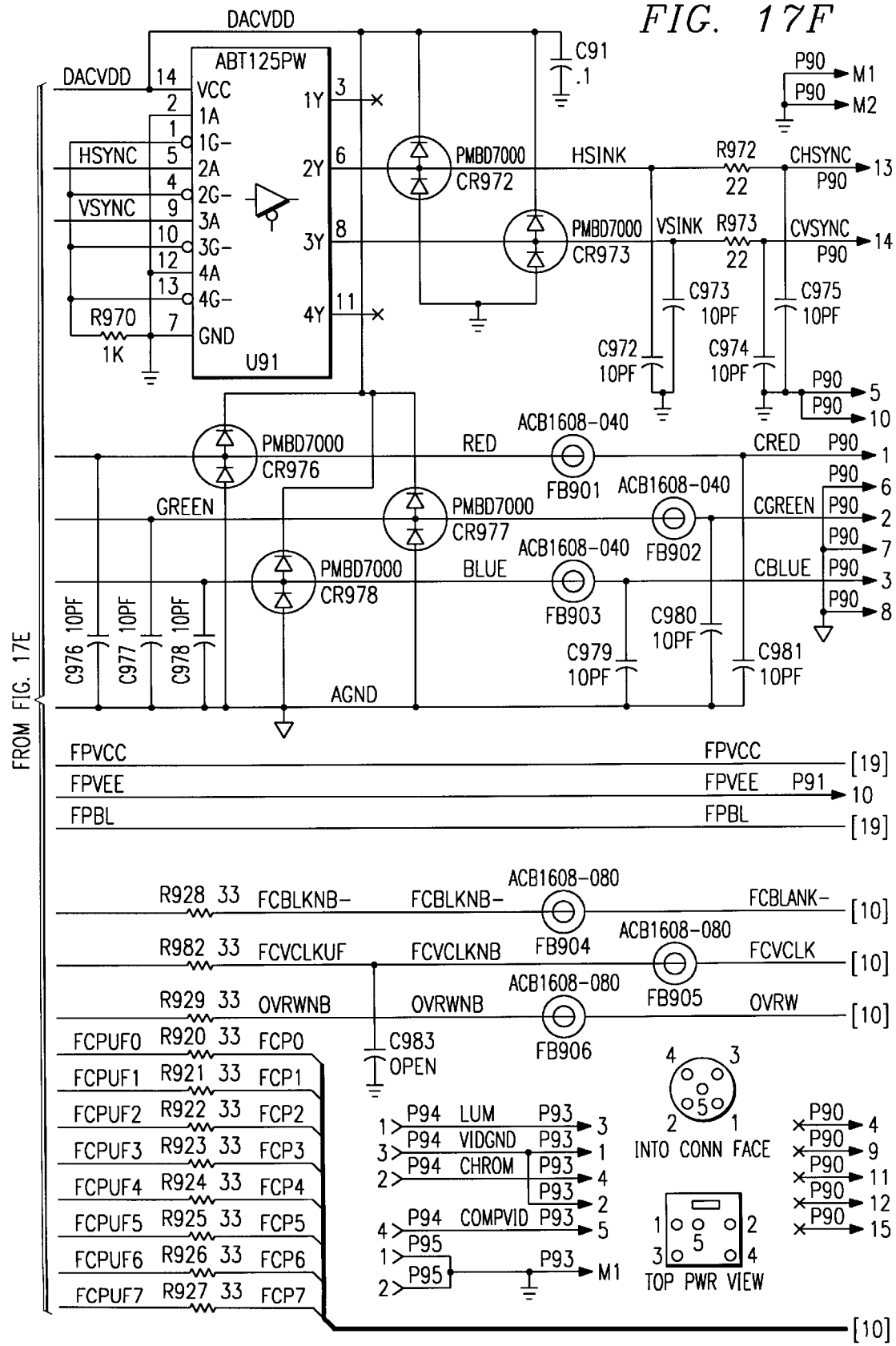
Figure 18:
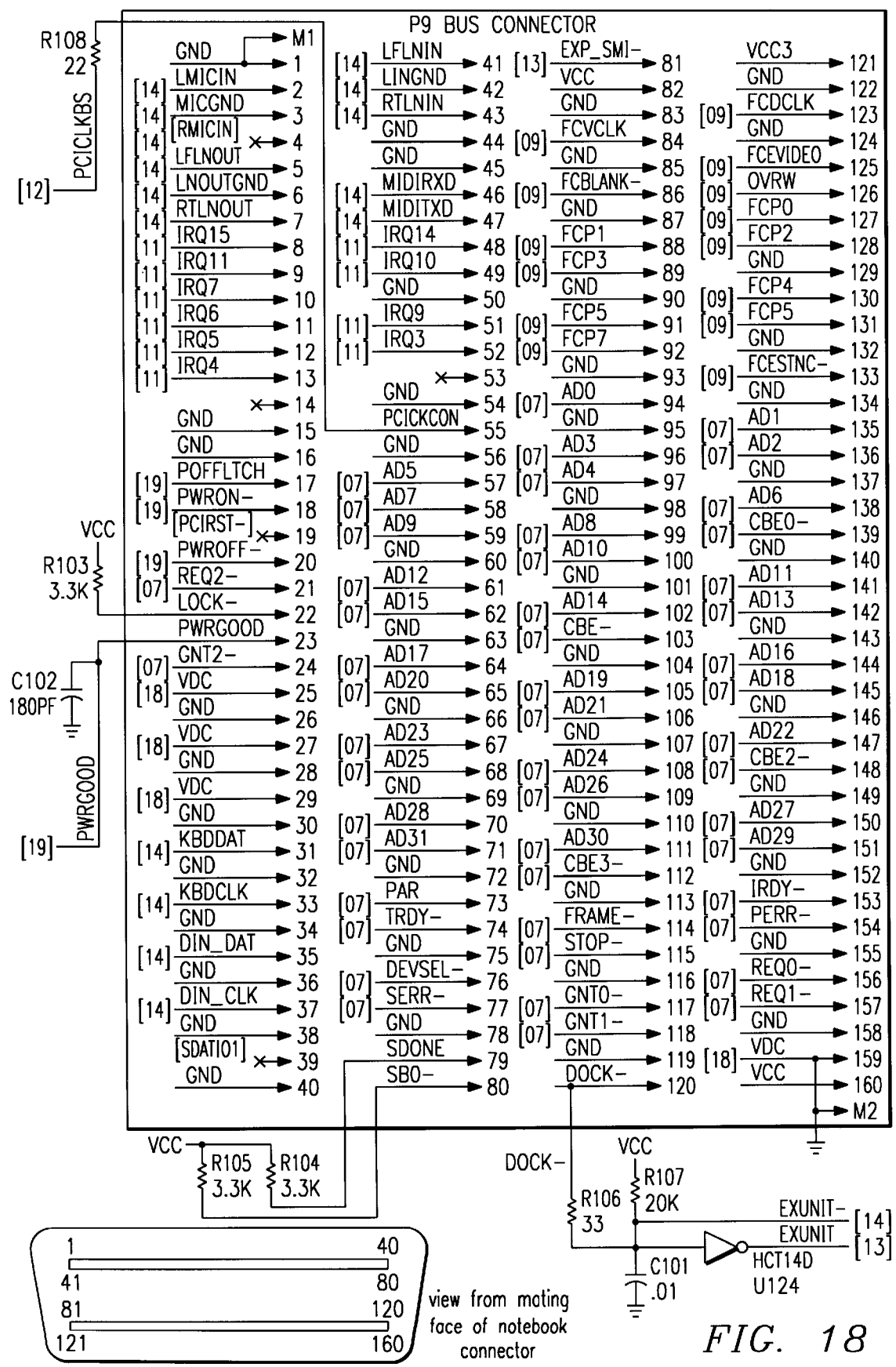
Figure 19B:
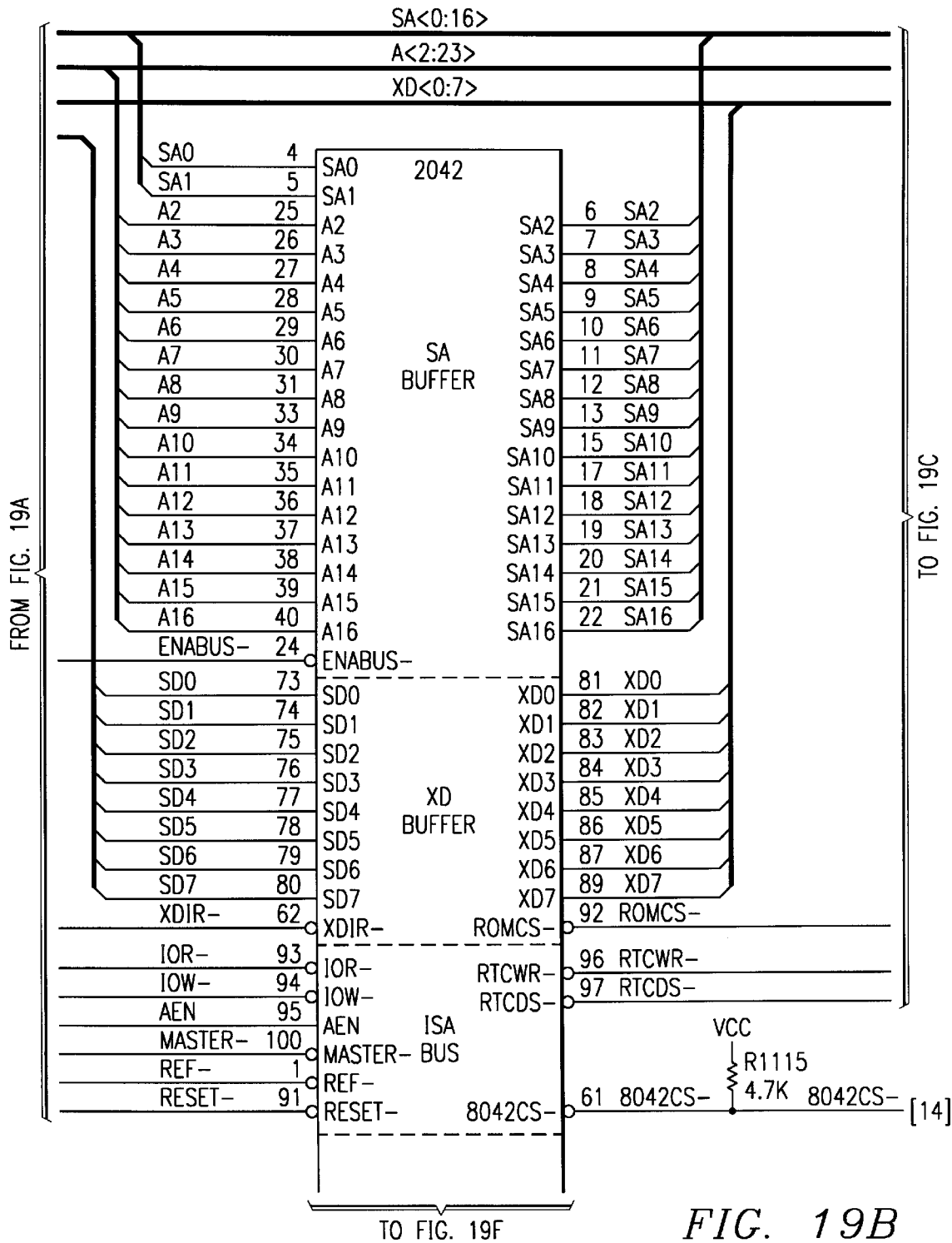
Figure 19C:
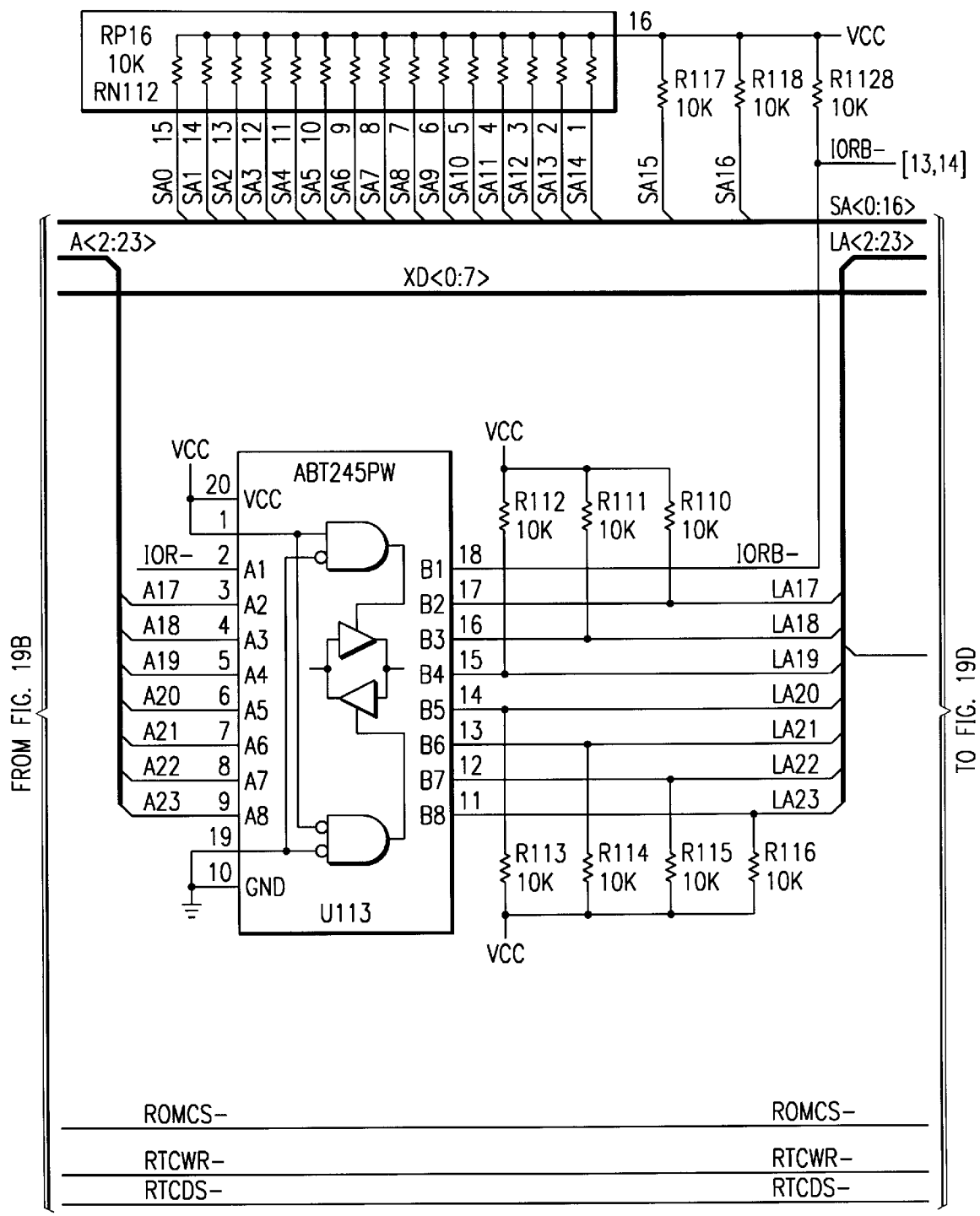
Figure 19D:
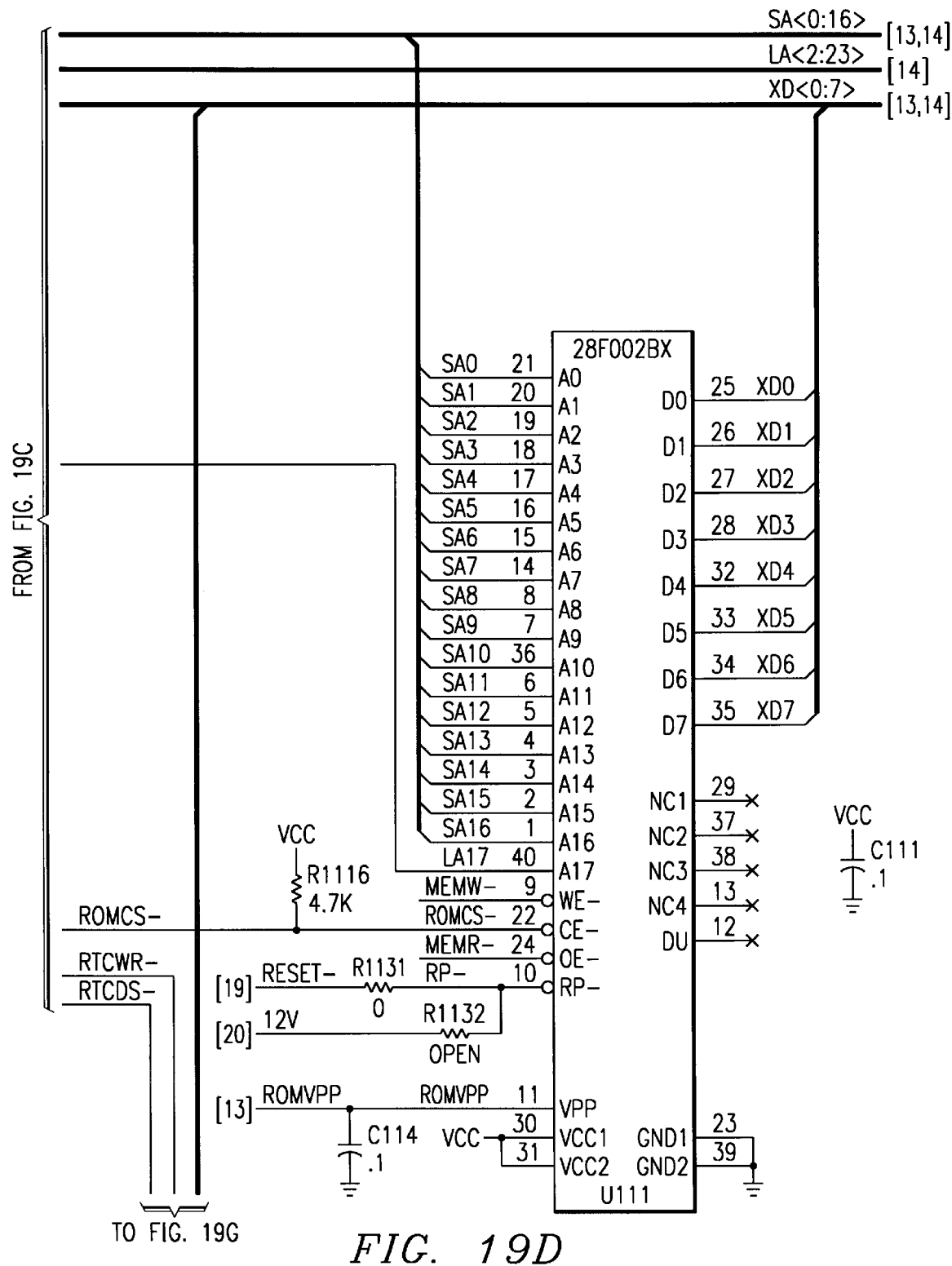
Figure 19E:
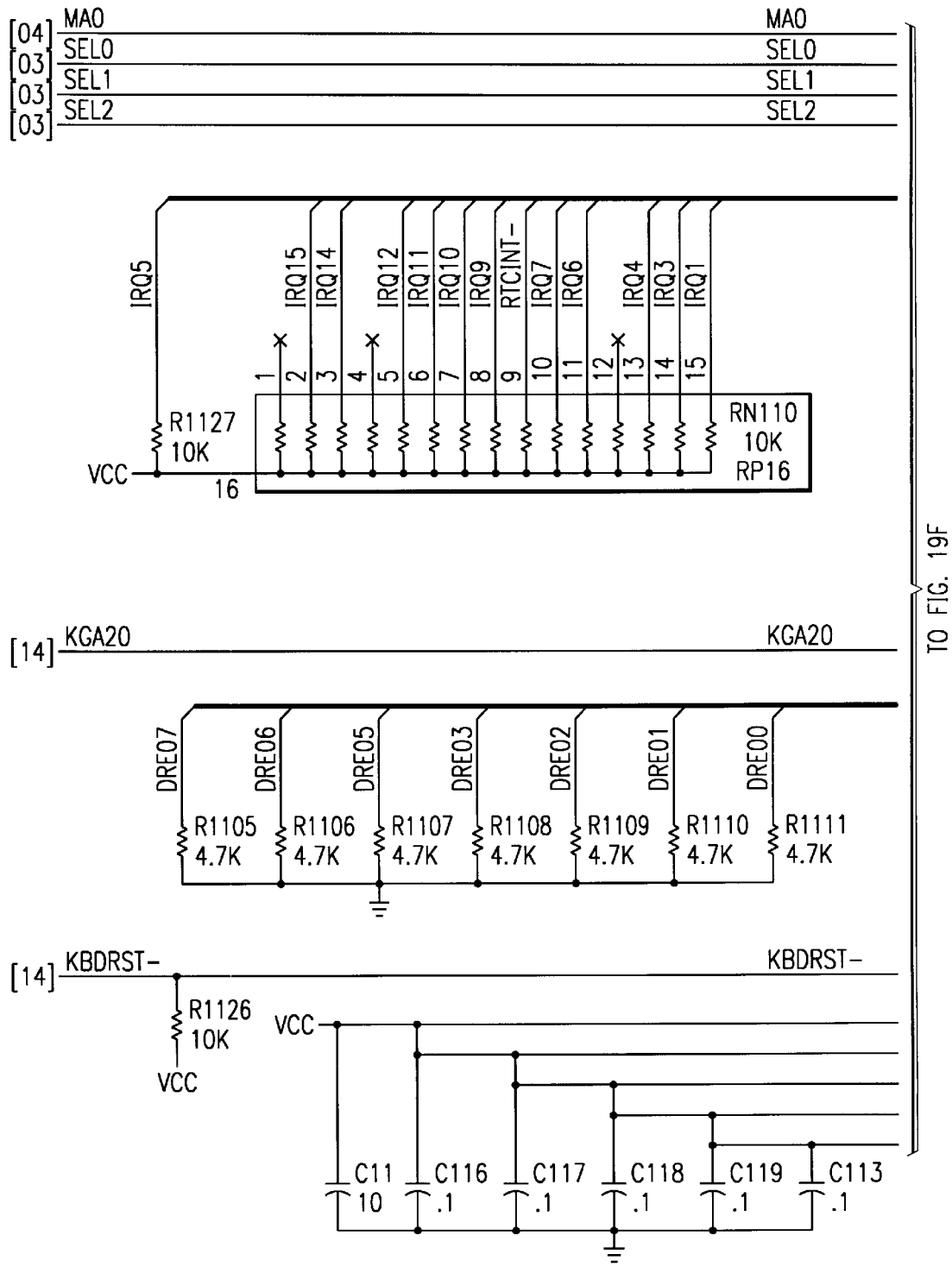
Figure 19F:
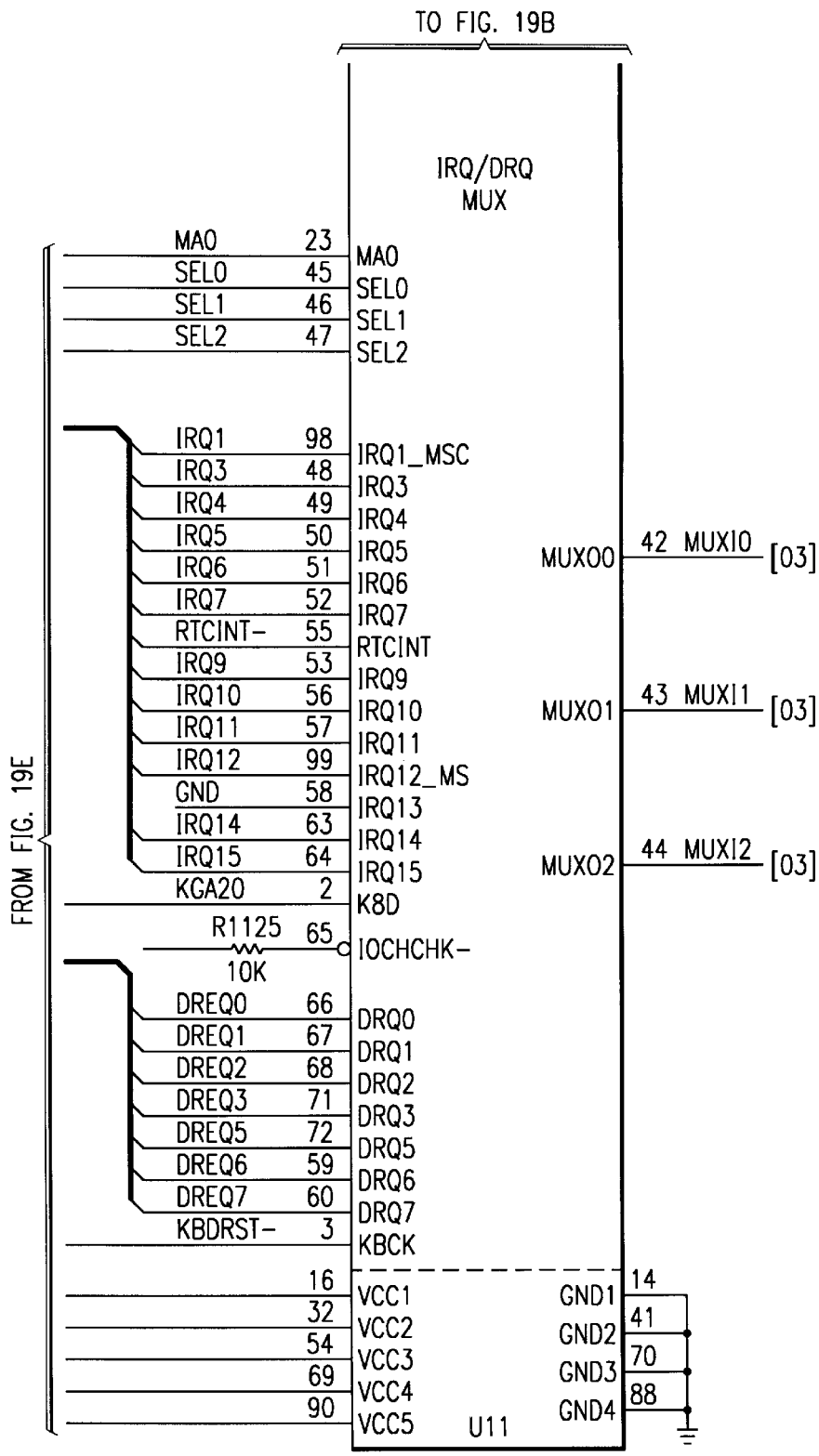
Figure 19G:
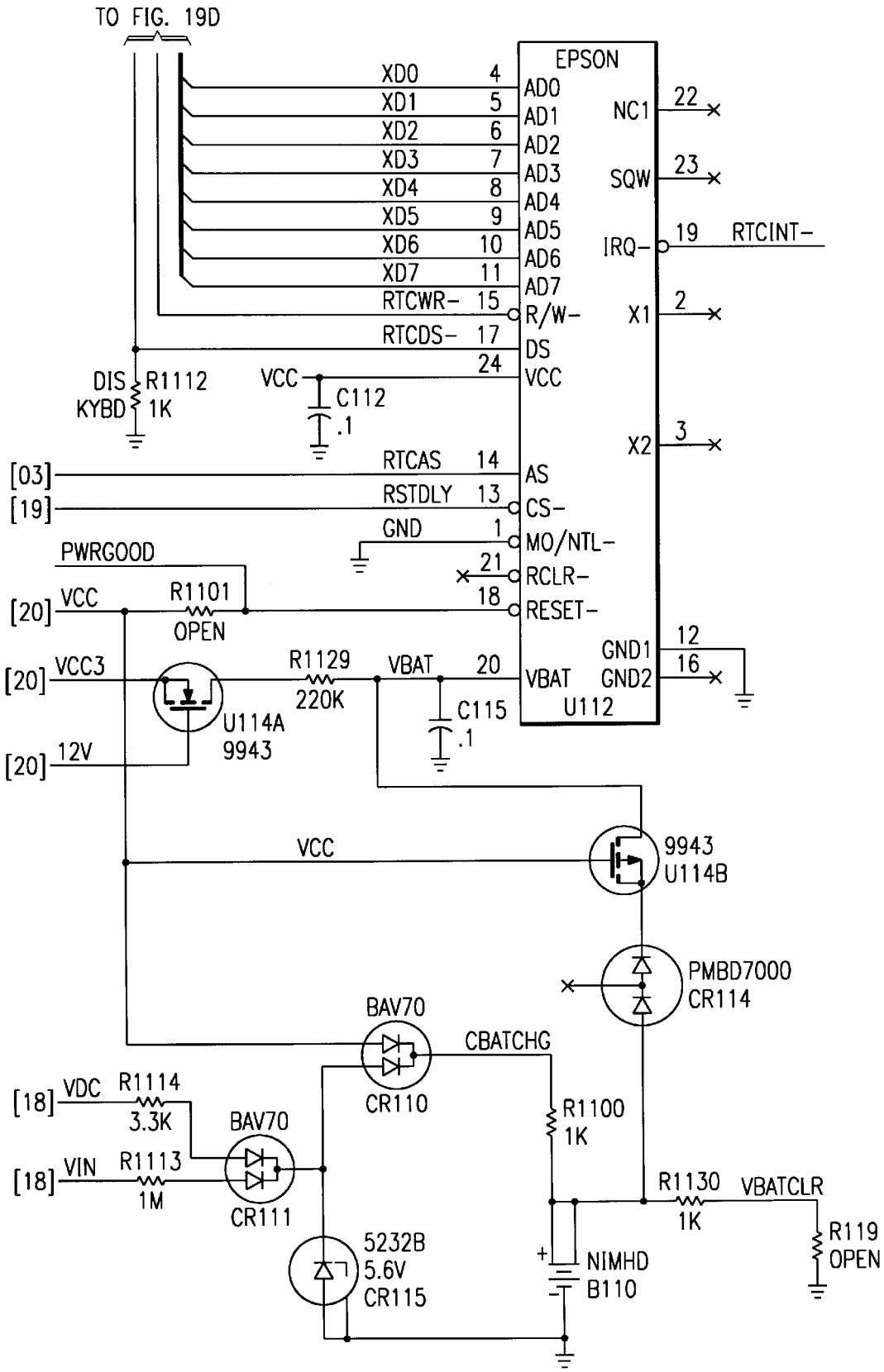
Figure 20A:
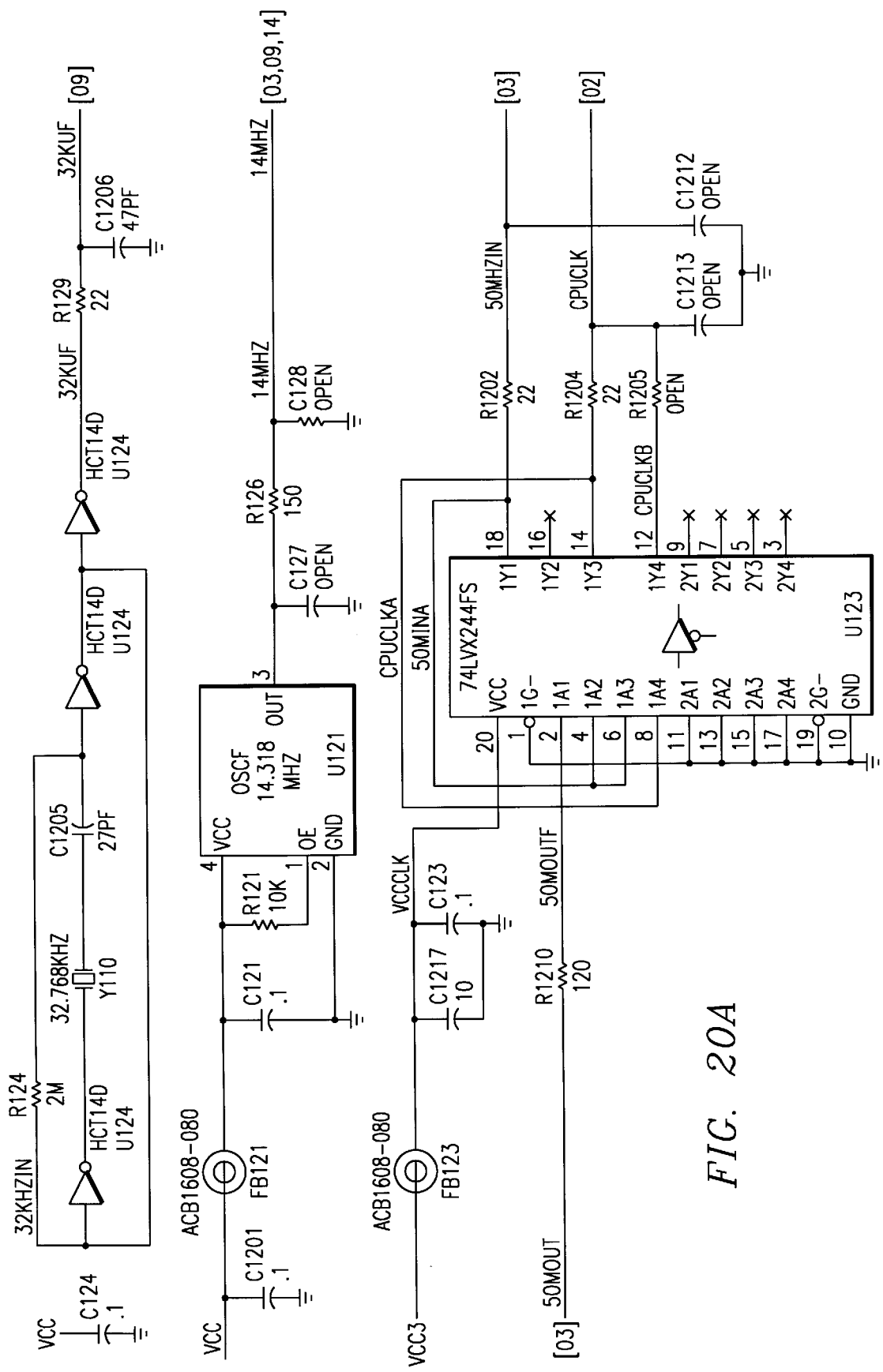
Figure 20B:
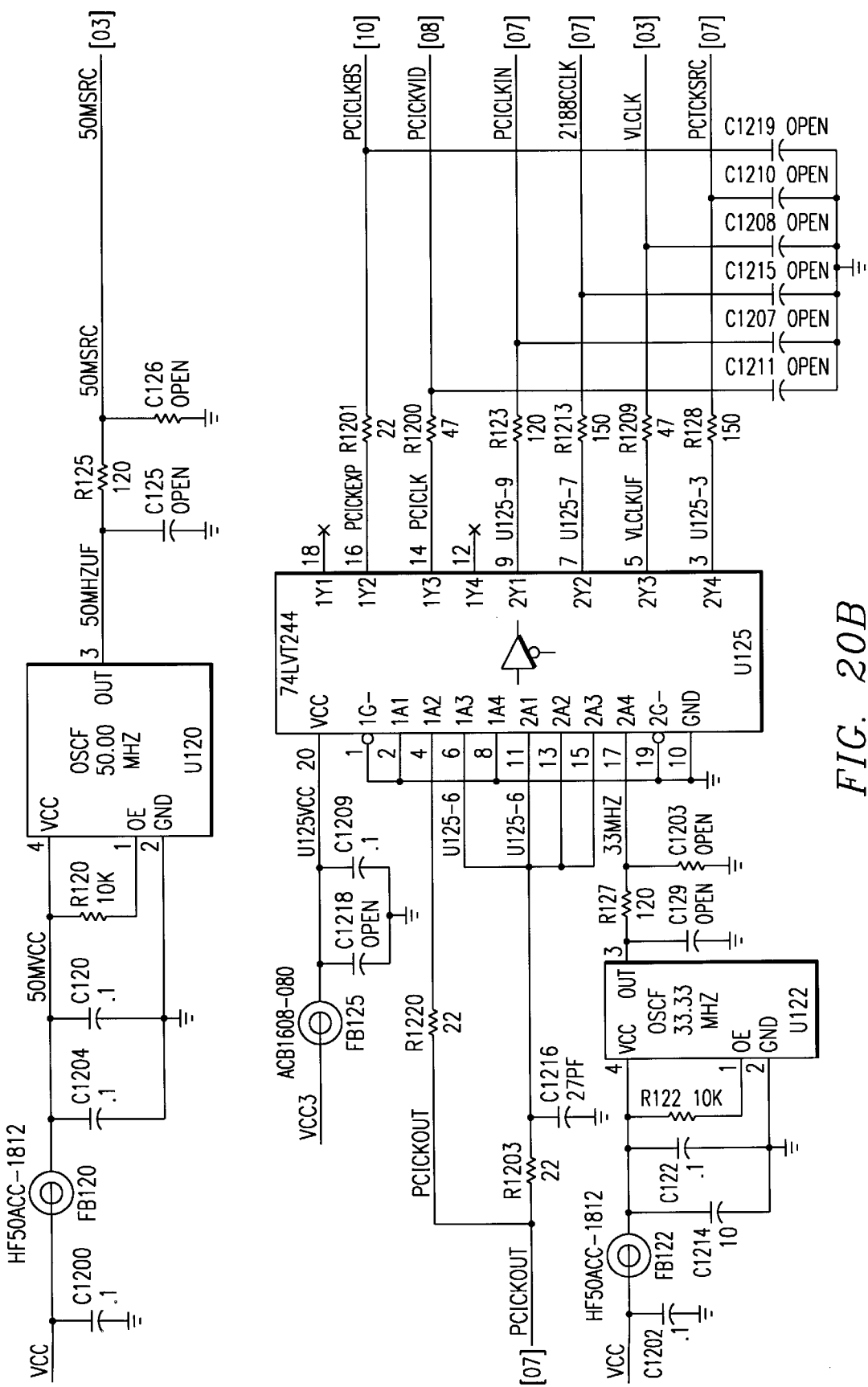
Figure 21A:
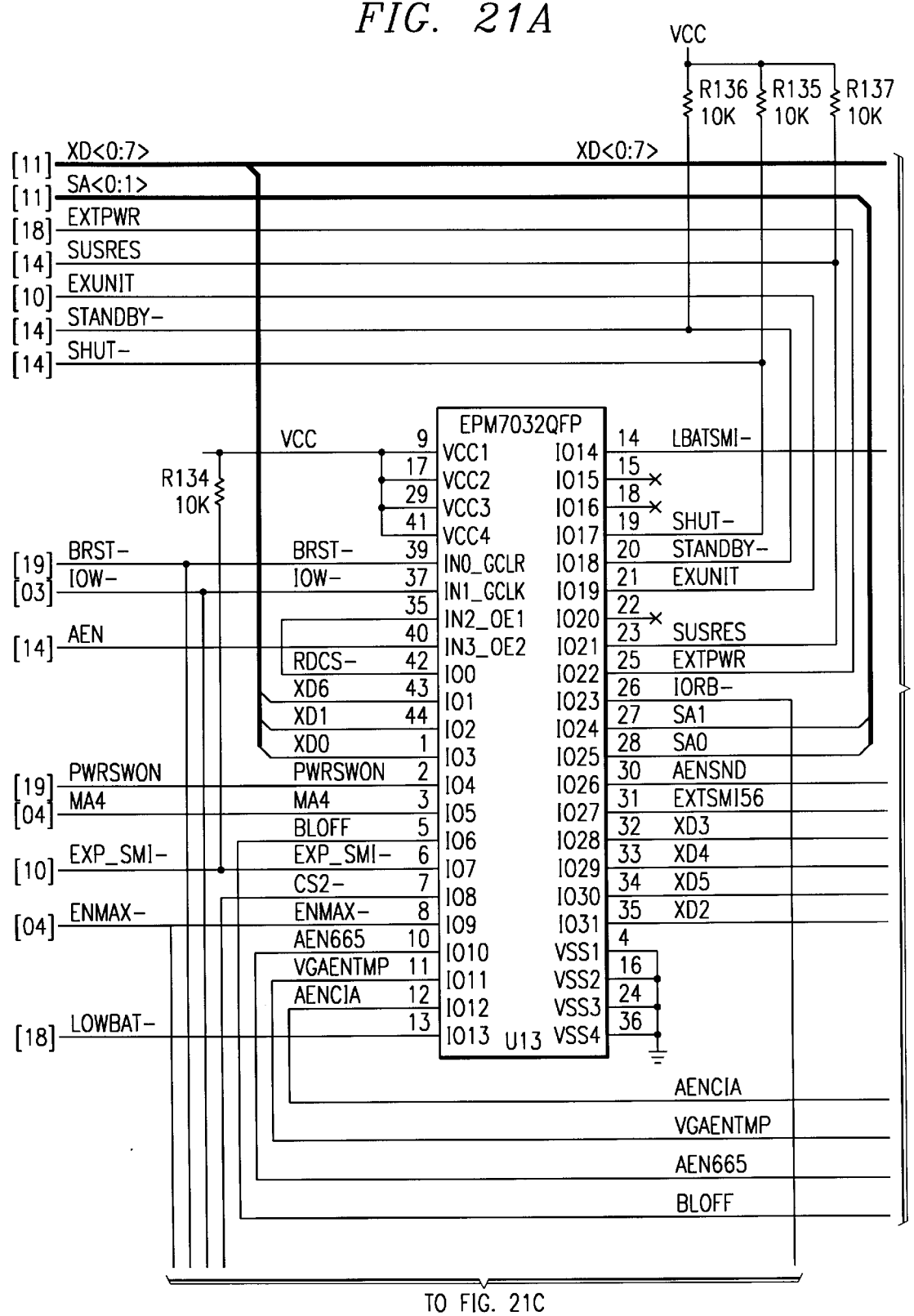
Figure 21B:
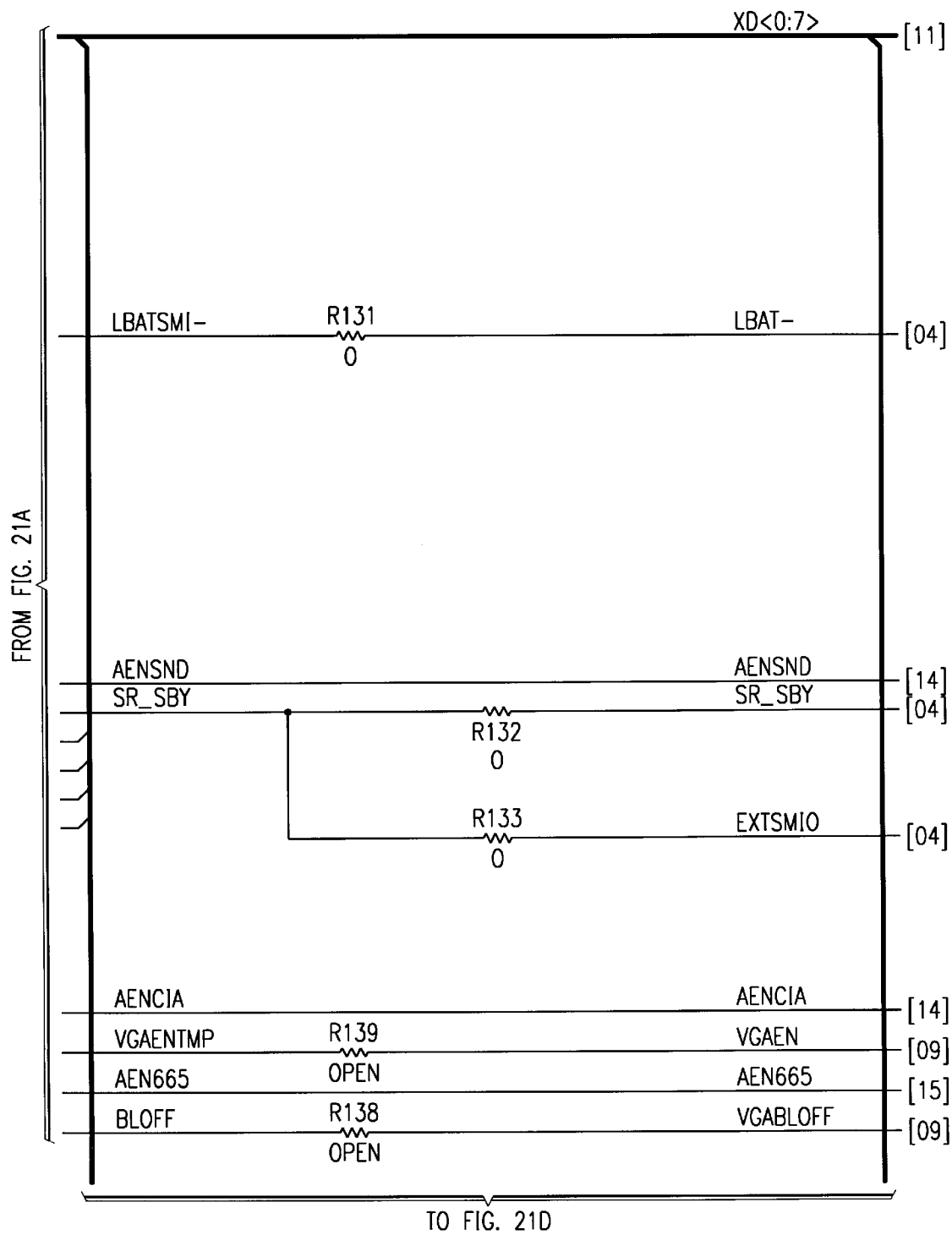
Figure 21C:
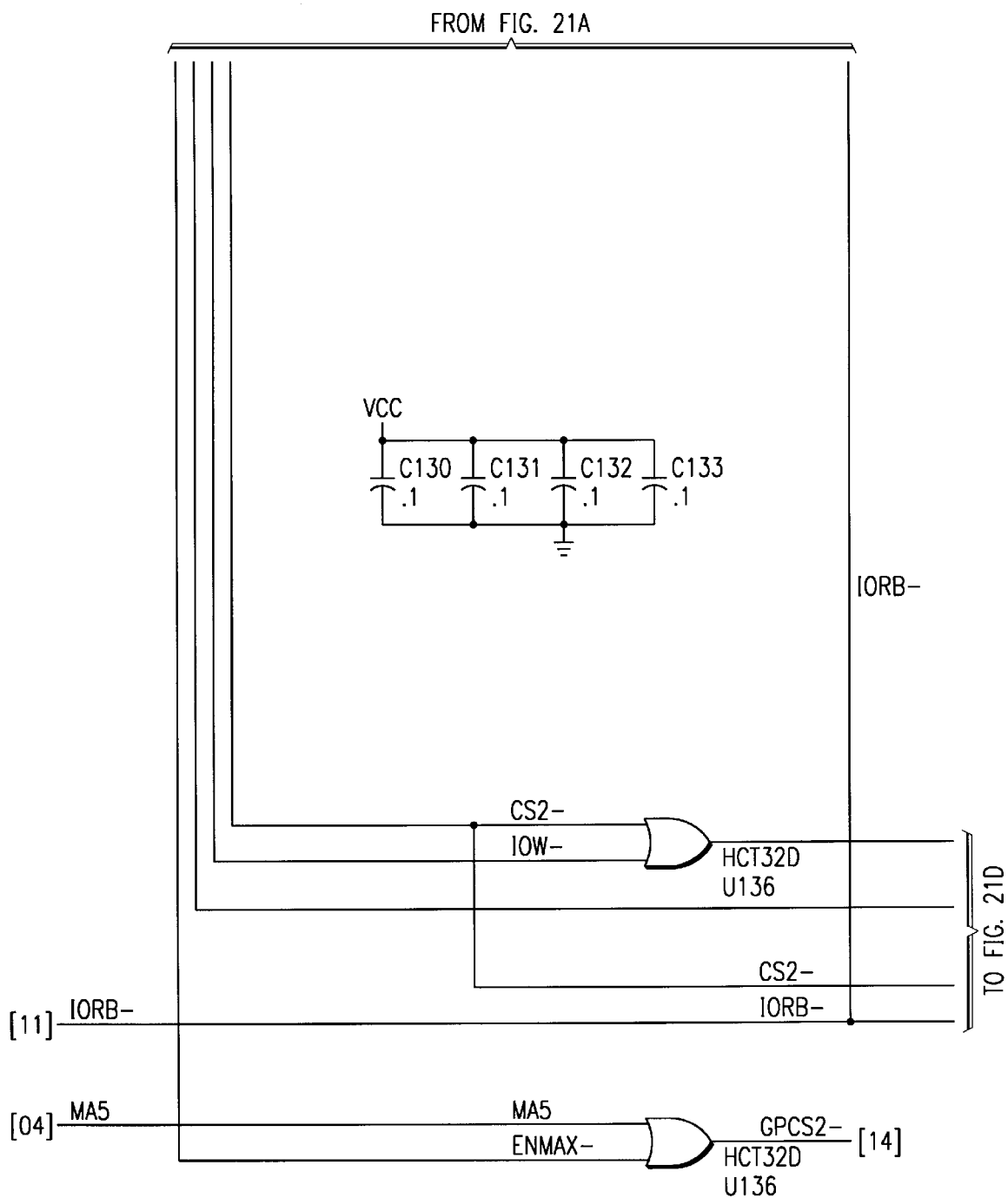
Figure 21D:
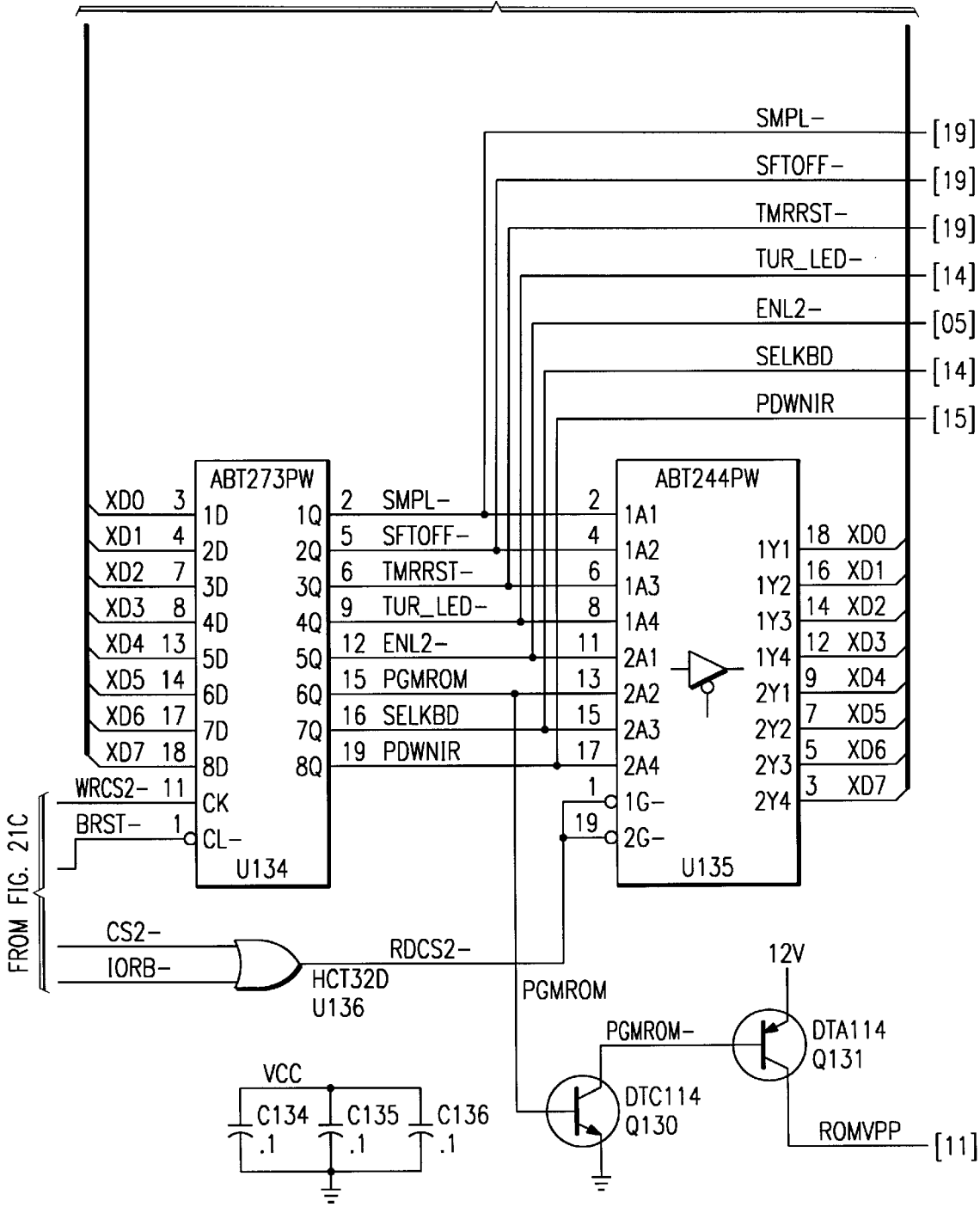
Figure 22A:
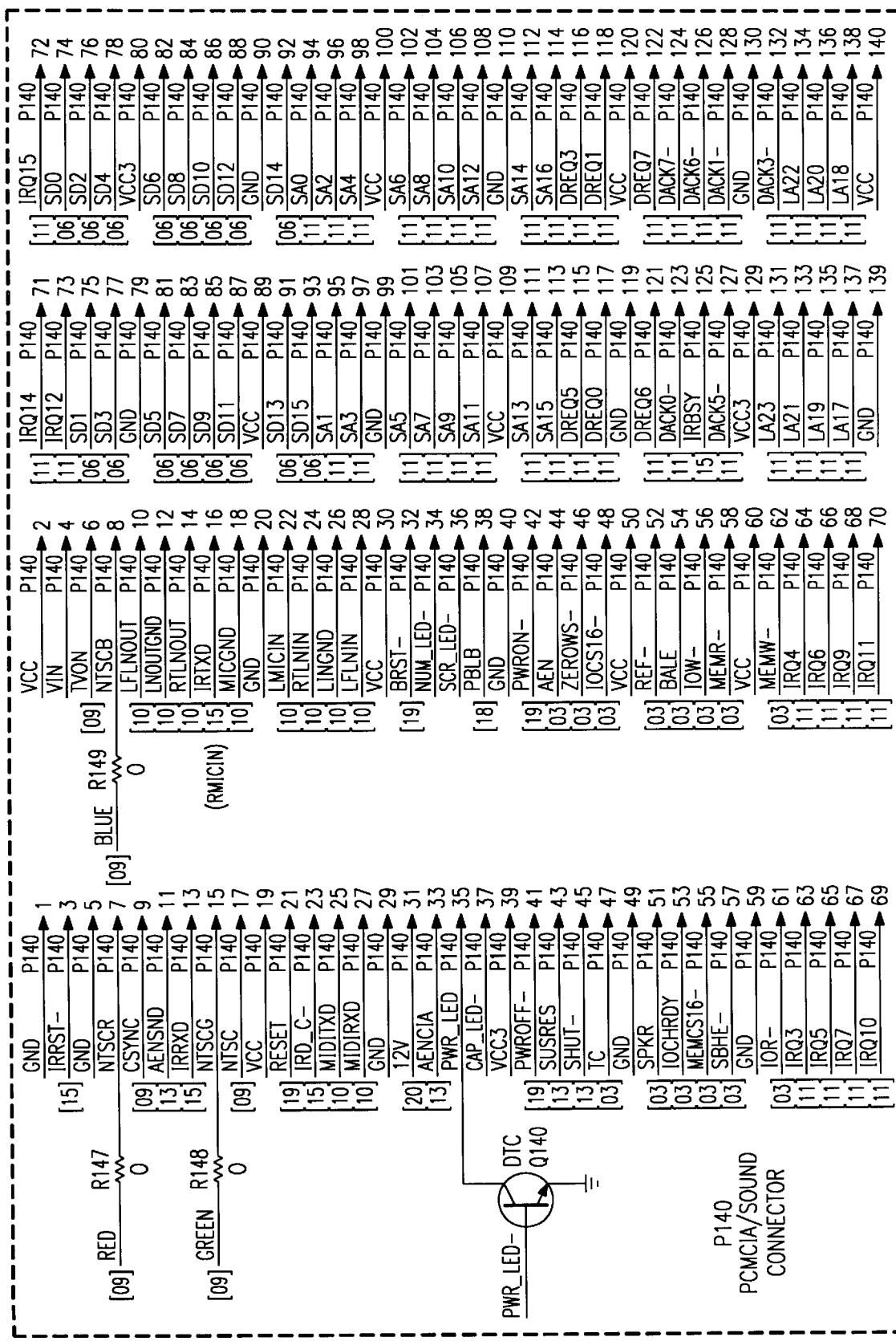
Figure 22B:
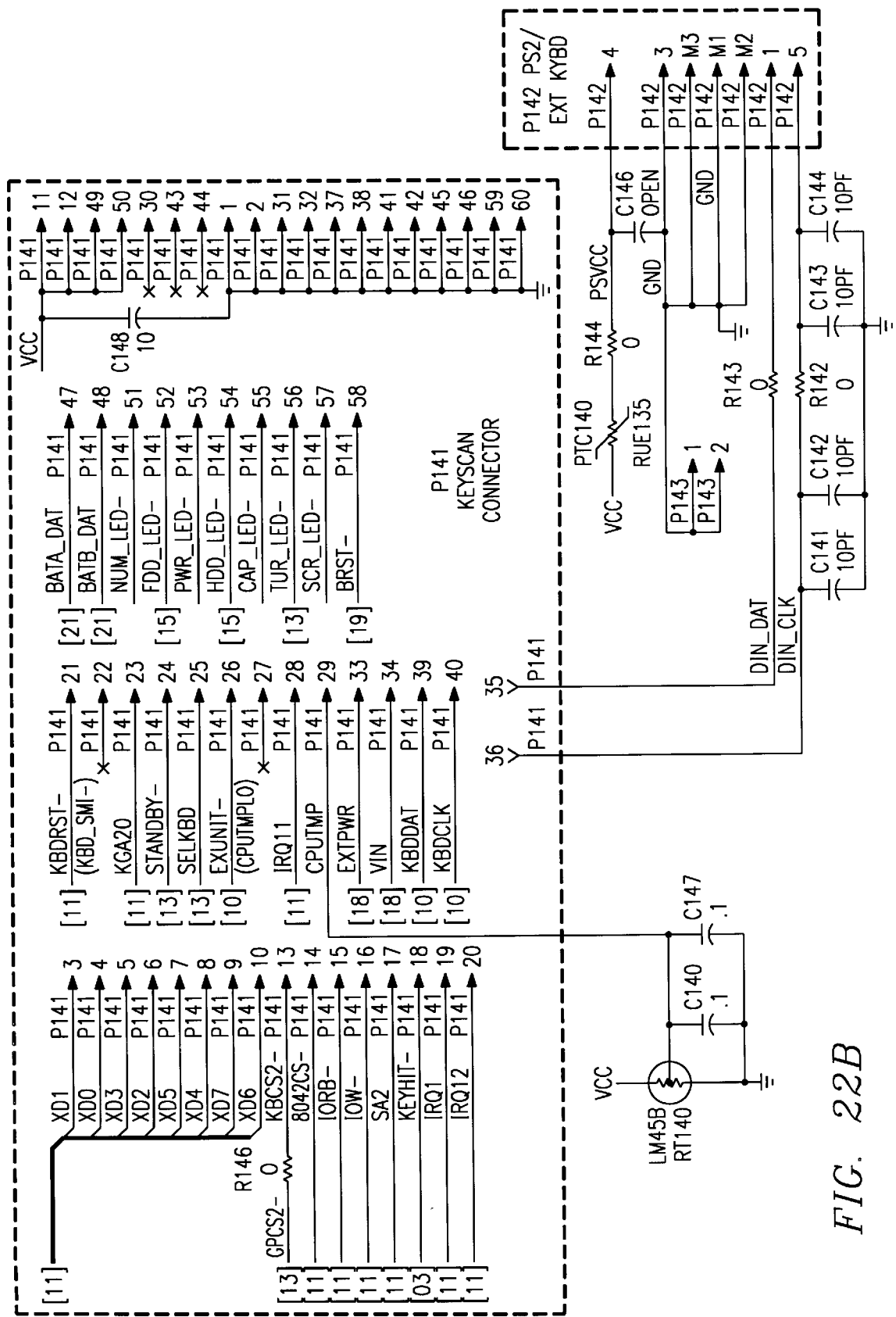
Figure 23A:
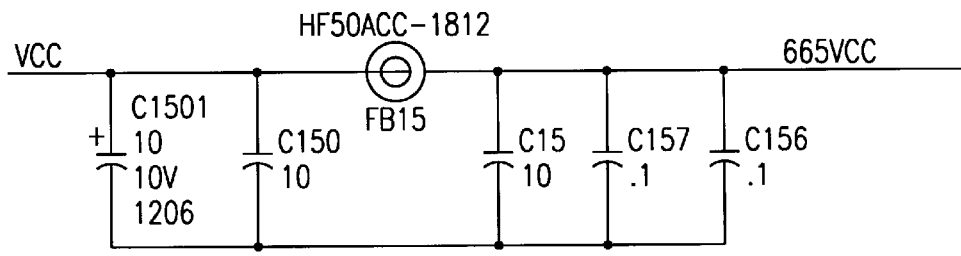
Figure 23B:
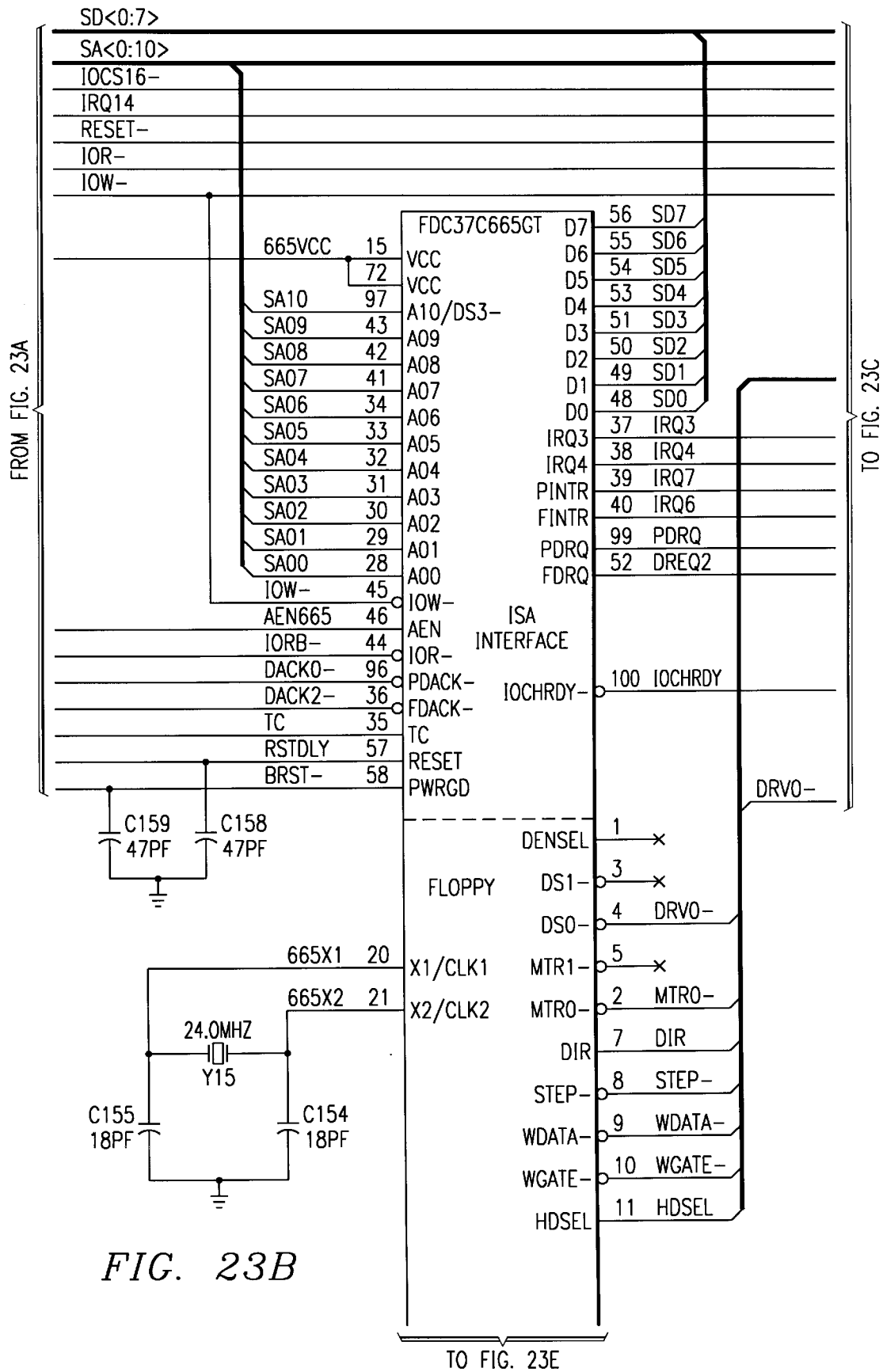
Figure 23C:
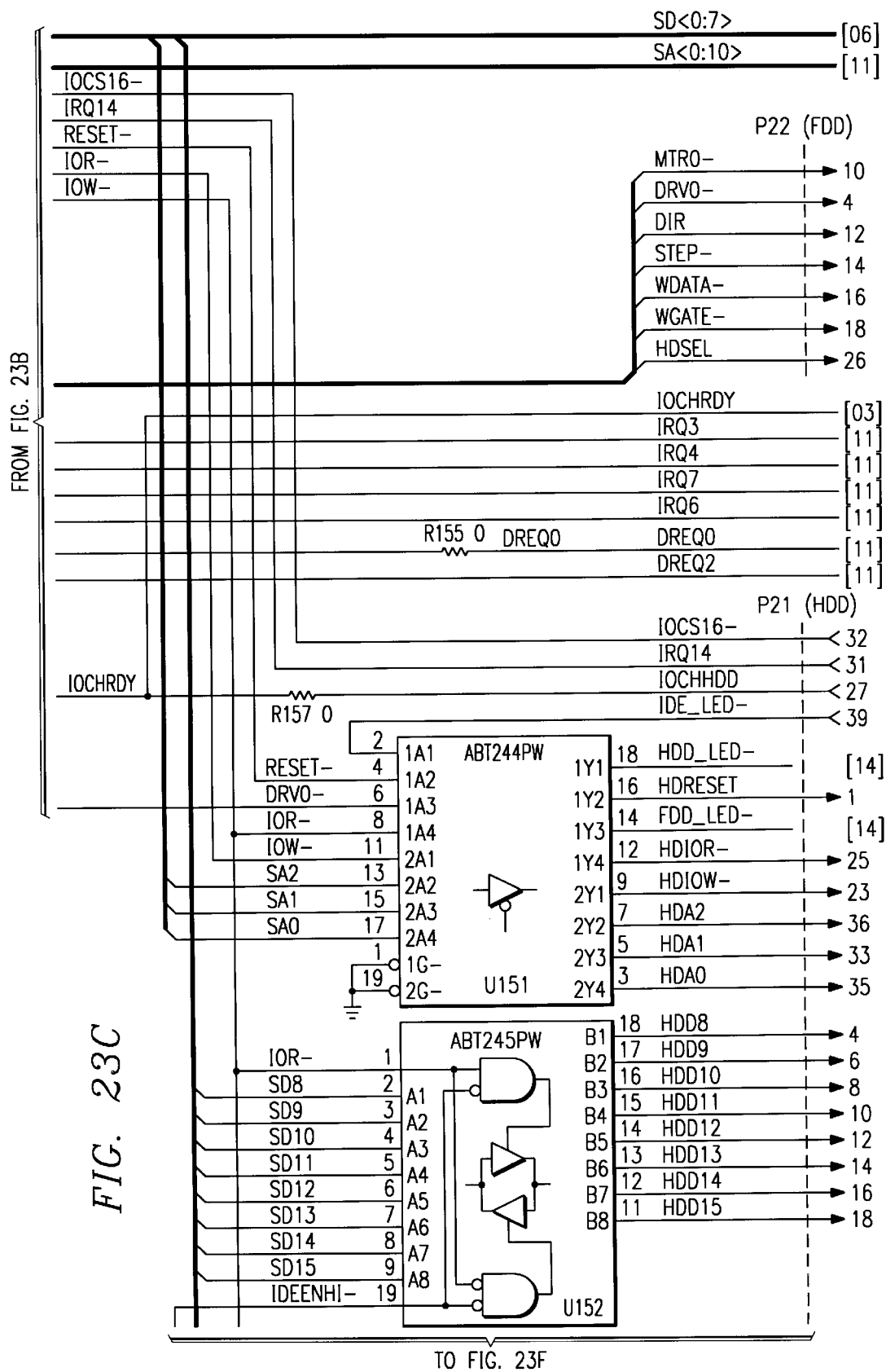
Figure 23D:
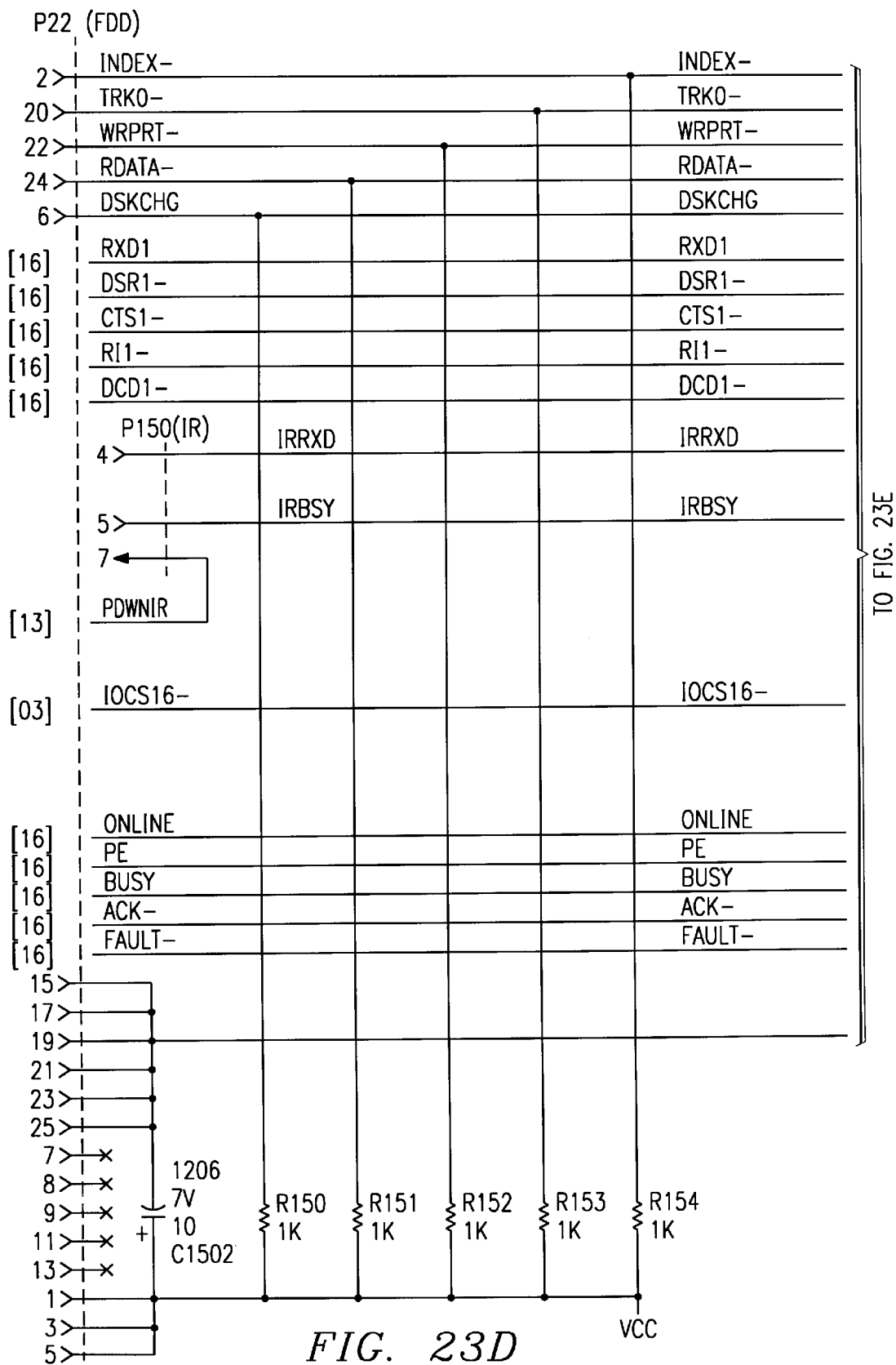
Figure 23E:
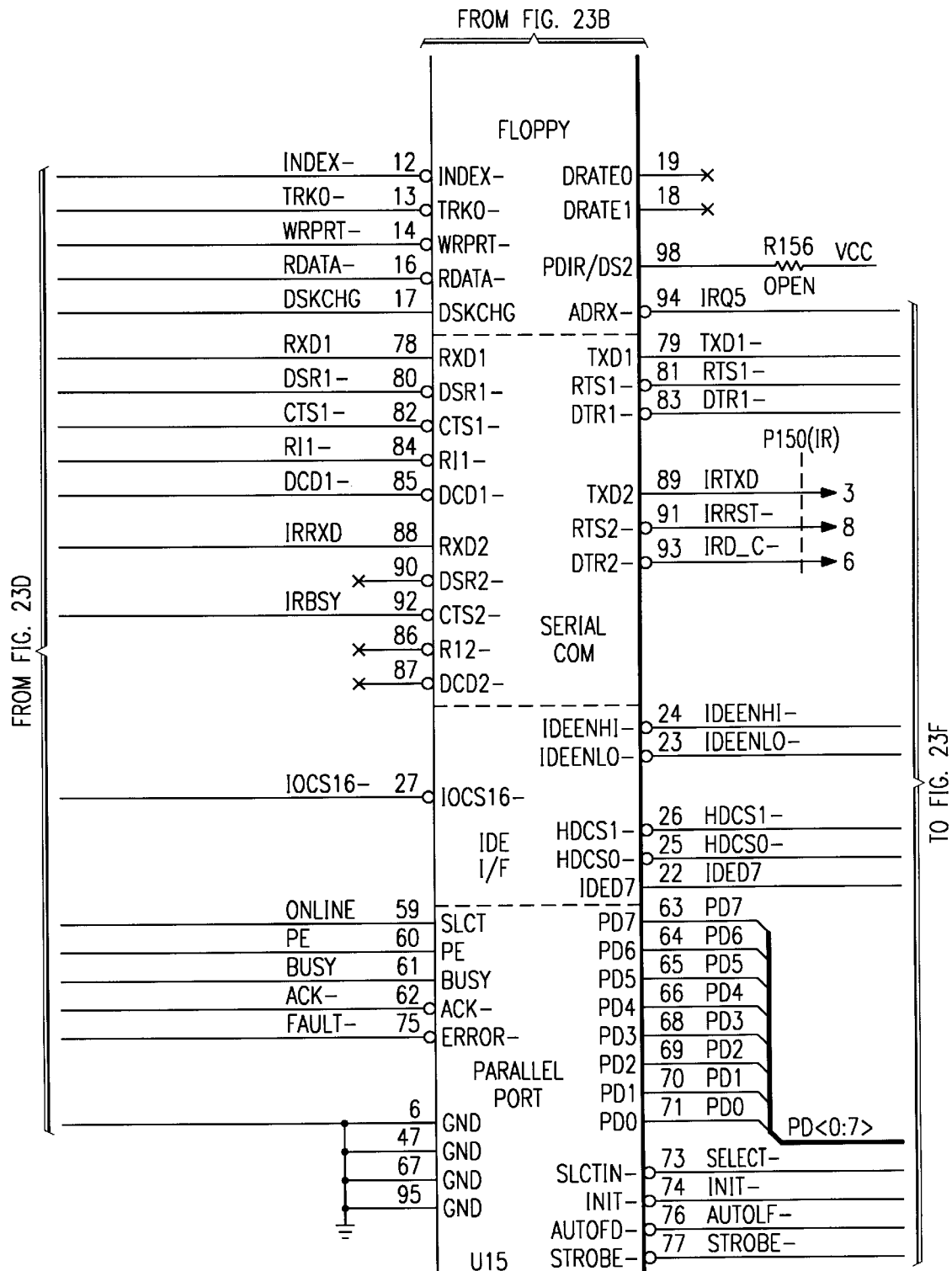
Figure 23F:
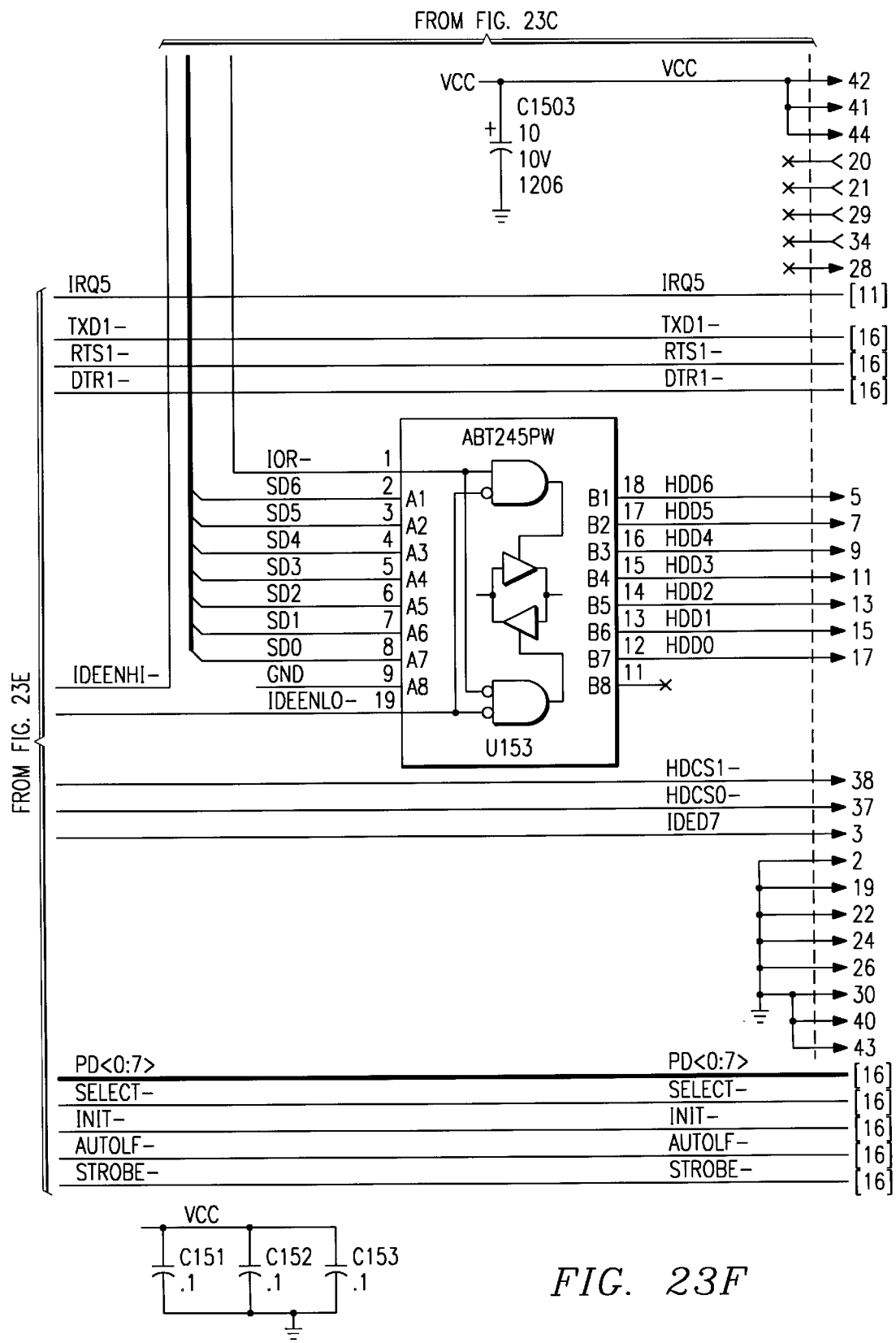
Figure 24A:
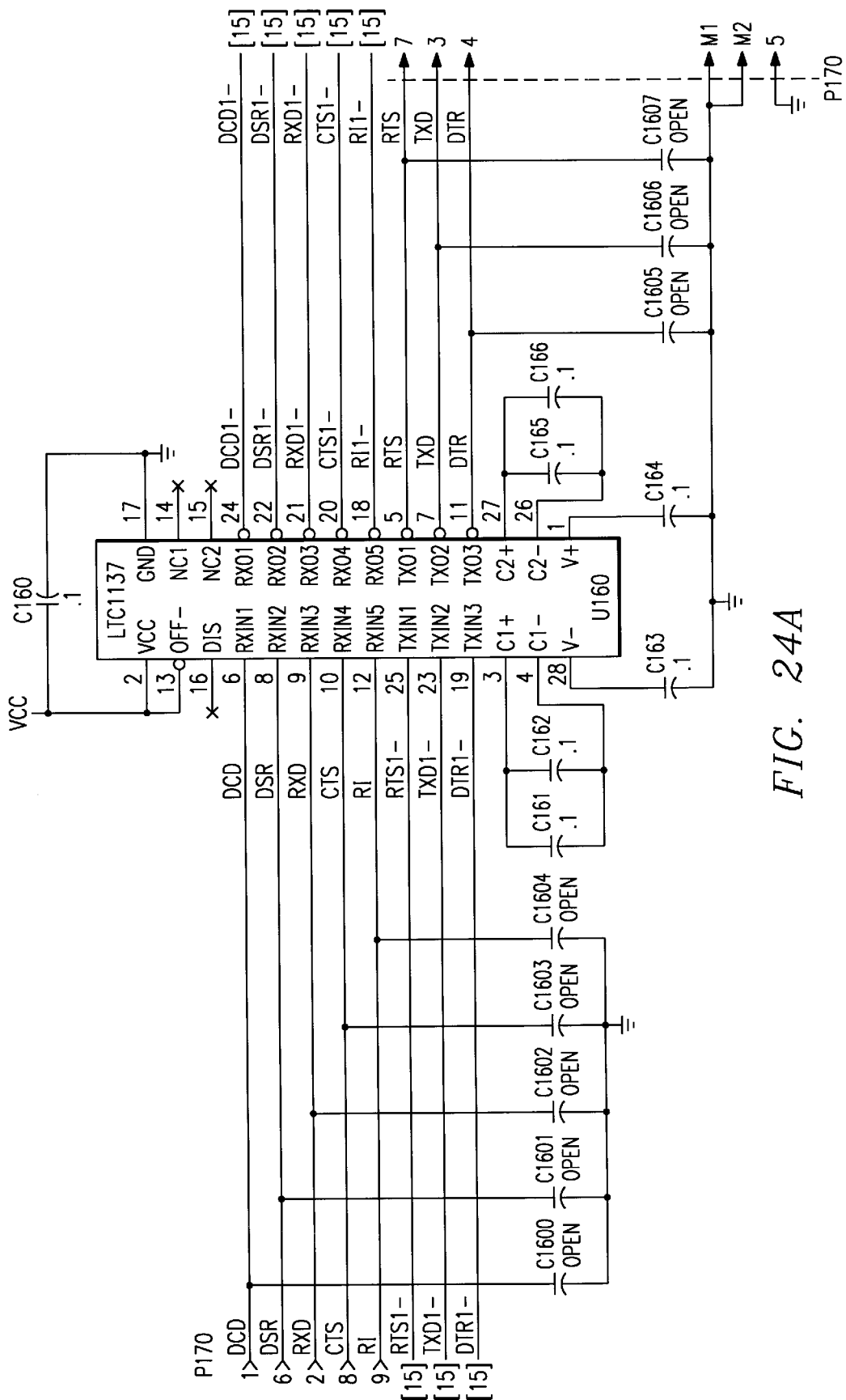
Figure 24B:
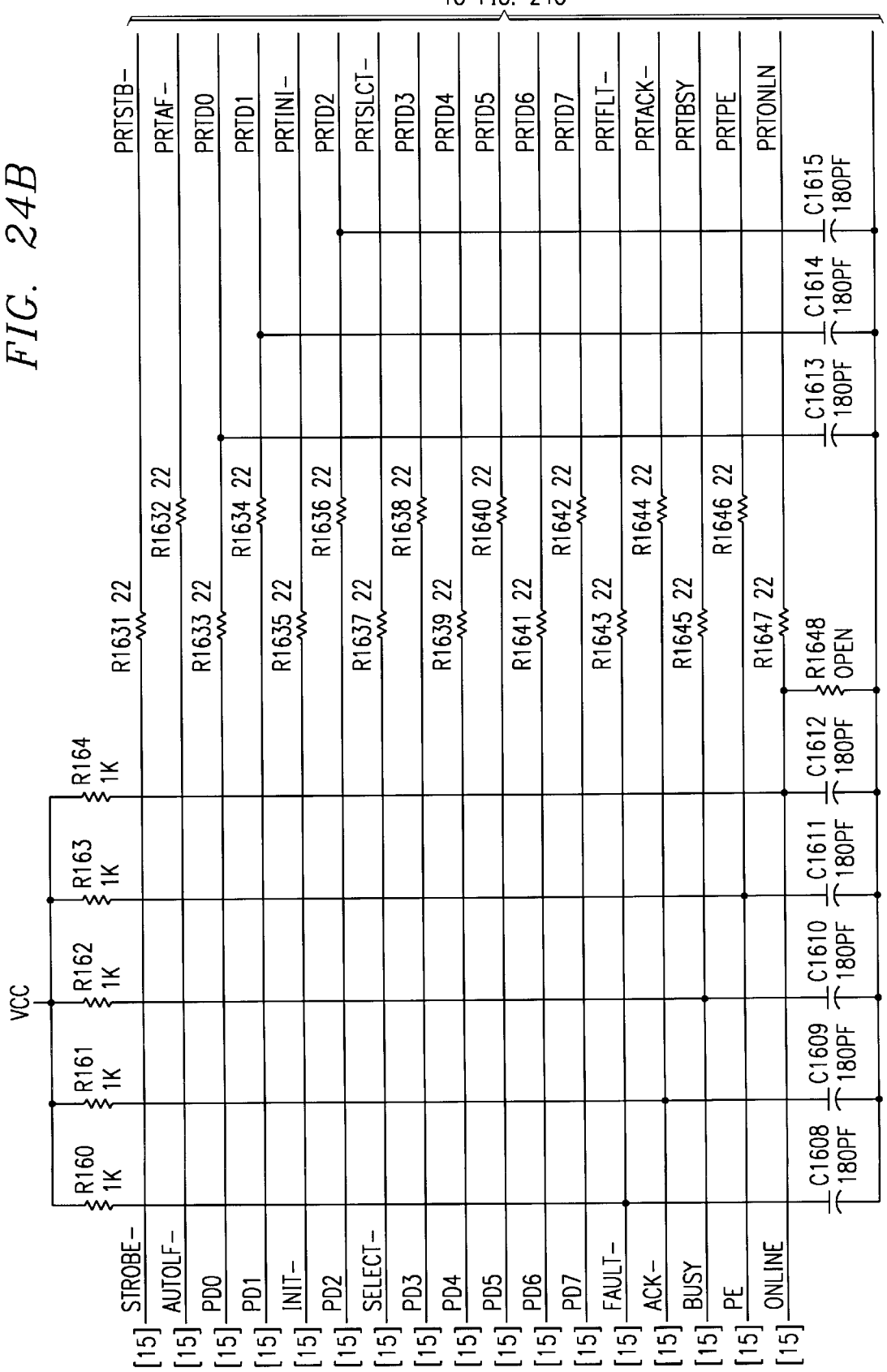
Figure 24C:
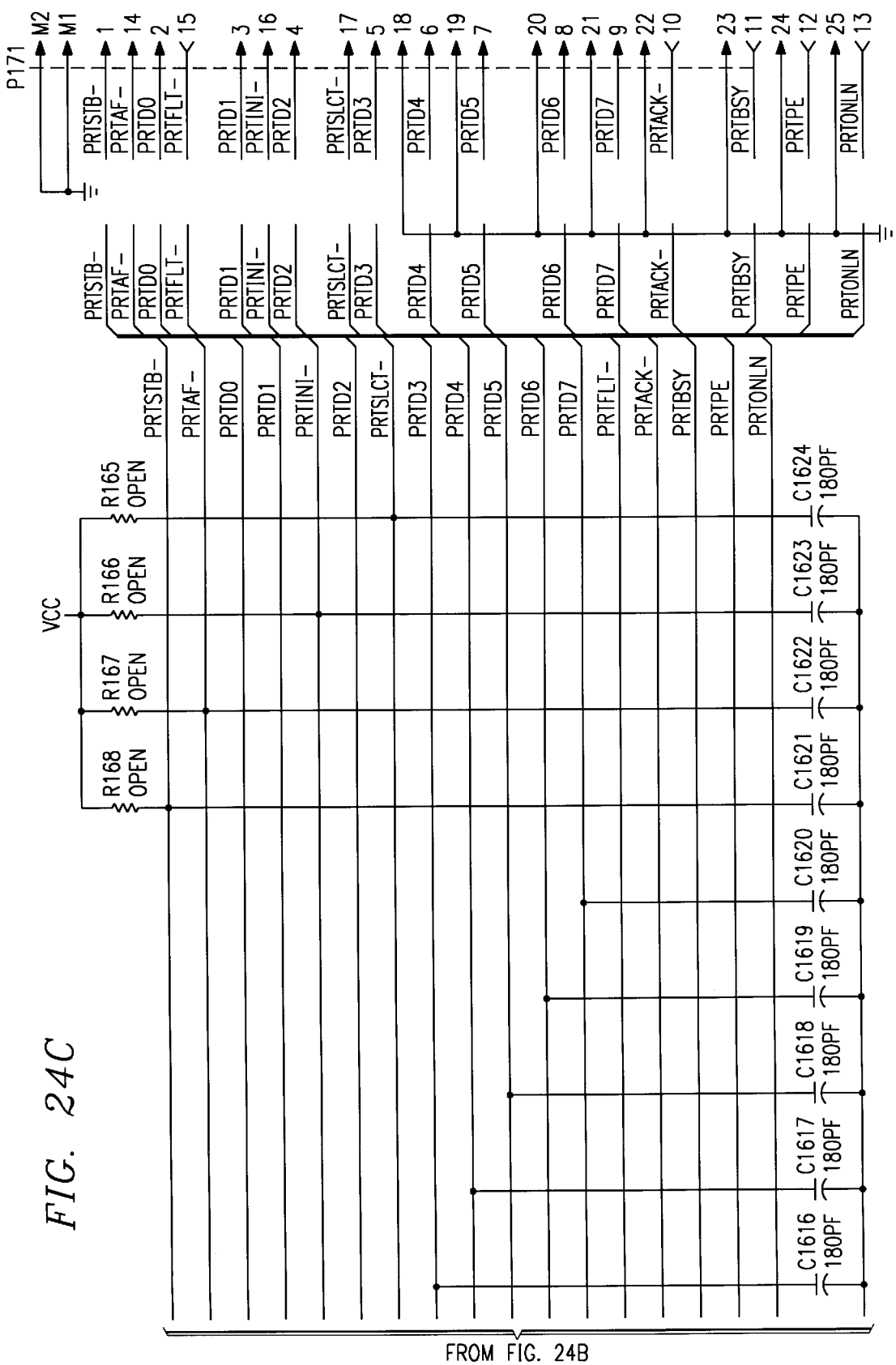
Figure 25A:
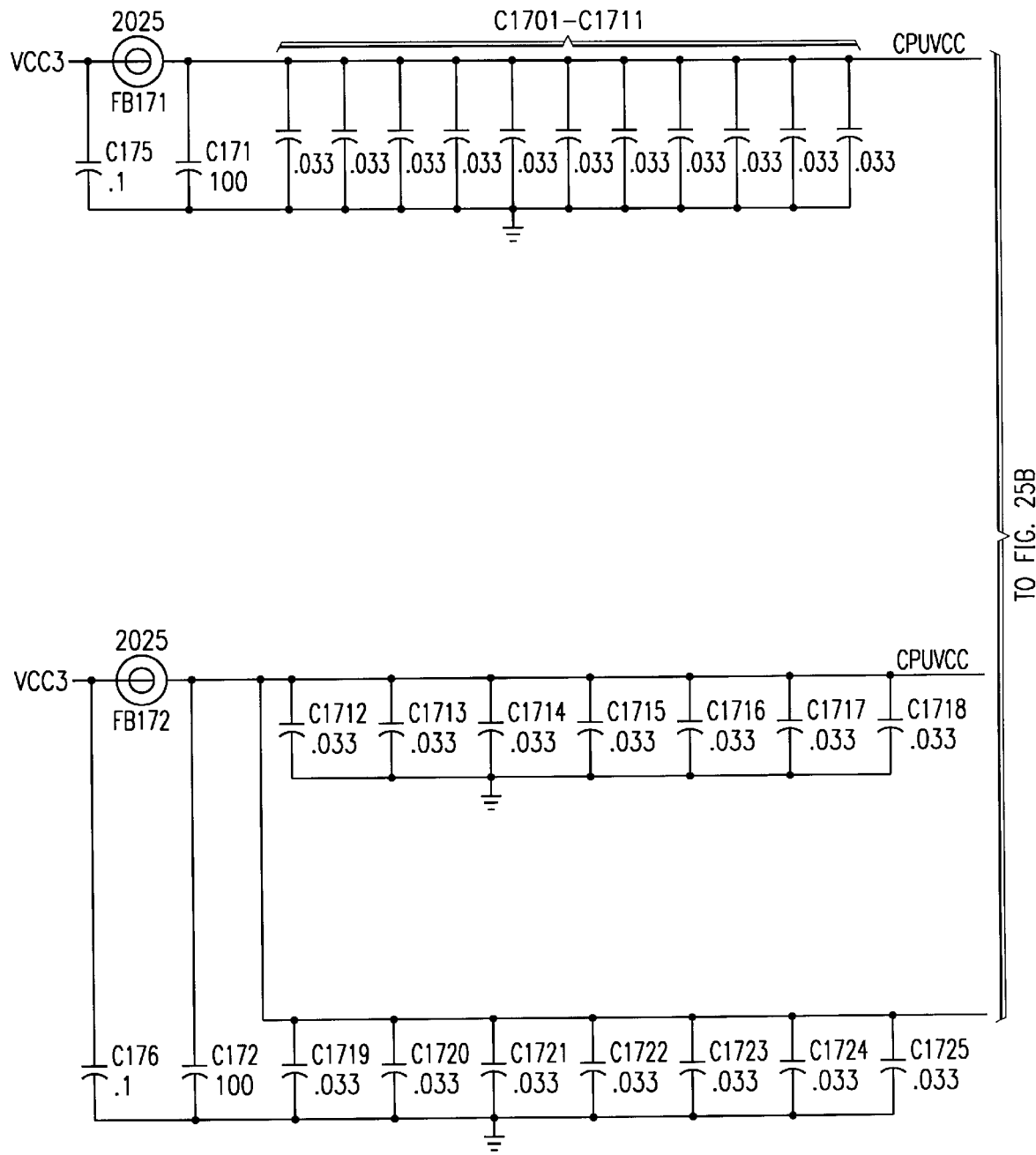
Figure 25B:
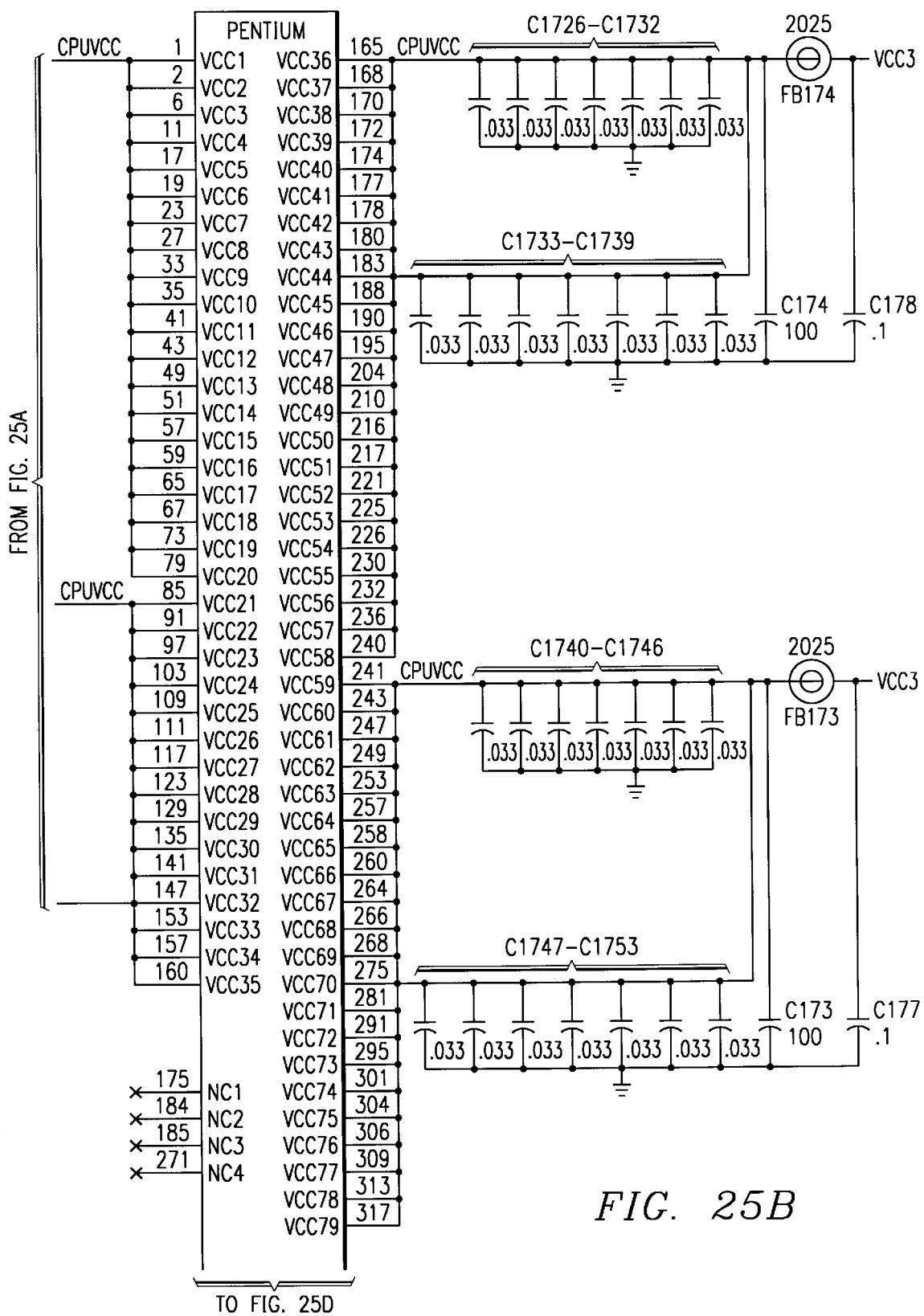
Figure 25D:
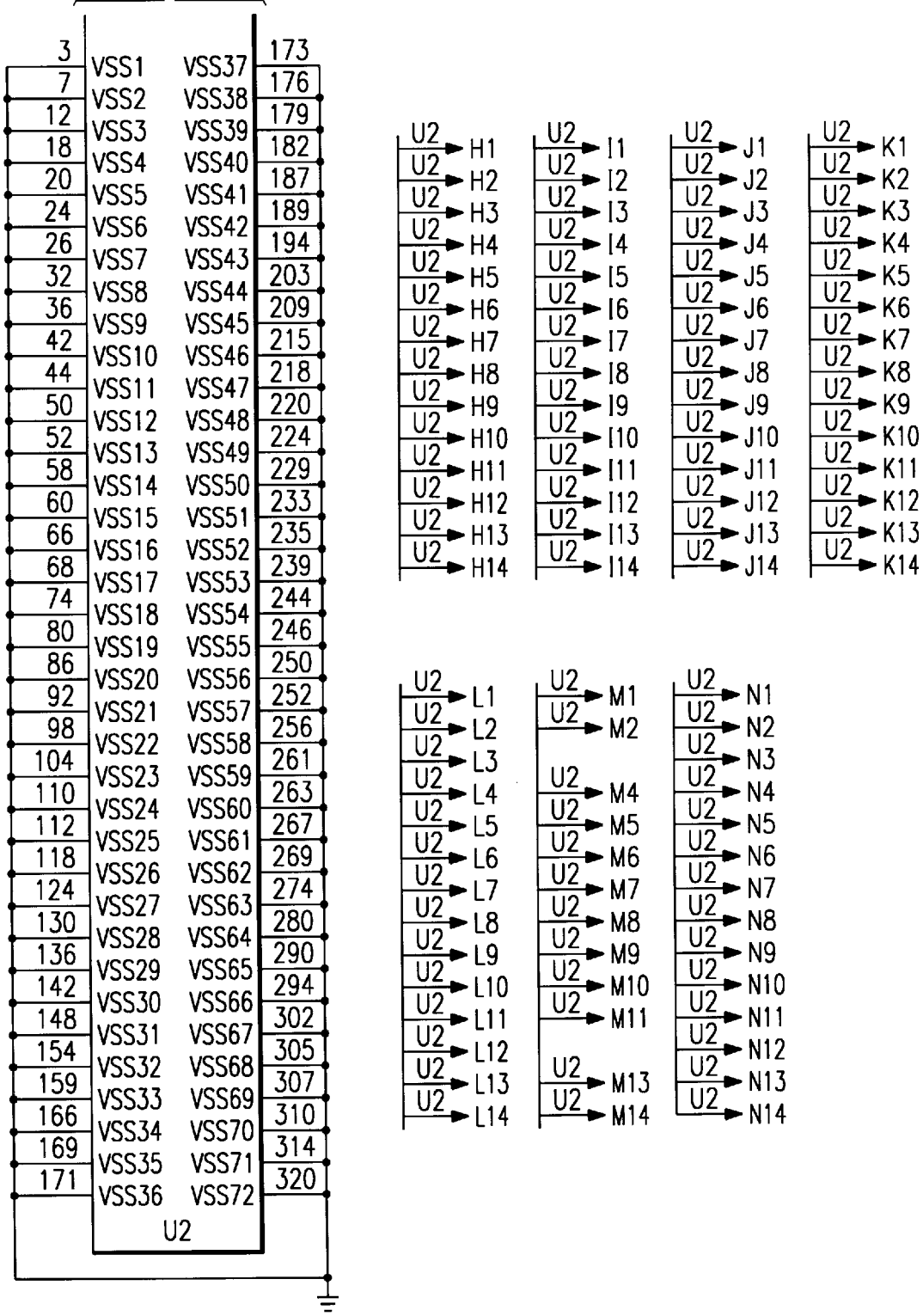
Figure 26A:
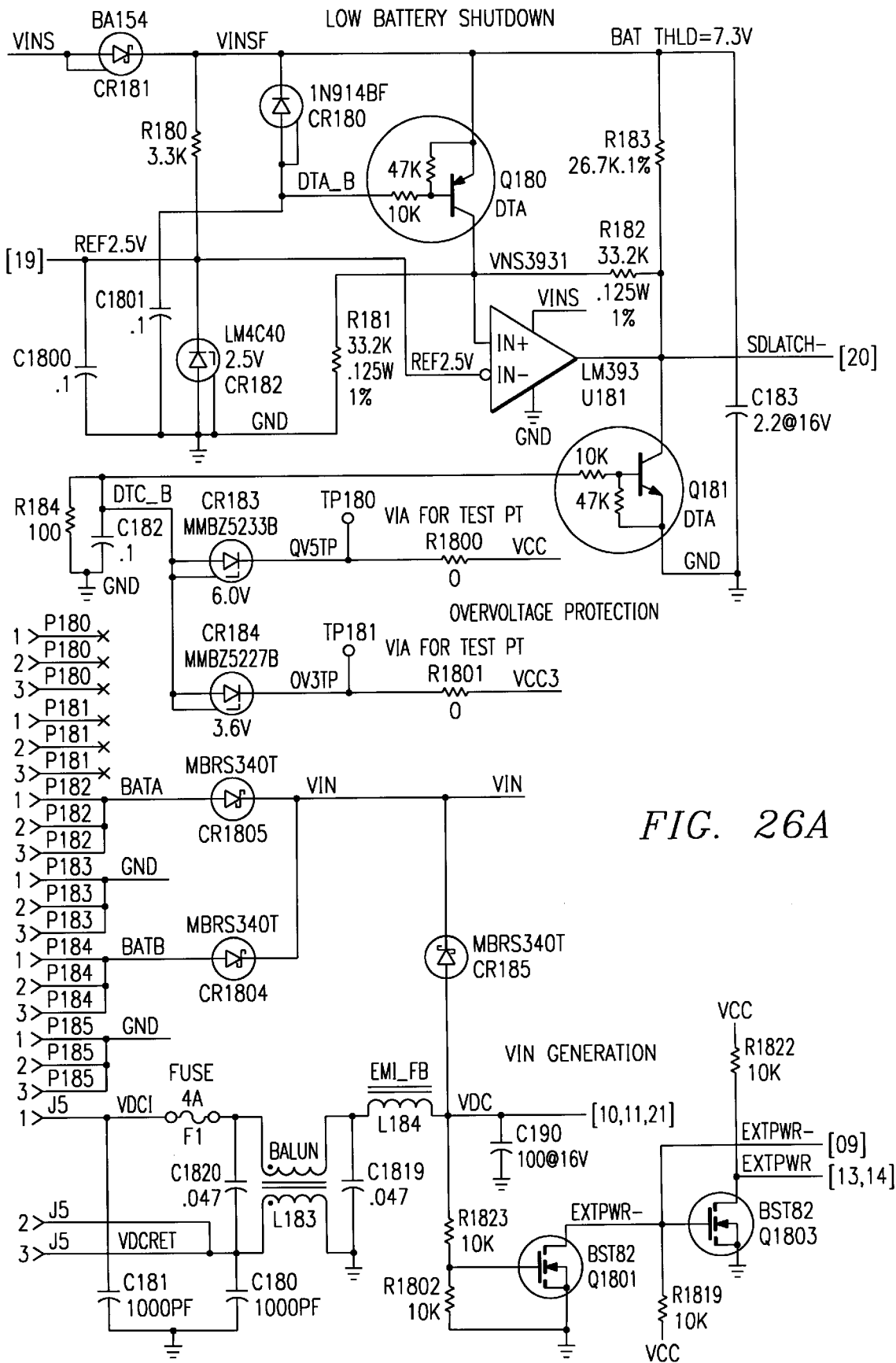
Figure 26B:
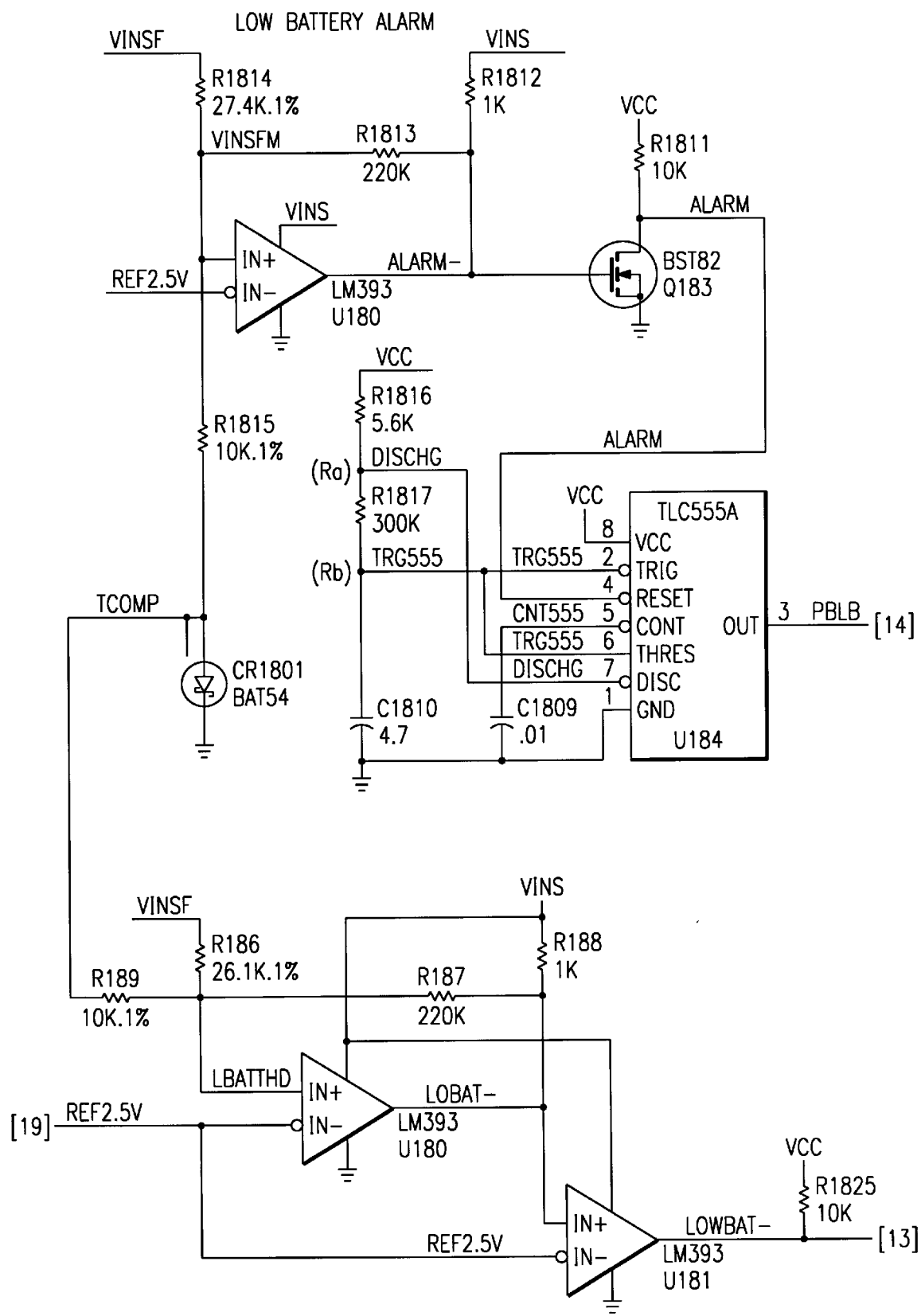
Figure 27A:
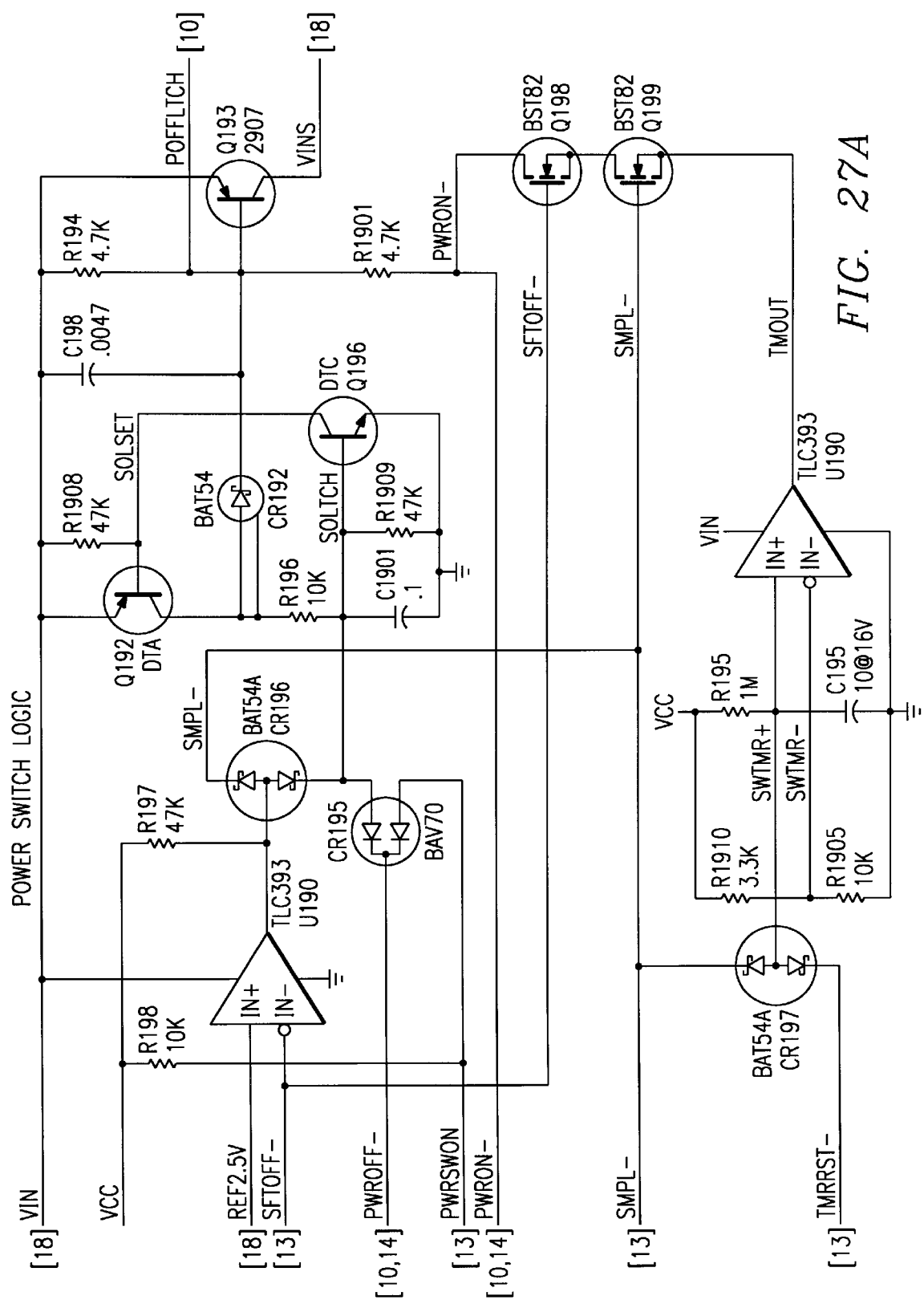
Figure 27C:
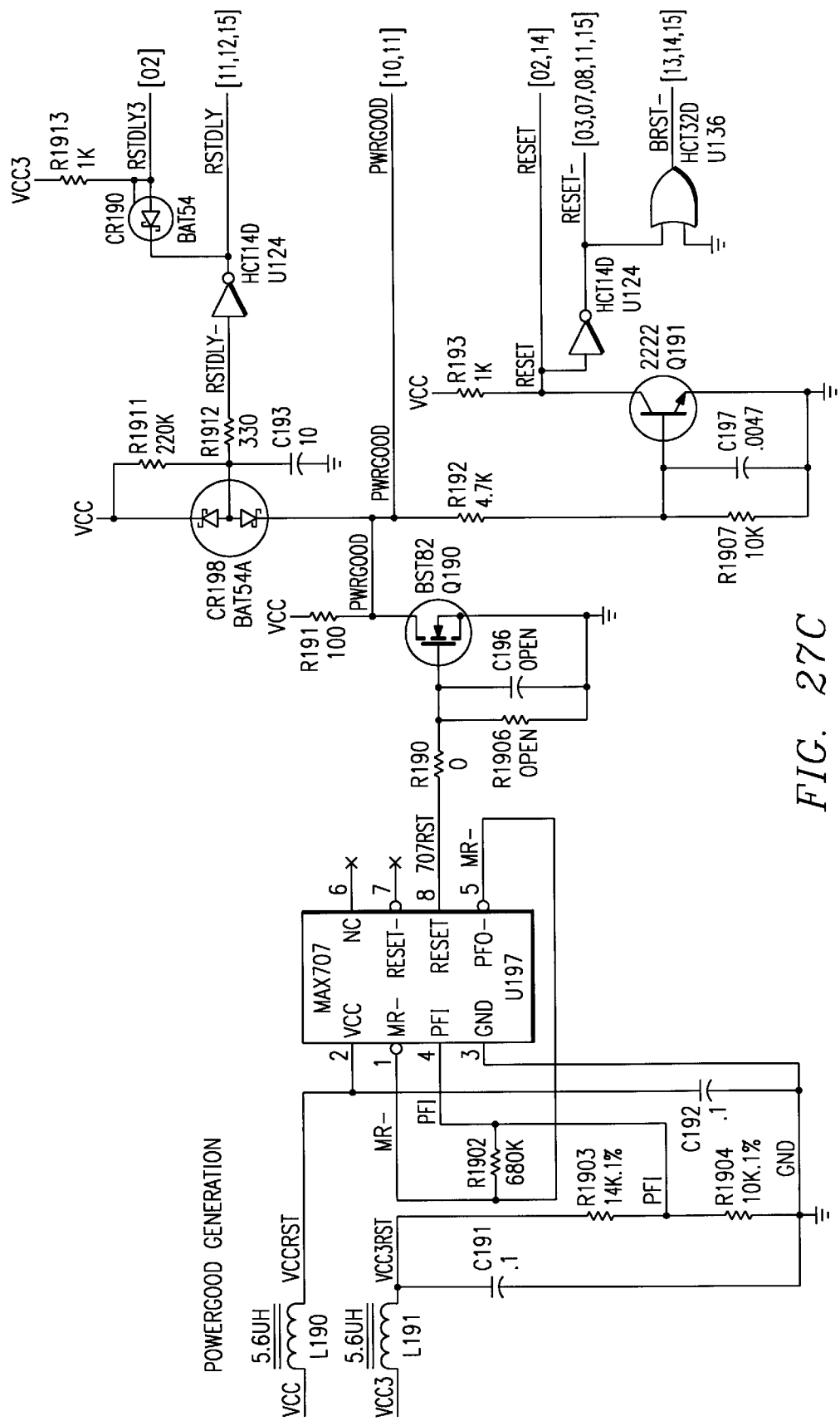
Figure 28A:
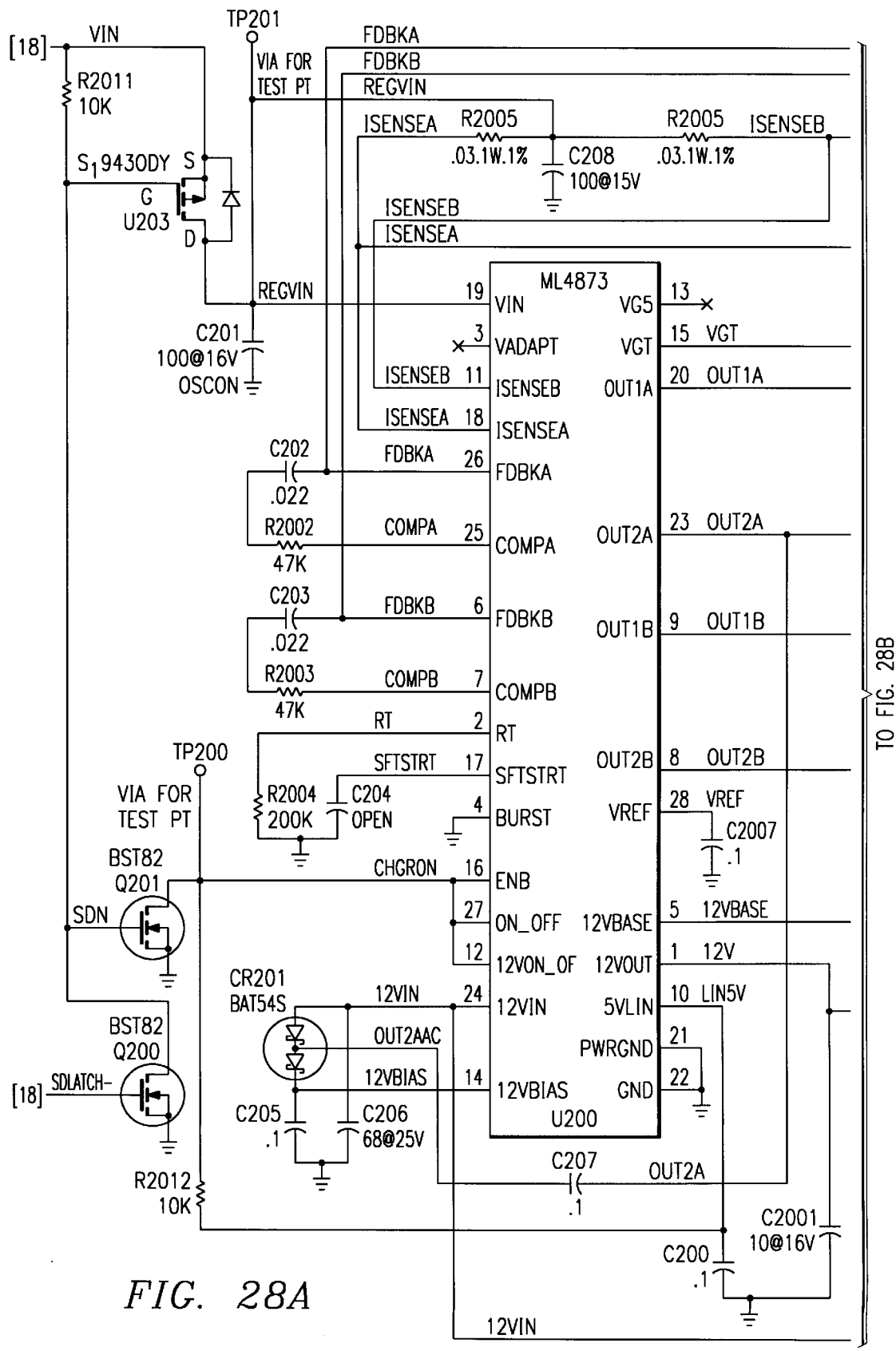
Figure 28B:
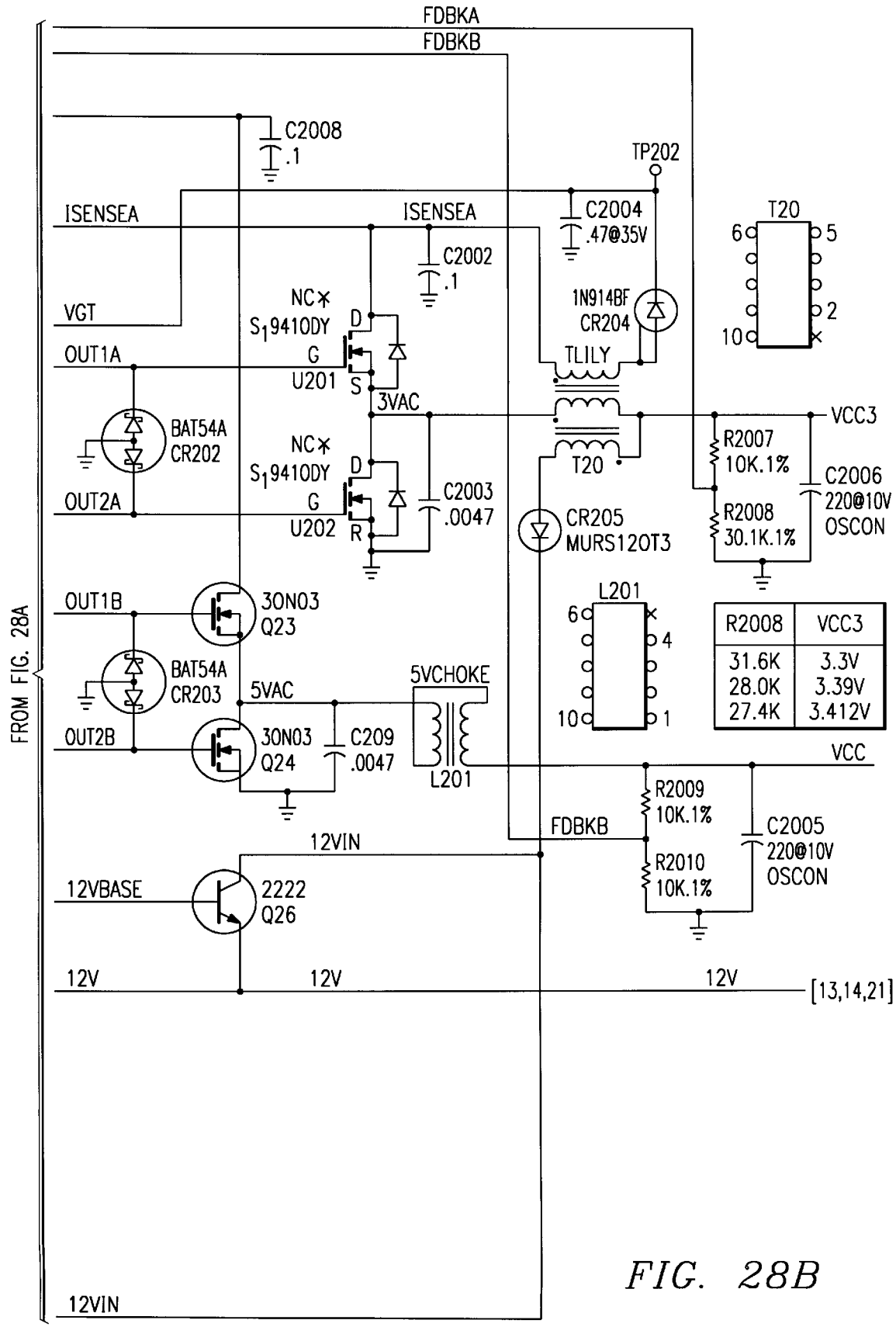
Figure 29A:
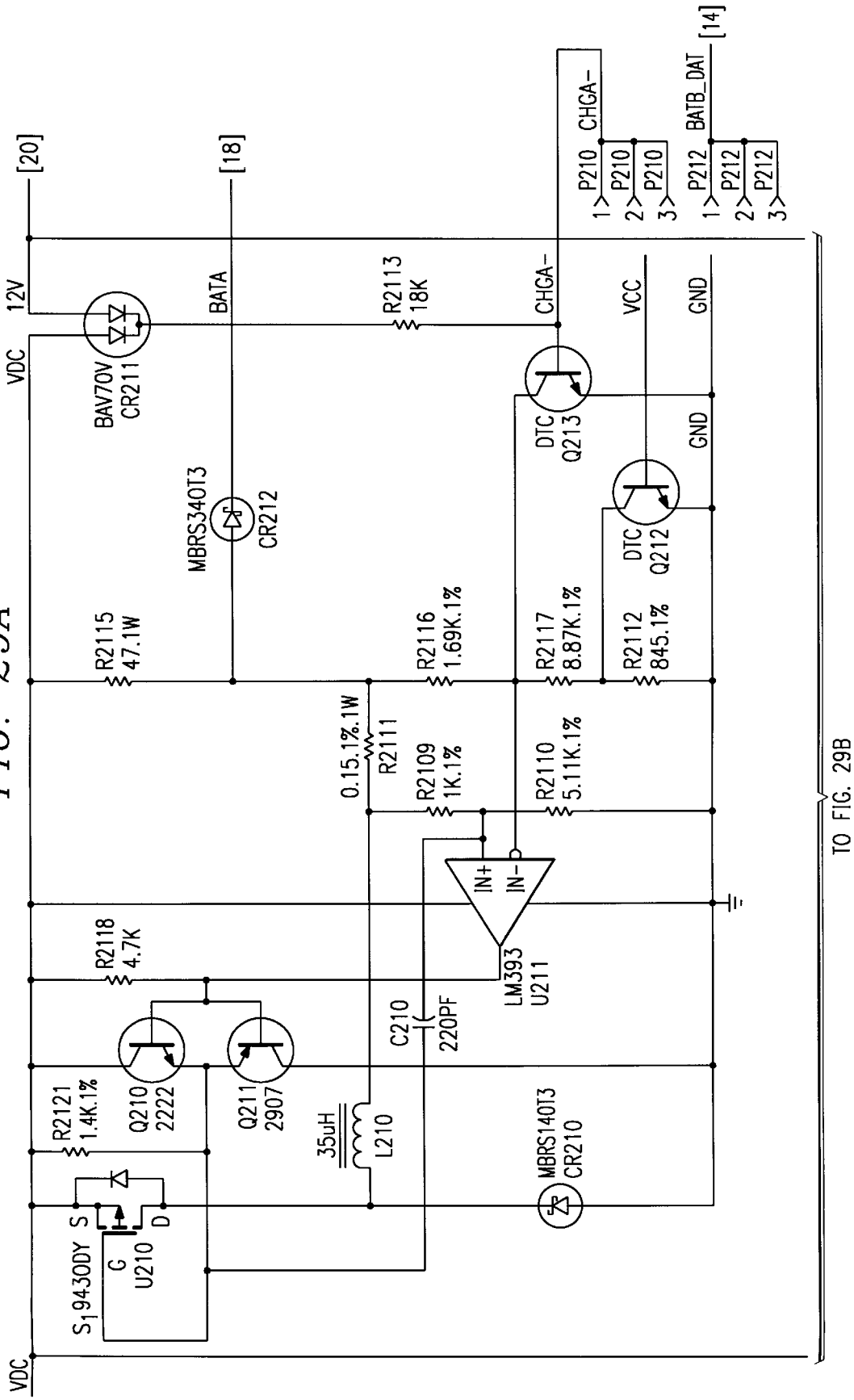
Figure 29B:
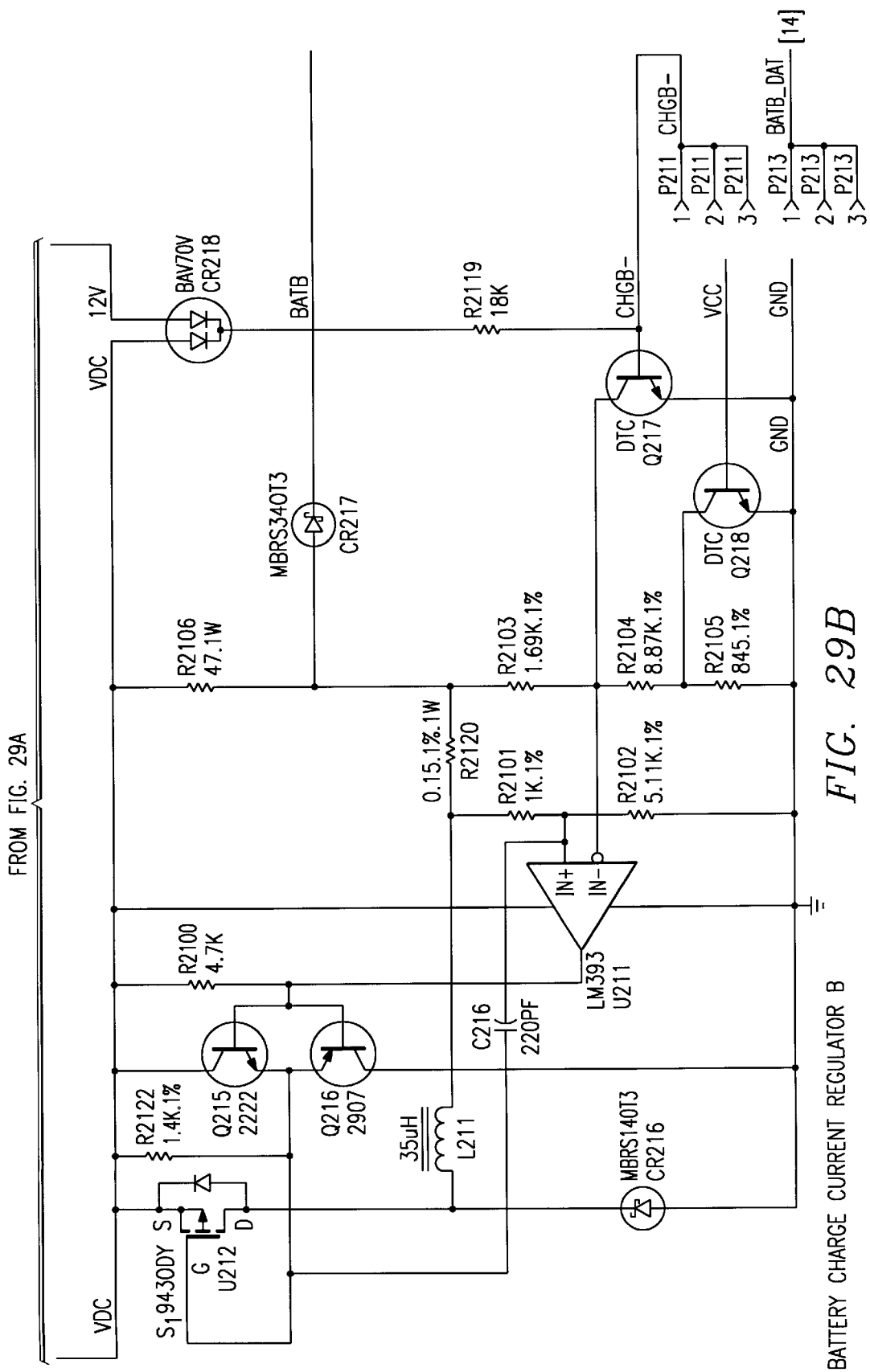
Figure 32A:
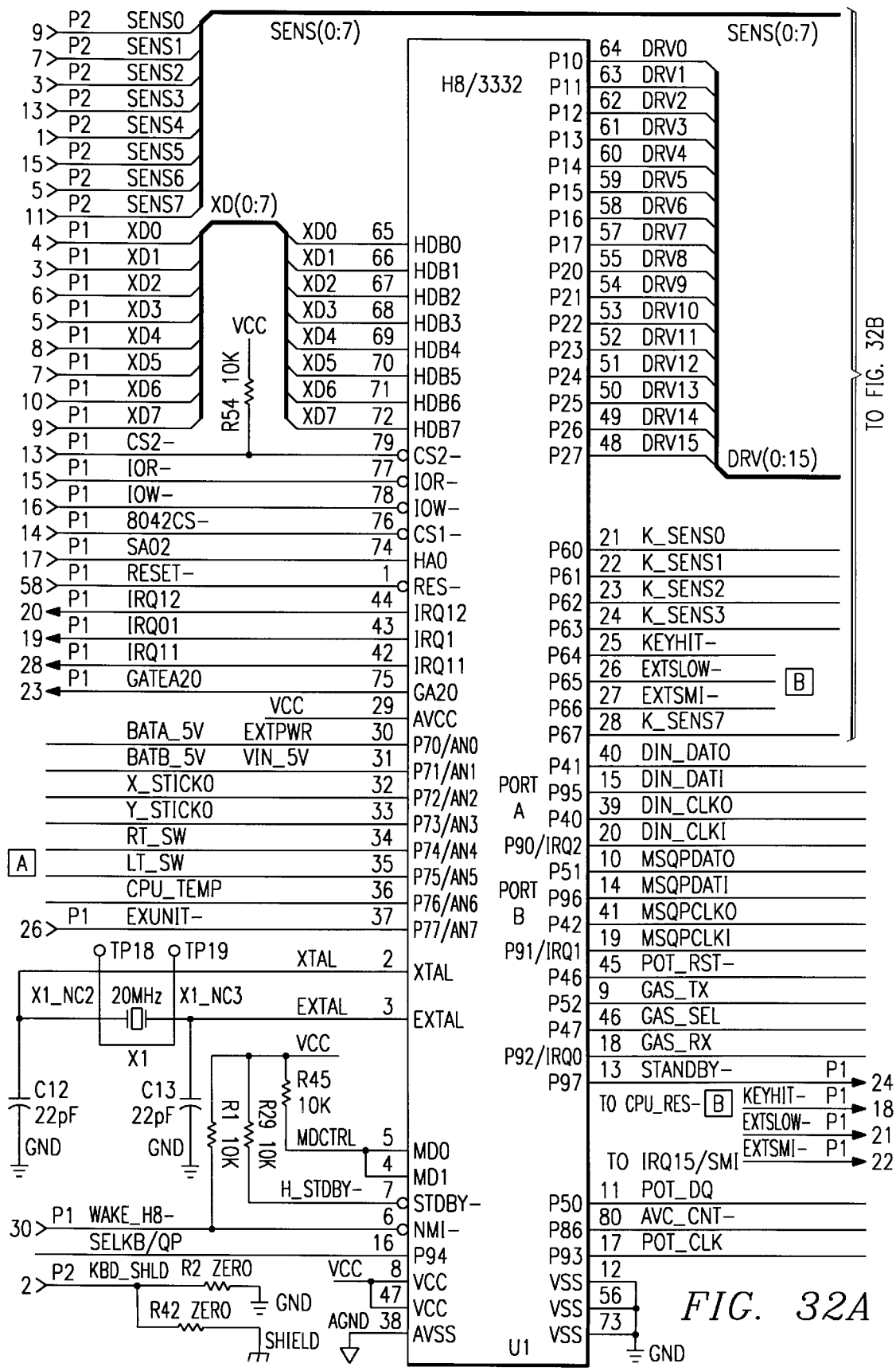
Figure 32B:
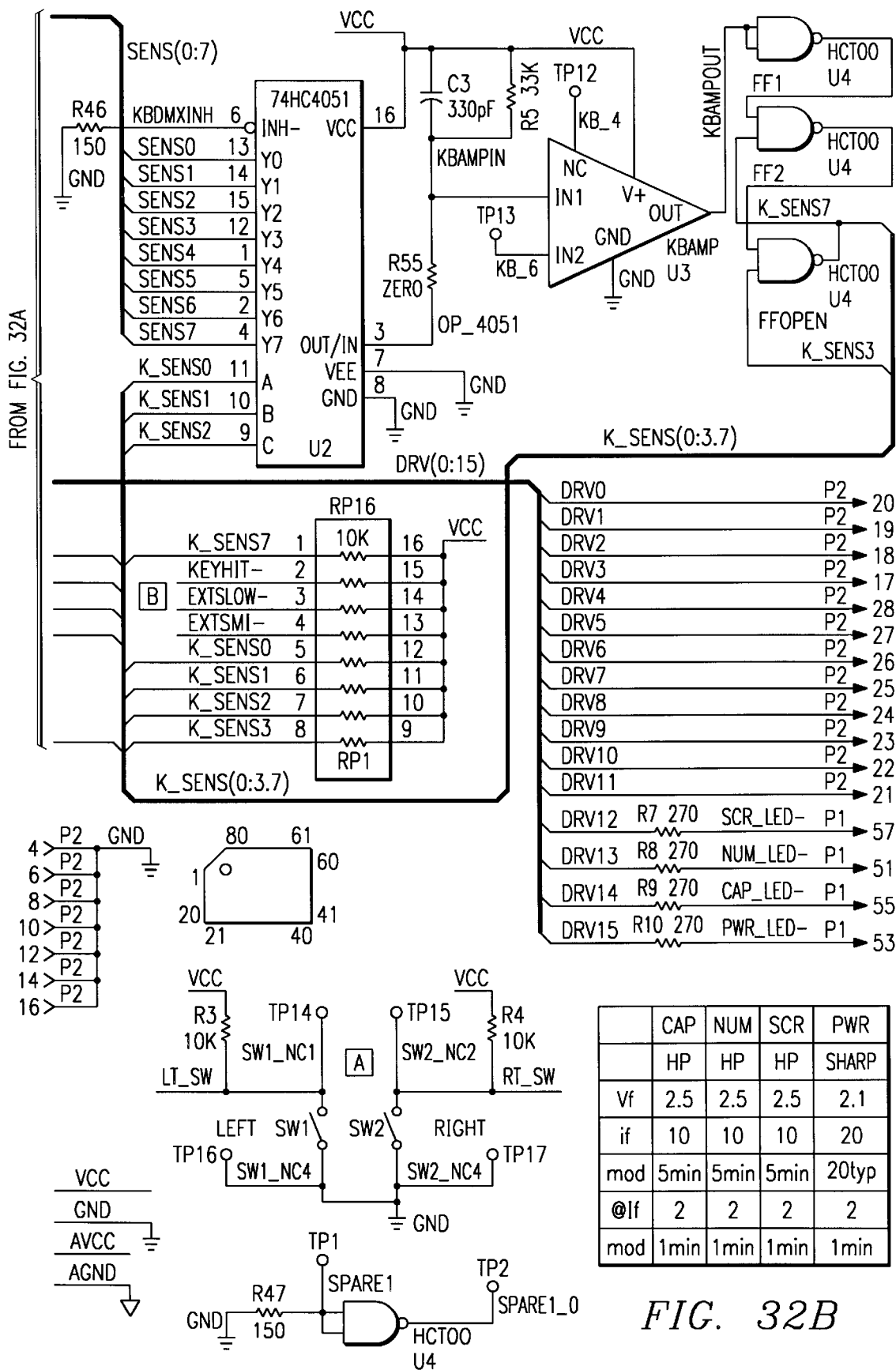
Figure 33A:
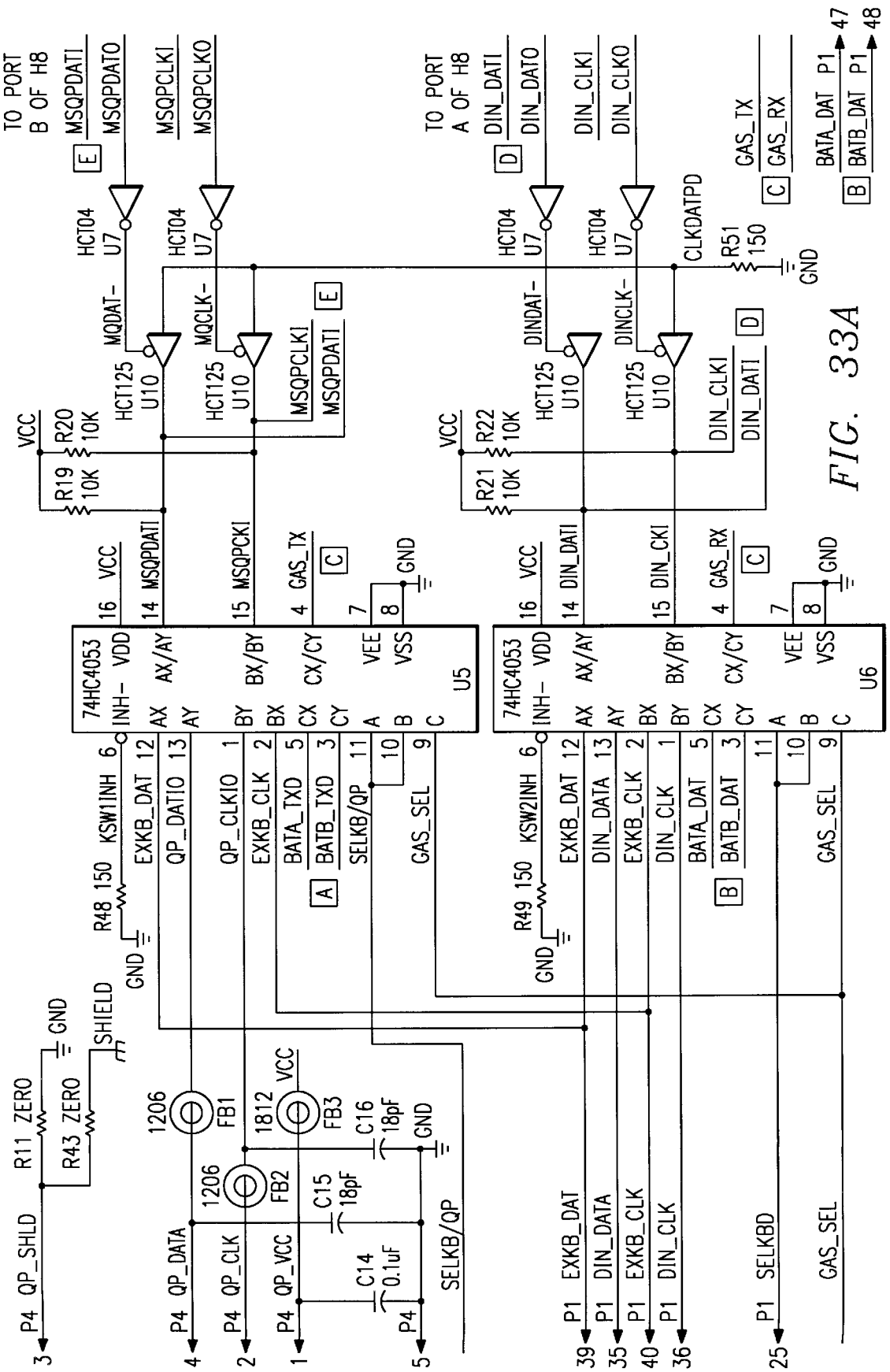
Figure 33B:
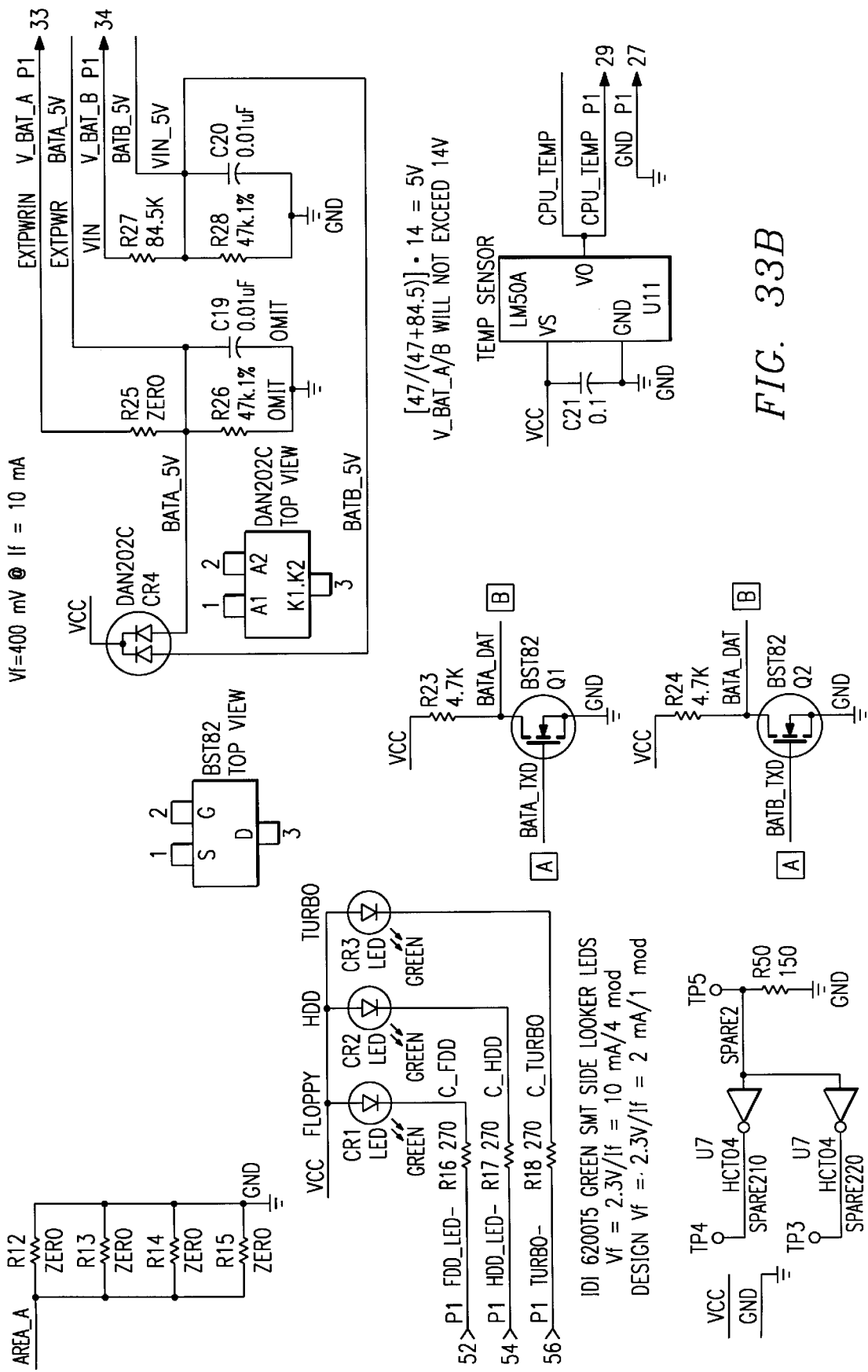
Figure 34:
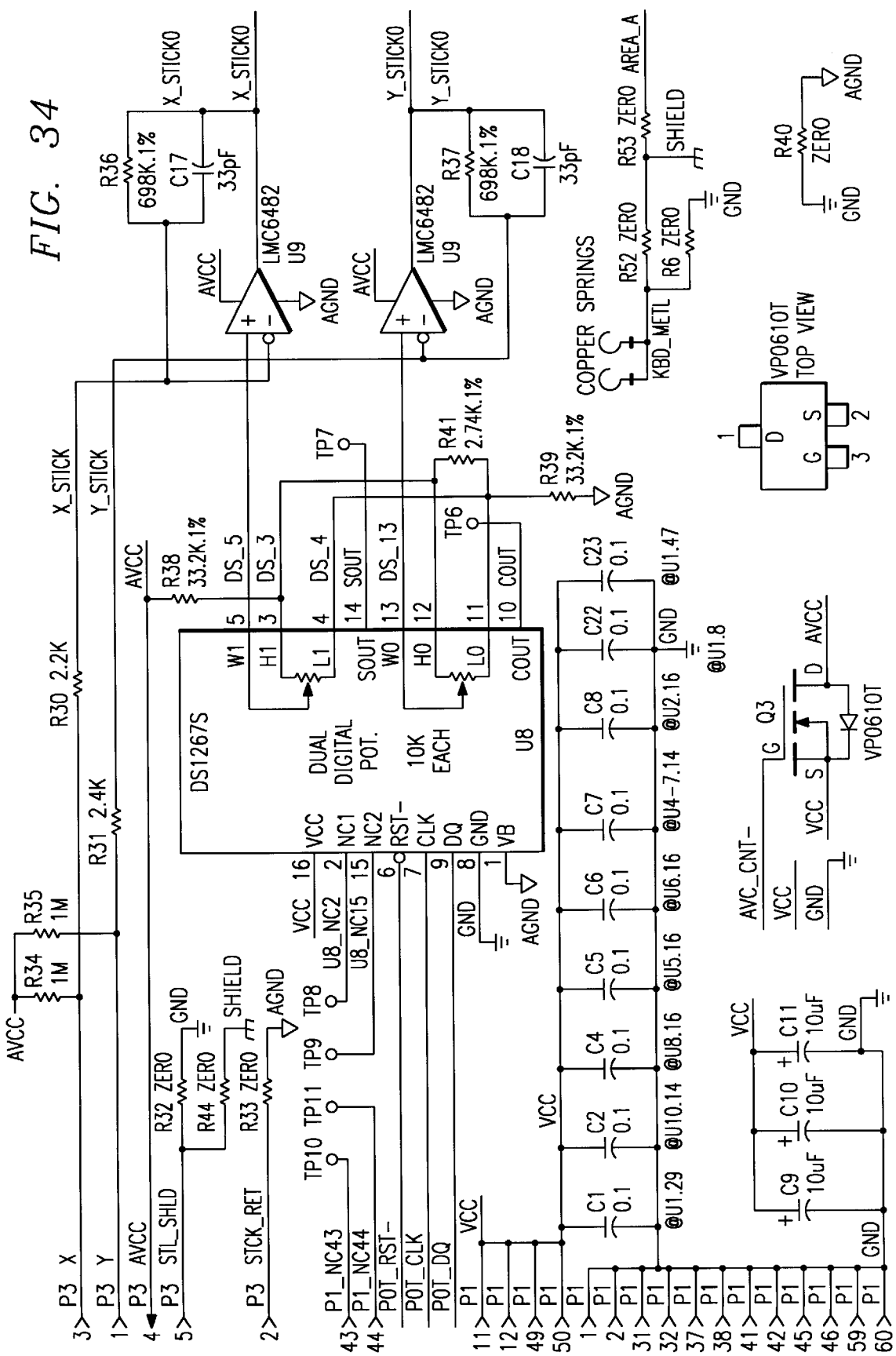
Figure 37A:
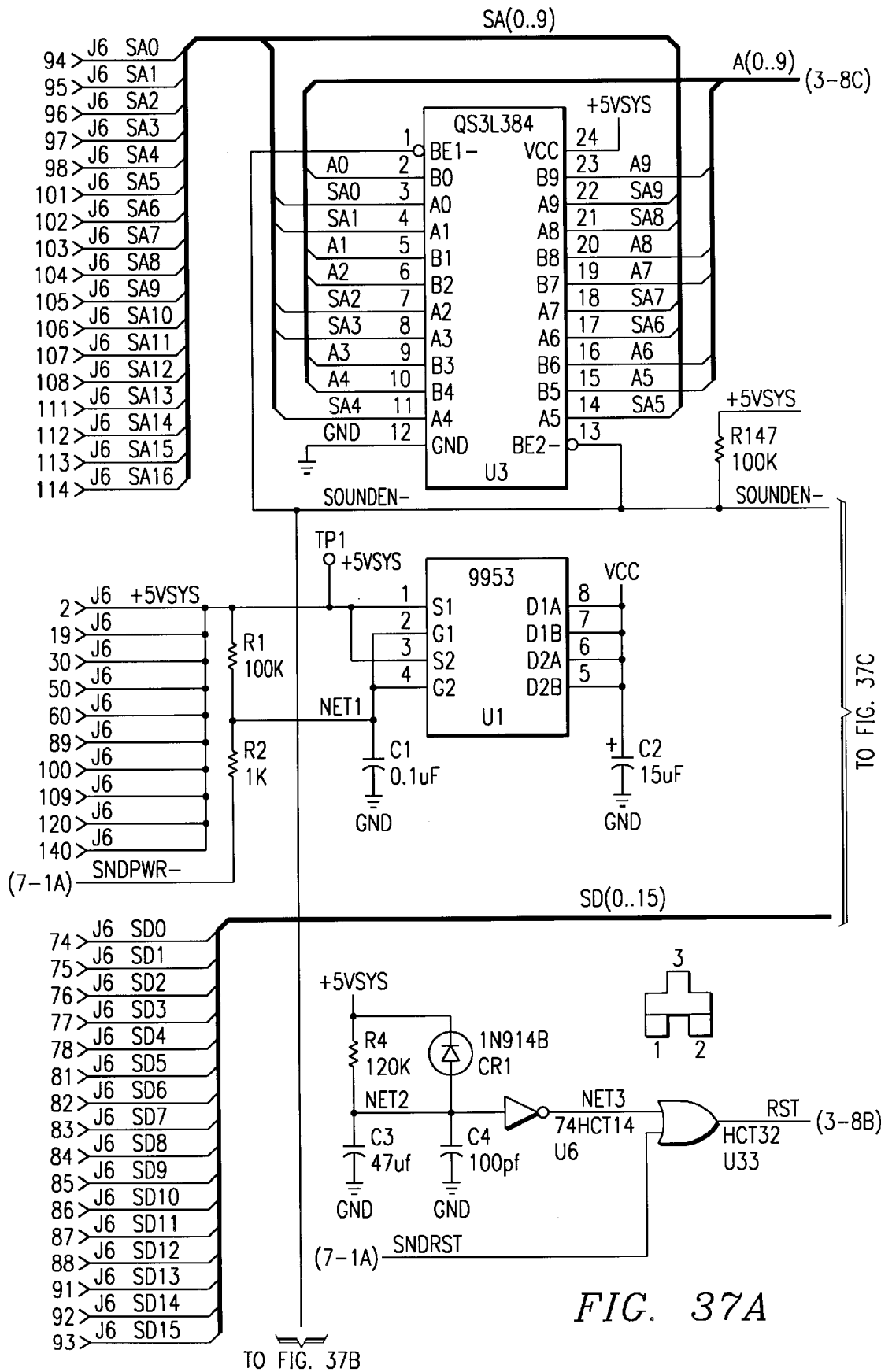
Figure 37B:
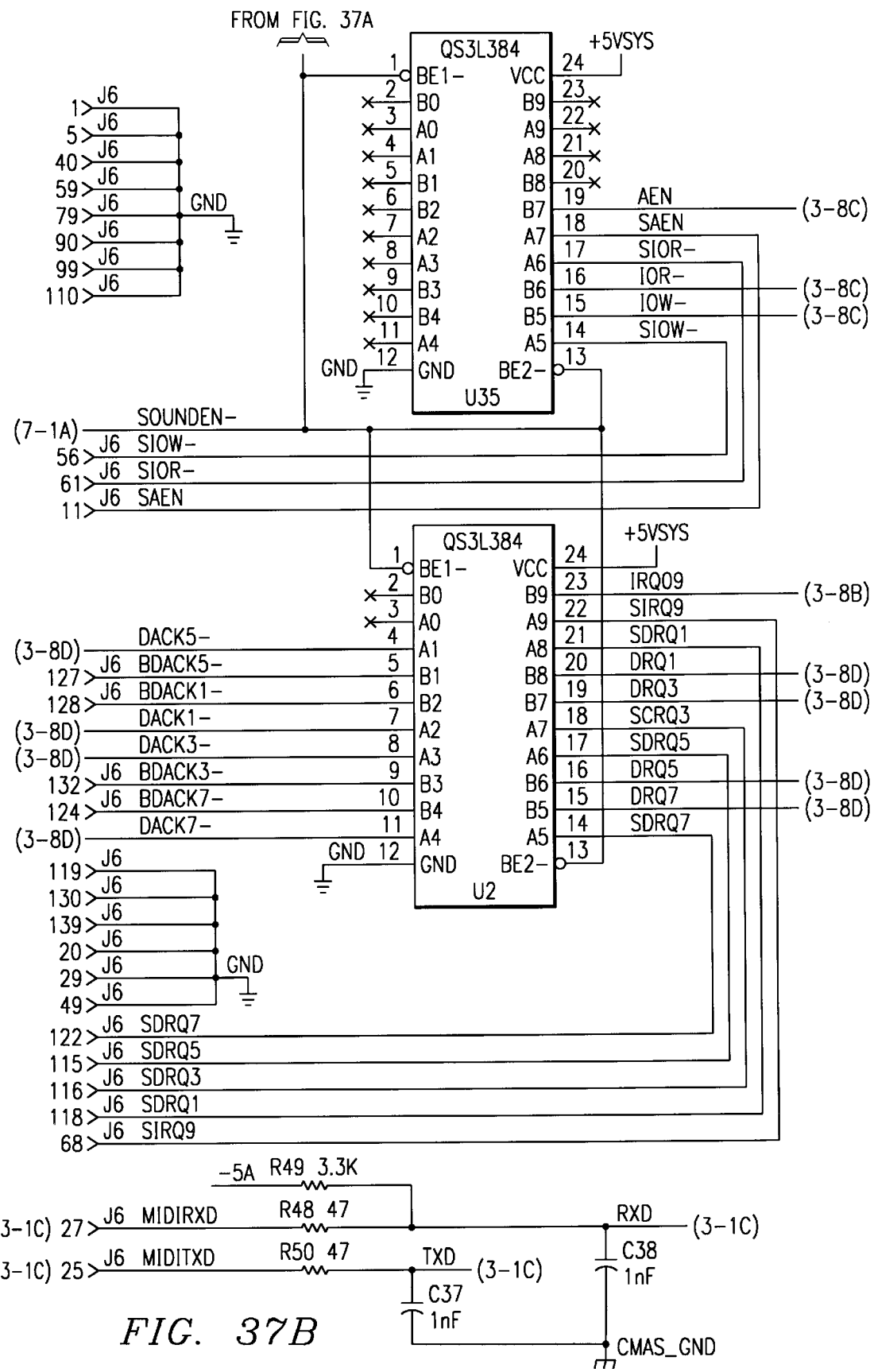
Figure 37C:
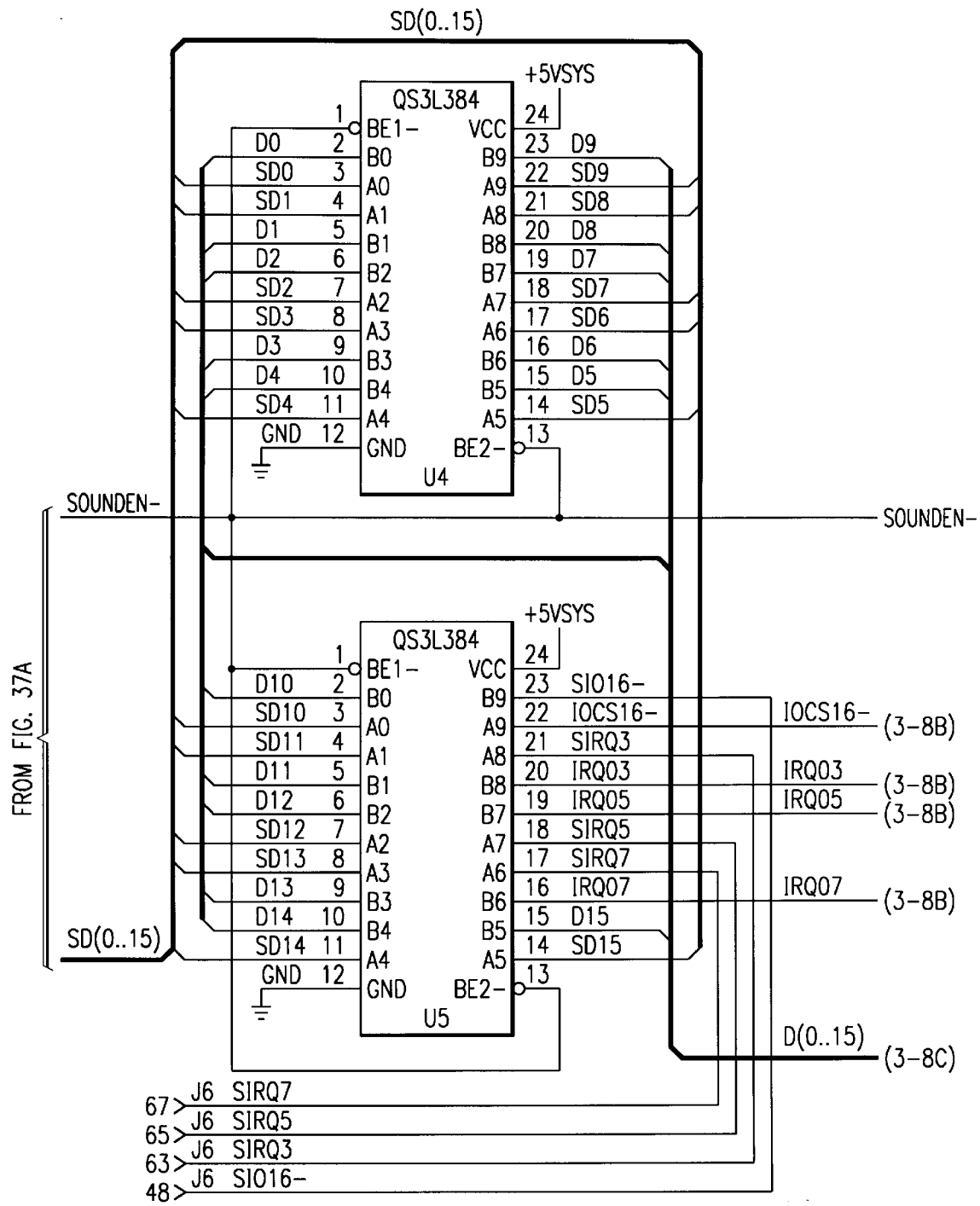
Figure 38A:
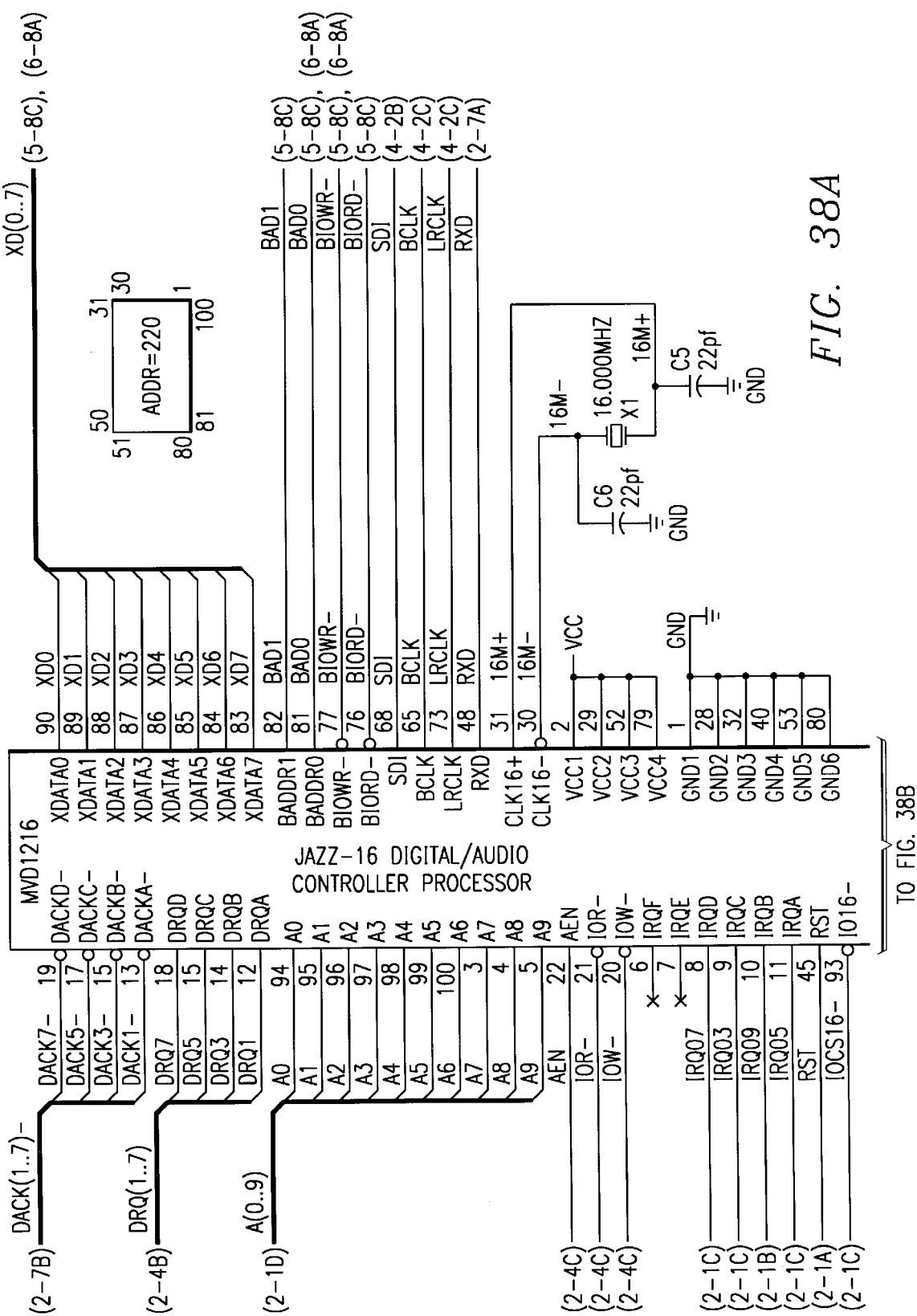
Figure 38B:
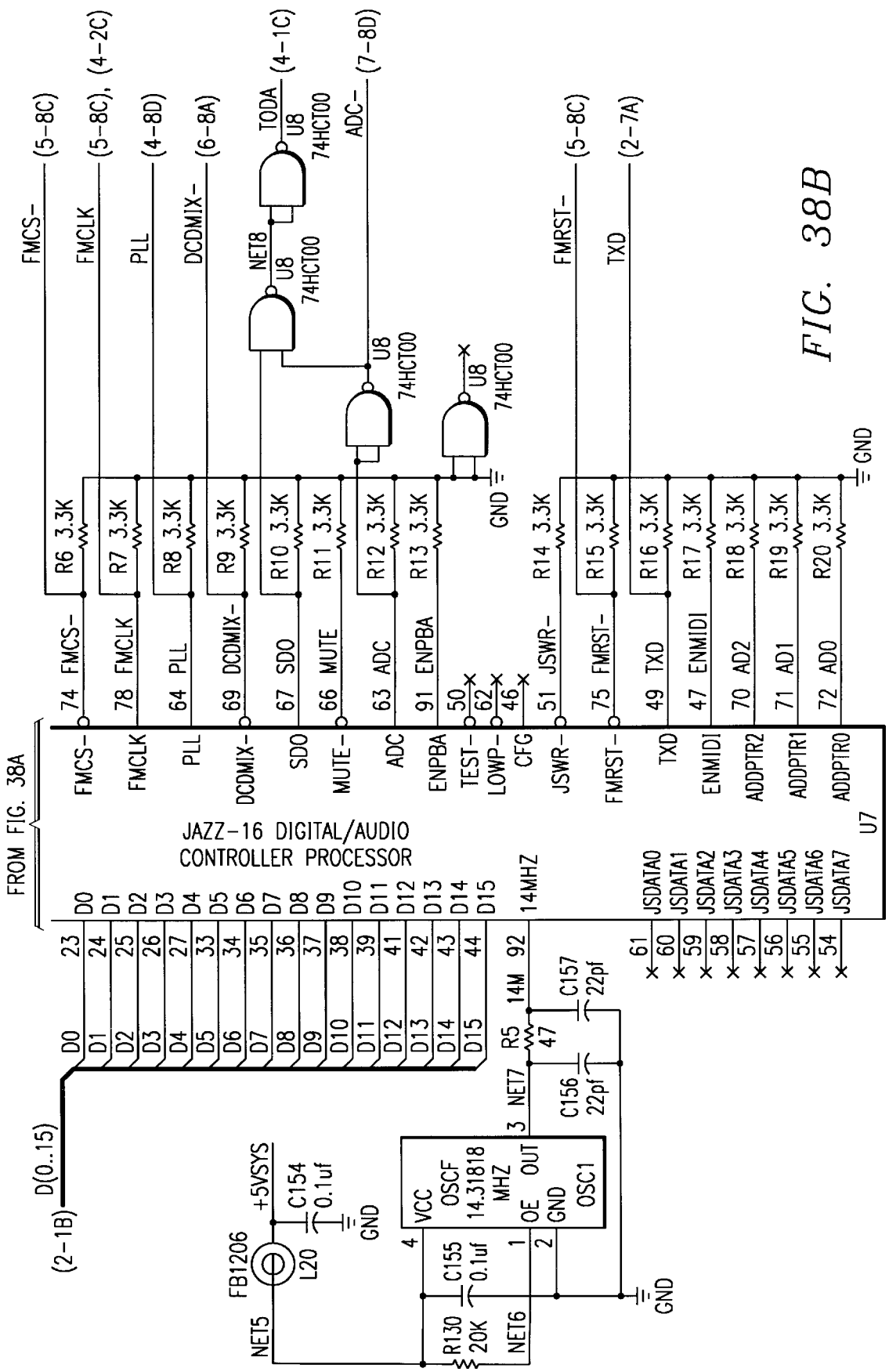
Figure 39A:
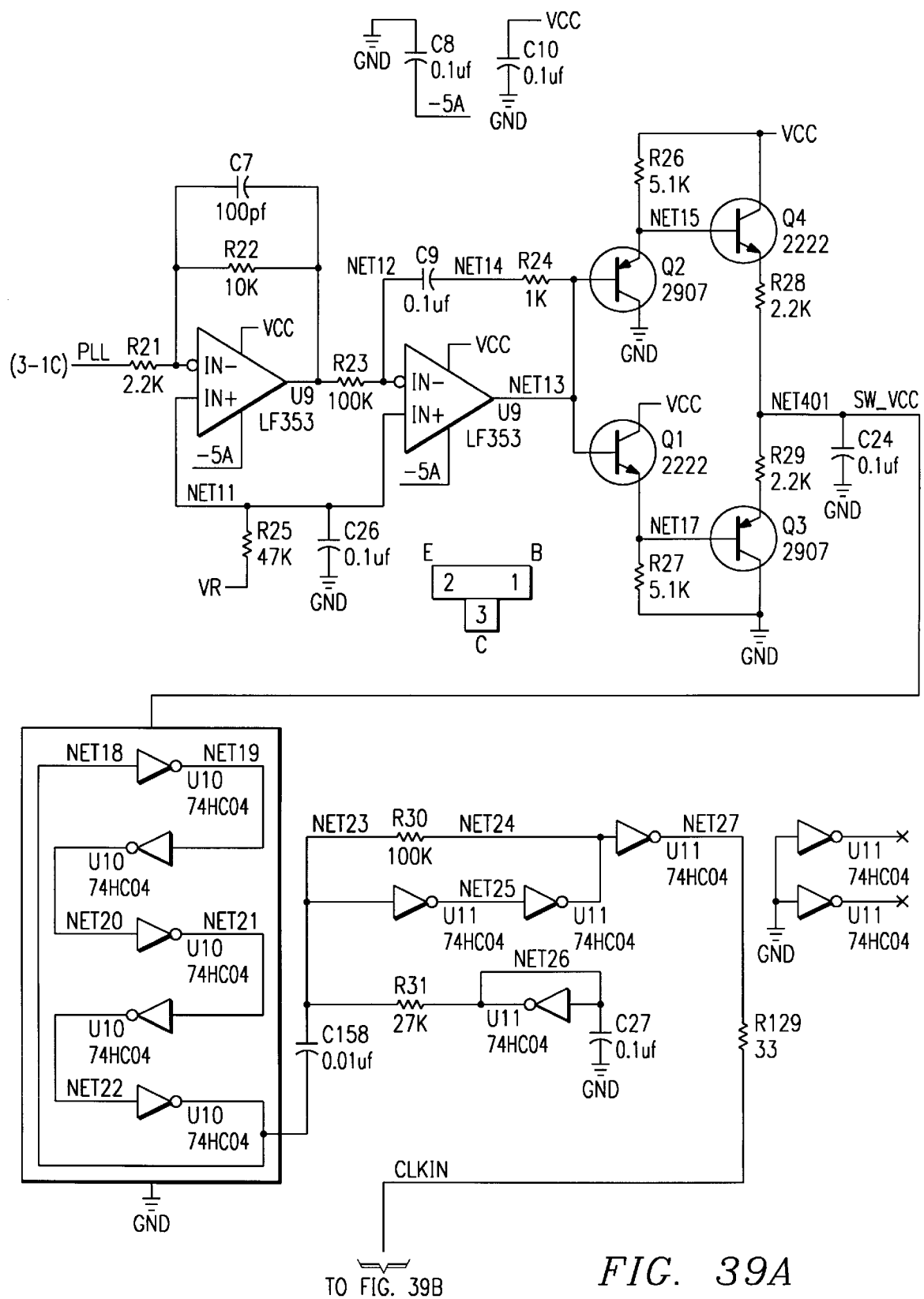
Figure 40:
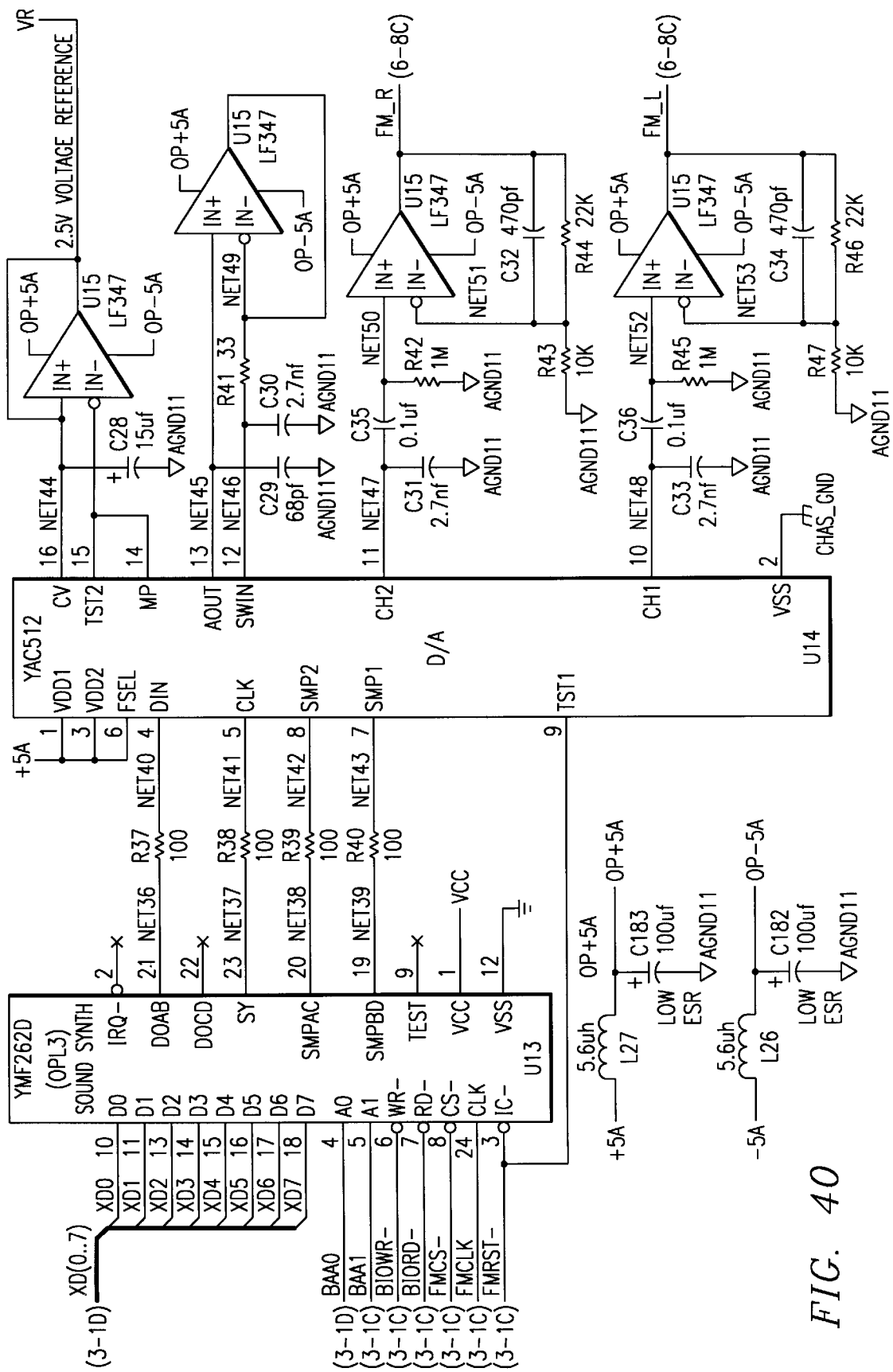
Figure 41:
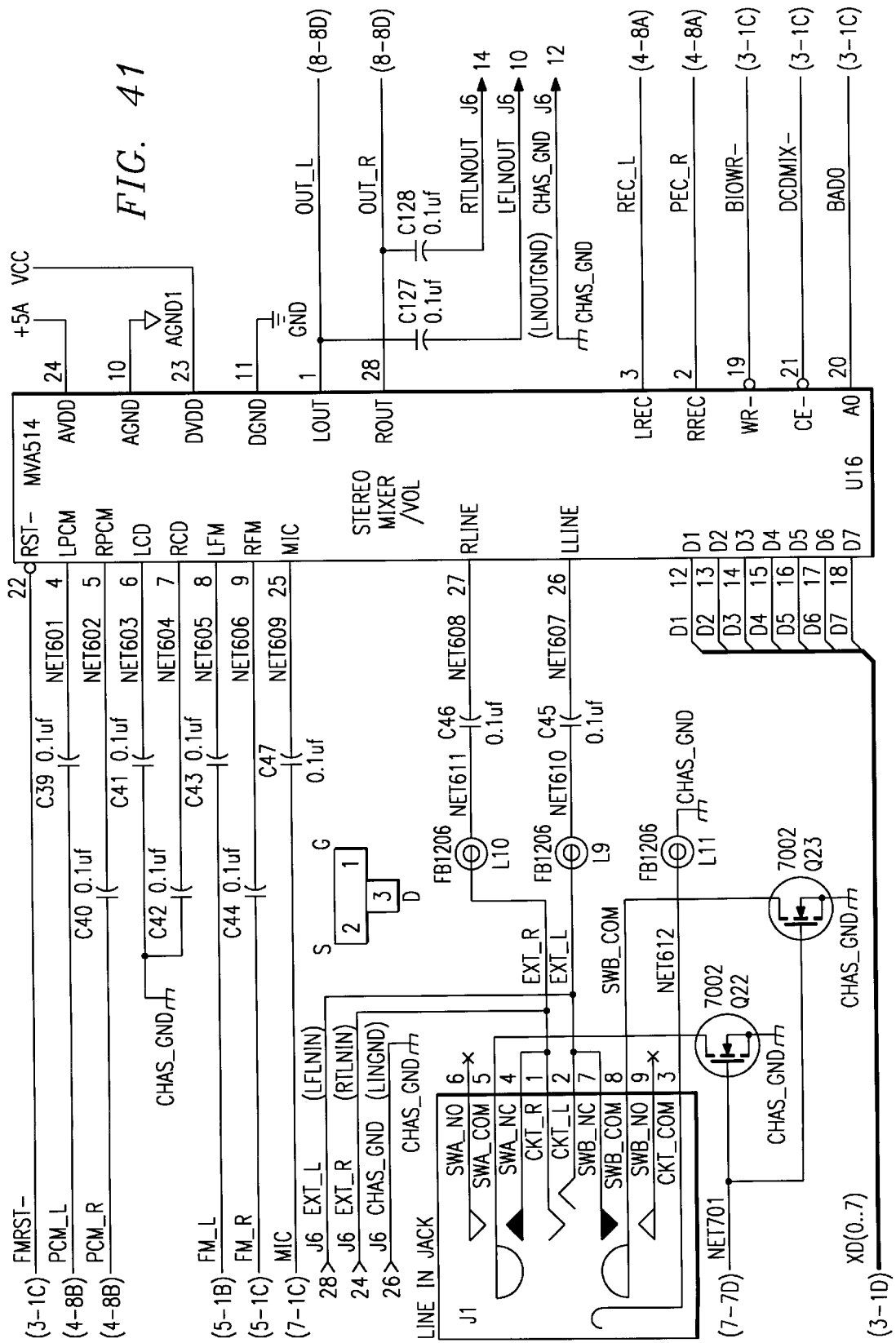
Figure 42A:
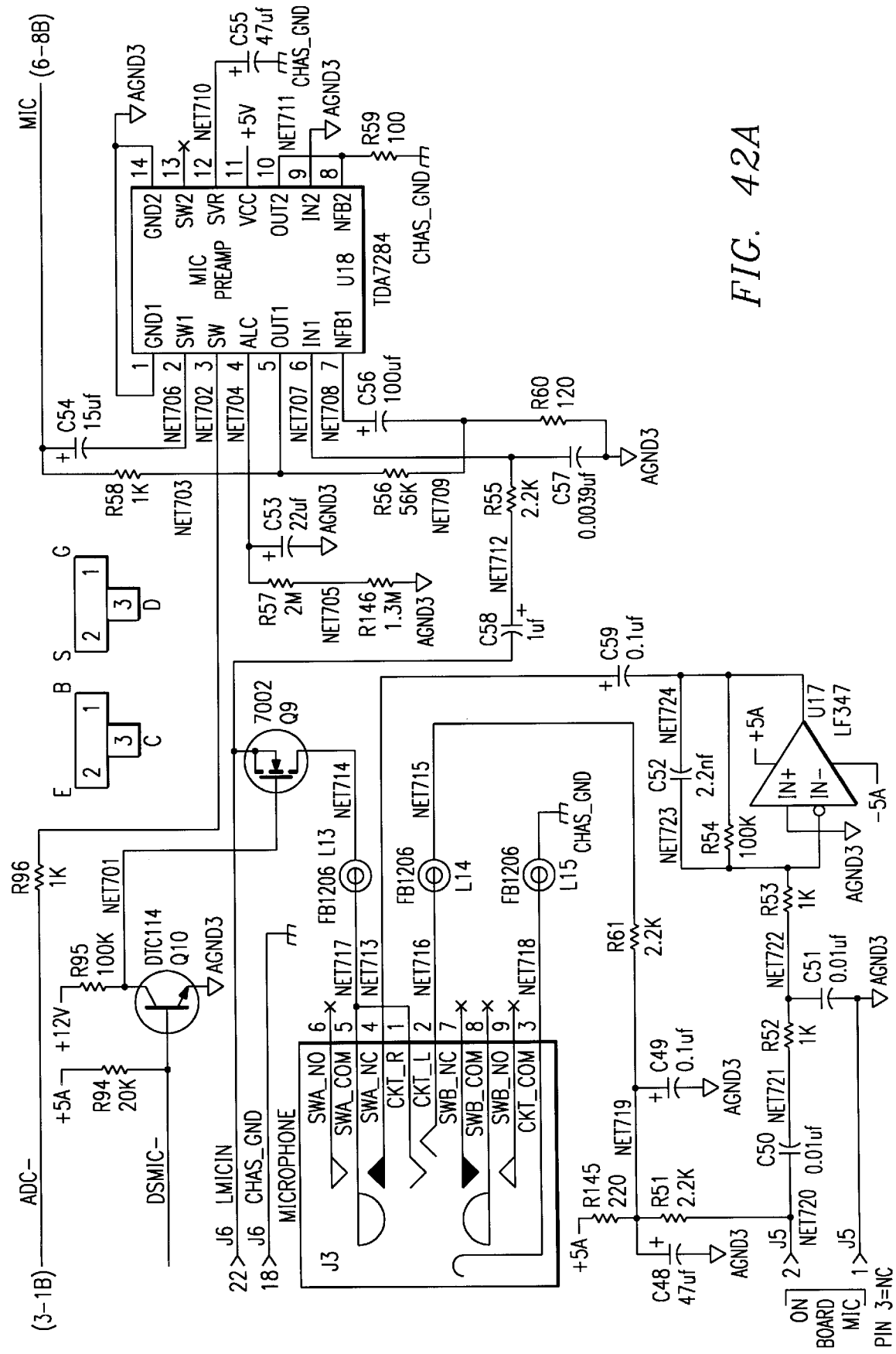
Figure 42B:
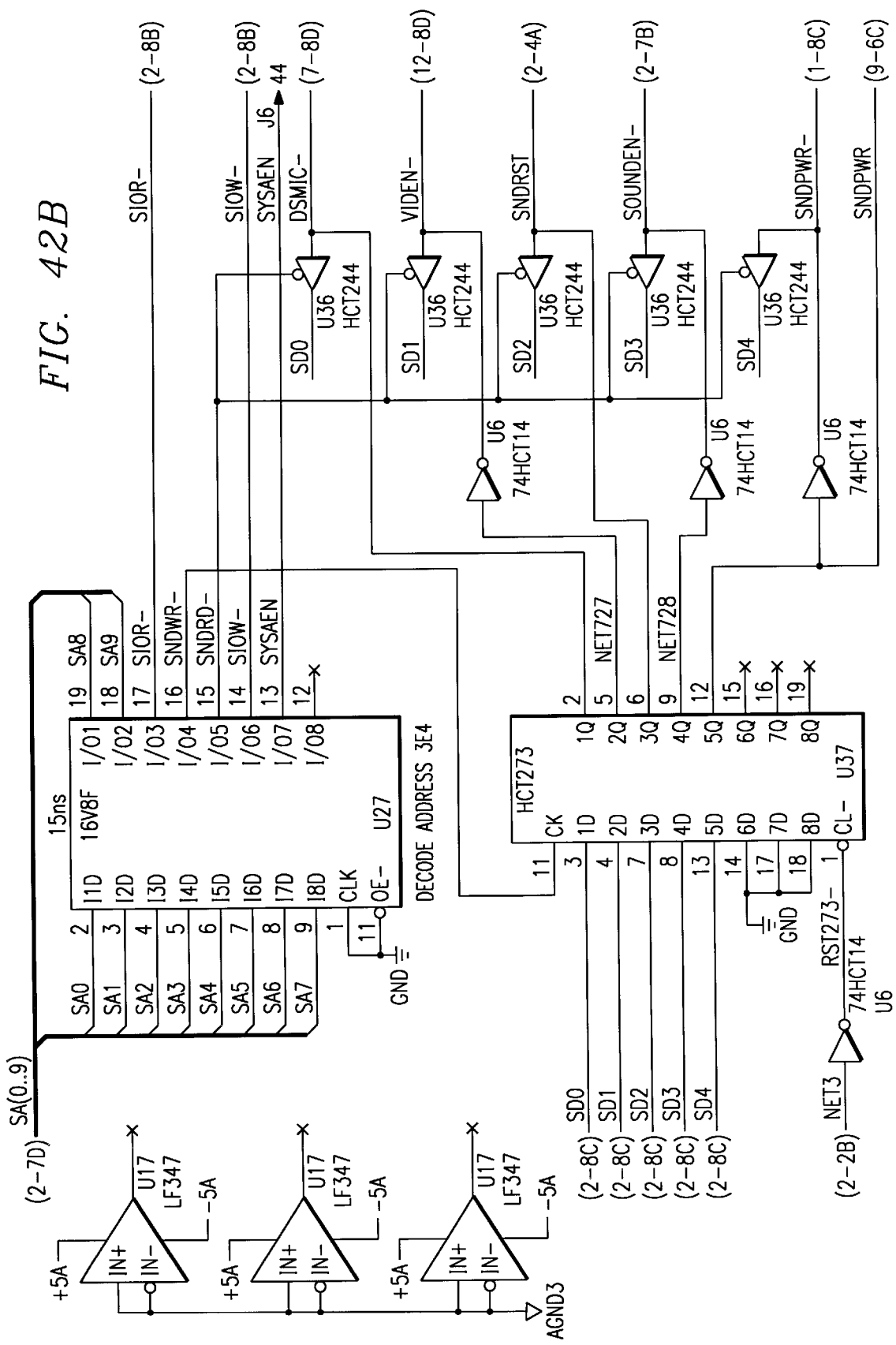
Figure 43:
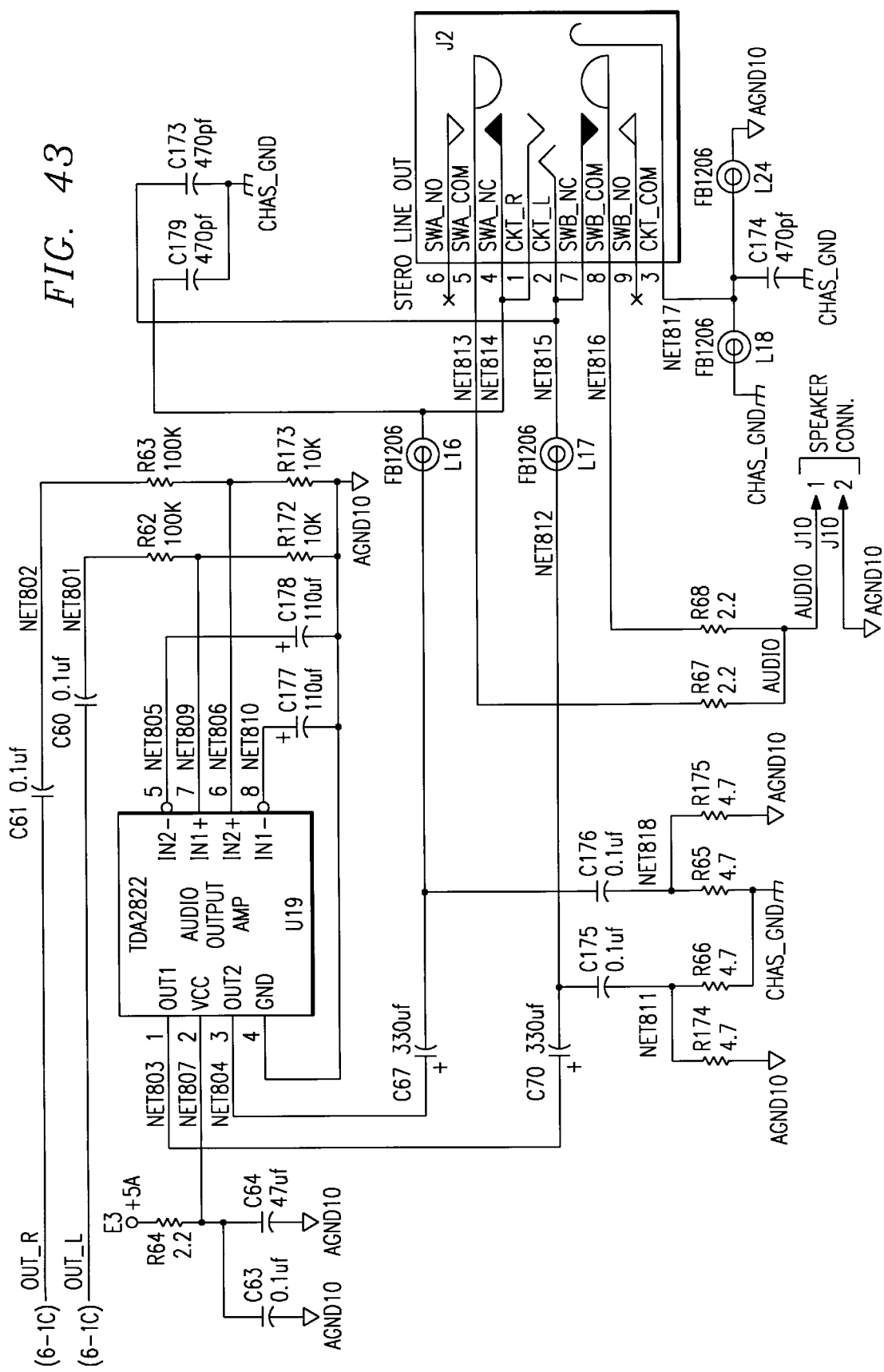
Figure 44A:
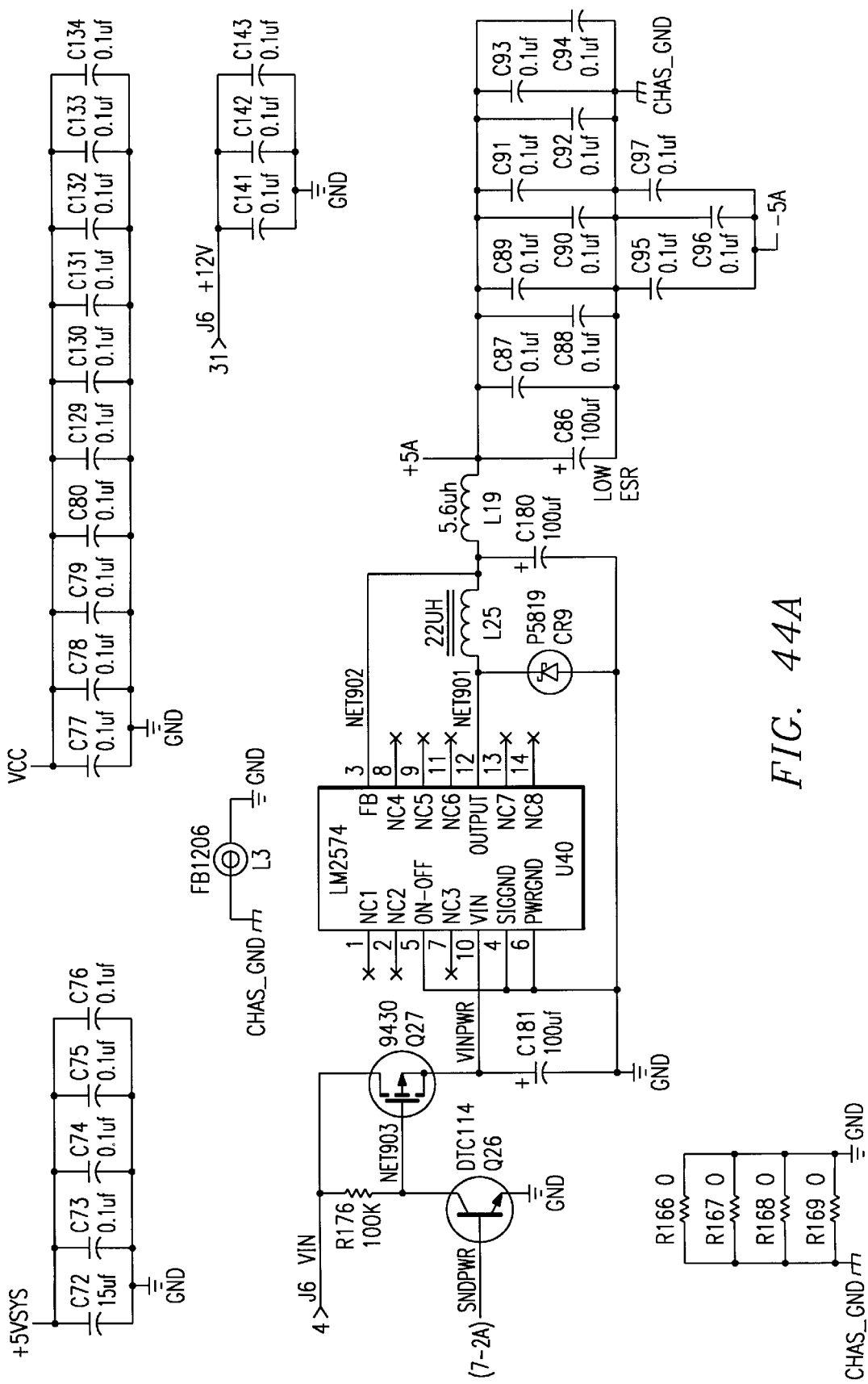
Figure 44B:
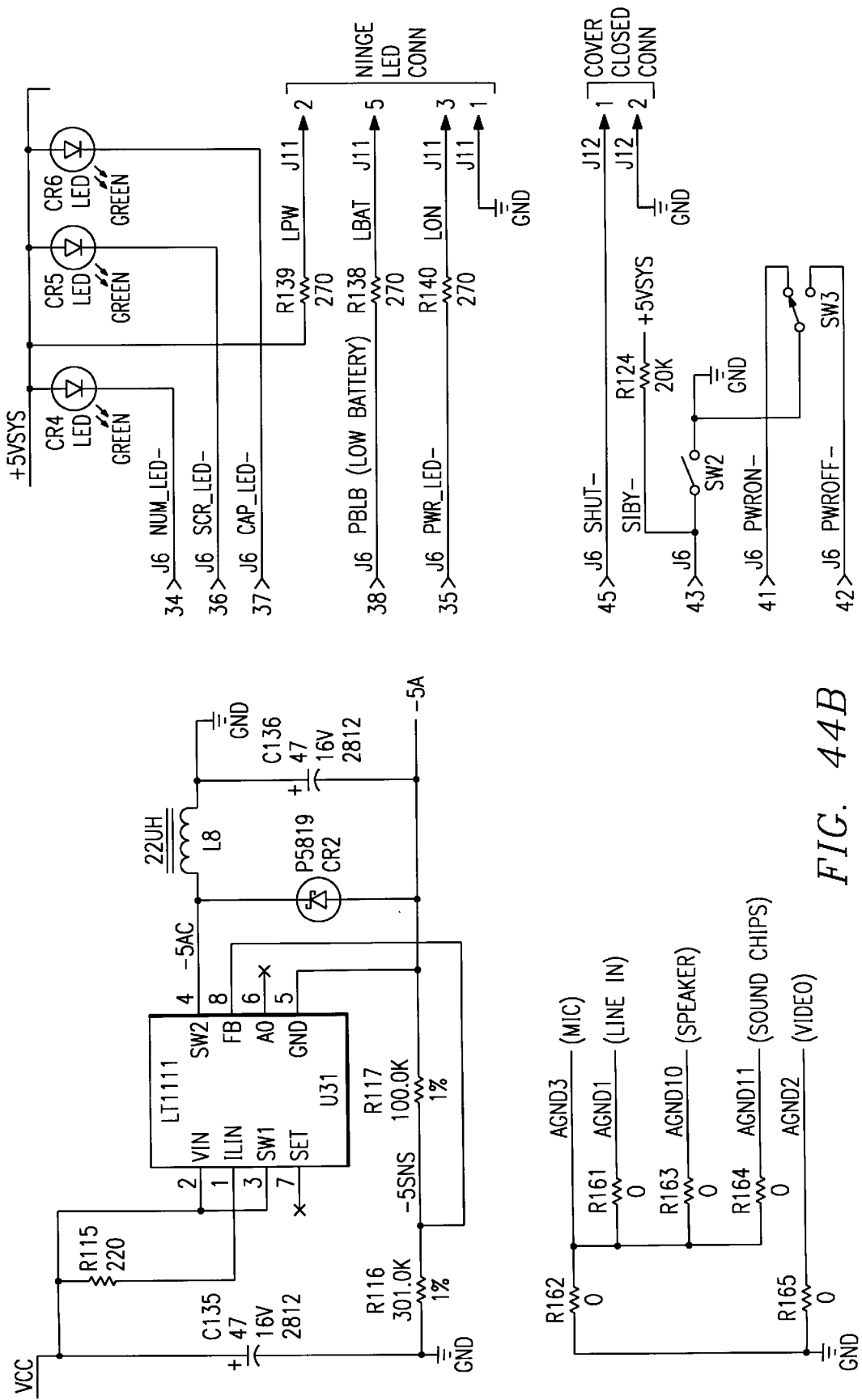
Figure 45B:
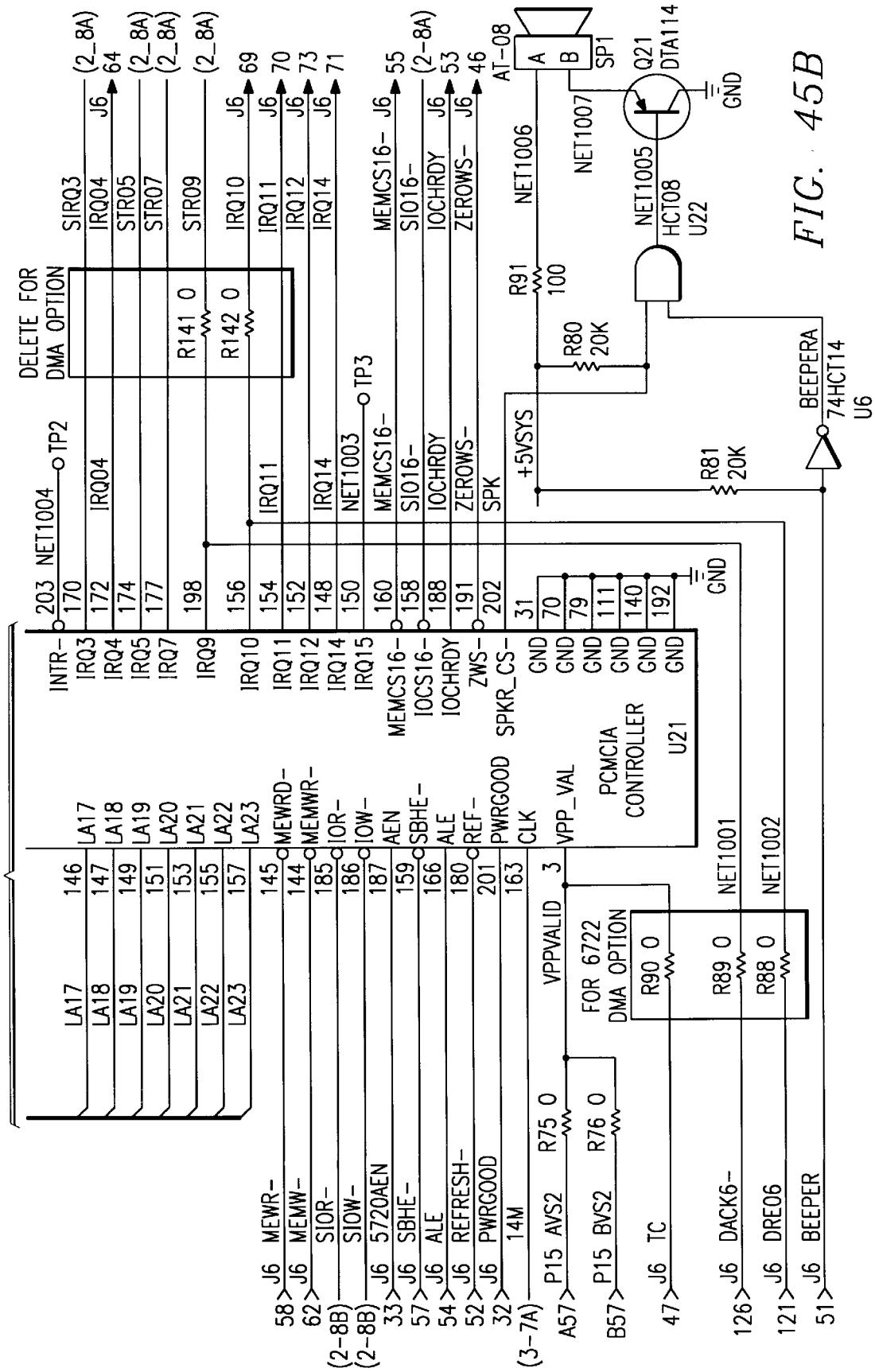
Figure 46A:
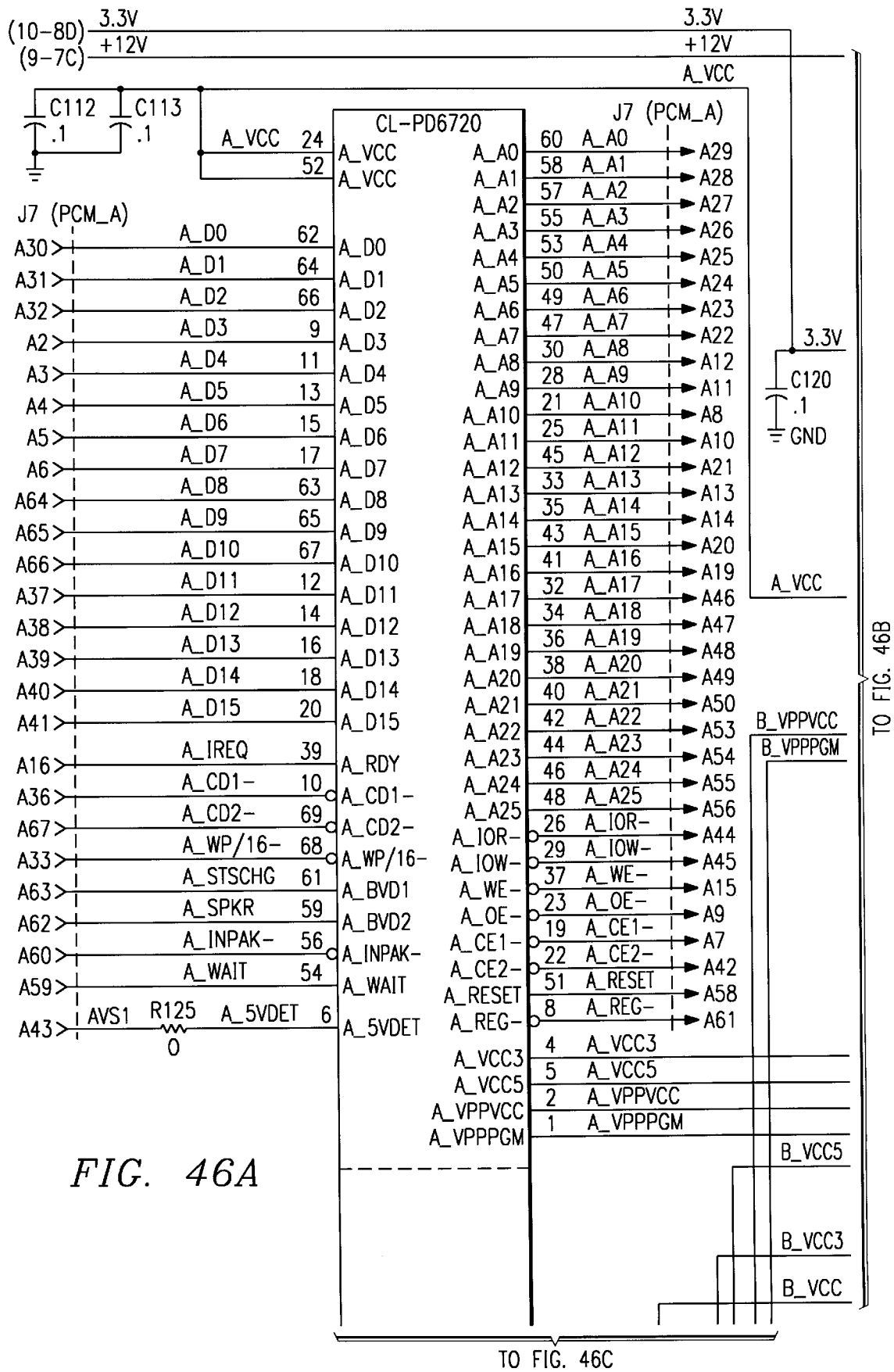
Figure 46B:
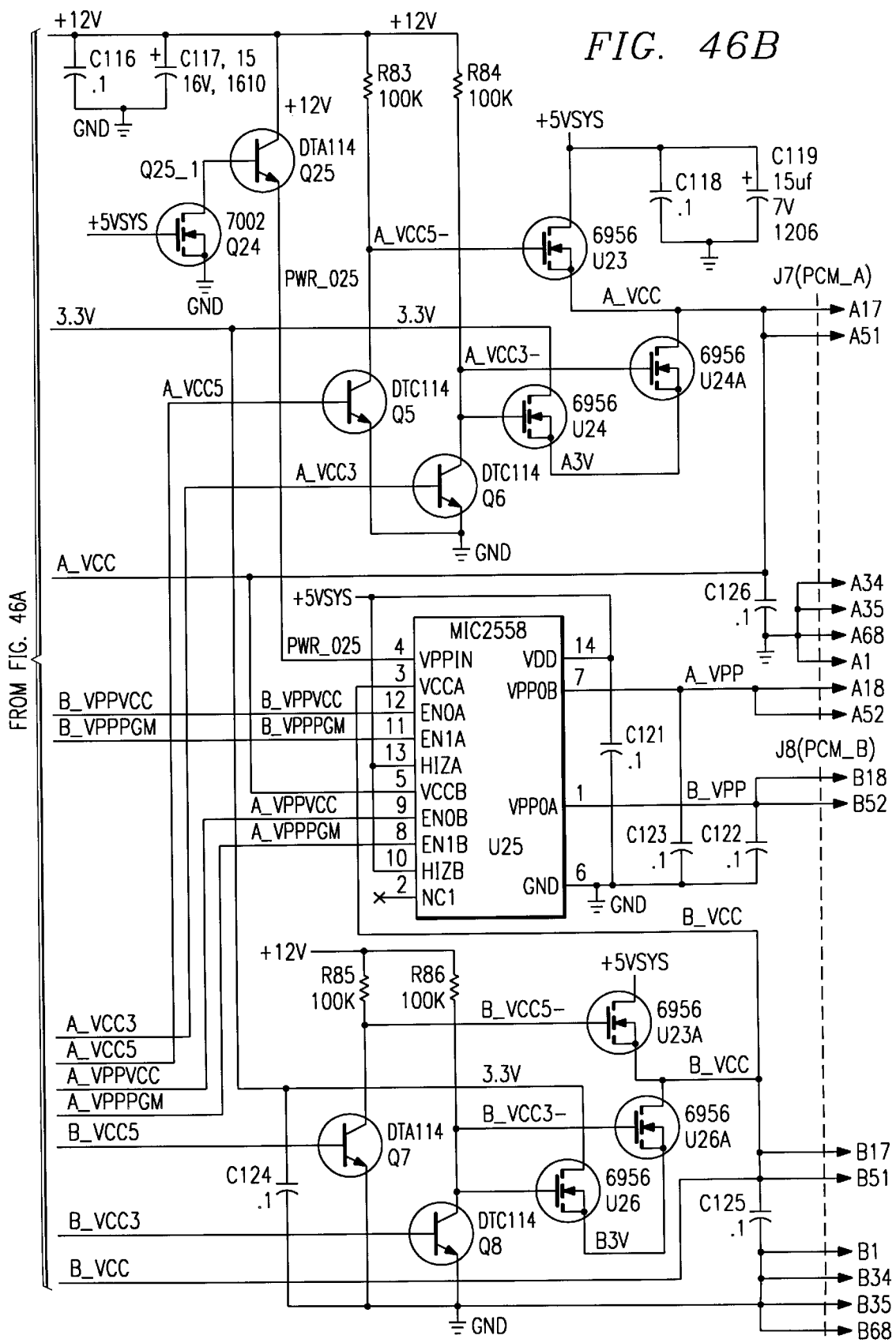
Figure 46C:
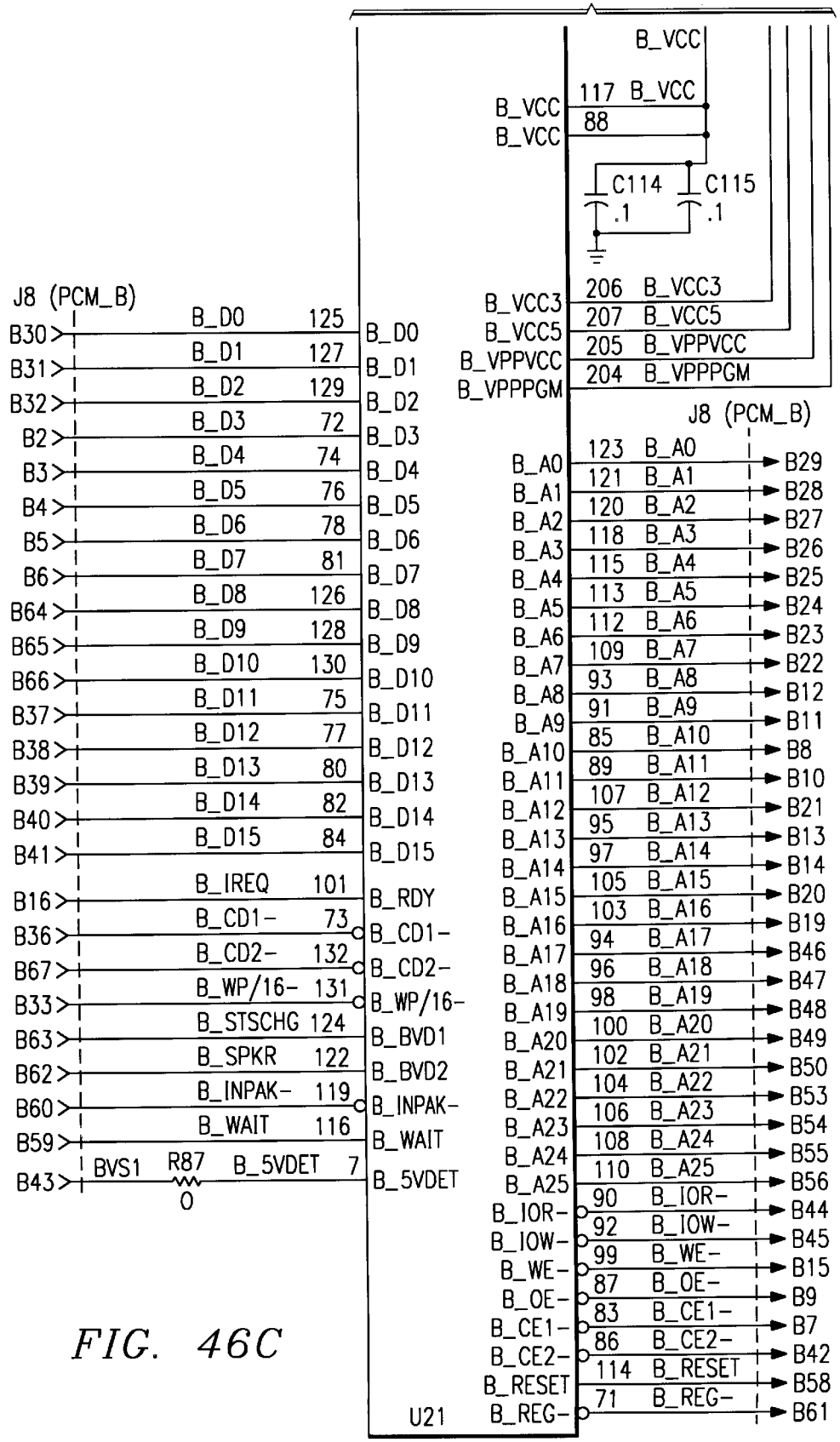
Figure 47A:
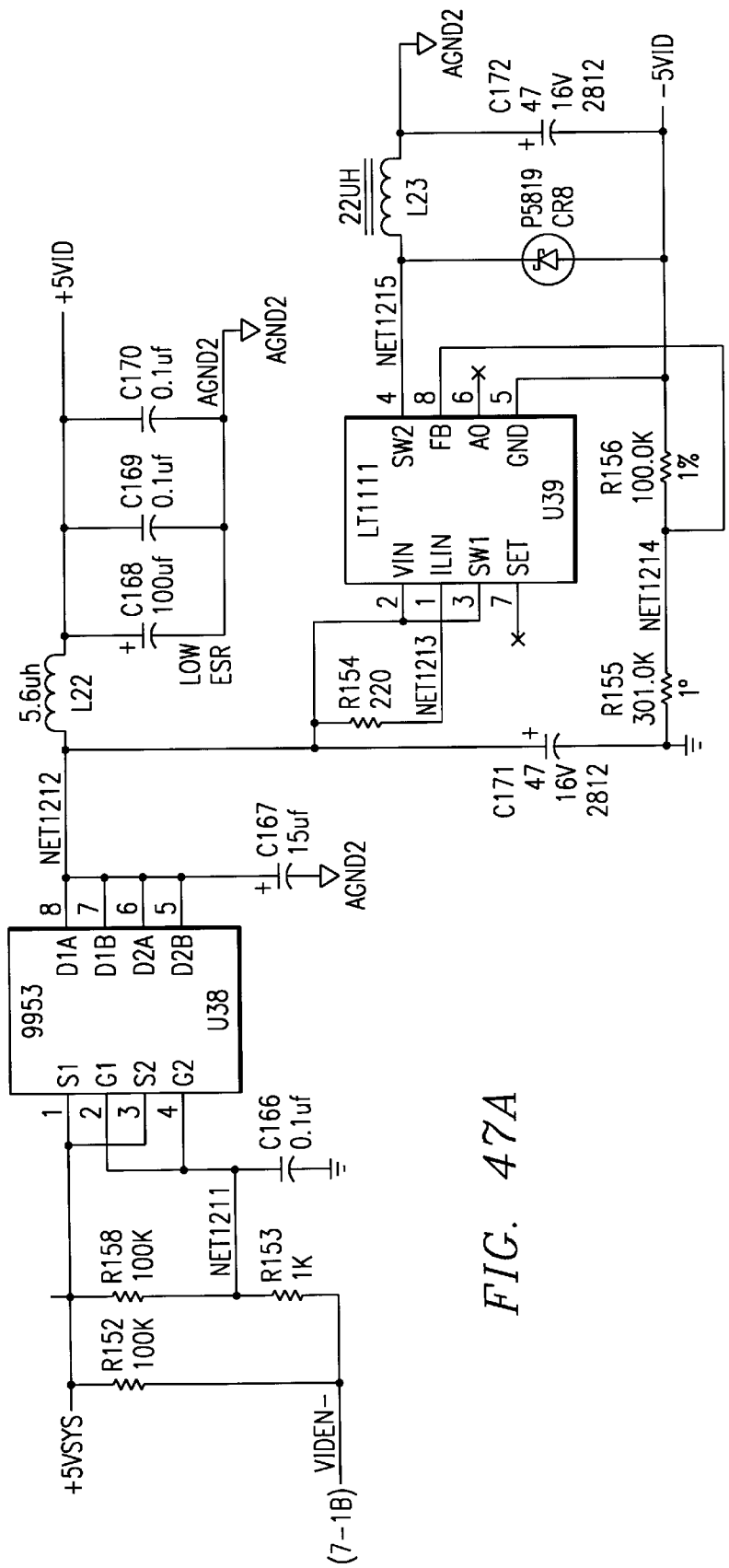
Figure 47B:
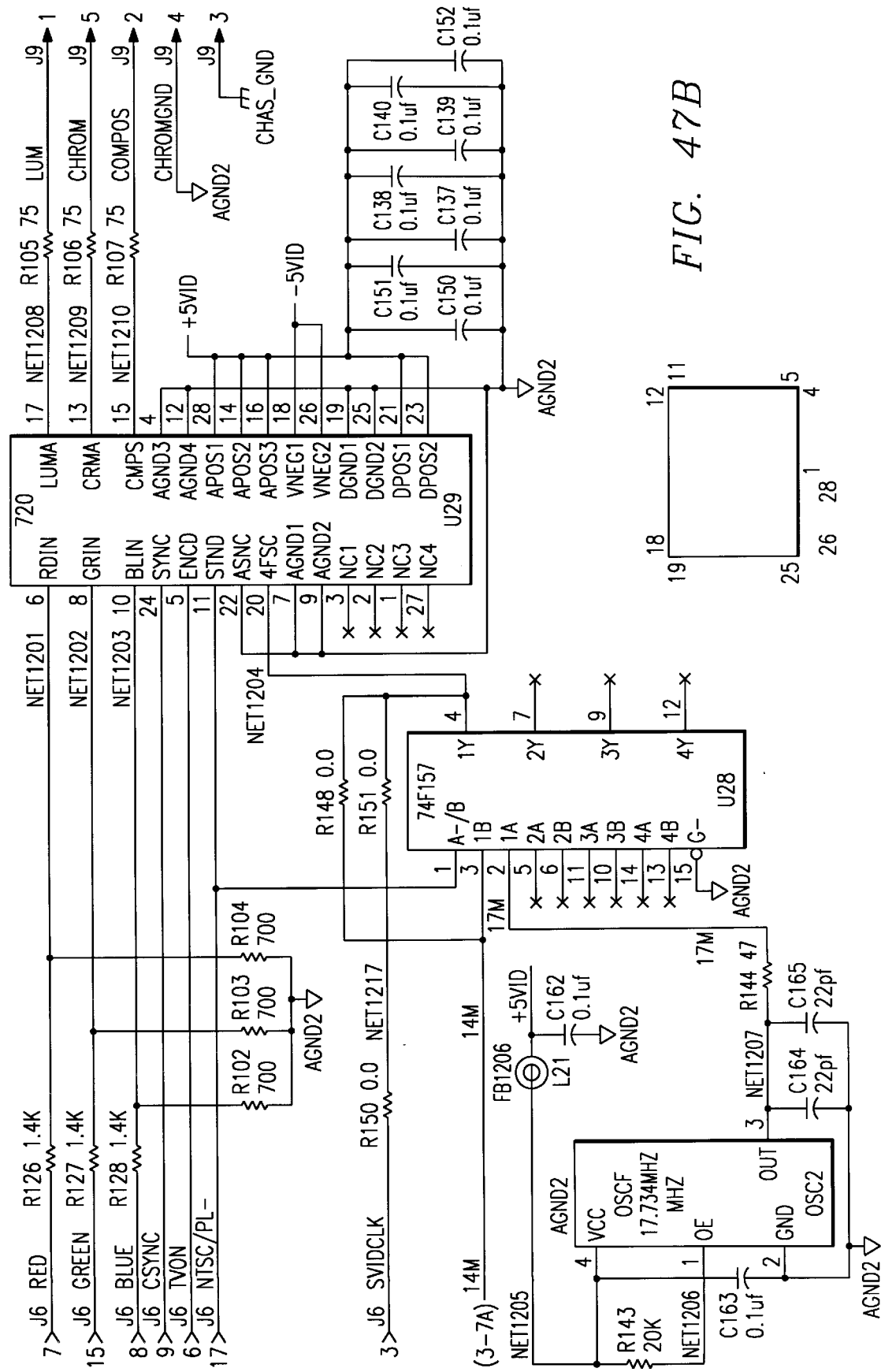

While some of the embodiments shown are in relation to a portable computer, the present invention can also be integrated into any electronic device. For example, the present invention could be implemented on a main frame, mini, desktop, or portable computer. FIG. 6 is a block diagram of a basic computer 900 upon which the present invention could be implemented. Computer 900 comprises a Power Input and Conversion Unit 905 having power input 910. Unit 905 senses the input conditions and selects appropriate circuitry to convert the input to the voltages needed to power the other elements of the system. Output from the conversion unit is coupled to Bus 915, which comprises paths for power as well as for digital information such as data and addresses.

Bus 915 typically needs more than one power line. For example, the motor drive for a hard disk requires a different power (voltage and current) than does a CPU, for example, so there are parallel power lines of differing size and voltage level in Bus 915. A typical Bus 915 will have, for example, a line for 24 VDC, another for 12 VDC, and yet another for 5 VDC, as well as multiple ground lines.

Bus 915 connects to a video display controller 920 including Video Random Access Memory (VRAM) which both powers and controls display 925, which in a preferred embodiment is a display driven by analog driver lines on an analog bus 930. Bus 915 also connects to a keyboard controller 935 which powers and controls keyboard 940 over link 945, accepting keystroke input and converting the input to digital data for transmission on Bus 915. The keyboard controller may be physically mounted in the keyboard or within the computer housing.

Bus 915 comprises, as stated above, both power and data paths. The digital lines are capable of carrying 32 addresses and conveying data in 32 bit word length. To minimize pin count and routing complexity, addresses and data are multiplexed on a single set of 32 traces in the overall bus structure. One with skill in the art will recognize that this type of bus is what is know in the art as a low-pin-count or compressed bus. In this kind of bus different types of signals, such as address and data signals, share signal paths through multiplexing. For example, the same set of data lines are used to carry both 32-bit addresses and data words of 32-bit length.

In Bus 915, some control signals, such as interrupt arbitration signals, may also share the data lines. Typical examples of buses that are exemplary as usable for Bus 215 (with the exception of power supply analog lines in Bus 915) are the IIS-Bus" implemented by Sun Microsystems, the "Turbochannel" Bus from Digital Equipment Corporation, and buses compatible with the IEEE-488 standard. Bus 915 is also a high-speed backplane bus for interconnecting processor, memory and peripheral device modules.

CPU 950 and RAM 955 are coupled to Bus 915 through state translator 960. CPU 950 may be of a wide variety of CPUs (also called in some cases MPUS) available in the art, for example Intel 80386 or 80486 models, MIPS, RISC implementations, and many others. CPU 950 communicates with State Translator 960 over paths 965. State Translator 960 is a chip or chip set designed to translate commands and requests of the CPU to commands and requests compatible with Bus 915. It was mention previously that CPU 950 may be one of a wide variety of CPUs, and that Bus 915 may be any one of a wide variety of compressed busses. It will be apparent to one with skill in the art that there may be an even wider variety of state translators 960 for translating between the CPU and Bus 915.

RAM memory module 955 comprises conventional RAM chips mounted on a PCB as is known in the art, and connectable to state translator 960. Preferably, the RAM module is "on board" the CPU module to provide for rapid memory access, which will be much slower if the RAM is made "off board". As is the case with Bus 915, paths 965 and 970 comprise power and ground lines for CPU 950 and Translator 960.

Figure 5:
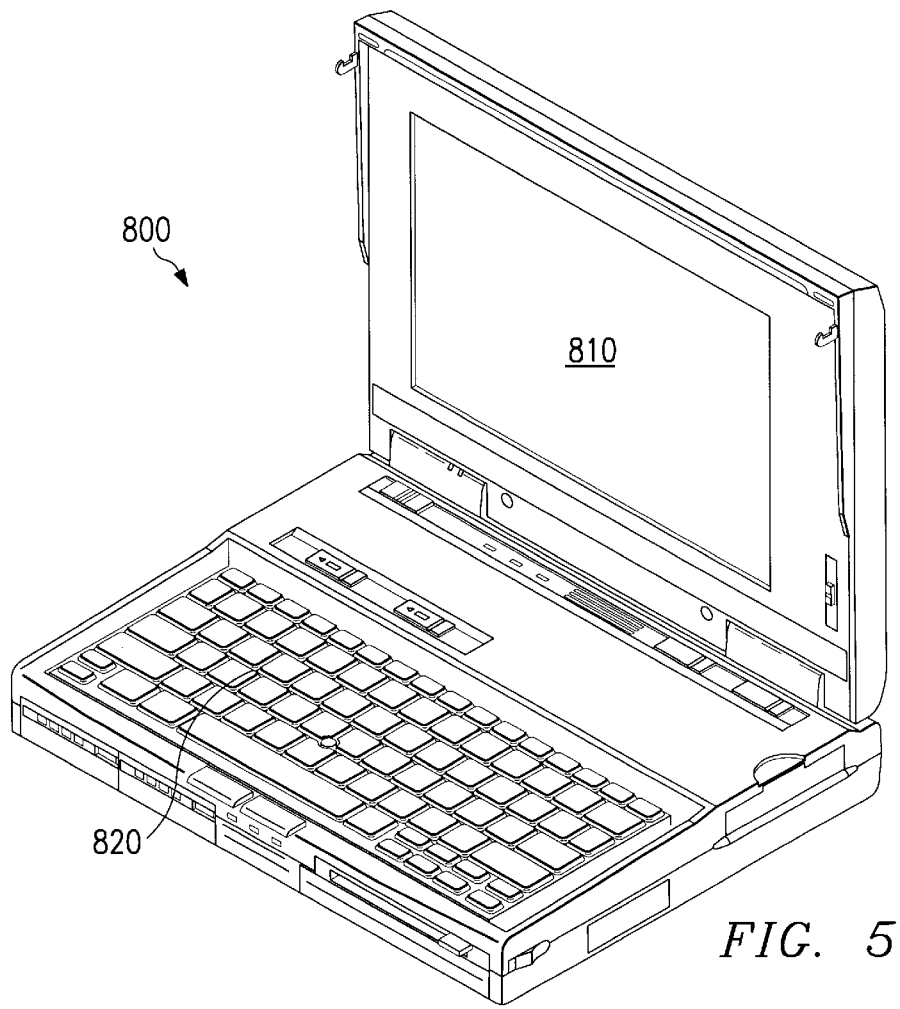
FIG. 5 is an isometric view of a portable computer.

FIG. 5 illustrates a portable personal computer 800 having a display 810 and a keyboard 820. The present invention is ideally suited for the portable computer 800.

FIG. 6 is a block diagram of portable computer 800. Portable computer 800 is a color portable notebook computer based upon the Intel Pentium microprocessor. Operating speed of the Pentium is 75 Mhz internal to the processor but with a 50 Mhz external bus speed. A 50 Mhz oscillator is supplied to the ACC Microelectronics 2056 core logic chip which in turn uses this to supply the microprocessor. This 50 Mhz CPU clock is multiplied by a phase locked loop internal to the processor to achieve the 75 Mhz CPU speed. The processor contains 16 KB of internal cache and 256 KB of external cache on the logic board.

The 50 Mhz bus of the CPU is connected to a VL to PCI bridge chip from ACC microelectronics to generate the PCI bus. The bridge chip takes a 33.333 Mhz oscillator to make the PCI bus clock. The Cirrus Logic GD7542 video controller is driven from this bus and this bus has an external connector for future docking options.

The GD542 video controller has a 14.318 Mhz oscillator input which it uses internally to synthesize the higher video frequencies necessary to drive an internal 10.4" TFT panel or external CRT monitors. When running in VGA resolution modes the TFIT panel may be operated at the same time as the external analog monitor. For Super VGA resolutions only the external CRT may be used.

Operation input to portable computer 800 is made through the keyboard. An internal pointing device is imbedded in the keyboard. External connections are provided for a parallel device, a serial device, a PS/2 mouse or keyboard, a VGA monitor, and the expansion bus. Internal connections are made for a Hard Disk Drive, a Floppy Disk Drive, and additional memory.

Portable computer 800 contains 8 Megabytes of standard memory which may be increased by the user up to 32 Megabytes by installing optional expansion memory boards. The first memory expansion board can be obtained with either 8 or 16 Megabytes of memory. With the first expansion board installed another 8 Megabytes of memory may be attaches to this board to make the maximum amount.

A second serial port is connected to a Serial Infrared (SIR) device. This SIR device has an interface chip which uses a 3.6864 Mhz oscillator. The SIR port can be used to transmit serial data to other computers so equipped.

The two batteries of portable computer 800 are Lithium Ion and have internal controllers which monitor the capacity of the battery. These controllers use a 4.19 Mhz crystal internal to the battery.

Portable computer 800 has two slots for PCMCIA cards. These slots may be used with third party boards to provide various expansion options. Portable computer 800 also has an internal sound chip set which can be used to generate or record music and/or sound effects. An internal speaker and microphone built into the notebook. In addition, three audio jacks are provide for external microphones, audio input, and audio output.

FIG. 7 shows an exploded view of the TM5000™ made by Texas Instruments Incorporated. Table 2 describes the essential elements of FIG. 7.

TABLE 2

| Item | Description | Function |
| --- | --- | --- |
| 150 | BASE | Base of computer |
| 151 | COVER ASSY,TOP | top cover of computer |
| 154 | CONNECTOR DOOR | connector door |
| 155 | PCMCIA DOOR | PCMCIA door |
| 157 | LCD ASSY,9.5" | compute display assembly |
| 158 | BEZBL.LCD | LCD display |
| 160 | Light Pipe | indicators for different functions (e.g. turbo mode) |
| 161 | BUTTON,BATTERY EJECT,LEFT | ejects left battery |
| 162 | BUTTON,BATTERY EJECT,RIGHT | ejects right battery |
| 163 | BUTTON,POWER SWITCH | power switch |
| 166 | HINGE COVER,RIGHT | hinge cover for display attachment to computer |
| 167 | BUTTON,PCM EJECT | PCMCIA eject buttons |
| 168 | HINGE COVER,LEFT | hinge cover for display attachment to computer |
| 172 | RAM CARD,FRONT TRIM | cover over ram card (ram cards not shown) |
| 178 | HINGE,RIGHT | hinge for attaching display to computer |
| 179 | HINGE,LEFT | hinge for attaching display to computer |
| 181 | HINGE,BRACKET,RIGHT | binge bracket for attaching display |
| 182 | HINGE,BRACKET,LEFT | hinge bracket for attaching display |

TABLE 2-continued

| Item | Description | Function |
|---|---|---|
| 186 | BRACKET,LEFT,FLOPPY DRIVE | bracket for floppy drive |
| 187 | LIGHT PIPE,HINGE COVER | indicators for different functions (e.g. power) |
| 190 | BRACKET,FLOPPY DRIVE | bracket for floppy drive |
| 195 | SPRING,I/O DOOR LATCH | latch for I/O doors |
| 196 | EXTENSION SPRING,I/O DOOR | extension spring for I/O doors |
| 204 | HEATSINK,CPU | heatsink for CPU |
| 205 | HEATSINK CUSHION | heatsink cushion |
| 206 | PWB ASSY,LED BOARD | printed wiring board for LEDs |
| 210 | PWB ASSY,MAIN BOARD | main printed circuit/wiring board |
| 211 | PWB ASSY,PCMCIA/SOUND BOARD | PCMCIA/Sound printed circuit/wiring board |
| 212 | PWB ASSY,KEYSCAN BD | keyscan printed circuit/wiring board |
| 213 | MICROFLOPPY DRIVE,11 MM | floppy drive |
| 222 | NAMEPLATE ,ACTIVE MATRIX COLOR | Nameplate |
| 226 | COVER,LCD SCREWS | screws for LCD |
| 228 | SCREW,TORX,PLASTITE,PAN,2–28 X .500 | screws |
| 229 | SCREW,TORX,PLASTITE,4–20 X .250 | screws |
| 230 | SCREW,TORX,SLOTTED,2–28 X.375",CARBON | screws |
| 231 | SCREW,TORX,MACHINE,BUTTON,2–56 X .1250 | screws |
| 232 | SCREW,W/THREAD LOCK | screws |
| 233 | SCREW,SLOT-TORX,MACHINE,PAN,4–40 X .188 | screws |
| 234 | SCREW,TORX,MACHINE,FLAT,4–40 X .375 | screws |
| 235 | SCREW,METRIC,TORX,MACH,FLH,M3–0.5 X 6 | screws |
| 236 | SCREW,TORX,4–20 X.375",CARBON STEEL | screws |
| 237 | SCREW,MACH,FLAT,PH,4–40 X .188 | screws |
| 238 | SCREW,TORX,MACHINE,PAN,4–40 X .125 | screws |
| 239 | SCREW,TORX,MACHINE,4–40 X .250 | screws |
| 240 | SCREW,SLOT-TORX,PLASTITE,PAN,4–20 X 1.25 | screws |
| 241 | SCREW,SLOT-TORX,PLASTITE,PAN,2–28 X .188 | screws |
| 242 | SCREW,TORX,MACHINE,2–56 X .250 | screws |
| 243 | SCREW,TORX,MACHINE,BUTTON,2–56 X .1875 | screws |
| 244 | CABLE ASSY,LCD,RIGHT,W/O TAPE | cable |
| 248 | FLEX CABLE,HARD DISK DRIVE | flex cable |
| 249 | CABLE ASSY,FDD DX4 | cable |
| 253 | CABLE EXTENSION MICROPHONE | cable for microphone |
| 254 | MEDALLION LABEL "P" | Texas Instruments trademark label |
| 255 | SECURITY RING | security ring |
| 262 | PWB ASSY,UNIVERSAL IR MODULE P/D | printed wiring board for IR module |
| 263 | LENS COVER,IR | lens cover for IR module |
| 270 | COMPRESSION FOAM,STANDBY SWITCH | foam for standby switch |
| 271 | BUTTON,STANDBY SWITCH SERIES | standby switch |
| 275 | Power input | input to computer from external power |
| 276 | Keyboard | Keyboard input |

FIG. 8 shows an enlarged view of the main printed circuit board 210 of FIG. 7. Note the CPU 204 and power input 275 are both on this printed circuit board 210. The present invention can be implemented on the TM5000 by using the software control program, described herein, and the optional deadman timer circuit shown in FIG. 3. The software control program would be run by the CPU 204 in memory (not shown) and communicate to the power switch. The optional deadman timer circuit would also be connected to the power switch 275 and the CPU 204 so that the deadman timer can be reset when necessary. The deadman timer circuit could be placed on the main printed circuit board 210.

FIGS. 9–30 show logic diagrams of an implementation of the main printed circuit board 210 of the TM5000. This logic diagram details how the deadman timer circuit, and the logic for the shutdown procedure could be implemented, along with the other functions of a main printed circuit board.

FIGS. 31–35 show logic diagrams of an implementation of the keyscan printed circuit board 272 of the TM5000. This logic diagram details how the circuit could be designed to implement keyscan functions of the TM5000.

FIGS. 36–47 show logic diagrams of an implementation of the PCMCLA/Sound printed circuit board 211 of the TM5000. This logic diagram details how the circuit could be designed to implement keyscan functions of the TM5000.

Figure 49:
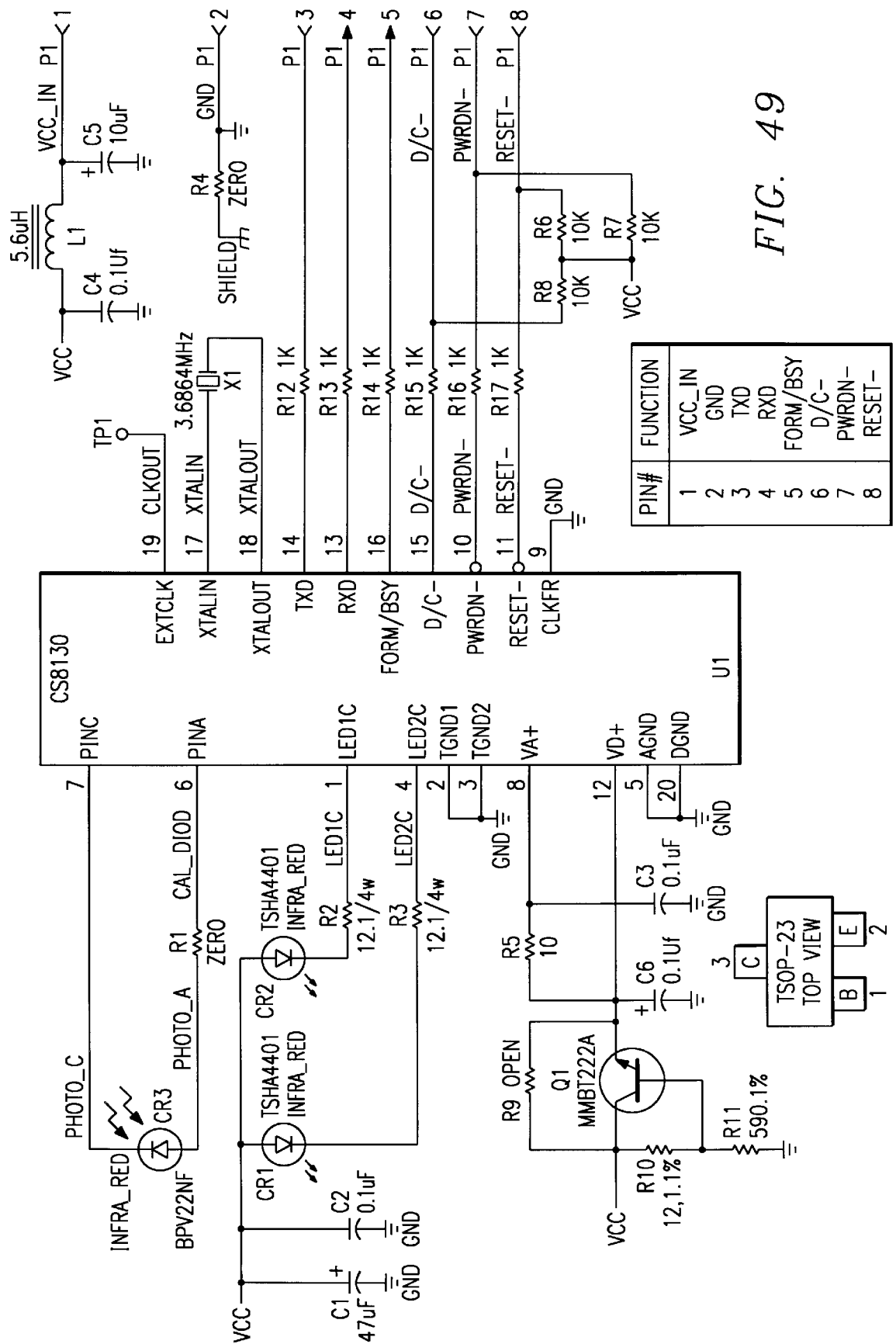

FIGS. 48–49 show logic diagrams of an implementation of the IR module printed circuit board 262 of the TM5000. This logic diagram details how the circuit could be designed to implement infra-red module functions of the TM5000.

While several implementations of the preferred embodiment of the invention has been shown and described, various modifications and alternate embodiments will occur to those skilled in the art. For example, process diagrams are also representative of flow diagrams for microcoded and software based embodiments. In addition, various modifications and combinations of the illustrative embodiments, as well as other embodiments of the invention, will be apparent to persons skilled in the art upon reference to the description. Words of inclusion are to be interpreted as nonexhaustive in considering the scope of the invention. Various modifications and combinations of the illustrative embodiments, as well as other embodiments of the invention, will be apparent to persons skilled in the art upon reference to the description. It is therefore intended that the appended claims encompass any such modifications or embodiments.

An example implementation of the software control program is included below. However, the invention could be implemented in a multitude ways and is not restricted to this implementation. In addition, the software control program includes calls to "FactoryPowerDownTable" and to "Sub-WalkTable" (hereafter referred to as WalkTables). These calls implement the shut down procedure of the invention. An example embodiment is included after the software control program. In this embodiment, devices are shut down in a specific order. However, the WalkTables may be altered to include a shut down procedure for other devices. For example, the WalkTables could shut down a real time clock, serial devices, floppy disk drives, hard disk drives, DMA controllers, interrupt controllers, and other peripheral devices on the main system bus. Further, the shut down procedure may include peripheral devices connected serially, or through the parallel port. In addition, the WalkTables could shut down peripheral devices on main system buses such as ESDI, AT, or PCI and may include devices on auxiliary buses, such as USB or 1394. Moreover, WalkTables could even shut down the entire bus itself. Furthermore, the WalkTables could even shut down portions of or the entire docking station that a portable computer may be connected to. These are just a few examples of what the shut down procedure could include and not meant to be an exhaustive listing. Various modifications and combinations of the illustrative shut down procedure, as well as other embodiments of the invention, will be apparent to persons skilled in the art upon reference to the description. It is therefore intended that the appended claims encompass any such modifications or embodiments.

```
;*******************************************************************
; ORIGINAL CODER: La Vaughn F. Watts, Jr.
;                                                        +------------------+
;+-----------------------------------------------------  | Near Entry Point
;| PmInit -- Initialize power management                 +------------------+
;|
;| Entry: None
;|
;| Exit:  All registers preserved
;|
;| This function is called during POST before executing INT 19h.
;+--------------------------------------------------------------------+ public  PmInit
PmInit  proc    near
        assume  ds:nothing,es:nothing,fs:nothing,gs:nothing,ss:nothing IFDEF   zzzlily                     ;Enable Smart Power Switch
                push    cx
                mov     cx,0
                in      al,0e2h
                and     al,NOT 7
                out     0e2h,al             ;Kill software control
                loop    $
                or      al,02h
                out     0e2h,al
                loop    $ or      al,1
                out     0e2h,al             ;Smart power switch enabled
                pop     cx
        ENDIF                               ;zzzlily ;This code is called on exit of the PM initialization
;Restore all registers and quit.
;--------------------------------------------------------------------
        IFDEF   zzzlily                     ;Bring back the power switch
Quit:
                pop     gs
                pop     fs
                pop     es
                pop     ds
                popad
```

TI-21405 Page 23

```
                popfd

AbortPmInit:
                Extrn       ExtCmosCsum:near
                Call        ExtCmosCsum mov         al,3bh
                out         70h,al
                in          al,71h
                in          al,0e1h
                and         al,01000000b
                cmp         al,0
                jne         quitswitch
                extrn       VidSuspend:near
                extrn       HDDDisable:near call        HDDDisable              ;Take hard drive Down!

                CLI in          al,0e2h
                and         al,NOT 3                ;5.08.1
                out         0e2h,al                 ;Smart disabled, power off if needed
                jmp         $ quitswitch:
                push        ax
                push        cx
     Include Deadman.Inc                            ;Delays needed to
                                                    ;initialize on powerup the R/C mov         cx,DEADMANDELAY
     DeadmanPm1Delay:
                jmp         $+2
                loop        DeadmanPm1Delay
                in          al,0e0h
                or          al,01000000b            ;Turn on Power Switch SMI
                out         0e1h,al                 ;Clear interrupts
```

TI-21405 Page 24

```
                mov     cx,DEADMANDELAY

DeadmanPm2Delay:
                jmp     $+2
                loop    DeadmanPm2Delay out     0e0h,al
                loop    $
        ;
        ;Is this a factory link? If so, leave Deadman timer off
        ;Otherwise turn it on!
        ;
                mov     ax,cs:BPVersion
                and     ah,0f0h             ;Test version?
                cmp     ah,0f0h             ;Maybe
                je      FactoryExit         ;NOP!

in      al,0e2h
                or      al,04h              ;Turn it On-Deadman 5.07.01
                out     0e2h,al             ;Done mov     cx,DEADMANDELAY
        DeadmanPm3Delay:
                jmp     $+2
                loop    DeadmanPm3Delay FactoryExit:
                pop     cx
                pop     ax
                ret ELSE                                ;zzzlily
        Quit:   pop     gs
                pop     fs
                pop     es
                pop     ds
40              popad
                popfd AbortPmInit:
```

TI-21405 Page 25

```
              ret
        ENDIF                                   ;zzzlily

       ;File Deadman.inc
        DEADMANDELAY   Equ  16+1                ;1.6 plus one for good measure
        ;Comments: 1000 works great..trying to min the delay now.
        ;Comments: so does 100,50,10
        ;Comments: Does NOT work: 5,8
        ;          ... remember we need delay that will work on 90MHz
        ;          and 120MHz, so put some margin in it.
        ;          120/75 =1.6 factor
        ;
        ;Code called from OS to turn off APM..this will terminate the smart switch
        ;this time for 15 seconds in order to orderly shutdown to new OS operating
        ;environment.

APMIFunc04     proc   near
        IFDEF   zzzlily                         ;Arm Interrupts
        ;
        ;Reset Deadman Timer                    Gives MS 15 seconds to get back
        ;
                push    ax
                in      al,0e2h
                mov     ah,al                   ;5.08.1
                and     al,NOT 04 out     0e2h,al                 ;Force to ZERO!
                mov     al,ah                   ;5.08.1
                out     0e2h,al                 ;5.08.1 Reset Complete pop     ax
                STI
        ENDIF                                   ;zzzlily
                                                ;connection is established
                ret
        APMIFunc04     endp
        APMIFunc0B     proc   near
        ;This code is called by the OS every 1 to 5 seconds..welook at the event
        ;for the power switch and other power management devices.
```

TI-21405 Page 26

```
;
          IFDEF   zzzlily                       ;Downcount Temperature
;---------------------------------------------------------------------
;Reset Deadman Timer                    Gives MS 15 seconds to get back
;
          push    cx
          in      al,0e2h
          or      al,4
          out     0e2h,al                       ;Force to one!

mov     cx,DEADMANDELAY
Deadman1Delay:
          jmp     $+2
          loop    Deadman1Delay and     al,NOT 4
          out     0e2h,al                       ;Toggles to zero and leaves on NOW mov     cx,DEADMANDELAY
Deadman2Delay:
          jmp     $+2
          loop    Deadman2Delay or      al,4                          ;Resets to 15 seconds
          out     0e2h,al                       ;Done
          pop     cx ;Test for Wav/sound/IR active
;
;Scan for Unwanted SMI events
;
          pushf
          cli                                   ;Interrupts disabled
          in      al,0e1h                       ;Get interrupt mask please
          and     al, 0dfh                      ;make sure dock bit not set
                                                ;dock bit means dock present, not an SMI
          cmp     al,0d3h                       ;Value of no interrupts pending
          je      KillUnwantedSmi               ;Kill them out !
          xor     al,0d3h                       ;Flip the bits
          xchg    al,ah
          in      al,0e0h                       ;Mask active
          and     ah,al                         ;Only bits wanted
```

TI-21405 Page 27

```
            jz         KillUnwantedSmi      ;Nothing logged

;
       ;We have an valid Smi posted, now we need to process!
       ;

IFDEF   zzzlilyp                ;5.08.1 Force Software SMI mov     ah,59h
                    in      al,0f2h         ;Get old value
                    xchg    al,ah
                    out     0f2h,al         ;Selected
                    in      al,0f3h         ;Old value
                    or      al,10h          ;Arm SMI
                    out     0f3h,al         ;Done mov     al,7fh
                    out     0f2h,al
                    in      al,0f3h         ;Set up for low to high trans
                    and     al, NOT 1
                    out     0f3h,al         ;Done or      al,1            ;low to high, please
                  STI                     ;Arm CPU interrupts
                    out     0f3h,al         ;Initiate the interrupt push    cx
                    mov     cx,0            ;Wait for interrupt
                    loop    $
                    loop    $
                    loop    $
                    loop    $
                    loop    $
                    pop     cx              ;Interrupt complete CLI                     ;Setup for clean up
                    mov     al,59h
                    out     0f2h,al         ;just in case, reset it
                    in      al,0f3h
                    and     al,NOT 10h      ;Kill the SMI
                    out     0f3h,al         ;Done
                    xchg    al,ah
```

```
                out     0f2h,al                 ;Reset 0F2h
                CLI                             ;Disable again as we fixup
        ;
        ;We have processed the valid Smi posted!
        ;
        KillUnwantedSmi:
                mov     ax,01059h               ;Kill the SMI
                Extrn   CfgClearBits:near
                call    CfgClearBits            ;Done
                mov     ax,017dh
                call    CfgClearBits            ;Clr the interrupt
                popf                            ;Clean up stack
        ENDIF                                   ;zzzlilyp IFDEF zzzlilyd                          ;Is it a Lilyd?-Yes, then add SoftSMI
        ;                                       ;Yes, we must add SMI software
        ;We have processed the valid Smi posted!
        ;
        KillUnwantedSmi:
                popf                            ;Clean up stack ENDIF                                   ;zzzlilyd ;
        ;We are now free of that issue, at lease for now!
        ;
                mov     al,38h                  ;Value with Sound/IR active
                call    CmosRead                ;Read it
                test    ah,08h                  ;Sound/IR bit ON = Active
                jnz     NoFunc08PCChange        ;Do not compute this time extrn   DoThermalManagement:near
                extrn   BPPowerChange:near mov     al,7ah                  ;Get the seconds passed for test
                call    CmosRead                ;Done
                test    ah,40h                  ;Get Battery Capacity Request active
                jz      SkipBatteryCap          ;Skip this request
        ;
        ;We need a read for the battery capacity
        ;
```

```
            Extrn     ReadLilyBattery:near
            Call      ReadLilyBattery
            jnc       HaveBatteryData       ;Data is good, update it
        ;
        ;BX = 0, No channel available, use previous data
        ;BX = 2, No batteries/battery installed, tell user
        ;
            cmp       bx,0
            je        NoFunc08PCChange      ;Bad data point
        ;
        ;Setup unknown for user
        ;
            mov       al,7fh                ;Unknown?

        HaveBatteryData:
        ;
        ;Data good;AL = Percent available, ch = status slot a cl =status slot b
        ;
            mov       ah,39h
            xchg      al,ah
            mov       bl,7fh                ;Mask to write
            call      CmosWriteMask         ;Done and its good!

;Protect against the power switch being turned off during update
        ;
            xchg      bx,ax                 ;
            pushf                           ;
            cli                             ;Disable interrupts
            in        al,0e2h               ;Get software status
            mov       ah,al                 ;
            or        al,3                  ;Force to software override
            out       0e2h,al               ;
            xchg      ax,bx                 ;Read to write data
            mov       ax,007ah
            mov       bl,40h
            call      CmosWriteMask         ;Reset the Request Bit
            Call      ExtCmosCsum xchg      ax,bx                 ;
            xchg      ah,al                 ;
            out       0e2h,al               ;Put switch back to way it was
            popf                            ;Restore interrupts to way it was
```

```
                jmp         short NoFunc08PCChange

SkipBatteryCap:
                mov         bl,ah               ;Power status flag
                and         ah,3fh              ;Number of minutes
                and         bl,80h              ;PowerChange flag
        ;
        ;Look at power change status
        ;
                in          al,0e3h             ;Port containing AC information
                and         al,00001000b
                shl         al,4                ;Align with old value
                dec         ah
                cmp         ah,0                ;Time to read?
                jne         ThermalTest1        ;Not yet
                mov         ah,63               ;63= seconds for a minutes;best we
                call        DoThermalManagement ;can do and allow up to 3 battery
                                                ;reads during cycle!
        ThermalTest1:
                cmp         al,bl               ;PowerChange state occured?
                je          ThermalTest2        ;Nop
                call        BPPowerChange       ;Execute the power state change code
                or          ah,40h              ;Force battery read once a DoPowerC ThermalTest2:
                and         ah,7fh
                or          ah,al               ;New value to write
                mov         al,7ah ;
        ;Protect against the power switch being turned off during update
        ;
                xchg        bx,ax
                pushf
                cli                             ;Disable interrupts
                in          al,0e2h             ;Get software status
                mov         ah,al               ;
                or          al,3                ;Force to software override
                out         0e2h,al             ;
                xchg        ax,bx               ;Read to write data
                Extrn       CmosWrite:near
                Call        CmosWrite
                Extrn       ExtCmosCsum:near
```

```
            Call        ExtCmosCsum xchg        ax,bx
            xchg        ah,al
            out         0e2h,al              ;Put switch back to way it was
            popf                             ;Restore interrupts to way it was
;
;End of protecting power switch
;
NoFunc08PCChange:
;...return to OS here...
ENDIF                                        ;zzzlily ;this code can be called from DOS and power management and thermal
;management vectors anytime.
BPPowerCheck:                                ;Please call only in DOS
            in          al,0e1h              ;Get PS State
            and         al,01000000b         ;PowerSwitch State
            jne         BPNoFuncSupport      ;Switch is NOT to "turn it off"

;turn off if switch is off
;this code can be left in if docking station does not have power switch intelligence
;
;           in          al, 0e1h             ;switch off, check to see if we be docked
;           test        al, 020h             ;
;           jnz         BPNoFuncSupport      ;ignore off position if docked ;
;Insert the walk tables here
;
            in          al,0e2h              ;Deadman active?

;following code is optional and provides software override for windows.
;If it is on now, power off...
;           and         al,04h               ;Maybe
;           jne         BPNoFuncSupport      ;Yes, Skip the power down in          al,0e0h              ;Mask wanted?
            and         al,01000000b
            je          BPNoFuncSupport      ;Nop, skip this request
```

TI-21405 Page 32

```
        extrn       FactoryPowerDownTable:byte
        mov         si, offset FactoryPowerDownTable extrn       SubWalkTable:near
        call        SubWalkTable
        jmp         short BPGoDownDownDown BPPowerDown:                                ;Factory turnpower off
        ;
        ;Insert the walk tables here
        ;
        extrn       FactoryPowerDownTable:byte
        mov         si, offset FactoryPowerDownTable
        call        SubWalkTable BPGoDownDownDown:

Extrn       TurnPowerOff:near
        in          al,0e2h                 ;Get power switch to clr
        and         al,11111000b            ;Turn it off
        or          al,00000011b            ;Turn it on
        out         0e2h,al
        loop        $
        Call        TurnPowerOff
        jmp         BPNoFuncSupport BPGetVersion:
        mov         bx,cs:word ptr BPVersion
        mov         ax,cs:word ptr BPRevision
        STI
        clc
        ret
        ;This code lands here if an interrupt has happened by the SMI.
        ;We look to see if power switch has been hit..if smart power switch is
        ;programmed to be "Save-to-Disk" we generate the Save to disk event.
        ;Smart power switch is set to "suspend or standby" then we can generate
        ;the suspend or standby event. All events are transferred to OS for
        ;final operation where they turn around and call APMIFunction 07 to
        ;turn off power after cleaning up or saving to disk. If shutdown (super
        ;one) is running, then we pass the event to him for file savings and task
```

TI-21405 Page 33

```
;closings prior to giving the event to OS.
;Note: APMIFunction07 is the same as the turnpoweroff code above.
;Note: there are two ways that we support this smartpower switch for the
;user control;
;1. Let the hardware map the interrupt of the smart power switch to the
;suspend, standby, donothing, save-to-disk, turn power off event.
;2. Read one common event and let the software read cmos map that contains
;the user setup option and map it after we get the same hardware event.
;
SMI_Interrupt:
;
;Test for power switch turning off - timing issue
;
        test    ah,40h          ;Check for AC/PowerSwitch request
        jz      PPLatch         ;Process Powerswitch : bit = 0
        test    ah,8            ;Check for Suspend Key
        jnz     PSKey           ;Process Suspend Key : bit =1
        test    ah,4            ;Check Stby Key
        jnz     PStbyKey        ;Process Stby Key : bit =1
        test    ah,2            ;Check Closed Cover latch
        jz      PCLatch         ;Process closed cover latch : bit =1
        test    ah,1            ;Check low battery alarm
        jz      PBLatch         ;Process low battery alarm : bit =0
        test    ah,20h          ;Check Dock/Undock Request
        jnz     PDLatch         ;Process Dock/Undock Request : bit =0
        test    ah,40h          ;Check for AC/PowerSwitch request
        jz      PPLatch         ;Process Powerswitch : bit = 0
        test    ah,10h          ;Check for EZ-dock com request
        jz      PELatch         ;Process EZ-Dock com : bit =1
                                ;No more request, just in case,
        jmp     PDLatch         ;Process apparent Dock/Undock Request in      al,0e0h         ;Interrupt accept Mask
        out     0e1h,al         ;clr all since we should not be here.

NoActionKey:
        mov     ax, 0107dh      ;Clear status Using EXTSMI0
        call    CfgClearBits    ;
        RET                     ;Finished here!
;
;Process routines
;
PSKey:                          ;Suspend Key
```

```
                                            ;ah&al=E1h
              mov     al,8                  ;Clr interrupt
              out     0e1h,al               ;Done
              mov     ax, 0107dh            ;Clear status Using EXTSMI0
              call    CfgClearBits          ;

SusLBatAction:
              mov     al,5ch                ;Get suspend key action needed
              mov     bl,11000000b          ;Get options
      SusAction:
              call    CmosReadMask
              cmp     ah,0
              je      NoActionKey           ;Ignore this key
              cmp     ah,2                  ;Stby wanted?
              je      ActionStby            ;Yep
              cmp     ah,1
              je      ActionSus             ;Suspend action
              jmp     SaveDiskAction        ;Save-to-Disk
      PStbyKey:
              mov     al,4                  ;Clr interrupt
              out     0e1h,al               ;Done
              mov     ax, 0107dh            ;Clear status Using EXTSMI0
              call    CfgClearBits          ;
      ActionStby:
              TREPORT088h
      ;
      ;Test for Wav/sound/IR active
 30   ;
              mov     al,38h                ;Value with Sound/IR active
              call    CmosRead              ;Read it
              test    ah,08h                ;Sound/IR bit ON = Active
              jnz     NoActionKey           ;Do not compute this time
              JMP     GlobalStby            ;Do it ActionSus:
              TREPORT               084h
      ;
      ;Test for Wav/sound/IR active
      ;
              mov     al,38h                ;Value with Sound/IR active
```

TI-21405 Page 35

```
                call        CmosRead                ;Read it
                test        ah,08h                  ;Sound/IR bit ON = Active
                jnz         NoActionKey             ;Do not compute this time
                JMP         GlobalSus               ;Do it Public  PCLatch
        PCLatch:                                    ;Process closed cover latch : bit =1
                extrn       Video_Global:near
                extrn       Video_UnGlobal:near
        ;
        ;Note: Lowtime 40:6c words
        ;           40:6e words
                push        cx
                mov         cx,7                    ;Number of seconds to delay/3
                extrn       KeyDisable:near
                extrn       KeyEnable:near
                extrn       WaitSecDelay:near
        StallPCLatch:
                call        KeyDisable
                call        WaitSecDelay            ;Wait one second 25              in          al,0e1h                 ;Read the Cover latch & Low Bat
                test        al,2                    ;Still down?
                jnz         PCLatchAbort            ;Nop, abort the saving status
                test        al,40h
                jz          PPLatch                 ;turn power off
                call        KeyEnable
                call        WaitSecDelay            ;Wait one second
                in          al,0e1h                 ;Read the Cover latch & Low Bat
                test        al,2                    ;Still down?
                jnz         PCLatchAbort            ;Nop, abort the saving status
                test        al,40h
                jz          PPLatch                 ;turn power off
                loop        StallPCLatch CCLBDoit:
                in          al,0e1h                 ;Read the Cover latch & Low Bat
                test        al,2                    ;Still down?
                jnz         PCLatchAbort            ;Nop, abort the saving status
                test        al,40h
```

```
            jz      PPLatch             ;turn power off
            call    Keydisable
            pop     cx                  ;Clean Stack off
            mov     al,2
            out     0e1h,al             ;Clear Interrupt - Both!
            mov     al,5ch              ;Get suspend key action needed
            mov     bl,00110000b        ;Get options
            jmp     SusAction           ;Process based on user
     Public PCLatchAbort
     PCLatchAbort:
            Call    KeyEnable
            mov     ah,5ah              ;Read current status
            call    CfgRead             ;Get the value
            and     ah,20h              ;Alarms on?
            cmp     ah,20h              ;maybe
            jne     PCLatchAb1          ;Nop
            mov     ax,205ah
            call    CfgClearBits        ;clear alarm suspend request
            xor     cx,cx
            loop    $
            mov     ax,205ah
            call    CfgSetBits
            xor     cx,cx
            loop    $ PCLatchAb1:
            pop     cx                  ;Clean Stack off
            mov     al,2
30
            out     0e1h,al             ;Clear Interrupt
            mov     ax, 0047dh          ;Clear status
            call    CfgClearBits
            jmp     NoActionKey PBLatch_Clr:                       ;low battery while docked
            mov     al,001h
            out     0e1h,al             ;Clear Interrupt
            jmp     NoActionKey ;
     ;We have standby here
```

```
        PBLatch:                                     ;Process low battery alarm : bit =0
                call    APMBattLowNotify             ;Tell APM push    cx
                mov     cx,4                         ;Number of seconds to delay/2

StallPBLatch:
                call    KeyDisable
                call    WaitSecDelay                 ;Wait one second in      al,0e1h                      ;Read the Cover latch & Low Bat
                test    al,1                         ;Still down?
                jnz     PBLatchAbort                 ;Nop, abort the saving status test    al,40h
                jz      PPLatch                      ;turn power off call    KeyEnable
                call    WaitSecDelay                 ;Wait one second in      al,0e1h                      ;Read the Cover latch & Low Bat
                test    al,1                         ;Still down?
                jnz     PBLatchAbort                 ;Nop, abort the saving status test    al,40h
                jz      PPLatch                      ;turn power off loop    StallPBLatch LBDoit:
                in      al,0e1h                      ;Read the Cover latch & Low Bat
                test    al,1                         ;Still down?
                jnz     PBLatchAbort                 ;Nop, abort the saving status test    al,40h
                jz      PPLatch                      ;turn power off call    Keydisable pop     cx                           ;Clean Stack off
                mov     al,1
```

```
                out     0e1h,al             ;Clear Interrupt - Both!
                mov     al,5ch              ;Get suspend key action needed
                mov     bl,00110000b        ;Get options
                jmp     SusAction           ;Process based on user
        Public PBLatchAbort
        PBLatchAbort:
                Call    KeyEnable
                mov     ah,5ah              ;Read current status
                call    CfgRead             ;Get the value
                and     ah,20h              ;Alarms on?
                cmp     ah,20h              ;maybe
                jne     PBLatchAb1          ;Nop
                mov     ax,205ah
                call    CfgClearBits        ;clear alarm suspend request
                xor     cx,cx
                loop    $
                mov     ax,205ah
20
                call    CfgSetBits
                xor     cx,cx
                loop    $
        PBLatchAb1:
                pop     cx                  ;Clean Stack off mov     al,1
                out     0e1h,al             ;Clear Interrupt
                mov     ax, 0047dh          ;Clear status
                call    CfgClearBits jmp     NoActionKey
        PDLatch:                            ;Process Dock/Undock Request : bit =0
                in      al, 0e1h            ;are we docked?
                test    al, 020h
                jz      NotDocked
        Docked:
                in      al, 0e0h            ;disable closed cover SMI
                and     al, 0fdh
```

TI-21405 Page 39

```
            out       0e0h, al
            jmp       @f

NotDocked:
    in        al, 0e3h        ;are we AC power?
    test      al, 08h
    jnz       @f              ;yes, don't worry about cover
    in        al, 0e0h        ;else, enable closed cover SMI
    or        al, 02h
    out       0e0h, al
@@:
    mov       al, 020h        ;clear dock/undock SMI
    out       0e1h, al jmp       NoActionKey PPLatch_Chng:                 ;power switch changed while docked
    mov       ah, 098h        ;switch is on flag - debug stuff
    in        al, 0e1h        ;check power switch position
    and       al, 040h
    jnz       @f
    in        al, 0e3h        ;check for ac power
    and       al, 08h
    jz        PPLatch2        ;turn off if on battery
    jmp       PStbyKey        ;else go into Standby
    mov       ah, 099h        ;switch is off flag - debug stuff
@@:
    mov       al, 040h        ;clear power switch SMI
    out       0e1h, al
    jmp       NoActionKey PPLatch:                      ;Process Powerswitch : bit = 0
@@:                           ;we will process power switch PPLatch2:
    mov       al,0
    out       0e0h,al         ;Kill all interrupts
    mov       al,-1
    out       0e1h,al         ;Clr all pending ones ;
;Insert the walk tables here
;
```

```
              extrn      PowerDownTable:byte
              mov        si, offset PowerDownTable
              extrn      SubWalkTable:near
              call       SubWalkTable
       Public TurnPowerOff
       TurnPowerOff  proc   near
              Extrn      ExtCmosCsum:near
              Call       ExtCmosCsum
       turnpwroff:
              CLI                                ;Disable interrupts
              mov        al,0
              out        0e0h,al                 ;Kill all interrupts
              mov        al,-1
              out        0e1h,al                 ;Clr all pending ones in         al,0e2h
              and        al,NOT 4                ;Turn off Power Deadman
              out        0e2h,al                 ;Done or         al,7                    ;Turn on Software Control/Deadman
              out        0e2h,al                 ;Done
              and        al,NOT 3                ;Turn off software Control
              out        0e2h,al or         al,1                    ;Turn power off please
              out        0e2h,al                 ;Done!
       Forever: JMP      Forever                 ;Spin until loss of power or deadman control
       TurnPowerOff   endp PELatch:                                  ;Process EZ-Dock com : bit =1
              in         al,0e0h
              out        0e1h,al                 ;clear interrupt
              mov        ax, 0017dh              ;Clear status Using EXTSMI0
              call       CfgClearBits
              jmp        NoActionKey SaveDiskAction:
              extrn      SaveToDisk:near
```

TI-21405 Page 41

```
                call    SaveToDisk
        ;
        ;Need to add critical resume to que if Windows 95
        ;
                mov     al,0ffh
                out     0e1h,al
        endif                                   ;zzzlilly
                ret
        APMIFunc0b  endp
```

```
;*********************************************************************
;Beginning of Walktable examples:
;********************************************************************* extrn   Com_Lpt_Suspend:near    ;COM, LPT suspend code
        extrn   Com_Lpt_Resume:near     ;COM, LPT resume code extrn   Floppy_Suspend:near     ;FLOPPY suspend code
        extrn   Floppy_Resume:near      ;FLOPPY resume code
        extrn   FPU_Suspend:near        ;Coprocessor suspend code
        extrn   FPU_Resume:near         ;Coprocessor resume code
        extrn   Keyboard_Suspend:near   ;KBD suspend code
        extrn   Keyboard_Resume:near    ;KBD resume code extrn   Video_Global:near       ;VIDEO panel off and suspend code
        extrn   Video_UnGlobal:near     ;VIDEO panel on and resume code extrn   MarkUTime:near
IFDEF   zzzlily                         ;Extermal for Features SuspendVideo
        extrn   VidSuspend:near         ;Video__P
        extrn   SetAutoSuspendTimer:near
        extrn   ClrAutoSuspendTimer:near
        extrn   HDDDisable:near
        extrn   HDDUp:near
        extrn   KeyEnable:near
        extrn   KeyDisable:near
        extrn   PCISleep:near
        extrn   PCIInit:near
```

TI-21405 Page 42

```
                extrn    SuspendInitialize:near
                extrn    ClrActivityTimer:near
                extrn    DozeInitialize:near
        ENDIF   ;zzzlily
        ;
        ; SUSPENDTable - User may alter the sequence in the SUSPENDTable, also,
        ;               user may add customization code in this SUSPENDTable.
        ;               For example, VPx_Suspend is to set value to power
        ;               register 0/1 to turn on/off devices that connected to
        ;               power register 0/1.
        ;
                public SuspendTable
        SuspendTable   label  word IFDEF  zzzlily                          ;Suspend Table - Devices
                dw      offset ClrAutoSuspendTimer
                dw      offset ClrActivityTimer
                dw      offset VidSuspend       ;Place Screen Memory into suspend
                dw      offset HDDDisable       ;Take hard drive Down!
                dw      offset FPU_Suspend      ;Coprocessor suspend now, 6th executed
                dw      offset SirOff           ;Sleep SIR Leds
                dw      WaitSecDelay            ;Debug
                dw      offset KeyDisable
                dw      WaitSecDelay            ;Debug
                dw      offset PCISleep         ;Sleep PCI bus
        ENDIF  ;zzzlily
                dw      END_TABLE               ;End of table, do not add anything
                                                ;here
        ;
        ; RESUME Functions - Resume table, please see SUSPENDTable for references.
        ;
                public ResumeTable
        ResumeTable   label  word
        IFDEF  zzzlily                          ;Add PCIInit
                extrn   WaitSecDelay:near       ;Debug ; This table was modified by Ashish Hira. The table was
        ; rearraged to solve a problem when resuming from suspend. Trouble
        ; report reference number 2897.
        ;
        ; Description:
        ; External PS2 mouse erratic sometimes, but the internal works when
```

TI-21405 Page 43

```
        ; coming out of suspend or standby.
        ;
        ; Found out - the sequence of resuming had a impact on keyboard being
        ; enable for the first few seconds when resuming.  If the user moved the
        ; external mouse in that time, the mouse goes erratic.

dw      offset PCIInit              ; Bring up PCI Bus
                dw      offset MarkUTime            ;
                dw      offset FPU_Resume           ;
                dw      offset SuspendInitialize;
                dw      offset KeyEnable            ; Use Keyboard from BatteryPro
                dw      offset Video_Unglobal       ;
                dw      offset SirOn                ;

        ENDIF   ;zzzlily
                dw      END_TABLE
        ;
        ; GLOBAL Functions - Global Standby table, please see SUSPENDTable for
        ;           references.
        ;
                public  GlobalTable
        GlobalTable     label   word
        IFDEF   zzzlily                             ;Global Suspend table
                dw      offset Video_Global
                dw      offset SetAutoSuspendTimer
                dw      END_TABLE
        ENDIF   ;zzzlily
        IFDEF   zzzlily                             ;PowerChange Table
                Public  PChangeTable
        PChangeTable    label   word
                extrn   SoundTVInitialize:near
                dw      SoundTVInitialize           ;vw-done;Setup Sound/TV modes
                dw      PCIInit                     ;Initialize PCI bus
                extrn   HDSetTim:near
                dw      HDSetTim                    ;vw-done;Initialize HDD Timeouts
                extrn   LocalInitialize:near
                dw      LocalInitialize
                extrn   GlobalInitialize:near
                dw      GlobalInitialize
                dw      SuspendInitialize
                dw      END_TABLE
        ENDIF   ;zzzlily
        ;
```

```
        ; UNGLOBAL Functions - Exit Global Standby table, please see SUSPENDTable
        ;              for references.
        ;
              public ExitGlobalTable
        ExitGlobalTable label  word
              IFDEF  zzzlily                          ;Add PCIInit
                    dw    PCIInit                     ;Bring up PCI Bus
                    dw    SuspendInitialize
                    dw    offset Video_UnGlobal
                    dw    END_TABLE ENDIF  ;zzzlily
                    dw    END_TABLE
              IFDEF  zzzlily                          ;Smart Pwer switch table
              ;
              ; POWERDOWNTABLE - User may alter the sequence in the POWERDOWNTable, also,
              ;         user may add customization code in this Table.
              ;         For example, VPx_Suspend is to set value to power
              ;         register 0/1 to turn on/off devices that connected to
              ;         power register 0/1.
              ;
              public PowerDownTable
              PowerDownTable  label  word
                    dw    offset VidSuspend           ;Place Screen Memory into suspend
                    dw    offset HDDDisable           ;Take hard drive Down!
                    dw    END_TABLE                   ;End of table, do not add anything public FactoryPowerDownTable
              FactoryPowerDownTable  label  word
                    dw    offset HDDDisable           ;Take hard drive Down!
                    dw    END_TABLE                   ;End of table, do not add anything ENDIF  ;zzzlily
```

What is claimed is:

1. An apparatus, comprising:
   a means for user input;
   a means for output;
   a processor coupled to said means for user input and means for output;
   a software controlled switch for coupling power to said processor, said switch having a first mode of operation wherein power to said processor is terminated substantially simultaneously with user actuation of said switch, and a second mode of operation wherein power to said processor is terminated upon completion of both said switch being user actuated and software releasing control of said switch at a time not substantially simultaneous with user actuation of said switch; and
   a timer circuit coupled to said switch, said timer circuit including a power off timer with a set value that initiates a shut down procedure when said power off timer times out.

2. The apparatus of claim 1, wherein said software controlled switch further includes a third mode of operation wherein power to said processor is terminated upon completion of said switch being user actuated and one of said software releasing control of said switch within a time period less than said set value and said power off timer completing said shut down procedure in the event said software does not release control of said switch within a time period less than said set value.

3. The apparatus of claim 2, wherein said software sets said power off timer to time out instantly upon completion of both said switch being user actuated and said software releasing control of said switch prior to said time period reaching said set value.

4. The apparatus of claim 1, wherein said software controlling said switch in said second mode of operation initiates a software shutdown process.

5. The apparatus of claim 1, wherein said software controlling said switch in said second mode of operation initiates a hardware shutdown process.

6. The apparatus of claim 1, wherein said software controlling said switch in said second mode of operation initiates a software and hardware shutdown process.

7. The apparatus of claim 1, wherein said set value is a default value.

8. The apparatus of claim 1, wherein said software sets said default value.

9. The apparatus of claim 1, wherein a user of said apparatus sets said default value.

10. The apparatus of claim 1, wherein said set value is resetable by said processor.

11. The apparatus of claim 1, wherein said processor is a central processing unit (CPU).

12. The apparatus of claim 1, wherein said processor is an application processor.

13. The apparatus of claim 1, wherein said apparatus is a computer.

14. The computer of claim 13, wherein said software is implemented in the bootup process of said computer.

15. The computer of claim 13, wherein said software is implemented when a user of said computer actuates said switch.

16. The computer of claim 13, wherein said software controlled switch further includes a power failure mode wherein a power shut down procedure is initiated in the event that battery power level drops below a predetermined value.

17. The computer of claim 13, wherein when said power switch is actuated to be on, the system boots, the software boots, the Basic Input/Output System (BIOS) initializes and then the timer is set to zero and the power switch is activated in said first mode of operation.

18. The computer of claim 17, wherein subsequent to said power switch being activated in said first mode of operation, and through the process of initializing the rest of the computer's system, said software determines whether or not to change said switch from said first mode of operation to said second mode of operation.

19. The computer of claim 13, wherein said switch is programmed to watch for a System Management Interrupt (SMI).

20. The computer of claim 19, wherein said switch is set to act real time upon an SMI.

21. The computer of claim 20, wherein when the SMI interrupt is detected, the heads of a hard drive coupled to said processor are positioned and parked, the power to the hard drive and a display coupled to the processor is terminated, after which the CMOS parameters that need to be saved are saved.

22. The computer of claim 13, wherein said switch is set to act upon an SMI at a later time.

23. The computer of claim 22, wherein said software allows the computer's operating system and other programs to prepare for shut down, including but not limited to, closing files, updating any pertinent parameters, after which the heads of a hard drive coupled to said processor are positioned and parked, the power to the hard drive and a display coupled to the processor is terminated, after which the CMOS parameters that need to be saved are saved.

24. A computer, comprising:
   a display;
   a keyboard;
   a central processor unit (CPU) coupled to said display and said keyboard;
   a software controlled switch for coupling power to said central processing unit (CPU), said switch having a first mode of operation wherein power to said processor is terminated substantially simultaneously with user actuation of said switch, and a second mode of operation wherein power to said central processing unit (CPU) is terminated upon completion of both said switch being user actuated and software releasing control of said switch at a time not substantially simultaneous with user actuation of said switch; and
   a timer circuit coupled to said switch, said timer circuit including a power off timer with a set value that initiates a shut down procedure when said power off timer times out.

25. The computer of claim 24, wherein said software controlled switch further includes a third mode of operation wherein power to said central processing unit (CPU) is terminated upon completion of said switch being user actuated and one of said software releasing control of said switch within a time period less than said set value and said power off timer completing said shut down procedure in the event said software does not release control of said switch within a time period less than said set value.

26. The computer of claim 25, wherein said software sets said power off timer to time out instantly upon completion of both said switch being actuated and said software releasing control of said switch prior to said time period reaching said set value.

27. The computer of claim 24, wherein said software controlling said switch in said second mode of operation initiates a software shutdown process.

28. The computer of claim 24, wherein said software controlling said switch in said second mode of operation initiates a hardware shutdown process.

29. The computer of claim 24, wherein said software controlling said switch in said second mode of operation initiates a software and hardware shutdown process.

30. The computer of claim 24, wherein said set value is a default value.

31. The computer of claim 24, wherein said software sets said default value.

32. The computer of claim 24, wherein a user of said apparatus sets said default value.

33. The computer of claim 24, wherein said set value is resetable by said central processing unit (CPU).

34. A method of controlling power to an apparatus, comprising the step of:
   providing a user input;
   providing an output;
   providing a processor coupled to said user input and output;
   providing a software controlled switch for coupling power to said processor, said switch having a first mode of operation wherein power to said processor is terminated substantially simultaneously with user actuation of said switch, and a second mode of operation wherein power to said processor is terminated upon completion of both said switch being user actuated and software releasing control of said switch at a time not substantially simultaneous with user actuation of said switch; and
   providing a timer circuit for coupling to said switch, said timer circuit including a power off timer with a set value that initiates a shut down procedure when said power off timer times out.

35. The method of claim 34, wherein said software controlled switch further includes a third mode of operation wherein power to said processor is terminated upon completion of said switch being user actuated and one of said software releasing control of said switch within a time period less than said set value and said power off timer completing said shut down procedure in the event said software does not release control of said switch within a time period less than said set value.

36. The method of claim 35, wherein said software sets said power off timer to time out instantly upon completion of both said switch being user actuated and said software releasing control of said switch prior to said time period reaching said set value.

37. The method of claim 34, wherein said software controlling said switch in said second mode of operation initiates a software shutdown process.

38. The method of claim 34, wherein said software controlling said switch in said second mode of operation initiates a hardware shutdown process.

39. The method of claim 34, wherein said software controlling said switch in said second mode of operation initiates a software and hardware shutdown process.

40. The method of claim 34, wherein said set value is a default value.

41. The method of claim 34, wherein said software sets said default value.

42. The method of claim 34, wherein a user of said apparatus sets said default value.

43. The method of claim 34, wherein said set value is resetable by said processor.

44. The method of claim 34, wherein said processor is a central processing unit (CPU).

45. The method of claim 34, wherein said processor is an application processor.

46. The method of claim 34, wherein said apparatus is a computer.

47. The method of claim 46, wherein said software is implemented in the bootup process of said computer.

48. The method of claim 46, wherein said software is implemented when a user of said computer actuates said switch.

49. The method of claim 46, wherein said software controlled switch further includes a power failure mode wherein a power shut down procedure is initiated in the event that battery power level drops below a predetermined value.

50. The method of claim 46, wherein when said power switch is actuated to be on, the system boots, the software boots, the Basic Input/Output System (BIOS) initializes and then the timer is set to zero and the power switch is activated in said first mode of operation.

51. The method of claim 50, wherein subsequent to said power switch being activated in said first mode of operation, and through the process of initializing the rest of the computer's system, said software determines whether or not to change said switch from said first mode of operation to said second mode of operation.

52. The method of claim 51, wherein said software allows the computer's operating system and other programs to prepare for shut down, including but not limited to, closing files, updating any pertinent parameters, after which the heads of a hard drive coupled to said processor are positioned and parked, the power to the hard drive and a display coupled to the processor is terminated, after which the CMOS parameters that need to be saved are saved.

53. The method of claim 46, wherein said switch is programmed to watch for a System Management Interrupt (SMI).

54. The method of claim 53, wherein said switch is set to act real time upon an SMI.

55. The method of claim 54, wherein when the SMI interrupt is detected, the heads of a hard drive coupled to said processor are positioned and parked, the power to the hard drive and a display coupled to the processor is terminated, after which the CMOS parameters that need to be saved are saved.

56. The method of claim 46, wherein said switch is set to act upon an SMI at a later time.

57. An apparatus, comprising:
   a means for user input;
   a means for output;
   a processor coupled to said means for user input and means for output;
   circuitry for coupling power to said processor, said circuitry having a first mode of operation wherein power to said processor is terminated substantially simultaneously with user actuation of a switch, and a second mode of operation wherein power to said processor is terminated upon completion of both said switch being user actuated and software releasing control of said circuitry at a time not substantially simultaneous with user actuation of said switch; and
   a timer circuit coupled to said circuitry, said timer circuit including a power off timer with a set value that initiates a shut down procedure when said power off timer times out.

58. An apparatus, comprising:
   a means for user input;

a means for output;

a processor coupled to said means for user input and means for output;

a software program executed on said processor, said software program facilitating a first mode of operation wherein power to said processor is terminated substantially simultaneously with user actuation of a switch, and a second mode of operation wherein power to said processor is terminated upon completion of both said switch being user actuated and said software program triggering said termination of power at a time not substantially simultaneous with user actuation of said switch; and a timer function for initiating a termination of power to said processor when said timer times out.

59. The apparatus of claim 58, wherein said timer function is performed by hardware.

* * * * *